US009398077B2

(12) United States Patent
Bosworth et al.

(10) Patent No.: US 9,398,077 B2
(45) **Date of Patent: *Jul. 19, 2016**

(54) MOBILE APPLICATIONS

(71) Applicant: Oracle International Corporation, Redwood Shores, CA (US)

(72) Inventors: Adam Bosworth, Redwood Shores, CA (US); Richard Burdon, Redwood Shores, CA (US); Alexander Khesin, Redwood Shores, CA (US); Alexander Lloyd, Redwood Shores, CA (US); Farokh H. Eskafi, Redwood Shores, CA (US); Ken Ong, Redwood Shores, CA (US); Terry Leonard Lucas, Redwood Shores, CA (US); Alexander Bosworth, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,183

(22) Filed: Nov. 20, 2013

(65) Prior Publication Data

US 2014/0280771 A1 Sep. 18, 2014

Related U.S. Application Data

(63) Continuation of application No. 11/857,352, filed on Sep. 18, 2007, now Pat. No. 8,645,973.

(60) Provisional application No. 60/826,691, filed on Sep. 22, 2006, provisional application No. 60/852,589, filed on Oct. 18, 2006, provisional application No. 60/939,575, filed on May 22, 2007.

(51) Int. Cl.
*G06F 15/16* (2006.01)
*H04L 29/08* (2006.01)
*G06F 12/08* (2016.01)

(52) U.S. Cl.
CPC ............ *H04L 67/10* (2013.01); *G06F 12/0875* (2013.01)

(58) Field of Classification Search
None
See application file for complete search history.

(56) References Cited

U.S. PATENT DOCUMENTS

| | | | |
|---|---|---|---|
| 5,023,776 | A | 6/1991 | Gregor |
| 5,835,087 | A | 11/1998 | Herz et al. |
| 6,058,391 | A | 5/2000 | Gardner |
| 6,096,096 | A | 8/2000 | Murphy et al. |
| 6,314,408 | B1 | 11/2001 | Salas et al. |
| 6,594,682 | B2 | 7/2003 | Peterson et al. |
| 6,618,737 | B2 | 9/2003 | Arider et al. |

(Continued)

*Primary Examiner* — Diem Cao
(74) *Attorney, Agent, or Firm* — Tucker Ellis LLP

(57) ABSTRACT

Providing a framework for developing, deploying and managing sophisticated mobile solutions, with a simple Web-like programming model that integrates with existing enterprise components. Mobile applications may consist of a data model definition, user interface templates, a client side controller, which includes scripts that define actions, and, on the server side, a collection of conduits, which describe how to mediate between the data model and the enterprise. In one embodiment, the occasionally-connected application server assumes that data used by mobile applications is persistently stored and managed by external systems. The occasionally-connected data model can be a METAdata description of the mobile application's anticipated usage of this data, and be optimized to enable the efficient traversal and synchronization of this data between occasionally connected devices and external systems.

20 Claims, 30 Drawing Sheets

(56) References Cited

U.S. PATENT DOCUMENTS

| | | | | |
|---|---|---|---|---|
| 6,845,091 | B2 | 1/2005 | Ogier et al. | |
| 6,925,595 | B1 | 8/2005 | Whitledge et al. | |
| 6,941,310 | B2 * | 9/2005 | Ahad et al. | |
| 6,944,623 | B2 | 9/2005 | Kim | |
| 7,003,566 | B2 | 2/2006 | Codella et al. | |
| 7,020,697 | B1 | 3/2006 | Goodman et al. | |
| 7,032,033 | B1 | 4/2006 | Ledoux et al. | |
| 7,062,515 | B1 | 6/2006 | Thomas et al. | |
| 7,062,756 | B2 | 6/2006 | Kamen et al. | |
| 7,076,508 | B2 | 7/2006 | Bourbonnais et al. | |
| 7,099,926 | B1 * | 8/2006 | Ims et al. | 709/217 |
| 7,155,447 | B2 | 12/2006 | Roberge et al. | |
| 7,159,174 | B2 | 1/2007 | Johnson et al. | |
| 7,222,169 | B2 | 5/2007 | Koshimizu et al. | |
| 7,240,091 | B1 | 7/2007 | Hopmann et al. | |
| 7,242,925 | B2 | 7/2007 | O'Neil et al. | |
| 7,252,243 | B2 | 8/2007 | Bjorn et al. | |
| 7,257,649 | B2 | 8/2007 | Rabbers et al. | |
| 7,263,551 | B2 | 8/2007 | Belfiore et al. | |
| 7,392,308 | B2 | 6/2008 | Aufricht et al. | |
| 7,467,389 | B2 | 12/2008 | Mukkamala et al. | |
| 8,165,146 | B1 * | 4/2012 | Melick et al. | 370/428 |
| 2001/0034733 | A1 | 10/2001 | Prompt et al. | |
| 2001/0051949 | A1 | 12/2001 | Carey et al. | |
| 2002/0004796 | A1 | 1/2002 | Vange et al. | |
| 2002/0033843 | A1 | 3/2002 | Loos et al. | |
| 2002/0059345 | A1 | 5/2002 | Wang et al. | |
| 2002/0059425 | A1 | 5/2002 | Belfiore et al. | |
| 2002/0065879 | A1 | 5/2002 | Ambrose et al. | |
| 2002/0099818 | A1 | 7/2002 | Russell et al. | |
| 2002/0116698 | A1 | 8/2002 | Lurie et al. | |
| 2002/0160745 | A1 | 10/2002 | Wang | |
| 2003/0149934 | A1 | 8/2003 | Worden | |
| 2003/0158947 | A1 | 8/2003 | Bloch et al. | |
| 2003/0172145 | A1 | 9/2003 | Nguyen | |
| 2003/0177175 | A1 | 9/2003 | Worley et al. | |
| 2003/0191832 | A1 | 10/2003 | Satyavolu et al. | |
| 2004/0001476 | A1 | 1/2004 | Islam et al. | |
| 2004/0006586 | A1 | 1/2004 | Melchione et al. | |
| 2004/0098463 | A1 | 5/2004 | Shen et al. | |
| 2004/0111464 | A1 | 6/2004 | Ho et al. | |
| 2004/0128345 | A1 | 7/2004 | Robinson et al. | |
| 2004/0163088 | A1 | 8/2004 | Frender et al. | |
| 2004/0181543 | A1 | 9/2004 | Wu et al. | |
| 2004/0225670 | A1 | 11/2004 | Cameron et al. | |
| 2005/0033767 | A1 | 2/2005 | Kamentz et al. | |
| 2005/0044165 | A1 | 2/2005 | O'Farrell et al. | |
| 2005/0050142 | A1 | 3/2005 | Capone et al. | |
| 2005/0076086 | A1 | 4/2005 | Budd et al. | |
| 2005/0138143 | A1 | 6/2005 | Thompson | |
| 2005/0149517 | A1 | 7/2005 | Cosic | |
| 2005/0160060 | A1 * | 7/2005 | Swartz et al. | 707/1 |
| 2005/0182787 | A1 | 8/2005 | Oswalt | |
| 2005/0234969 | A1 | 10/2005 | Mamou et al. | |
| 2005/0240621 | A1 | 10/2005 | Robertson et al. | |
| 2005/0246415 | A1 | 11/2005 | Belfiore et al. | |
| 2006/0004923 | A1 | 1/2006 | Cohen et al. | |
| 2006/0009213 | A1 | 1/2006 | Sturniolo et al. | |
| 2006/0136571 | A1 | 6/2006 | Kloba et al. | |
| 2006/0155759 | A1 | 7/2006 | Ramachandran et al. | |
| 2006/0177023 | A1 | 8/2006 | Vaghar et al. | |
| 2006/0236254 | A1 * | 10/2006 | Mateescu et al. | 715/762 |
| 2006/0248285 | A1 * | 11/2006 | Petev | 711/141 |
| 2007/0061336 | A1 | 3/2007 | Ramer et al. | |
| 2007/0078950 | A1 | 4/2007 | Hopkins et al. | |
| 2007/0094042 | A1 | 4/2007 | Ramer et al. | |
| 2007/0136360 | A1 | 6/2007 | Randall et al. | |
| 2007/0250503 | A1 | 10/2007 | Breinning et al. | |
| 2008/0046557 | A1 | 2/2008 | Cheng | |
| 2008/0189439 | A1 | 8/2008 | Chitre et al. | |

* cited by examiner

800

| | | Input | |
|---|---|---|---|
| | | Temporary | Permanent |
| Output | Temporary | Custom Operations | n/a |
| | Permanent | Custom Objects | Keyref/CRUD Operations |

Output = Operation (Input) ;

```
<html>
 <table>
  <tbody>
                                                    <tr>
     <td>Cuisines</td>
    </tr>
    <netui:repeater id="$allCuisines"  src="$current.@@cuisines" var="$i">
     <tr>
      <td>
       <a href="{$i.select()}">{$i.name}</a>
      </td>
     </tr>
   </netui:repeater>
  </tbody>
 </table>
 <br/>
 Total Cuisines: <span>{$current.@@cuisines.length()}</span>
</html>
```

| Cuisines | Neighborhoods | Restaurants |
|---|---|---|
| French | Eastside | Au Bouchon |
| Italian | Westside | Café Campagne |
| Chinese | Downtown | Café De Paris |

FIG. 27A

| Cuisines | Neighborhoods | Restaurants |
|---|---|---|
| French | Eastside | |
| Italian | Westside | |
| Chinese | Downtown | |

FIG. 27B

| Cuisines | Neighborhoods | Restaurants |
|---|---|---|
| French | Eastside | Au Bouchon |
| Italian | Westside | Café Campagne |
| Chinese | Downtown | Café De Paris |

FIG. 27C

| Cuisines | Neighborhoods | Restaurants |
|---|---|---|
| French | Eastside | |
| Italian | Westside | |
| Chinese | Downtown | |

FIG. 27D

```
<html>
 <table>
  <tboby>
   <tr>
    <td>Cuisines</td><td>Neighborhoods</td><td>Restaurants</td>
   </tr>
   <tr>
    <td>
     <netui:repeater id="$cuisines src="$current.@@cuisines" var="$i">
      <li><a href="{$i.select()}">{$i.name}</a></li>
     </netui:repeater>
    </td>
     <td>
      <netui:repeater id="$hoods" src="$cuisines.isSelected() ? $current.@@hoods : null"
var="$j">
      <li><a href="{$j.select()}">{$j.name}</a></li>
     </netui:repeater>
    </td>
    <td>
     <netui:repeater id="$all" src="$current.@@hoods.(name ==
$hoods.selected.name).@@restaurants" var="$k">
      <li>{$k.name}</li>
     </netui:repeater>
    </td>
   </tr>
  </tbody>
 </table>
</html>
```

FIG. 28

MOBILE APPLICATIONS

CLAIMS OF PRIORITY

This present application is a continuation of U.S. patent application Ser. No. 11/857,352, filed Sep. 18, 2007, now U.S. Pat. No. 8,645,973, issued Feb. 4, 2014 entitled "MOBILE APPLICATIONS" and which claims priority to U.S. Provisional Application No. 60/826,691, entitled "CACHING AND MOBILE BROWSER FOR MOBILE COMMUNICATION SYSTEMS" by Bosworth et al., filed on Sep. 22, 2006; to U.S. Provisional Application No. 60/852,589, entitled "CACHING AND MOBILE BROWSER FOR MOBILE COMMUNICATION SYSTEM" by Bosworth et al., filed on Oct. 18, 2006 and to U.S. Provisional Application No. 60/939,575 entitled "MOBILE APPLICATIONS" by Bosworth et al., filed on May 22, 2007.

FIELD OF THE INVENTION

The current invention relates generally to mobile application architectures, and more particularly to mobile application architectures for developing, deploying and managing applications for occasionally connected mobile devices.

BACKGROUND OF THE INVENTION

Computers and computing devices have become smaller, faster and more efficient. As a result, their functionality has evolved and they are able to store and process more information. However, there is a still a limit to what a device can store and process locally.

Lately, the development of mobile connected systems has enabled even more functionality for portable devices. These devices, including laptop computers, PDAs, cell phones, notebook computers, blackberry-type devices, and other mobile devices can be connected to the internet wherever a strong connection exists. Though applications for these devices come in several forms, users historically prefer a web base model because of the ease of application deployment and subsequent changes. Additionally, web based pages are very simple and intuitive for users to use.

There are several problems with the latest developments of mobile devices web browsing. It is not easy to get connections wherever a user is. The connection is typically through a standard phone connection, which depends on cellular phone signal strength. There are currently many dead zones in cellular phone networks, which can cause downtime for connections between a mobile device and a web server.

This is even more troublesome when considering the interaction necessary to provide web page content through a typical browser. When a user interacts with a web browser, the browser will request more information from a server based on user input. This requires an active connection between the browser and a web server in order to retrieve new information to present to a user. Thus, when a user is interacting with a web browser on a mobile device and enters an area with weak signal strength or a dead zone, the weak connection (or lack thereof) will likely provide errors in the content received by the mobile device. Thus, the user is often unable to interact with the web page in this manner.

What is needed is a mobile application architecture framework that provides an intuitive user interface and a more reliable mechanism for providing content to a user on a mobile device. The framework should also provide for developing, deploying and managing sophisticated mobile solutions while enabling a simple Web-like programming model that integrates with existing enterprise components.

BRIEF DESCRIPTION OF THE DRAWINGS

FIGS. 27 A-D illustrate displays of one example.

FIG. 28 illustrates an XHTML template file for the application of FIGS. 27 A-D.

DETAILED DESCRIPTION

Figure 1A:
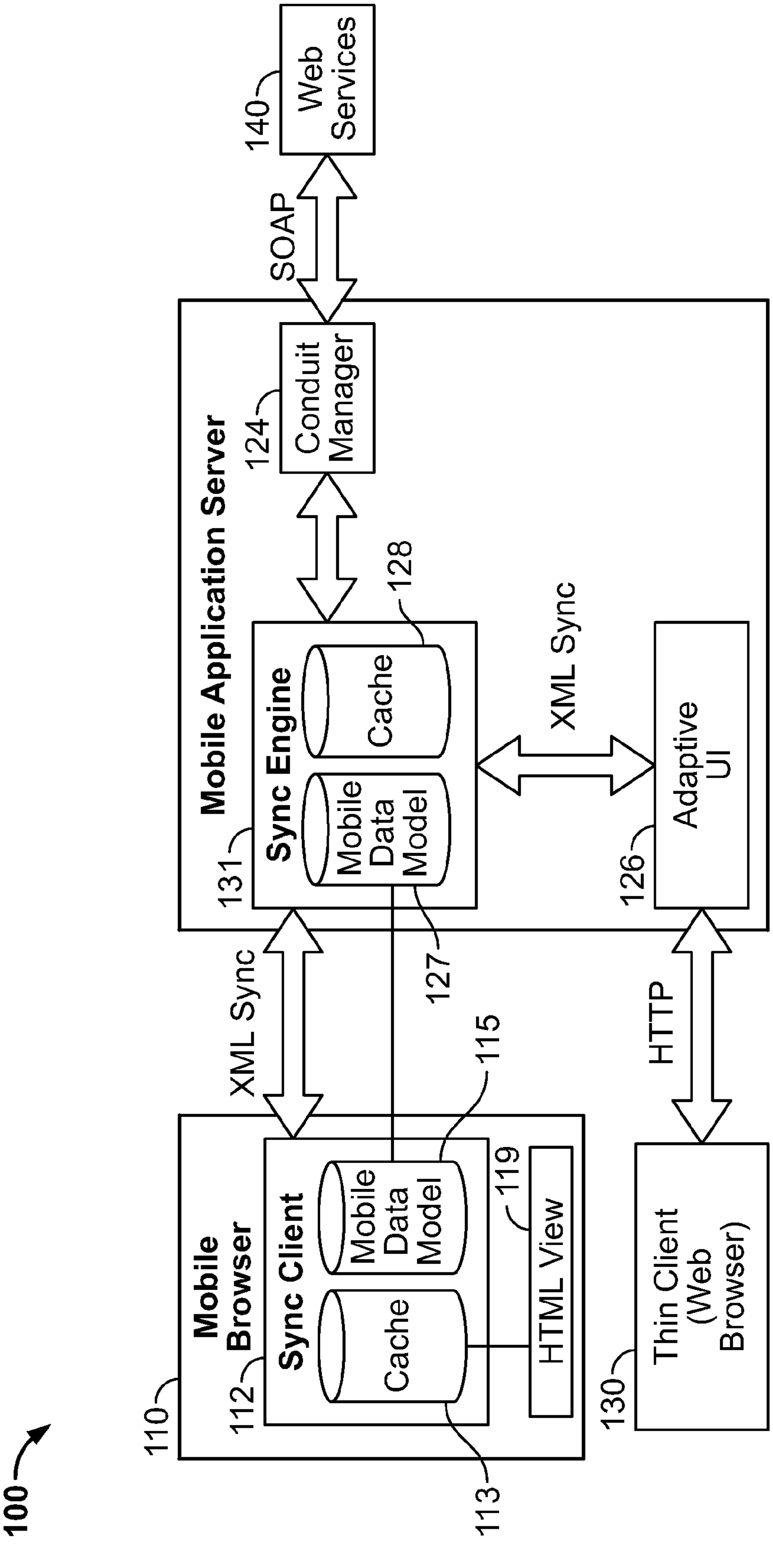
FIGS. 1A-B are illustrations of an architectural overview in accordance with one embodiment of the present invention.

One embodiment is a mobile application adapted to run on a mobile browser at a mobile device. The mobile application can comprise a controller program file; a set of presentation templates; and metadata files that describe the applications data model.

The controller file can contain action scripts. The scripts can be written in ECMAscript for XML. The action scripts can be invoked by user actions. The action script can return the name of a template to load. A begin action script can be automatically executed. Templates can define layout. Templates can include expressions. The expressions can be evaluated when a user clicks an element. The controller action can be called when the expression is evaluated. Metadata files define an object model that references local cached data. Action scripts can modify data, modify a template and cause navigation. Data can be defined in data nodes that can be locally cached. The controller file can further include function scripts.

One embodiment of the present invention is a mobile application cache including a cache manager; an in-core cache stored in memory; and a persistence cache stored on persistent memory. At least some data orders removed from the in core cache are stored on the persistent cache.

The data nodes can have an expire Time To Live (TTL) after which the data node is not returned from the mobile application cache. The data nodes can have a refresh Time To Live (TTL) after which the data node is returned with an indication that the data node may be stale. An application can request an update for stale data node for which the refresh (TTL) has been exceeded. In one embodiment, the data nodes can be accessed as a nodeset. The mobile application cache can use primary and foreign keys to access the data nodes. Data nodes can be deleted, updated and created. The cache manager can have a garbage collection component. The cache manager can have a return evaluation. The cache manager can have a data evaluator.

One embodiment of the present invention is a computer-based method comprising receiving a URL of a mobile application; setting up a virtual machine for the mobile application; setting up a sandbox environment for the mobile application; wherein the sandbox environment includes an application framework and a data management framework; and creating a display of the mobile application uses the sandbox environment.

The application framework can include a controller. The application framework can include Xscript and/or the application framework can include a bound page. The data management framework can include a cache, a SML engine and/or a transport.

In one embodiment, a Mobile Application is an application which is designed to run in a Mobile Browser.

In one embodiment, users can access a Mobile Application by referencing its URL. The first time a user references an application from a Mobile Browser, all the components of the application can be automatically downloaded from the server.

The application programming model can implement a Model-View-Controller architecture. An application can consist of controller program file (called controller.xpf) a set of presentation templates (with .tmpl extension), and META data files which describe the application's data model.

The controller file can contain function and action scripts written in ECMAScript for XML (E4X or XScript). Actions can be functions invoked by user actions. The action script can return the name of the template to load and, optionally, sets the data context for the page. When an application starts, the begin action in the controller can be automatically executed; it can return the name of the first page template to load and the data context for the page.

Templates can define layout in XHTML and may also include custom tags and XScript expressions. Expressions can reference data or other variables via the object model. URI's in HTML elements, such as links and form buttons, can contain expressions. When the user clicks on an element, the expression can be evaluated and the appropriate controller action called, which in turn can cause page navigation.

Controller script and template expressions can access data via the object model. Since the object model references local cached data, an application can run without regard for whether the user is online or offline.

Script can be written in ECMAScript for XML (aka E4X), ECMA standard ECMA-357.

Data access can be specified using the E4X notation, extended to support traversal between related nodes using the symbols →.[1]. The syntax used for navigating the hierarchy of an XML document can be similar but not identical to XPath. In one example, it uses the "." operator instead of the "/" operator. For convenience, we call this syntax SPath and the extended language XScript.

XScript can support direct operations on XML.

By convention, system variables can be un-typed and prefixed with the '$' symbol. The use of other variables can be defined by the XScript spec.

The following declarations create variables foo and bar.

```
foo = 100;
var bar = "Alchemy";
```

In on embodiment, variables that are not prefixed by the var keyword are global in scope; variables prefixed with the var keyword are locally scoped within the current function.

Variables can include XML objects. Attributes are referenced using the '@' operator.

```
var foo = <foo id-"100"><bar>Alchemy</bar></foo>;
var bar = foo.bar
bar = "Alchemy"
var id = foo.@id;
```

The value of elements can be changed directly, including with other XML:

```
foo.bar = "MAS";
foo = = <foo id = "100"><bar>MAS</bar></foo>
for.bar = <foobar>Mobilized</foobar>
foo = = <foo id = "100"><foobar>Mobilized</foobar></foo>
```

Elements and attributes not in the schema can be added implicitly (i.e., as expando properties):

```
foo.bar = <bar>Alchemy</bar>
foo.@ping = "200";
```

The +=operator can be used to insert XML. The delete operator is used to remove elements:

```
var foo – <foo><bar>Alchemy</bar></foo>;
for. bar + = <foobar>Mobilized</foobar>
```

-continued

```
foo = = <foo><bar>Alchemy</bar><foobar>Mobilized</foobar></foo>
delete foo.foobar
foo = = <foo><bar>Alchemy</bar></foo>
```

All operations can be implemented in the application's own default namespace. The application namespace can be configured by META data in the application descriptor file.

The application namespace can be automatically added to all XML operations. For example, if the default namespace were http://example.com/, the following expression:

```
var account=<account><name>Acme</name></ac-
    count>;
```

can generate the following XML:

```
<account xmlns = "http://example.com/">
  <name>Acme</name>
  </account>
```

The object model can use system variables to provide access to system objects. The following can be system objects:

| Type | Variables | Description |
|---|---|---|
| Data cache | $root | Root node into application data virtual XML. |
| Data cache | $current | Read-only cursor into the application data. |
| Controller | $pageFlow | Refers to the controller object and system- and its user-defined functions and actions. |
| History | $history | The user's history stack. |
| Temporary | $context | Object for temporary variables. |
| Template | $page | Template object. |
| App setting | $app | Application specific persisted settings. |
| User | $user | User specific settings. |
| Connection | $connection | Connection info. |

The controller can contain action and function scripts. Action scripts can be invoked from templates based on user action. The action scripts can define the page flow of the application.

Controller functions and actions can be called directly or as member functions of the $pageFlow object.

Actions can provide a mechanism for the application to modify data, modify the current template, or to effect navigation. For example, actions might create or update a data node, compute a total on a particular node set or change the currency to a different part of the data model. In one embodiment, when template expressions can only access data in the cache (or in $context), actions provide the only mechanism to interact with external systems.

Actions can be called from the HREF attribute in HTML links:

```
<a href="xscript:$pageFlow.actionName
    ('Hello')">Example 1</a>
```

They can be called using the same syntax as regular XScript functions:

```
$pageFlow.actionName([param1(, param2])
```

A controller file can minimally include a begin action which is called when an application is run. Minimally, the begin function can return a forward array that contains the filename of the first template to be displayed.

```
function begin( )
{
  return ["home.tmpl", $root->accounts];
}
```

Actions need not directly modify the $current variable, but if a second object is returned in the forward array, $current can be set to reference that object.

Functions, actions, and template expressions can share temporary variables using $context.

Actions can return a forward array. A forward array can be an array of up to 2 XScript objects. In one embodiment, the first object specifies the next template to display and the second object, if present, is a pointer to the data which is used to set $current:

```
function actionName( ) {
return [forward-object1, forward-object2];
}
```

In one embodiment, forward-object 1 can either be a predefined constant string or a string variable which evaluates to the name of a template file:

| Forward Object | Controller Action |
|---|---|
| CONTINUE | redisplay current template |
| BACK | Go back in history stack |
| FORWARD | Go forward in history stack |
| Template-filename | navigate to specified template; i.e., set $page=template-filename |

Forward-object2, if present, can be an expression which evaluates to a SPath into the object model. Upon return, the controller can set $current to that SPath. In one embodiment, if a forwardobject2 is specified, then a forward-object1 must also be specified (it can be "CONTINUE", if no navigation is desired).

An action return can also call another action and return the forward array returned by the called action.

The following are examples of legal forward arrays.

```
return [ ];
return ["BACK"]
return ["home.tmpl"];
return ["home.tmpl", $root->accounts];
return ["CONTINUE", $root->accounts];
return action2( );
```

If the action returns nothing, it is equivalent to returning ["CONTINUE"].

In the example below, the action can use a context variable to perform a calculation and on success navigate to the showorder template. On error, the action can set the error context variable and instruct the controller to remain on the current template.

```
function calulateTotal( ) {
if ($context.order.qty <= 0) {
$context.error = "Error: Quantity not set.";
return ["CONTINUE"];
}
```

-continued

```
$context.order.total = $context.order.price * $context.order.qty;
return ["showOrder.tmpl"];
}
```

Controller functions and actions can be callable via the $pageFlow object. In addition to user-defined actions and functions, the following system actions and functions can be provided.

The navigate action can be used to effect navigation.

| Function | Meaning |
|---|---|
| Navigate (template[, SPath]) | Causes navigation and sets $context and $page variables |

Timers implement a simple event mechanism:

| Function | Meaning |
|---|---|
| timerID = addTimer (callback, delay [, period]) | Invoke callback function after delay interval, and optionally, every period interval. Function returns a unique identifier for the timer instance. |
| cancelTimer (timerID) | Cancels the timer identified by the timerID variable. |

The function parameters are:

| Parameter | Type | Description |
|---|---|---|
| Callback | function | Specifies the name of the function to be invoked; the callback is passed the timer ID and a counter. |
| Delay | Integer | Specifies the initial delay (using xsd:duration type format) in milliseconds. |
| Period | Integer | Optionally, specifies the repeat interval (using xsd:duration type format) in seconds. |

The duration format for xsd: duration (defined by ISO 8601) is a string using the form "PnYnMnDTnHnMnS". The capital letters are delimiters and can be omitted when the corresponding member is not used.

In the following example, the function foo sets a timer to call function bar.

```
function foo( ) {
var timerId = $pageFlow.addTimer(bar, 0, PT1S);
}
function bar(timerId, count) {
  . . .
    if (count = = 10) {
      $pageFlow.cancelTimer(timerId);
    }
}
```

The callback function bar can execute immediately and every second after that. The timer can be cancelled on the tenth invocation.

The browser can implement a single threaded execution model; therefore, the callback function need not be executed until after the calling function returns.

Each time navigation occurs a <$current×$context×$page> tuple can be placed onto the history stack, accessible by the $history system object.

The $history variable can implement the following functions:

| Function | Meaning |
|---|---|
| reset ( ) | Clear the history stack |
| home ( ) | move to beginning of history stack |
| end ( ) | move to end of history stack |
| back ( ) | move to previous history state |
| forward ( ) | move to next history state |
| length ( ) | Length of history stack |
| position ( ) | current position in history stack |

If the user moves back and then causes a different navigation to occur (i.e., instead of moving forward), then the entire forward history can be discarded.

Moving backwards and forwards through the history stack can preserve the currently selected values of all repeaters; form values bound to $context variables can also be preserved.

The $page object can refer to the currently rendered template. This can be used by actions to access the state of HTML controls within the currently rendered page.

Figure 13:
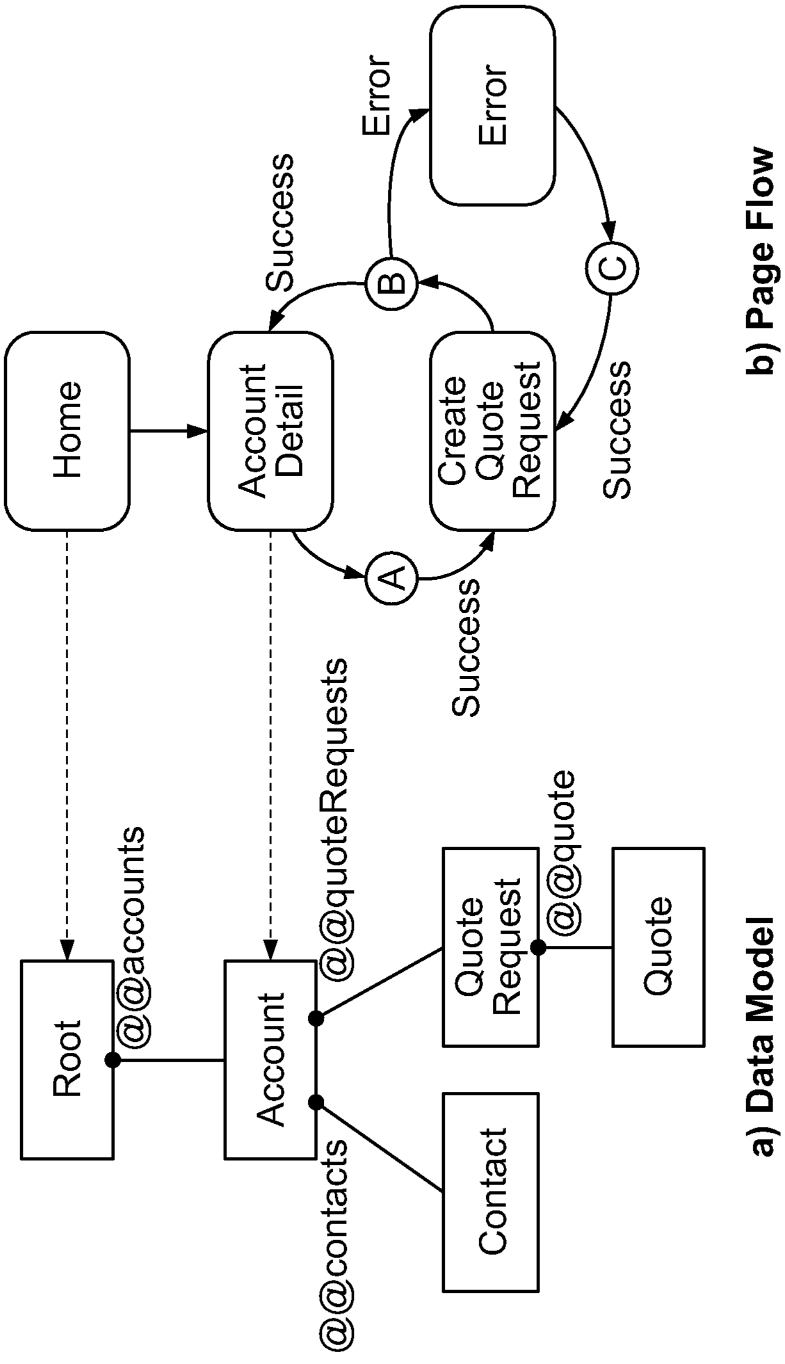
FIG. 13 shows an exemplary page flow.
Figure 14:
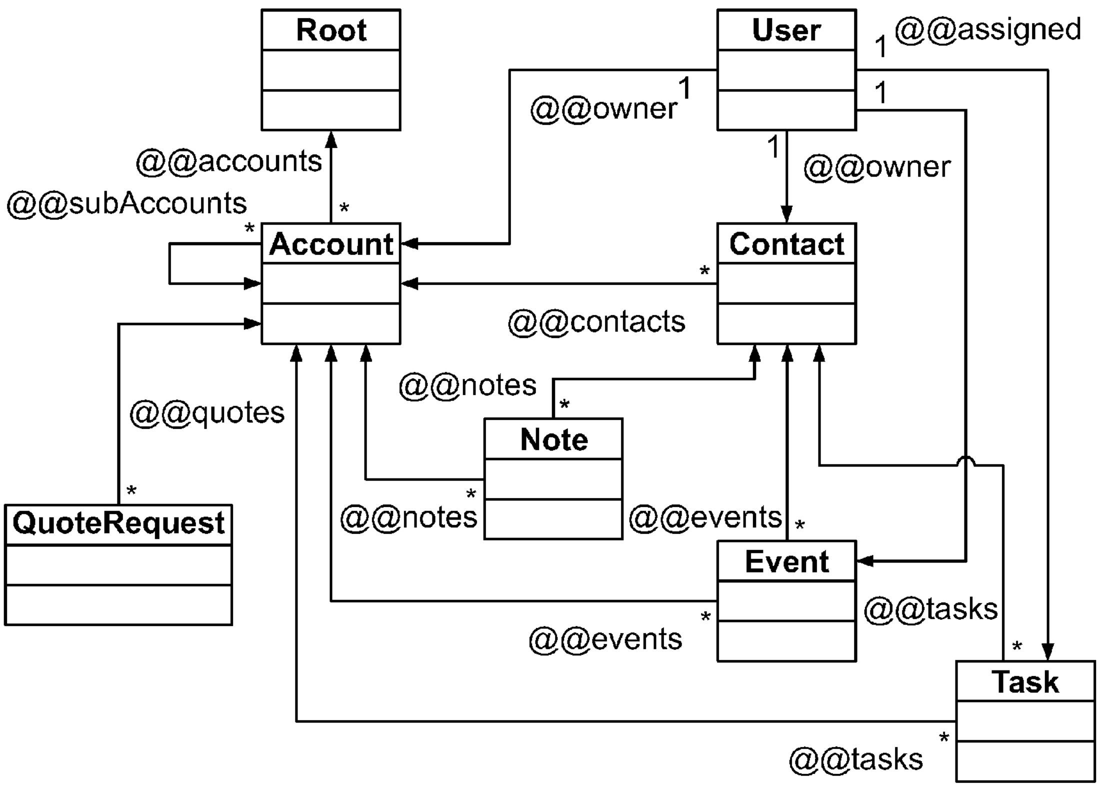
FIG. 14 shows a CRM diagram.
Figure 15:
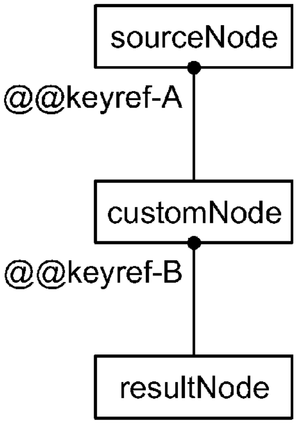
FIG. 15 shows a node diagram of one embodiment.

FIG. 13 illustrates a simple page flow for part of the CRM sample application. Diagram a) represents part of the data model (schema and keyrefs); diagram b) represents the page flow, which consists of four templates—each with a dotted line indicating the $current nodetype.

This scenario implements a custom operation to initiate a quote request for a particular account.

This example illustrates the process of creating a custom object (quote request), which is used as the context of a select operation.

The Home template can contain repeaters that enable the user to navigate to a particular account, which invokes the AccountDetail template (see below). The AccountDetail template can show a list of previous price quotes and enables the user to invoke the createQuoteRequest action (A).

```
<a href="xscript:$pageFlow.createQuote-
    Request( )">Create Quote Request </a>
```

This can cause the following action to be invoked.

```
function createQuoteRequest( ) {
    $context.quoteRequest.prodId = " ";
  $context.quoteRequest.qty = 0;
  return ["createQuoteRequest.html"];
}
```

This action can create a <quoteRequest> XML object within the current context and set values for the prodId and qty child elements. This can create a well formed <quoteRequest> element and can be equivalent to the following expression:

```
$context.quoteRequest=<quoteRequest><prodId/></
    qty>O<qty></quoteRequest>;
```

The action can then return a "template" forward path, invoking the createQuoteRequest template without changing the $current variable. An example of a createQuoteRequest template is shown below. Note, that $current still points to the account node.

```
<p>Quote Request for {current.label( )}</p>
<form action="submitQuoteRequest( )">
   <table><tbody>
      <tr>
         <td>Product ID</td>
         <td><input xdoc:bind="$context.quoteRequest.prodId"/></td>
      </tr>
      <tr>
         <td>Quantity</td>
         <td><input xdoc:bind="$context.quoteRequest.qty"/></td>
      </tr>
      <tr>
         <td colspan="2">
         <input type = "submit" value = "Submit"/>
         </td>
      </tr>
   </tbody></table>
</form>
```

| Quote Request for Acme | |
|---|---|
| Product ID | |
| Quantity | 0 |
| Submit | |

This template enables the user to edit the <quoteRequest> element created by the previous action. The form submit action can copy the current form values into the bound $context variables, then invoke the submitQuoteRequest action (B) below.

```
function submitQuoteRequest( ) {
if ($context.quoteRequest.prodId ! = | | $context.quoteRequest.qty < = 0) {
   return ["CONTINUE"];
}
else {
   $current->quoteRequests.create($context.quoteRequest);
   return ["BACK"];
   }
}
```

The action can perform validation on the <quoteRequest> element's values and returns to the template (CONTINUE) if there is an error. Otherwise, it can add the <quoteRequest> element to the quoteRequests keyref for the current account. Note, the $context.quoteRequest variable is a well-formed <quoteRequest> element containing the values bound from the form, for example:

```
           <quoteRequest>
              <prodId>Widget-Z</prodId>
              <qty>I000</qty>
           </quoteRequest>
```

On success, the action can navigate "BACK" to the previous AccountDetail template (BACK). The AccountDetail template, below, can display the list of synchronized price-Quotes.

```
   <p>Account: {$current}</p>
   <td>Product ID</td><td>Quantity</td><td>Price</td>
   <xdoc:repeater source = "$currant->quoteRequests"
   iterator="i"> <td>{i.prodId}</td>
      <td>(i.qty)</td>
      <td>(i->quote.price)</td>
```

-continued

```
   </xdoc:repeater>
   <a href = "xscript:$pageFlow.createQuoteRequest( )}">Create
   Quote Request</a>
```

This template can create the display below:

| Account: Acme | | |
|---|---|---|
| Product ID | Quantity | Price |
| Widget-X | 100 | 2000.00 |
| Widget-Y | 200 | 1575.00 |
| Widget-Z | 1000 | |
| Create Quote Requests | | |

The submitQuoteRequest action above can return immediately, so the new quoteRequest node need not display a price field until the server has responded with a synchronized quote node.

Templates can be well formed (and validated) XHTML pages that make up the application's user interface. Templates can reference data (via expressions) and call controller actions based on user action, but need not modify data directly.

Templates can reference data via the $current system variable. Templates may also contain repeaters, which iterate over a specified part of the data or data model. Repeaters can enable the template to automatically create data-driven lists and tables, and enable the user to select individual records and invoke actions or navigation on them.

Templates can generate events by defining HTML <a> links with HREF values bound to an expression or action. When a user clicks on the link, the expression is evaluated and the action can be called. These expressions and actions can have side effects, including changing selection, navigating to a different template and/or changing the currency on the data.

Actions and templates can exchange temporary variables via $context. For example, a template may bind input fields to context variables or data elements. When the template invokes an action, the page's input values can automatically be copied into the bound variables.

If data is changed due to synchronization, the displayed values can be automatically updated.

Templates may contain regular JAVAScript functions in URIs using the "JavaScript:" prefix. JAVAScript function need not reference XScript actions.

Templates can incorporate data directly using expressions which contain SPath expressions. The result of the evaluated expression can be treated as regular XHTML.

Whenever control is passed back from an action, expressions in the page can be evaluated and the page is refreshed. Therefore, expressions can be used to define dynamic values for XHTML tags.

For example, the following expression can evaluate the content of the variable $context.address and puts the result into the anchor tag's href attribute:

<a href="{$context.address)">Click</a>

If an action changes the value of the context variable, the new value can be automatically displayed when control passes back to the page.

The system can support standard XHTML tags that enable navigation. For example, both the <a> and <form> tags can have href and action attributes that accept an URI. In addition to standard URI's, the URI may also reference a local template, JAVAScript or XScript using the appropriate prefix (the prefix is not case sensitive):

```
<a href = "home.tmpl">Example 1</a>
<a href = "JAVAscript:foo( )">Example 2</a>
<a href = "xscript:$pageFlow.navigate('bar.tmpl', $root)">Example 3</a>
<form action = "xscript:$pageFlow.bar( )">Example 4</a>
```

A CRM application can implement an accountDetail. tmpl page that expects $current to point to a single account node.

```
<html>
<head>
  <META current = "node"/>
  <title>Account Detail</title>
</head>
<body>
<p>Account: {$current}</p>
<a href = "xscript:$pageFlow.navigate('contacts.tmpl',
  $current->contacts)">Contacts</a>
</body>
</html>
```

Conversely, the contacts. tmpl page can expect $current to contain a set the entire set of contacts for all accounts.

```
<html>
<head>
  <META current = "nodelist"/>
  <title>Contacts</title>
</head>
<body>
<table><tbody><tr>
<xdoc:repeater id = "contacts" source = "$current" iterator = "i">
  <xdoc:if cond = "contacts.position ($context.cursor)= = i.count( )">
  <td>first</td><td>{i.first}</td>
  <td>last</td><td>(i.last)</td>
  <td>email</td><td>(i.email}</td>
  </xdoc:if>
</xdoc:repeater>
<xdoc:if cond = "$contacts.position ($context.cursor) > 0">
  <a href ="xscript:$context.cursor = $current[contacts.position
 ($context.cursor) -1]">
  previous</a>
</xdoc:if>
<xdoc:if cond = "$contacts.position ($context.cursor)
< ($contacts.length( )-1)">
<a href = "xscript:$context.cursor =
$current[contacts.position($context.cursor)+1]">
  next</a>
</xdoc:if>
</tr></tbody></table>
</body>
</html>
```

Here, the focused repeater can allow the user to cycle through the collection of contact nodes.

Mobile Application Server (MAS) can support extensions to XHTML elements using attributes defined in the xdoc namespace. All examples use the following namespace declaration.

```
<html xmlns="http://www.w3.org/1999/xhtml"xmlns:
  xdoc="http://www.bea.com/xdoc">
```

To display data, a SPath can be enclosed in curly braces.

For example, if $current refers to a contact, then the following can show the contact's first and last name:

```
<tr>
<td>First:</td><td>{$current.name.first)</td>
```

-continued

```
<td>Last:</td><td>{$current.name.last)</td>
</tr>
```

This is read-only binding.

To write to variables, HTML form elements can be supported with the addition of the xdoc:bind attribute to map user input to the data model.

The following HTML form elements can be supported for binding read/write variables.

| HTML Tag | Description |
|---|---|
| <form> | Encloses form elements and specifies action |
| <input> | General purpose input tag that implements various simple controls based on the value of the type attribute |
| <textarea> | Allows user to input multiple lines of text |
| <select> | Allows user to select from a combo list |

Standard HTML form controls can also be supported (e.g., <button>, <label>, <fieldset>, etc.), although they need not be given special significance in the binding model.

The input tags (<input>, <textarea>, <select>) can each implement an attribute, xdoc:bind, that references a read/write variable using a SPath expression.

```
<input type="inputType"xdoc:bind="spath"/>
```

The SPath expression can typically references a $context variable. For example:

```
<input type="text"xdoc:
  bind="$context.address.name"/>
```

The variable can be used to set value of input field when the page is rendered.

Bound values can be written back into the variable only when a submit form action is invoked (typically via the <input type="submit"> tag below).

The <form> element can act as a container for input controls. It can also specify the action that will be invoked when the submit event is invoked (typically, via the submit input button).

```
<form action="xscript:expression"/>
```

The following example shows a form that contains a text input control bound to a context variable and a submit button that invokes the form's action, which calls the action, foo ( )

```
<form action = "xscript:$pageFlow.foo( )">
  <input type = "text" xdoc.= bind = "$context.bar"/>
  <input type = "submit"/>
</form>
```

Variables can be bound to form controls are updated with the current control values when the submit event is fired. This can be done either by pressing the submit button, or by invoking a JAVAScript function that raises the event.

If controls are bound to nodes within the data graph, then the submit function can automatically call update ( ) on any modified nodes.

In the following example, the anchor can invoke a JAVAScript function that calls the form's submit ( ) function.

```
<form id = "myForm" action = "xscript:$pageFlow.foo( )">
  <input type = "text" xdoc:bind = "$context.bar"/>
  <a href = "JAVAScript:foobar( )">Auto</>
  </form>
<script lang = "JAVAScript">
function foobar ( ) {
document.myForm.submit( );
}
</script>
```

The JAVAScript function can modify context variables, for example, to enable the action invoked by the form to determine which of multiple buttons was pressed.

Forms can also support a reset ( ) function, which can revert the values of all controls to the current values of the bound variables. The reset function can be triggered either by a reset input button, or by calling the function on the form object from a JAVAScript function.

```
<form action = "xscript:$pageFlow.foo( )">
  <input type = "text" xdoc:bind = "$context.bar"/>
  <input type = "Submit"/>
  <input type = "reset"/>
</form>
```

In one embodiment, since controls only write their values back into the bound variables when submit is called, invoking any other action or navigation can cause the values to be discarded.

The following example shows a form that includes a submit button, and an anchor that is used to invoke a different action-effectively canceling any modified control values.

```
<form id = "myForm" action = "xscript:$pageF1ow.foo( )">
  <input type="text" xdoc:bind = "$contextbar"/>
  <input type = "submit" value = "Submit"/>
  <a href = "xscript:$pageFlow.bar( )">Cancel</>
</form>
```

The <input> tag can be a general purpose input tag that implements various simple controls based on the value of its type attribute.

```
<input type="inputType"xdoc:bind="spath-expr"/>
```

The framework can add the xdoc:bind attribute to the standard attributes supported in XHTML.

The following types of <input> tags can be supported.

| Input Type | Variable Type | Description |
|---|---|---|
| Text | String | Allows user to input/edit a single line of text |
| Radio | Boolean | Allows user to select a single value from a list of choices. Radio inputs are joined by common xdoc:bind variables |
| checkbox | Boolean | Allows user to check a box to add the checkbox 'value' to bound variable |
| password | String | Allows user to enter a string displaying a series of "*" characters instead of the actual string contents |
| hidden | Sting | Allows hidden value to be bound |
| readonly | String | Allows read-only value to be bound |

-continued

| Input Type | Variable Type | Description |
|---|---|---|
| Image | Coordinates | Triggers form submission (i.e., binding and action), and can optionally bind coordinates of image click to bind variable |
| button | n/a | Creates a button that does not trigger form submit |
| submit | n/a | Creats a submit button |
| Reset | n/a | Resets values of input elements to initial values |

The following examples illustrate the various forms of <input> tag.

```
<input type = "text" xdoc.bind = "$context.contact.email"/>
<input type = "radio" xdoc:bind = "$context.contact.selected"
value = "yes"/>
<input type = "radio" xdoc:bind = "$context.contact.selected" value =
"no"/>
<input type = "checkbox" value = "chinese" xdoc:bind =
"$context.contact.langSpoken"/>
<input type="password" xdoc:bind = "$context.login.password"/>
<input type = "hidden" xdoc:bind = "$context.contact.MailingCountry"
value"USA"/>
<input type = "button" value = "press this button"/>
```

The radio tag can be grouped so that only a single value may be selected. In one embodiment, each radio tag within the same logical group binds to the same SPath expression.

```
<p>Selected:
<input type = "radio" xdoc:bind = "$context.contact.selected"
value="yes">Yes</input>
<input type = "radio" xdoc:bind="$context.contact.selected"
value="no">No</input>
</p>
```

The currently selected control can bind the value specified by the value attribute to the SPath expression. If no value attribute is specified then the Boolean value true is set.

The submit type can trigger form submission.

```
<input type="submit"value="click me"!>
```

When clicked, this can cause all bound variables (in the form) to be written with the current input tag inputs, then triggers the action specified in the form element attribute action.

The <textarea> tag can enable the user to input and edit multiple lines of text, which may involve displaying scroll-bars.

```
<textarea xdoc:bind="spath-expr"/>
```

The framework can add the xdoc:bind attribute to the standard attributes supported in XHTML.

For example, the following XHTML element can create a <textarea> element that is bound to the comments child element of a note node, which is referenced by the $context variable.

```
<textarea xdoc:bind="$current.note.comments"/>
```

The <select> tag can enable the user to select one of many application defined values from a dropdown control.

```
<select xdoc:bind="spath-expr"/>
```

The framework can add the xdoc:bind attribute to the standard attributes supported in HTML.

The contactType schema definition can contain a salutation element, which is defined to have the contactSalutationEnum type.

```
<xsd:complexType name = "contactType">
  <xsd:sequence>
    <xsd:element name = "salutation" type = "contactSalutationEnum"/>
    <xsd:element name = "first" type = "xsd:string"/>
    <xsd:element name = "last" type = "xsd:string"/>
    <xsd:element name = "email" type="xsd:string"/>
</xsd:sequence>
</xsd:complexType>
<xsd:simpleType name = "contactSalutationEnum">
  <xsd:restriction base = "xsd: string">
    <xsd:enumeration value = "Mr"/>
    <xsd:enumeration value = "Mrs"/>
    <xsd:enumeration value = "Ms"/>
    <xsd:enumeration value = "Dr"/>
  </xsd:restriction>
</xsd:simpleType>
```

The following XHTML can be used to create the <select> element.

```
<select xdoc:bind="$context.contact.salutation">
```

Option values can be declared explicitly:

```
<select xdoc:bind = "$context.contact.salutation">
  <option value = "Mr">Mr</option>
  <option value = "Ms">Ms</option>
  <option value = "Mrs">Mrs</option>
  <option value = "Dr">Dr</option>
</select>
```

Alternately, option values can be created using a repeater:

```
<select xdoc:bind = "$context.contact.salutation" iterator="i">
  <xdoc:repeater source = "$app.schema ('contactSalutationEnum')">
  <option
  value = "(i.@value}">(i.@value)</option>
  </xdoc:repeater>
</select>
```

The value matching the xdoc:bind expression can be selected as the default option. If the bound value is null, then the first option can be selected.

The following example binds the email context variable to a text input field. The corresponding action can either be invoked using the form's action attribute, or with a nested anchor tag.

```
<form action = "$pageFlow.inputEmailAddrees( )">
  <input type = "text" xdoc:bind = "$context.email"/>
  <input type = "submit" value = "Submit"/>
</form>
```

Typically context variables are first instantiated in a preceding action that causes the template to be displayed. The following anchor can invoke the addContact ( ) action:

```
<a href="xscript:$pageFlow.addContact( )/">Create
  New Contact</a>\
```

The action addContact ( ) defined below, first resets all context variables. It then initializes five context variables, implicitly creating them. Finally, it directs the controller to display the addcontact template.

```
function addcontact( ) {
  $context.reset( );
  $context.account = $current;
  $context.salutation = " ";
  $context.first = " "
  $context.last = " "
  $context.email= " "
  return ["addContact.tmpl"];
}
```

The addContact template can display a form with bound input fields.

```
<form action = "$pageFlow.createContact( )">
  <table><tbody>
    <tr>
      <td>Title</td>
      <td>
        <select xdoc:bind = $context.salutation">
          <option value = "Mr">Mr</option>
          <option value = "Ms">MS</option>
          <option value = "Mrs">Mrs</option>
          <option value ="Dr">Dr</option>
        </select>
    </td>
  </tr>
  <tr>
    <td>First</td><td><input type="text" xdoc:bind =
    $context.first"/></td>
  </tr>
  <tr>
    <td>Last</td><td><input type = "text" xdoc:bind =
    $context.last"/></td>
  </tr>
  <tr>
    <td>Email</td><td><input type = "text" xdoc:bind =
  "$context.email"/></td>
</tr>
<tr colspan = "2">
  <td><input type = "submit" value = "Create"/></td>
</tr>
  </tbody></table>
</form>
```

When a form containing bound variables is submitted, the variables can be set with the current XHTML form values. In this case, the submit <input> element can invoke the form's createContact action below.

```
function createContact( ) {
$context.account->contacts.create(
  <contact>
    <salutation>{$context.salutation)</salutation>
    <first>($context.first}</first>
    <last>($context.last)</last>
    <email>($context.email}</email>
</contact>
);
  return ["showContacts.tmpl"];
}
```

The standard XHTML <img> tag can be used to display images.

```
<img
[src = "filename"]
[xdoc:content = "spath-expr"]
[xdoc:type = "content-type"] />
```

The image tag defines the following attributes:

| Attribute | Type | Description |
|---|---|---|
| Src | String | Filename. |
| Xdoc :content | SPath | Raw binary_ |
| Xdoc: type | String | Browser supported MIME type (e.g., "image/x-ms- bmp" |

In addition to the standard XHTML attributes, the framework can support xdoc: content and xdoc type attributes to declare an SPath expression which references an element that contains the image's binary source. This can require that one of the node types define a suitable element within its XML Schema definition.

For example, the contact schema below has been extended to incorporate an <image> data element.

```
<xsd:complexType name = "contactType">
  <xsd:sequence>
    <xsd:element name = "salutation" type = "contactSalutationEnum"/>
    <xsd:element name = "first" type = "xsd:string"/>
    <xsd:element name = "last" type = "xsd:string"/>
    <xsd:element name = "email" type = "xsd:string"/>
    <xsd:element name = "image" type = "xsd:base64Binary"/>
  </xsd:sequence>
</xsd:complexType>
```

This can be referred to using the following XHTML:

```
<img xdoc:content="$current.contact.inage"xdoc:
    type="image/x-ms-bmp"/>
```

In addition to extending existing XHTML elements, the Mobile Browser can support additional elements using the xdoc namespace.

The <xdoc:if> tag can be used to conditionally include XHTML segments based on a computed condition.

```
<xdoc:if cond="spath-expr"> . . . </xdoc:if>
```

The cond attribute can define a SPath expression, which is evaluated when the page is rendered. If this expression evaluates to true, then the XHTML segment contained within the <xdoc:if> element can be inserted into the XHTML page.

The expression uses standard XScript coercion to evaluate a Boolean result. The following expressions can all evaluate to true:

```
{true}
{100}
{"some string"}
{<xml>}
{$root}
```

The example below includes the <if> tag to implement conditional template. Here, the $current.email table column is only displayed if the variable is non-null (i.e., empty, or zero length, text); all other values coerce to true.

```
<table> <tbody>
  <tr>
    <td>{$current.salutation}</td>
    <td>{$current. first}</td>
    <td>{$current.last}</td>
<xdoc:if cond="$current.email">
    <td>{$current.email}</td>
</xdoc:if>
  </tr>
</tbody> </table>
```

The conditional template can be represented as a property sheet in the template designer.

Templates incorporate regular XHTML elements and data from the data graph and system variables. They may also contain elements that generate XHTML when they are rendered.

A repeater can be an HTML generator tag that repeats over an element list (e.g., a node list of accounts). The <xdoc:repeater> can be a tag used to repeat the same HTML for element; all child elements of the <xdoc:repeater> element can be repeated for each element in the evaluated SPath expression.

```
<xdoc:repeater
  id="tag-id"
  source=" spath-expr"
  [iterater = "variable-name"]
  [selected = "spath-expr"]
  [orderBy = "orderBy-expr"]/>
```

Each <xdoc:repeater> element can have a source attribute that describes a set of nodes it should iterate over. Conceptually, all the XHTML inside of the template can get repeated for each node described by the source attribute. The repeated XHTML segment can access the iterated node instance referenced by the iterator attribute.

Repeaters can define the following attributes.

| Attribute | Type | Description |
|---|---|---|
| Id | Identifier | Uniquely defines the repeater tag |
| Repeater | SPath | Specifies SPath expression, which results in a node list (e.g., $root->accounts) |
| Iterator | Iterating variable | Defines the variable containing the iterated node; this variable only has scope within the contained XHTML |
| Selected | SPath | Specifies the initially selected node(s); can be set by the select ( ) function; reset when the value of the source expression changes |
| orderBy | String | Specifies an XQuery-like BNF expression that determines the sort order |

In one embodiment, the following functions may be called on a repeater object.

| Function | Description |
|---|---|
| Select ($i) | Set selected attribute to $i |
| Position ($node) | Returns the ordinal position of the node in the repeater source (or −1 if not found) |
| Length ( ) | Return number of items in list |
| Iterator ( ) | Returns current iteration of repeater |

The following template segment defines a repeater that displays the list of nodes defined by the accounts keyref.

```
<ul>
  <xdoc:repeater id = "repeaterl" source = "$current->accounts"
  iterator="i">
```

-continued

```
        <1i>(i.label( )} </1i>
    </xdoc:repeater>
    </ul>
```

This can create the following output:

```
Acme
Bancroft
Cyberdine
```

All XHTML elements can be contained within the <xdoc:repeater> elements can be repeated for each node in the node list defined by the source attribute (i.e., each account node).

The repeated section can contain anchors that invoke actions or system functions. For example, the repeater below displays a list of accounts, displaying an anchor (hyperlink) with the label of each account.

```
<ul>
<xdoc:repeater id = "repeaterl" source = "$current->accounts" iterator
="i">
   <li>
      <a href = "xscript:$pageFlow.navigate(i, 'showDetail.tmpl')">(i.label(
      )}</a>
   </li>
</xdoc:repeater>
</ul>
```

Clicking on one of the anchors can cause the system to navigate function to be invoked, causing the controller to navigate to the showDetail. tmpl template with $current set to point at the node referenced by the value of $i for the corresponding repeated element.

Repeaters can implement the built-in function, select ( ) that enables the user to select a particular element from the list. For example, the following template fragment can represent the node list above as a list of HTML anchors:

```
<ul>
<xdoc:repeater id = "repeaterl" source = "$current->accounts" iterator-"i">
   <li> <a href = "xscript:repeaterl.select(i)">(i.label( )}</a> </li>
   </xdoc:repeater>
</ul>
```

Clicking on a particular anchor can cause the repeater's selected attribute to be set to the current value of the $i variable. Other parts of the template can reference the repeater's currently selected value.

```
<ul>
<xdoc:repeater id = "repeaterl" source = "$current->accounts" iterator="i"
   selected ="{$context.preselect}">
   <li>
      <a href = "xscript:repeaterl.select(i)"
         style = '(repeaterl.selected.contains(i) ? "background-
      color:yellow":" "}>
      {i.label( )}</a>
   </li>
</xdoc:repeater>
</ul>
<p>Type:{repeaterl.selected.type}<p>
```

In the template above, the repeaters selected attribute can be preset by the calling action to a particular account; e.g.,

```
function showAccounts(name) {
      $context.preselect = $current->accounts.where(.name = = name);
      return ("showAccounts.tmpl");
   }
```

This can create the following output:

```
Acme
Bancroft
Cyberdine
Type: Direct
```

The <a> anchor above can declare a style attribute, which contains an SPath expression that changes the background color of the element if the associated item is selected.

To invoke changes in selection for the above template fragment, the user can click on anchors that reference selection actions. For example, if the user clicks on the 'Cyberdine' account, the following output can be created:

```
Acme
Bancroft
Cyberdine
Type: Direct
```

The selected attribute can be accessed by other repeaters (known as chaining) and by subsequently invoked actions. The repeated HTML section can also reference the selected attribute to visually indicate the currently selected item(s).

Repeaters can be chained together so that the selection of an element in a parent repeater influences what is displayed in a child repeater. For example, the following repeater displays the list of messages associated with the selected node (Contact) in the previous repeater.

```
<ul>
<xdoc:repeater id="repeaterl" source="$current->accounts" iterator="i">
   <li> <a href="xscript:repeaterl.select(i)">{i.label( )}</a> </li>
</xdoc:repeater>
</ul>
<br/>
<ul>
<xdoc.repeater id = "repeater2" source = "repeater1.selected->contacts"
   iterator = "j">
   <li>j.label ( ) </li>
</xdoc:repeater>
</ul>
```

The following template illustrates nested repeaters that can create a multi-columned display (illustrated below).

```
<table> <tbody>
   <tr>
      <td>App</td> <td>Repeater 1</td> <td>Repeater
      2</td> <td>Contacts</td>
</tr>
<tr>
   <td>{$current}</td>
   <td> <ul>
   <xdoc:repeater id="x" source"$current.keyref('*')" iterator="i">
      <li> <a href="xscript:x.select(i)">{i}</a> </li>
   </xdoc:repeater>
</ul> </td>
```

-continued

```
<td> <ul>
   <xdoc:repeater id="y" source="x.selected" iterator = "j">
      <li> <a href-"xscript:y.select(j)">{j}</a> </li>
   </xdoc:repeater> </ul> </td>
   <td> <ul>
      <xdoc:repeater source="y.selected->contacts" iterator="k">
         <1i>{k}</1i>
         </xdoc:repeater>
      </ul> </td>
   </tr>
</tbody> </table>
```

The first repeater can generate a list of keyref anchors; the second repeater can bind its source variable to the previous repeater's selected node, and generates a list of node anchors. The final repeater can generate a list of contact nodes. This repeater's source attribute can specifically traverses to the contacts keyref-skipping the automated keyref column.

When a repeater's select ( ) function is invoked, it automatically triggers the redisplay of the template-modifying the source of dependent repeaters, and setting the selected variable of dependent repeaters to null. Templates can avoid circular dependencies between repeaters. The select mechanism need not be considered to be navigation The sample above results in the following display:

| App | Repeater 1 | Repeater 2 | Contacts |
|---|---|---|---|
| Root | accounts | Acme<br>Bancroft<br>Cyberdine | Sarah Smith<br>David Davies |

The template above can represent the navigation part of the UI-enabling the end user to traverse a series of keyrefs.

We can further modify the UI to represent a table of nodes. For example:

```
<td>
   <table> <tbody>
      <xdoc:repeater source = "y->contacts" iterator = "k">
         <tr>
            <td>(k.email)</td>
            <td>(k.label ( )}</td>
         </tr>
      </xdoc:repeater>
   </tbody> </table>
</td>
```

This can create the following output:

| App | Repeater 1 | Repeater 2 | Contacts | |
|---|---|---|---|---|
| Root | accounts | Acme<br>Bancroft<br>Cyberdine | sarah@acmo.com<br>david@Acme.com | Sarah Smith<br>David Davies |

The repeater can also be defined to be "focused", which means that instead of iterating over the entire collection of elements defined by the source attribute, the repeater only shows one element at a time and maintains a cursor.

In one embodiment, the following additional functions may be called on a focused repeater id variable.

| Function | Description |
|---|---|
| Position ( ) | Return index position within nodeset |

In the following example, the focus attribute can declare that a single node from the nodeset is to be displayed. The action below invokes the template containing the focused repeater and sets $current to the node list relating to the specified account's contact keyref:

```
function selectContacts($account) {
   $context.cursor = $account[0];
   return ["focused Contacts.tmpl", $account);
}
```

The anchors can invoke functions on the repeater, which move the repeater's cursor.

```
<xdoc:repeater id = "s" source = "$current" iterator-"i">
   <xdoc:if cond = "s.position ($context.cursor) = = i.count ( )">
         <td> first</td> <td>{i.first}</td
         <td> last</td> <td>{i.last}</td
         <td> email</td> <td>{i.email}{/td
      </xdoc:if>
</xdoc:repeater>
<xdoc:if cond="s.position($context.cursor) > 0">
      <a
First Sarah          First David          First Roger
Last Smith           Last Davies          Last Reed
Email                Email                Email
sarah@acme.com       david@acme.com       roger@acme.com
next                 previous    next     previous
      href="xscript:$context.cursor=$current[s.position
      ($context.cursor)-1)">
      previous</a>
</xdoc:if>
<xdoc:if cond = s.position ($context.cursor) < (s.length( )-1)">
      <a href = "xscript:$context.cursor = $current [s.position
      ($context.cursor)+1]">
      next</a>
</xdoc:if>
```

Repeaters can specify the order in which elements are enumerated by declaring an orderBy attribute. The orderBy attribute can be a string that contains an XQuery-like expression:

```
<xdoc:repeater
      id="id"source="source"iterator="var"orderBy="OrderayByCause">
```

Where OrderByClause can conform to the following BNF grammar (The SPath expression represent a field value for a particular repeater item):

```
OrderByClause : : = OrderSpec ("," OrderSpec)*
OrderSpec : : = SPath OrderModifier
OrderModifier : : = ("ascending" | "descending") ?
   (("empty" "greatest") | ("empty" "least")) ?
      ("Collation" StringLiteral)?
```

The expression can assume a stable order (i.e., order of equal values should be preserved across multiple invocations).

For example, the following repeater can list contacts by the descending value of the contact's last name (i.e., i. last).

```
<xdoc:repeater source="$current->contacts" iterator="i"
   orderBy="i.last descending">
```

-continued

```
        <td>last</td> <td>(i.last)</td>
        <td>first</td> <td>(i.first)</td>
        <td>email</td> <td>{i.email</td>
    </xdoc:repeater>
```

The following repeater can sort by last name in ascending order (i.e., default) and then by first name in descending order.

```
<xdoc:repeater source="$current->contacts" iterator="i"
    orderBy="i.last empty least, i.first descending">
```

In the example above, empty last name values can be considered of least significance.

Repeaters can also be used to repeat over META data defined by the data model.

For example, the node. keyref ('*') function returns a list of keyref elements that describe the possible navigations from the corresponding nodetype. This may be used as the source of a repeater to display a list of keyrefs.

```
<ul>
<xdoc:repeater id="repeaterl" source = "$current.keyref('*')"
iterator="i"> <1i>{i.label ( )
   }</1i>
</xdoc:repeater>
</ul>
```

The example above can return the following output if $current points to an account node:

owner
subAccounts
contacts
notes
events
quotes

The node.schema ( ) function can return an XML document that represents the corresponding nodetype's XML schema definition. This can be used as the source of a repeater to build an input form.

```
<xdoc:repeater id="repeaterl" source = "$current.META( ).schema ( )"
    showNull="true" iterator="i">
<tr>
        <td>{$current.META ( ).schema( ).getFieldLabel(i)}</td>
    <td>(i)</td>
  </tr>
</xdoc:repeater>
```

The example above produces the following output:

| | |
|---|---|
| salutation | Ms |
| first | Sarah |
| last | Smith |
| email | sarah@acme.com |

The standard <xdoc: include> tag can be used to insert referenced.

```
<xdoc:include template="templateFile"
    ($current="spath-expr"]/>
```

The include tag can define a template attribute that names a template to be inserted into the current page. The optional current attribute can be used to set the $current variable within the scope of the inserted template.

For example, the following XHTML segment extends the chained repeater example, and incorporate a new repeater ($z), which displays a list of Contacts (for a particular Account, $y). The <xdoc:include> tag can include the detail. tmpl template and defines its $current variable to be the selected node of the repeater (i.e., a contact node).

```
<td><ul>
  <xdoc:repeater id="z" source="y->contacts" iterator = "k">
     <li><a href="xscript:select (k)">{k}</a></li>
  </xdoc:repeater>
</ul></td>
<td>
  <xdoc:include current = "z.selected" template="detail.tmpl"/>
</td>
```

The detail.tmpl template, of one embodiment, is defined below.

```
<td>
  <table><tbody>
    <tr><td>Detail</td></tr>
    <tr><td>{$current.label ( ) }</td></tr> <tr><td>($current.email)
    </td></tr>
  </tbody></table>
</td>
```

This can result in the following output:

| App | Repeater 1 | Repeater 2 | Contacts | Detail |
|---|---|---|---|---|
| root | accounts | Acme<br>Bancroft<br>Cyberdine | Sarah Smith<br>David Davies | David Davies<br>david@Acme.com |

The <xdoc:html> tag can be used to insert unescaped HTML into the current page.

```
<xdoc:html>{spath-expr}</xdoc:html>
```

Normally SPath expressions are evaluated and the resulting value is interpreted as a string and not processed as HTML. However, evaluated SPath expressions contained between the opening and closing <xdoc:html> tag can be inserted into the page as HTML to be processed by the browser.

For example, given the following action code:

```
$current.productDesc="<p>A<b>great</b>new prod-
      uct.</p>";
```

The following template HTML can return the output below:

```
<xdoc:html>{$current.productDesc}</xdoc:html>
```

HTML and expressions may be combined within a <xdoc: html> element. For example, the following template HTML can return the output below:

```
<xdoc:html>
<ul><li>{$current.productDesc}</li><li>{$current.productDetail}</
1i><ul>
</xdoc:html>
```

Application data can be surfaced to programs as a virtual XML document with $root pointing to its root node. Navigation to related nodes via keys and key references can be done using the →operator. Another variable, $current, can point to the current position in the data model.

Figure 2:
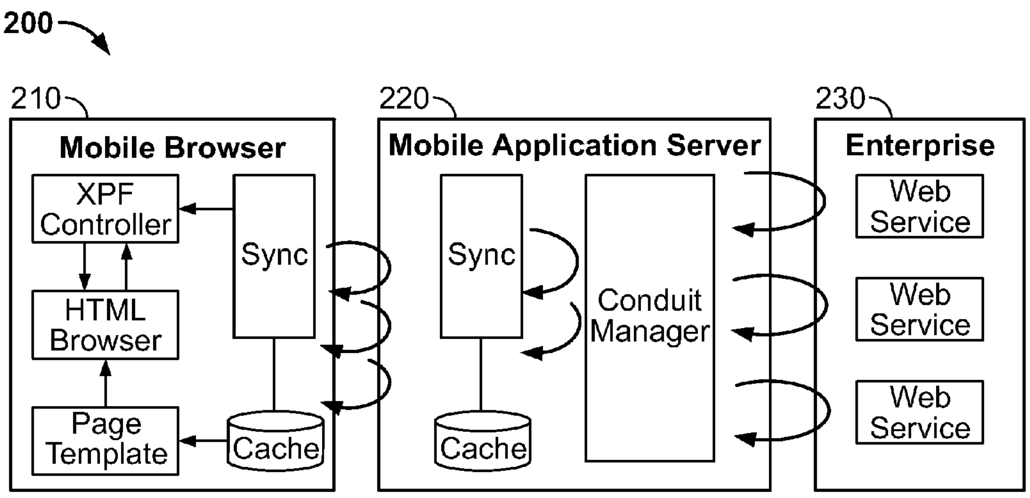
FIG. 2 is an illustration of an asynchronous interaction diagram in accordance with one embodiment of the present invention.

FIG. 2 illustrates the schema diagram for a sample CRM application; the application defines six nodetypes: Account, Contact, Note, Event, Task, and QuoteRequest.

The framework generates an XML Schema document that describes the application data model. The schema file can contain the following definitions: complex type definitions for each node type; simple type definitions for application enumerations; named key and keyref definitions of relationships between node types.

Relations between node types are defined by a keyref declaration in the schema. An alias can define the name of the relationship between a node type containing a reference and the node containing the referenced key (sometimes called a lookup). An inverseAlias can define the name of a 1:N relationship from a key to references of that key including, for some node types, an artificial reference from $root.

For example, the following keyref declaration can specify that a contact node can reference its owner account node, and that a set of contact nodes are accessible from an account node.

```
<xsd:keyref name="contactAccountRef" refer = "accountKey"
mas:alias="account">
    mas:inverseAlias="contacts">
    <xsd:selector xpath="contact"/>
    <xsd:field xpath="@accountId"/>
</xsd:keyref>
```

In the application programming model, related nodes can be accessed using the →operator.

An inverseAlias can return a nodeset. For example, the following can return the contacts nodeset for an account:

```
account→contacts;
```

or using the equivalent keyref ( ) function:

```
account.keyref ("contacts");
```

The following operators and functions can be supported on a nodeset:

| Operator Function | Description |
|---|---|
| [ ] | Accesses a particular node within a nodeset. E.g., account >contacts[0]; |
| length( ) | Returns the number of nodes in a nodeset. E.g., account >contacts.length( ); |
| Where ( ) | |

The data can be filtered using the function, which takes an SPath expression as an argument. For example, the following statement can match all contact nodes in the accounts keyref with specified last name and returns a node list.

```
$root→accounts.where (.name=="Acme");
```

This can be equivalent to the following expression.

```
$root→accounts.(thisXML.name=="Acme");
```

Where clauses can evaluate to node lists, and may be followed by a subsequent SPath expression. For example, the following expression can return a node list of contacts for all accounts named "Acme".

```
$root→accounts.where (.name=="Acme")→contacts;
```

The equivalence operation in XScript, ==, can be used in where ( ) expressions. However, care should be taken since the XQuery equivalence operation is =.

Applications can traverse the data using the object model; these traversals can cause the framework to synchronize the required data in the background. However, since the synchronization mechanism is invoked asynchronously, it can frequently be likely that an expression cannot be fully evaluated against the currently cached data.

For example, the following expression will return an empty list if accounts and contacts have not been previously synchronized and cached by the client.

```
$root→accounts→contacts→tasks;
```

In one embodiment, subsequent traversals are not initiated unless the preceding nodes are currently resident in the cache. In other words, the client code would first have first to traverse $root→accounts, then wait for a synchronization notification, then select $root→accounts→contacts, wait for another synchronization notification, then finally the expression would invoke the synchronization of all tasks for all contacts for all accounts.

The select ( ) function can enable the client to request the server to evaluate an expression on its behalf, and then to synchronize the resulting graph of nodes to the client.

The select ( ) function can be called on any keyref and can return immediately with no value. In one embodiment, the function cannot be called from within a template.

```
node→keyref.select(spath, [callback, id]);
```

The select ( ) function may also be called on the root node:

```
$root.select (spath, [callback, id]);
```

The mechanism can enable the client to request synchronization of part of the virtual XML document described by the SPath expression.

In the following example the entire expression is passed to the server, which calls successive keyref traversals and manages the synchronization of the nodes.

```
$root.select (accounts→contacts→tasks);
```

The server may return the data in one synchronization message or over multiple messages.

The select ( ) function may be called from the $root node or from within an expression. For example, the following expression requests all contacts for all accounts accessible from the root node.

```
$root.select (accounts→contacts);
```

The following expression requests all contacts for all accounts that are currently in the cache.

```
$root→accounts.select (contacts);
```

In one embodiment, an expression must not reference local functions; and the expression must not reference local variables that cannot be resolved to non-scalar values. The expression can be passed to the server, which translates the expression into a corresponding XPath expression.

Some keyrefs may be large and impractical to fully synchronize to the client. In these cases, the client can be able to filter the keyref using the where ( ) function.

For example, the following select expression can cause only account nodes matching the where ( ) predicate to be synchronized.

```
$root.select (accounts.where (.type=="Web"));
```

The following expression can select all contacts for the matching accounts above.

```
$root.select (accounts.where (.type=="Web")).con-
    tacts;
```

The following expression selects all contacts (from all accounts) that have the matching email address.

```
$root.select (accounts→contact.
    where (.email==“bobacme.com”));
```

The predicate select mechanism can also be used to allow the user to pre-select nodes that should be synchronized. For example, we can add a Boolean attribute, checked, to the account nodetype and bind this to a checkbox image within a template.

```
<form action = “xaction:$pageFlow.submit( )”>
  <xdoc:repeater id = “sl” source=“$root–>accounts’ iterator=“i”>
    <tr>
      <td><input type=“checkbox” xdoc:bind=“i.@checked”></a></td>
      <td>{i}</td>
    </tr>
  </xdoc:repeater>
  <input type = “submit”/>
</form>
```

The following expression (contained within an action invoked by the template) can cause the sync mechanism to retrieve all contacts for all of the checked accounts.

```
$root.select (accounts.where (.@checked==true)
    →contacts);
```

For example, one application of this mechanism might be having all templates for a particular application contain a “status bar” element at the bottom of each page, which binds to a temporary data value (e.g., $app.message).

```
<p>Status: <span>($app.message}</span></p>
```

An action can be called from one template that initiates a select with a callback.

```
q1 = “Q1”;
function beginSearch(email) {
  $root.select (accounts–>contact.where (.email = = email), ql, onUpdate);
}
```

In this case, the beginSearch ( ) function can take a parameter that represents a contact’s email address and selects all contacts (for all accounts) that having match email address elements.

The user defined callback function onUpdate ( ) can be called when the synchronization request completes.

```
function onUpdate(id) {
  if (id = = q1) {
    $app.message = “+ “Received results.”
  }
    . . .
}
```

The function can match the id input variable with the request constant passed into the select ( ) function above; it can then change the $app.message variable, which causes any templates binding to this variable to be refreshed.

In one embodiment, there can be two ways for the client to modify data. First, input elements in templates can be bound directly to data nodes; this mechanism enables the user to modify XML elements belonging to existing nodes and requires no code. Second, (and typically) the template can invoke an action, which modifies the data.

These changes to the data need not be synchronously sent to the server. Instead, a background process can synchronize updates to and from the server.

The create ( ) function can be used to create new nodes on the client.

```
var node = sourceNode->keyref.create (node [, callback, id]);
var node = $root.create (node [, callback, id]);
```

The function can be called either on a keyref that supports the insert conduit operation, or on the $root node. The function can return a node object.

| Parameter | Type | Description |
|---|---|---|
| Node | xml | Well formed XML object conforming to application schema for nodetype |
| Callback | function | optional callback parameter specifies the name of a function that is invoked once the sync mechanism has; received an acknowledgement from the server. |
| Id | Value | optional id parameter is passed into the callback function to identify the invocation context. |

When create ( ) is called on a keyref, the created node can contain a field that represents a foreign key referencing the source node of the keyref; In this case, the field value can automatically set by the framework.

The following script can construct a new contact node using the contacts keyref alias on the specified account object.

```
var contact =
  <contact>
    <salutation>Mr</salutation>
    <first>Sydney</first>
    <last>James</last>
    <email>sydney@james.com</email>
  </contact>;
node = account–>contacts.create (contact);
```

The last sentence can be equivalent to:

```
contact->account = account;
node = $root.create (contact);
```

A real data node need not be instantiated until the create ( ) function is called.

In one embodiment, nodes are typically created in three stages: first an action creates a context variable, and then causes a template to be displayed.

```
function init ( ) {
  $context.contact = <contact>=<salutation/>
  <first/><last/><email/></contact>;
  return [“editContact.tmpl”];
}
```

The template can bind input controls to individual context elements.

```
<input type=“text”xdoc:bind“$context.email”/>
```

The template can invoke a submit action, which can cause the framework automatically to transfer input values back into the context variables before calling the corresponding action. The action can then create the new node.

```
function create ( ) {
   $context.contact = $account->contacts.create ($context.contact);
   return ["showContact.tmpl"];
}
```

In the example above, the action can replace the current context variable ($context. contact) with the node constructed by the create ( ) function; this can enable the next template (showcontact.tmpl) to reference to created node. Before the create ( ) function is called

| Parameter | Type | Description |
|---|---|---|
| Callback | function | Optional callback parameter specifies the name of a function that is invoked once the sync mechanism has received an acknowledgement from the server. |
| Id | value | Optional id parameter is passed into the callback function to identify the invocation context |

$context. contact can just contain a well formed XML element; afterwards it can point to a real node (e.g., that supports the system data node functions).

Only keyrefs that define an insert conduit operation allow nodes to be created. In one embodiment, attempting to create a node on an invalid nodeset will cause a runtime error.

Nodes can be modified using regular XScript expressions. Changes are not persisted until the update ( ) function is called. The update ( ) function is used to synchronize nodes modified on the client.

```
node.update ([callback, id]);
```

The function can be called on a node that supports the update conduit operation.

In the following code, the first two expressions set the syncstate of the $contact node to DsYNC; the last expression sets the syncState to MODIFIED. The validate ( ) function can be called on a node to validate the XML object against the nodetype's schema definition.

```
contact.first = "Bob";
contact.address = <address><zip>10017</zip></address>;
if (contact.validate( ))
   contact.update ( );
}
```

Foreign key references can be modified directly, the same as any other fields. In one embodiment, links are only used for navigation and changes to relationships must be done by modifying the actual foreign keys directly.

The following function can successfully change the account attribute, which can change the foreign key value, which references the account node.

```
function foo (contact, account) {
   contact->accountId = account.id; //changes account foreign key
   contact.update ( );
}
```

A delete ( ) function can be used to permanently remove nodes.

```
node.delete ([callback, id]);
```

The function can be called on a node that supports the delete conduit operation.

| Parameter | Type | Description |
|---|---|---|
| Callback | Function | Optional callback parameter specifies the name of a function that is invoked once the sync mechanism has received an acknowledgement from the server. |
| Id | Value | Optional id parameter is passed into the callback function to identify the invocation context |

The delete ( ) function can immediately remove the local cache so that it is no longer accessible by the programming model. In one embodiment, any nodes that contain foreign keys referencing the deleted node will not be able to traverse to the former node; the framework need not implement any form of referential integrity.

In the following code, the account node is deleted.

```
var contacts = account->contacts;
account. delete ( );
```

After the account is deleted, the contact nodes will still contain the foreign key value of the deleted account.

The following additional functions can be defined on nodes:

| Function | Meaning |
|---|---|
| Select (spath, [force, callback, id]) | Invoke select mechanism for node graph described by the SPath expression relative to the source node; optionally defines a callback handler and cookie, which is invoked once the sync process is complete. The force parameter is a boolean value that, if true, ignores TTL values |
| Sync ("viewName" [force, callback, id]) | Establish a synchronization view on the node; optionally defines a callback handler and cookie, which is invoked once the sync process is complete. The force parameter is a boolean value that, if true, ignores TTL values. |
| cancleSync ("viewName") | Cancels the named synchronization view |
| setValue (node) | Replaces the source node with the nodes specified by the parameter; typically, the setValue ( ) function is used to set a conflicting node to the up-to-date node returned by the server. |
| Keyref ("keyrefName") Keyref("11" [, "12", . . .]) Keyref ("*") | Equivalent to ->keyrefName; keyref ("*") returns as XMLList of keyrefs. |
| Label ( ) | Return label constructed in the schema definition. |
| META ( ) | Return object that contains data model META data. |

The following functions can be defined on keyrefs:

| Function | Meaning |
|---|---|
| create (xml [, callback, id]) | Add node to keyref; the optional callback parameter specifies the name of a function that is invoked once the sync mechanism has received an acknowledgement from the server. |
| Where (spath-expr) | The SPath expression is evaluated as a predicate (or filter) on the nodeset. |
| Link (node) + = node | Set foreign key value of node (defined by keyref) to value of nodeset's source node. |
| unlink (node) − = node | Set foreign key value of node (defined by keyref) to null. |
| Sync ([force, callback, id]) | Attempts to synchronize the nodeset using timestamp based synchronization; also, instructs the garbage collection mechanism not to remove nodes from the corresponding nodeset. |
| cancelSync ( ) | Cancels the timestamp synchronization for the nodeset. |
| META ( ) | Return object that contains system state |

The client programming model can allow the developer to access part of the META data that describes the application.

META ( )

Data model META data can be accessible by calling the META ( ) function on either a node, or a keyref, for example:

```
$root.META ( );
$root.keyref ("accounts").META ( );
```

The following functions can be defined on the META object:

| Function | Meaning |
|---|---|
| Schema ( ) | returns schema object for node or keyref |

schema ( )

| Function | Meaning |
|---|---|
| getFieldLabel (spath) | Return field name; this value is used to construct forms with human readable labels corresponding to XML document elements |
| Keyref ("*") | Return list of keyrefs that refer to this schema; this function enables the client application to navigate the keyref graph without requiring instance data from the local cache |

The following template sample uses nested repeaters to construct a table representing the keyref hierarchy.

```
<xdoc:repeater id = "s1" source = "$root.keyref ('*')" iterator = "i">
  <p>(i)</p>
  <ul>
  <xdoc:repeater id = "s2" source = "s1.selected.META ( ).
  schema( ).keyref ('*')"
    Iterator = "j">
    <1i>{j}</1i>
  </xdoc:repeater>
  </ul>
</xdoc:repeater>
```

The output below can be generated for the CRM use case.

accounts
  owner
  subAccounts
  quoteRequests
  contacts
  notes
  events
  tasks Typically, data is retrieved by implementing select conduit operations that relate to a defined keyref relationship between two nodetypes; i.e., a foreign key value contained within one node identifies the primary key of a related node. The nodes that are returned by these select operations can be folded into the local cache by the framework.

Custom queries can be conduit queries (or other procedural logic) that are opaque to the client programming model; i.e., do not explicitly select (or modify) data based exclusively on primary and foreign key relationships. For example, a search operation may return a set of XML objects that match a natural language expression.

Custom operations can allow the client to pass an opaque, temporary XML object (document) to a specific conduit operation. The operation can asynchronously return a temporary XML document to a client callback.

Custom objects can involve the creation of a non-persistent node (defined by

| Parameter | Type | Description |
|---|---|---|
| Xml | xml | XML object representing custom operations input document. |
| Callback | Function | Optional callback parameter specifies the name of a function that is invoked once the sync mechanism has received an acknowledgement from the server. |
| ID | Value | Optional id parameter is passed into the callback function to identify the invocation context. |

schema), which becomes part of the graph. The operation can be invoked when the client "traverses through" a corresponding keyref, in which case, the custom object can be passed as the $source node into the corresponding select conduit operation.

Custom operations can implement Remote Procedure Call (RPC) like functionality-enabling the application to call custom conduit operations. Operations can be bound to nodetypes (or the root node) and can be invoked as function calls off a corresponding node object, node.operationName{xml [, callback, id]);

The function can return null immediately.

The following example assumes a Web service operation that has the following request and response objects:

```
<xsd:element name = "requestQuote">
  <xsd:complexType>
    <xsd:sequence>
      <xsd:element name = "prodId" type="xsd:string"/> <xsd:element
      name = "qty" type = "xsd:integer"/>
    </xsd:sequence>
  </xsd:complexType>
</xsd:element>
<xsd:element name = "requestQuoteResponse">
  <xsd:complexType>
    <xsd:sequence>
```

-continued

```
        <xsd:element name = "result" type = "xsd:double"/>
    </xsd:sequence>
  </xsd:complexType>
</xsd:element>
```

The operation can take prodId and qty input parameters and return a price value.

The application can construct an XML object that matches the operations input XML document. For example, the following XML represents a well formed <quoteRequest> element.

```
<requestQuote><prodId/><qty>0</qty></request-
    Quote>
```

An action can be invoked to create a context variable by assigning a well formed XML object containing default values. The following example creates a <quoteRequest> element and causes the controller to navigate to the inputRequest template.

```
function initiateRequest ( ) {
  $context += <requestQuote><prodId/><qty>0</qty></requestQuote>;
  return ["inputRequest.tmpl"];
}
```

The template can bind <input> elements to the individual field values.

```
<form action = "submitQuoteRequest( )">
<table><tbody>
  <tr>
    <td>Product ID</td>
    <td><input xdoc:bind = "$context.quoteRequest.prodId"/></td>
</tr>
<tr>
  <td>Quantity</td>
<td><input xdoc:bind = "$context.quoteRequest.qty"/></td>
</tr>
<tr>
  <td colspan = "2">
    <input type = "submit" value = "Submit"/>
  </td>
</tr>
</tbody></table>
</form>
```

The template can have a submit button that invokes the submit ( ) on the form, which can invoke the submitQuoteRequest ( ) action; this action can call the custom operation with the <quoteRequest> element.

```
function submitQuoteRequest ( ) {
  $root.quoteRequest ($context.quoteRequest, callback);
  return ["showRequests.tmpl"];
}
function callback (result) {
  $context.quoteResponse.price = result.price;
}
```

This custom operation function specified a callback and can return immediately; the action can then direct the controller to display the showRequests template.

The callback function can set another context variable to the XML object returned by the server.

The showRequests template can reference both the sent and callback values of the custom operation. The price element for the newly created request can initially return and empty value

```
<tr>
  <td>{$context.quoteRequest.prodId}</td>
  <td>{$context.quoteRequest.qty}</td>
  <td>{$context.quoteResponse.price}</td>
</tr>
```

| | |
|---|---|
| Widget-Z | 1000 |

When the conduit operation responds and the result is propagated to the client, the callback can be invoked and can pass the response XML object; e.g.,

```
<quoteResponse>
  <price>2000.00</price>
</quoteResponse>
```

If the showRequests template is still visible, the client framework can cause the template to be re-rendered, which can update the corresponding table row.

| | | |
|---|---|---|
| Widget-Z | 1000 | 2000.00 |

In one embodiment, neither templates nor actions can directly access external resources (e.g., Web services). Instead, external processes can be modeled as data objects, which are synchronized by the MAS framework.

In one embodiment, most of the conduit operations can map onto CRUD operations on node entities (i.e., select, create, update, etc.); these operations can correspond directly to client programming model functions (navigation, create, update, etc.) However, typically, it need not be possible to map all Web service operations onto the framework's standard operations. For example, a Web service operation may require a set of parameters that are made up from multiple nodes elements, or that contain temporary values input by the user. In these cases, the application can define a custom nodetype, which can contain the input and output parameters for the Web service operation. This mechanism is known as custom operations.

The create ( ) function can be used to create new custom objects in the same way that ordinary nodes are created.

```
var customNode=$sourceNode→keyref-A.create
    (<node>[, callback]);
```

Custom objects typically do not implement an insert conduit operation for the corresponding keyref. Instead, the custom object can be used as the context for subsequent traversals that trigger select conduit operations. E.g.,

```
var resultNodes=customNode→keyref-B;
```

Figure 3:
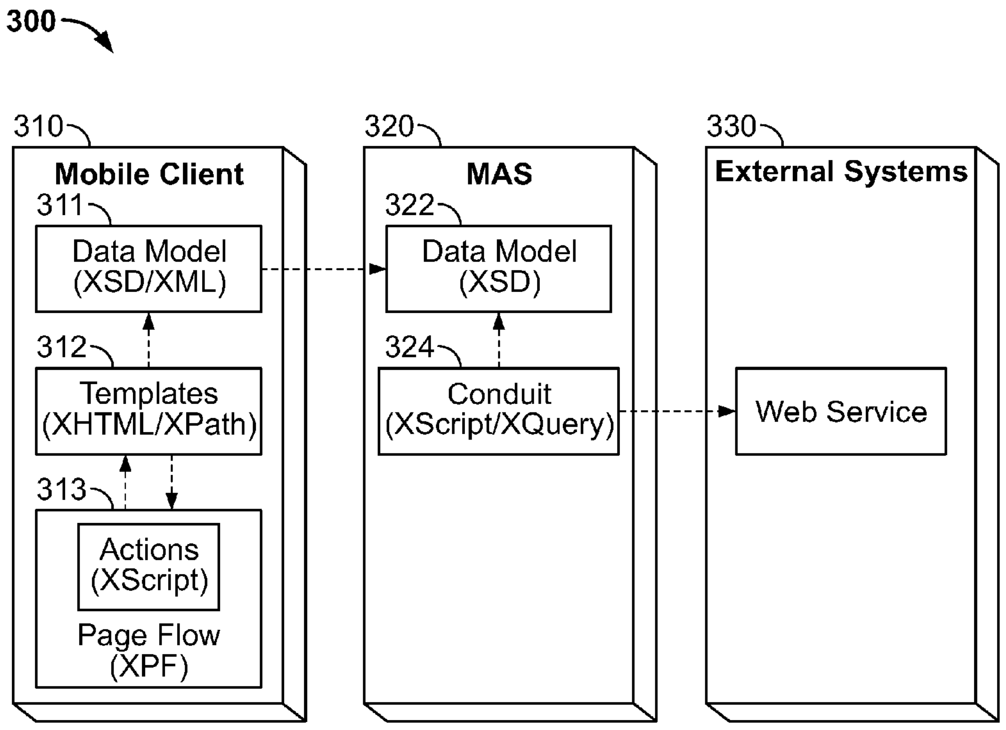
FIG. 3 is an illustration of a programming model for a MAS application in accordance with one embodiment of the present invention.

The keyref declarations, of one embodiment, are illustrated by FIG. 3.

In addition to the system variables described above, the Mobile Browser can support the following additional system variables:

| Variable | Meaning |
|---|---|
| $app | Per-application object for maintaining instance variables. |
| $user | Current user information |
| $connection | Current connection information. |

The $app object can be used to store an application's global variables. This object can be specific for each instance of each application. The properties in this object can be read-write properties from application program. Some standard properties may also be accessible from the Mobile Browser User interface.

These variables can be persisted locally but not synchronized to the server. The object functions can be similar to web browser cookies.

The $user object can contain user-specific settings, such as the username. There can be one object per user, accessible by all applications associated with that user. The properties of the user object can be settable from the Mobile Browser user interface and are read-only from client applications.

The $connection object can provide application with connection information. In one embodiment, there is one object per device. The values of the object can be settable by the user from the Mobile Browser user interface (e.g., go online or offline) or by the Mobile Browser connection agent (e.g., actual connection state, speed, and throughput). In one embodiment, the values are read-only to applications.

The Mobile Browser can implement a local cache. For the most part, client applications can ignore whether data is retrieved from the client cache or from the server. However, synchronization information can be made available for programs which need them.

Synchronization can occur asynchronously in the background. In one embodiment, except for error handling, applications really do not need to be concerned with synchronization. Sometimes, the user will want to defer apparent synchronization until a record is ready to be submitted (e.g., by pressing a submit function).

| State | Description |
|---|---|
| CHANGED | Changed but not ready for synchronization |
| PENDING | Ready for synchronization |
| SENDERR | Unable to sync this node with server |
| SENT | Sent to server |
| DELIVERED | Delivered to external service |
| ERROR | Server or external service error |

For example, the following template can display a list of purchase orders (for an account) and a checkbox for each item. The checkbox can be bound to an attribute, which determines the item's status.

```
<form action = "xaction:$pageFlow.submit( )">
  <xdoc:repeater id = "s1" source = "$context->purchaseOrders"
  iterator="i">
    <tr>
      <td><input type = "checkbox" xdoc:bind =
      "i.@complete"></a></td>
      <td>(i)</td>
    </tr>
  </xdoc:repeater>
  <input type = "submit"/>
</form>
```

The submit button can trigger the form action, submit ( ), which calls update ( ) for all purchase orders that have been set as complete.

```
function submit ( ) {
  for (i = 0; i < $context->purchaseOrders.length ( ); i++) {
    var po = $context->purchaseOrders [i];
```

-continued

```
    if (po.syncState ( ) = = "DSYNC" && po.@complete = = true) {
      po.update ( );
    }
  }
}
```

This example can require that the external system interpret the meaning of the complete attribute; i.e., defer processing the record (while managing persistence) until the appropriate value has been set by the user.

Error objects can be generated by the server and returned to the client whenever an error occurs. The error object can contain the following fields:

| Field(s) | Description |
|---|---|
| Error id | Unique id for this error. |
| Parent errorId | Id of parent error to enable chaining of related errors. |
| Node guid | GUID of node which caused this error. |
| Severity | |
| Originator info | Identifies the source type (server or web service), source id (if we expose such concept), and source name |
| Error no | Numeric error |
| Error text | Descriptive text |
| Array of error items | Arbitrary number of error items. This allows a single error object to return a set of detailed error messages. |

An error item can contain the following fields:

| Field(s) | Description |
|---|---|
| Field | Field name |
| Error no | Numeric code |
| Error text | Text description |

The conduit can return additional attributes in the error object which the client application code can then access. In one embodiment, it's up to the server whether to provide this extensibility.

If there are dependent operations, the server can hold processing of these dependent operations and return dependent errors for them, with those errors referencing the original error.

When a client receives an error, it can display the appropriate Alert dialog. The Alert dialog may contain a link to UI forms for the user to correct the errors.

Nodes with error have their syncState set and can be queried by the application via the syncState ( ) function. The error object can be accessed, enabling the application to automatically display the same UI repair forms.

The Mobile Browser also provides user interface to display pending errors and an error log history.

After the user has corrected the errors, the update will be sent to the server again. All dependent changes can also automatically be resubmitted. Corrected errors can automatically be removed from the list of pending errors.

Node conflicts can occur when a client tries to modify and synchronize a "stale" node that has already been updated (either by another client or other exogenous change process) in the external system. A stale node can be one that has a different sequence number than the current sequence number held by the server.

If the server rejects the update because the node is stale, then it can return an up-to-date node with the synchronization state attribute set to "conflict".

Update operations may set a callback, which is invoked when the node is returned from the server (whether or not there is a conflict). If a callback is not set, then the client framework can automatically replace the client's stale node with the up-to-date node returned by the server.

The callback function can first test for the conflict state using the syncstate ( ) system function. It can then set a global variable (i.e., $app) for the application; e.g.,

```
function updateCallback (node) {
  if (node.syncState ( ) = = "CONFLICT") {
    $app.message = "<a href = 'showConflict ( )'>edit conflicts</a>";
    $app.conflict = node;
  }
}
```

In order to notify the user that a conflict has occurred, each template can include a status area that contains references this global variable; e.g.,

```
<xdoc:html>{$app.message}</xdoc:html>
```

In this example, the global variable contains an HTML anchor that enables the user to navigate to an action that will display the conflict editor page:

```
function showConflict ( ) {
  $context.node = $app.conflict;
  return ["showConflict.tmpl"];
}
```

The showConflict template below can display the values of the stale node and the up-to-date node side-by-side.

The Spath expression can call the conflict ( ) function which is defined for data nodes; this can return the up-to-date node. In one embodiment, although the conflict node may contain foreign key values, the → operator cannot traverse from a conflict node.

```
<p>Contact record conflicted with server.</p>
<form action = "$pageFlow.updateConflict ( )">
  <table><tbody>
    <tr>
      <td>First</td>
      <td>($context.node.conflict ( ).first}</td>
      <td><input type = "text" xdoc:bind = "$context. node.first"/></td>
    </tr>
    <tr>
      <td>Last</td>
      <td>($context.node.conflict ( ).last}</td>
      td><input type = "text" xdoc:bind = "$context.node.last"/></td>
    </tr>
    <tr>
      <td>Email</td>
      <td>{$context.node.conflict ( ).email}</td>
      <td><input type = "text" xdoc:bind = "$context.node.email"/></td>
    </tr>
    <tr colspan = "3">
      <td><input type = "submit" value = "Create"/></td>
    </tr>
  </tbody></table>
  </form>
<a href = "xscript:$pageFlow.copyValues ($context.node)">Copy server's record.</a>
```

If the submit button is pressed, then the form can invoke the updateconflict ( ) action below:

```
function updateConflict ( ) {
  $context.node.update ( );
  $status.message = null;
  $status.conflict = null;
  return ["BACK"];
}
```

This can call the update ( ) function on the current node, which triggers the synchronization mechanism to try again. Here, the controller can immediately return to the previous page that was being displayed before the user clicked on the status area.

The template above also can define an anchor that calls the copyvalues ( ) action below when clicked:

```
function copyValues (node) {
  node.setValue (node.conflict ( ));
  return ("CONTINUE"];
}
```

This action can use the system setValue ( ) function to copy the up-to-date node into the stale node; the action then returns to the showconflict page.

If a node update is synchronized to the client while the user is currently editing the same node, then on submit, the node can immediately marked with the CONFLICT sync state.

Figure 16:
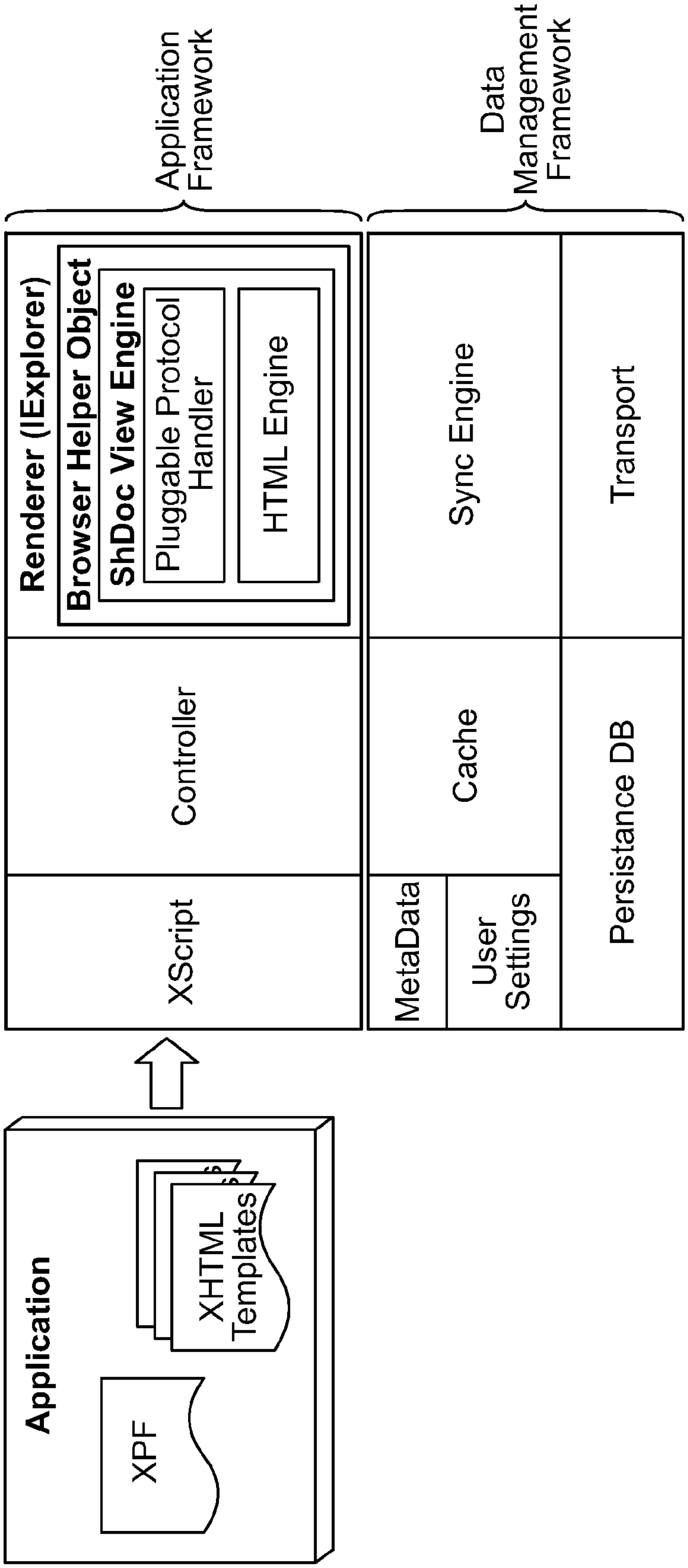
FIG. 16 shows a browser component overview of one embodiment.
Figure 17:
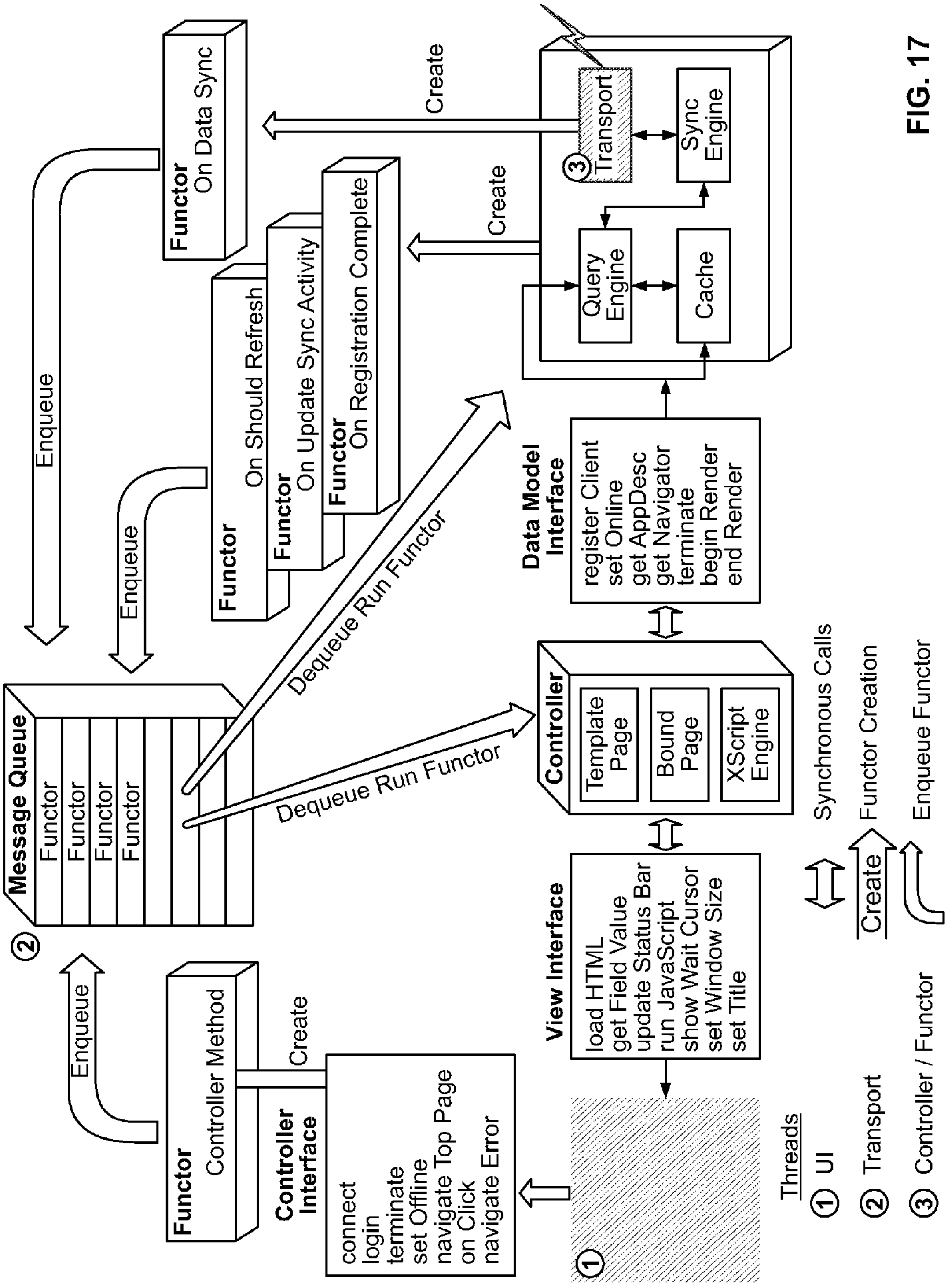
FIG. 17 shows a mobile browser flow of one embodiment.

FIG. 16 illustrates the components of the Mobile Browser architecture, of one embodiment. An application can directly interact with the Application Framework which can consist of the Controller, Renderer and XScript components. The Data Management Framework (DMF) can be where the data cache, data model, sync engine and wire transport exist.

Component interfaces and events can be involved in the high level function of provisioning and running an application. This application can adhere to the Model-View-Controller (MVC) architecture.

The Model's interaction with the data model (programming model) can be exposed to users via the Mobile Browser (MoB) Object Model (MoB OM) and various controls in the template, such as the repeater element and the expressions between curly braces.

An application can consist of a page flow file, known as XPF in this document. An XPF can be written in XScript with JAVA Doc style annotations to describe how actions are forwarded. This XPF file can consist of actions and user defined functions. Actions can be XScript functions annotated with action events. User defined functions can be functions used by actions or script expressions in a template.

The Controller can cause XScript to run the XPF this can cause a XHTML template file to be loaded.

The view can generate an HTML page from the XHTML. While generating the page, items from the data model can also be injected into the generated page and a binding of items on the page and items in the data model is created.

The generated HTML page can then pushed to the Renderer (browser) to be displayed to the user.

From the application writer's point of view the Controller component can load the XPF and runs the application by calling the begin function. In one embodiment, before the application is run, the MoB Object Model (MoB-OM) is created. The MoB-OM can expose the data model to the script on the page and the actions (functions in the XPF) called from the page.

In one embodiment, a set of interfaces Controller, View, and DataModel have been defined as a means for the 3 frameworks to communicate between themselves.

The Renderer framework can communicate to the Controller via an implementation of the Controller interface created by the Controller and made available to the Renderer. The Renderer can use the Controller interface to communicate to the Controller via inter-process communication (IPC) in a synchronous manner. The synchronous calls can enqueue a functor object that will, in an ordered way, call the Controller to perform the operation.

The Application Framework, typically the Controller component, can communicate to the Renderer via an implementation of the View interface created by the Renderer and made available to the Controller. Calls to the Renderer can be synchronous.

The Application Framework can communicate to the DMF via an implementation of the DataModel interface created by the DMF and made available to the Application Framework. Calls to the DataModel can be synchronous however some calls can call asynchronous requests to be started causes functor objects to be enqueued to the Message Queue.

The Renderer or UI can run in its own process space (typically a non-managed VM). The Controller, Message Queue, Script engine and Data Management Frame (sans Transport layer) can run in one thread. The Transport layer can run in its own thread.

The Message Queue can be a queue of functor objects. Other threads can cause functors to be enqueued to the Message Queue when asynchronous request is completed or to synchronize a request from another thread. In one embodiment, this is important because the script author needs to appear to be running in a single-threaded environment and the Message Queue can simulate that environment from our multi-threaded Mobile Browser. There need be no support for threading in Xscript. In one embodiment, to the script author the Mobile Browser is one thread.

Calls from the Renderer to the Controller or calls from DMF to the Controller, caused by a synchronous request from the Controller to the DMF that resulted in an asynchronous request from the DMF, can be executed by enqueing a functor object to the Message Queue.

The Controller, in its run loop, can check for new messages (functor objects) to dequeue from the Message Queue. When an object is dequeued, the Controller can call the invoke method on the functor object.

The Controller can make synchronous calls into the Renderer and into the DMF. However the results returned from calls made to the DMF may not be complete.

In one embodiment, only the data currently in the DMF cache is returned synchronously. The DMF can make the same synchronous request from the Controller. The request can be an asynchronous call to the MAS. In one embodiment, these asynchronous calls from the DMF to the MAS only happen on queries that blocked between beginPageRender and endPageRender calls or during a deep select. When the asynchronous request to the server is complete the DMF can enqueue a functor signaling new data has arrived. This event can be a signal to the Controller to re-run code (e.g., new data has arrived).

The Controller during instantiation can create the Message Queue and allows the DMF access to the queue. As described above, in one embodiment, only the Controller interfaces implementation and the DMF enqueue functors to this queue. The transport layer can also use this queue for its handling of asynchronous requests. Various OM requests like loadTemplate and navigate can also enqueue a functor to also allow a synchronous single-threaded model to the user, script author.

The Controller component can be responsible for a number of items. Preprocessing the XHTML template can involve creating an XML parse tree that is annotated with template objects. Template objects map to any portion of the XHTML file that describes a binding to items in the data model.

After an XHTML file is processed the Controller can then create binding objects to actual data in the DMF cache. The XML parse tree and the binding objects are used to generate an HTML page.

As a page changes, the result of new data arriving in the DMF cache, the Controller can be responsible to only change the parts of the page that change and not regenerate the entire page. This is called "page diff'ing". Page diff'ing can reduce page flicker, keeps the focus where the user's eyes are currently located (both scroll bar and focus item), and not lose any text the user is typing. In one embodiment, sometimes too many changes can occur which can cause the page diff'ing to fail and re-generate a new page.

XScript, ECMAScript 4.0 with E4X, can be exposed to the user by means of actions and XScript expressions.

Actions can be XScript functions which are hooked to UI events on the generated HTML page. Actions can be hooked to UI gestures on the generated HTML page. When a user causes an UI event, like onClick, the action (XScript function) associated with the HTML element can be called.

XScript expressions can exist on an XHTML page and can be enclosed within curly braces. In one embodiment, these expressions are called funclets. A funclet can be called when the Controller determines a page needs to be re-generated from a bound XHTML template. How or when the Controller needs to re-generate a page can be decided by page diff'ing. Each funclet can be run and its result can be squirted into the page being generated.

The Renderer can be an HTML browser. Building the following components for the browser:

asynchronous Pluggable Protocol Handler (PPH)
Browser Helper Object (BHO)
Toolbar plug-in.

will allow:

Detecting a Mobile application by virtue of its protocol (xsync://)
UI gestures on the page to forward to actions attached to particular elements
Access to the DOM of the HTML page
Sandboxing of all Mobile applications
Setting up an Inter-Process Communication or IPC (JNI for JAVA VM) between the Renderer and Controller.

Data Model Framework can consist of Query engine, Caching and persistence Module, Sync Engine, and transport module. This framework can evaluate the queries from XScript engine, provides data caching and persistence, and synchronization of data with the MAS.

The Query Evaluator can mediate between synchronization mechanism, the Controller (MVC client architecture), and the cache. In addition to interfacing with the Sync Engine, the Query Evaluator can implement such functions as cache management (including processing of time-to-live) and timers for polling support.

From a high level the Cache, Application management and Persistence module can be composed of three main parts:

1. Cache—caches data used by an application
2. Application/user data manager—manages transient user state such as view specifications and authentication information, as well as persistent application state such as the schema and template files.

3. Data persistence—cache and application data both benefit from persistence of the data.

Most read and update requests for data can first pass through this module; however, Query evaluator can bypass caching completely depending on the semantics of the larger expression being evaluated and send the query directly to the Sync Engine.

The Sync Engine can be responsible for implementing the MAS Sync Protocol, providing the necessary state management, protocol encoding and decoding and interfacing with the networking layer.

Query Evaluator can send queries that cannot be satisfied from the internal cache to the Sync Engine. Sync Engine, accordingly, can create a sync message and pass it to the Transport Module to be sent to the server.

Transport module can provide the following services to the Sync Engine.

1. Reliable message passing
2. Fragmentation and reassembly
3. HTTP transport over TCP/IP or other available network layer.

The Transport Module can be integrated into the Mobile Browser.

Figure 18:
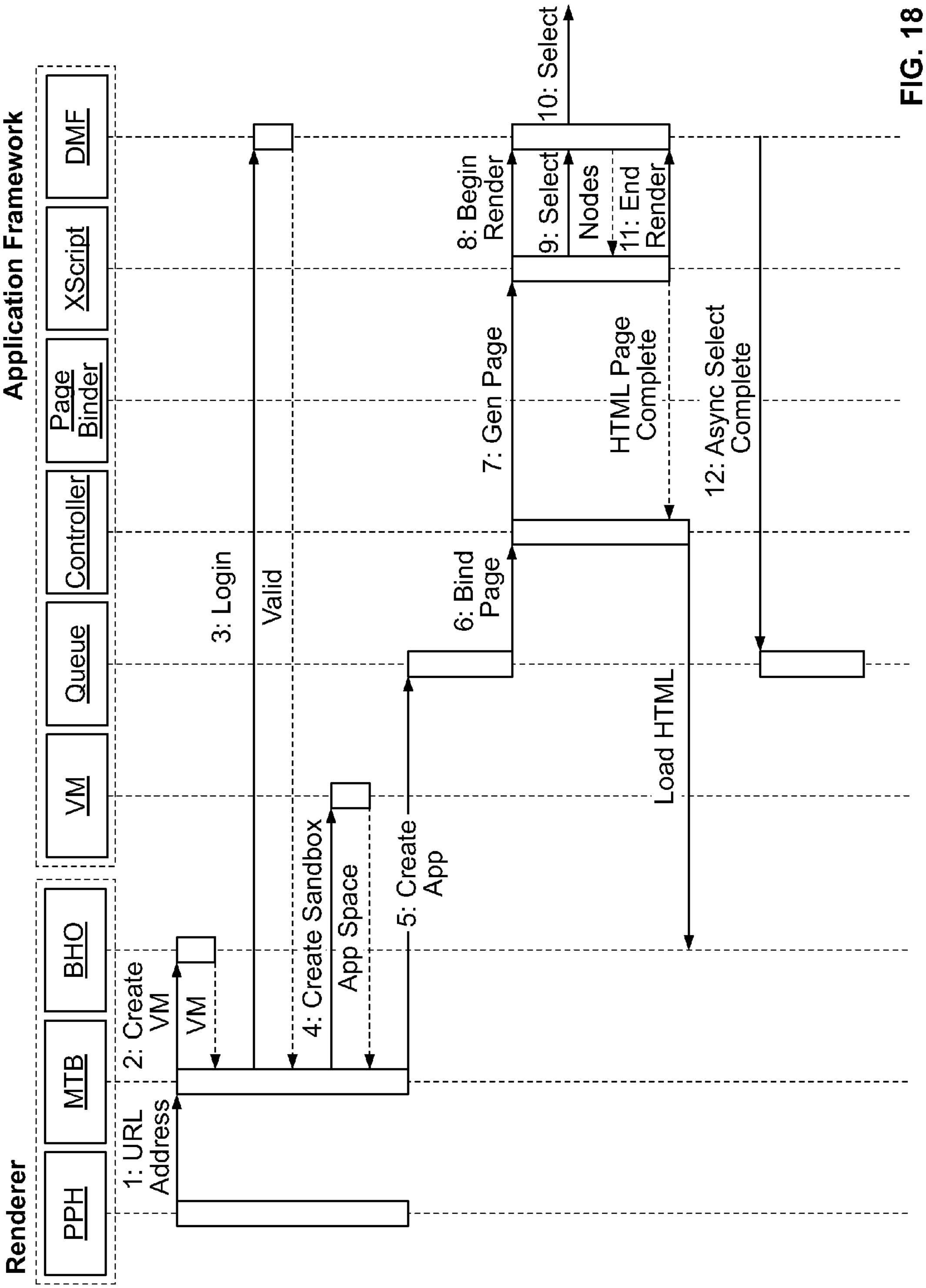
FIG. 18 is a sequence diagram for setting up a mobile browser of one embodiment.

FIG. 18 shows a sequence diagram for setting up a mobile browser.

Starting up a Mobile Browser application can illustrate the core set of operations between the Renderer, Controller and Data Management Framework (DMF) to perform the CRUD semantics to the data model.

1. A URL, using a registered protocol, can be typed into the browser address bar. This can cause the address to be directed to a registered Pluggable Protocol Handler (PPH). The PPH can delegate the request to the Mobile Taskbar (MTB).
2. The MTB can spin up a Virtual Machine (VM), if one doesn't exist. In one embodiment, only one VM need exist for all applications to execute within.
3. Using the above created VM the MTB can authenticate the user. If the user is allowed to download or run the application then continue to step 4 otherwise stop with "not valid user". All security exists inside of the Data Management Framework (DMF).
4. Once the user is authenticated, the MTB can create an application area that is sandbox with the appropriate class loader and JAVA security.
5. The MTB can then enqueue a create application event to the Message Queue. This can end the synchronous operations started by the Renderer to run an application.
6. The Controller can de-queue an event from the Message Queue to start an application. This can cause the XPF file to load and call the XScript function named "begin". This can typically navigate to an XHTML template causing the template to be processed. Binding objects can be created to connect the regions of the XHTML template to the funclets (expressions inside of curly braces in the XHTML template).
7. When all binding objects for the XHTML template exist, the HTML page can begin to be generated.
8. The Controller can call the DMF's "begin render" method signaling that any synchronous selects made to the data model cache, via funclets, can cause the same select to be done asynchronously to the MAS.
9. As the page is generated each script expression associated with the binding object can be executed.
10. The result of that script expression (funclet) can be returned synchronously and an asynchronous select request is sent to the MAS. The returned nodes from the expression can be injected into the position of the HTML page represented by the binding object.
11. When the HTML page is completely generated, the Controller can communicate back to the Renderer with a synchronous call telling the browser to load the generated HTML page (load HTML). The DMF can be signaled that the page is completely rendered by calling "end render". In one embodiment, any further navigation of the data model from this point (actions, etc) only fetch's the data in the cache (no asynchronous requests will be made to the MAS).
12. Later, one of the asynchronous requests made during page generation, returns with data. This can cause the DMF to enqueue an onShouldRefresh event. The Controller can process this event and cause step 6 to 11 to run and generate a new page with the new data.

In order to run an application on the Mobile Browser, the user can authenticate itself, either by username and password, or via a personal certificate. If the application needs to be downloaded to the client, the Mobile Browser can authenticate the user with the MAS. In one embodiment, if the Mobile Browser is off-line, the user cannot download the application or run the application.

The communication between Mobile Browser and the MAS can happen over a corporate VPN to encrypted and securely exchanged data.

The username and password can also be encrypted in the Mobile Browser's persistent storage, so no third party can access them. Also the username, password can have an expiry period attached to them, so Mobile Browser will authenticate users with the MAS as the user's password expires.

A mobile application can start from the XPF (XScript Page Flow file). When a template file (XHTML) is navigated to the template preprocessor can load and preprocess this XML file.

A template preprocessor can load the XHTML template file looking for netui:* tags and attributes or text nodes wrapped with a curly brace { }. The curly brace can signal that the data inside of the curly braces is a SPath expression, a call to a user-defined function, or a call to an action.

Curly braces can be escaped with quotes: "{'{'}".

Each expression within a curly can be mapped to a generated function called a funclet.

Figure 19:
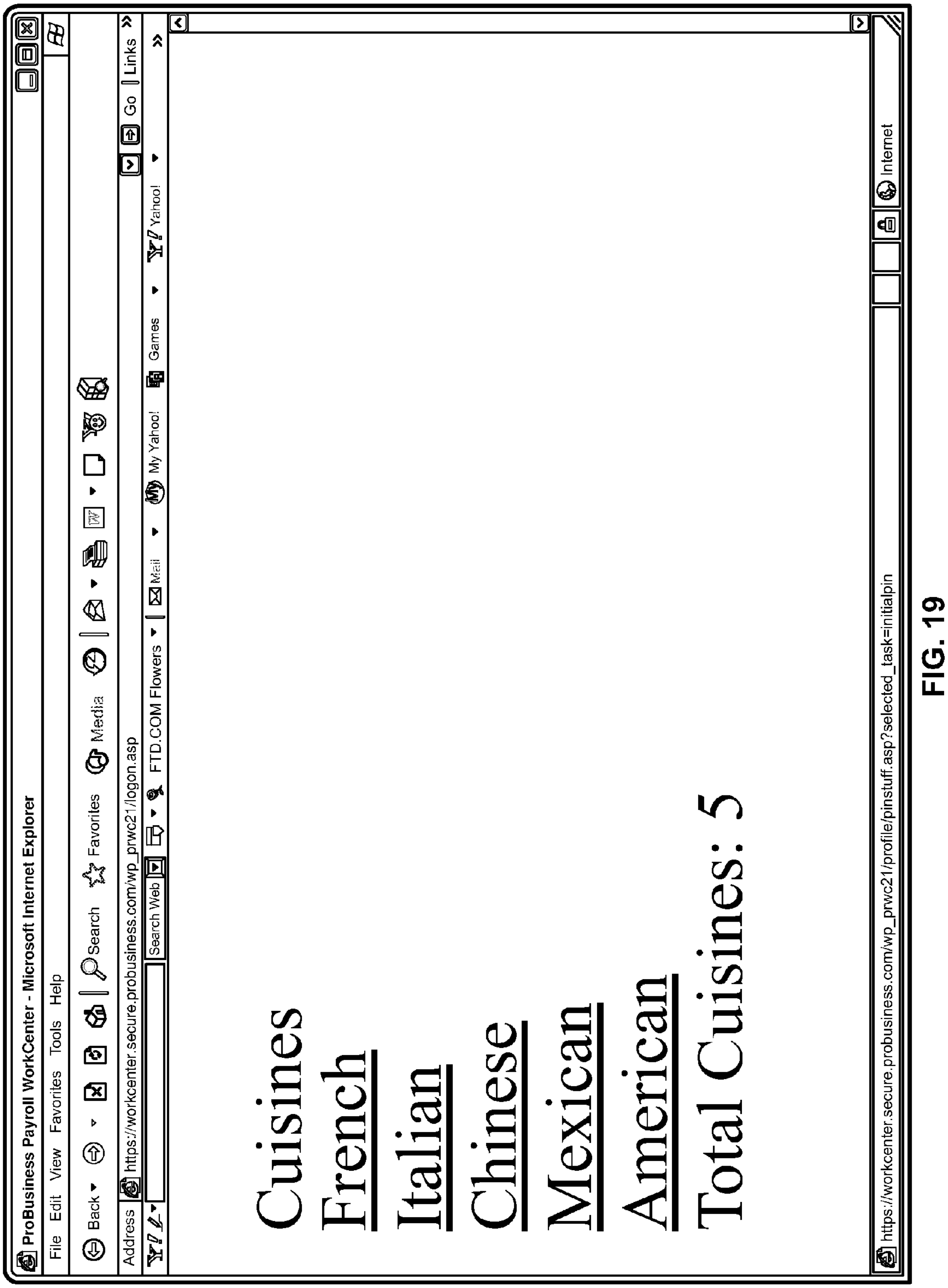
FIG. 19 illustrates a sample application.

To help understand how the template preprocessor works let's walk through a simple application. FIG. 19 illustrates a sample application. This sample application lists all of the cuisines in a restaurant guide's data model.

To create the above application, the XHTML template file can bind the cuisines keyref, in the data model, to the rows of a table and computes and display the total number of cuisines at the end of the table.

Figures 20, 21:
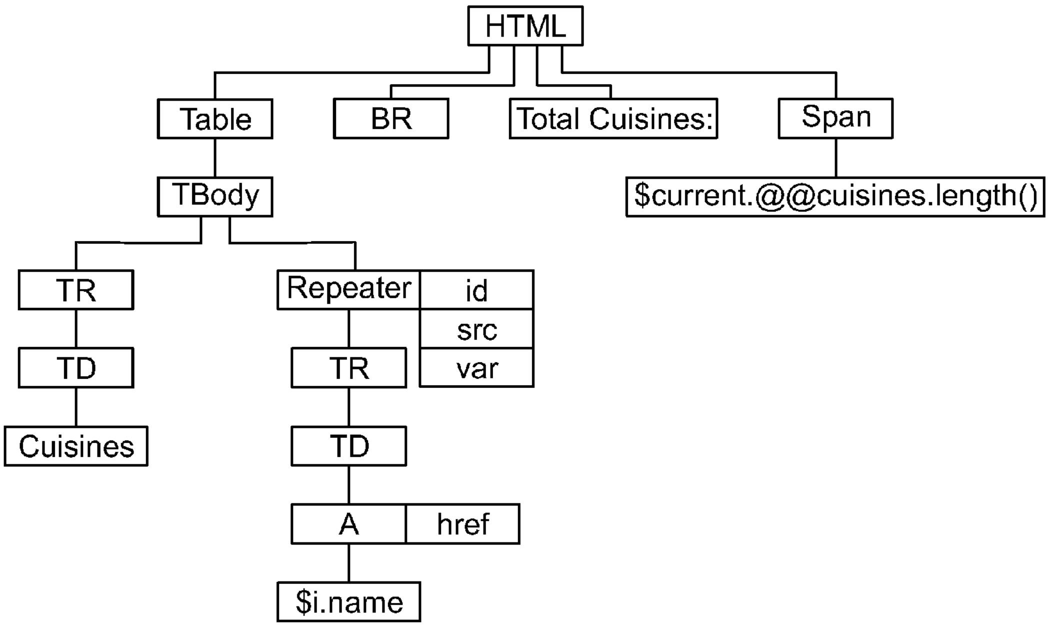
FIG. 20 illustrates a sample XHTML template file.
FIG. 21 illustrates a sample XHTML template of one embodiment.

The above application can be created from the XHTML template file of FIG. 20.

The template file can be first parsed, as normal XML, to produce an XML tree, as shown in FIG. 21.

The XML tree can be walked looking for binding element (element's QName is in the netui:* namespace) and/or bound values. Bound values can be attribute values or text values surrounded by curly braces. Each time a binding element or bound value is found a Template object can be created. The Template object can be a special object that points to the element, attribute or text value in the tree in addition the element, attribute or text value in the tree points to that Template object (2-way link).

Figure 22:
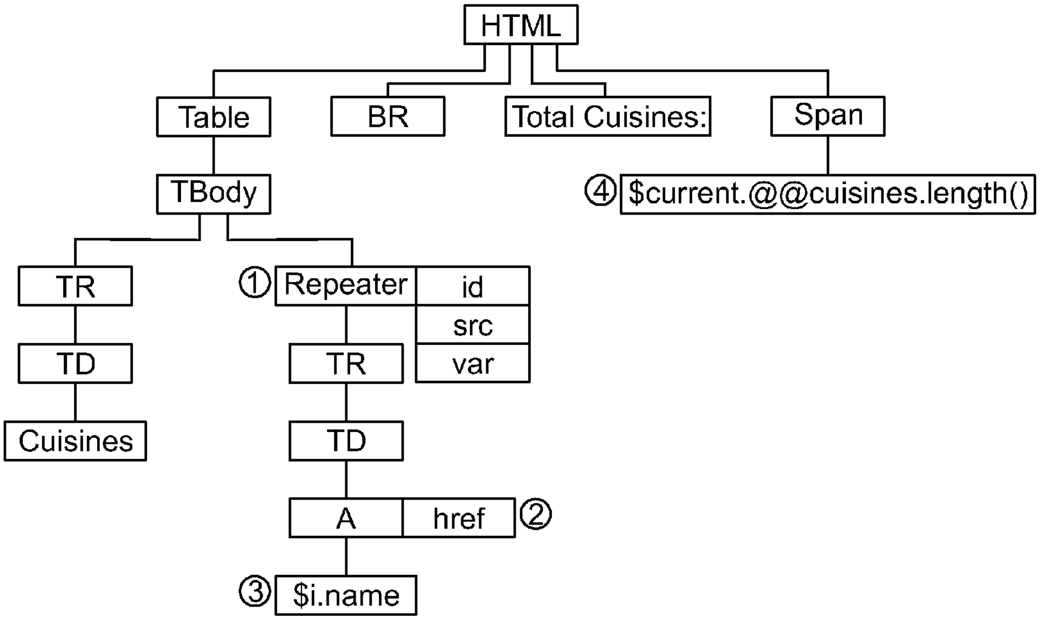
FIG. 22 illustrates the binding order of the sample XHTML template of FIG. 21.

FIG. 22 illustrates the binding order of the sample XHTML template of FIG. 21.

In our sample XML tree, there are four bindings, in this order (corresponds to the black number blocks in the above figure):

1. repeater element binding, netui:repeater
2. anchor element's bound attribute href value, $i.select( )
3. anchor element's bound text value, $i.name
4. span element's bound text value, $current.@@cuisines.length( )

Binding element or bound values can be defined as:

| Binding Type | Example |
|---|---|
| [1]any element's QName in the netui:* namespace | netui:repeater |
| [1]any attribute's QName in the netui:* namespace | netui:bind |
| [2]any attribute value surrounded by curly braces | attr="{$current.@@a}" |
| [2]any text value surrounded by curly braces | <span>{$i.name}</span> |

[1]Bound element
[2]Bound value

The first bindable item encountered while walking the XHTML tree can be the netui:repeater. The netui:repeater can bind a data source to a variable. The name of the variable can be defined by the id attribute of the netui:repeater element. The repeater, during page generation can iterate over each top-level node in the data source and assign the iterator variable, whose name is defined by the var attribute value, to the current node. In addition, a repeater can also remember which iterated item is selected.

A "Repeater" Template object can be created. The netui:repeater element can point to the object and the Template objects can point to the netui:repeater element in the XML tree.

The src attribute can cause the current script file to get a generated RIO function, called a funclet, and is injected. In this case the function is:

```
function_templFunct1 ( )
{
    return $current.@@cuisines;
}
```

The src attribute can be a special kind of funclet that doesn't require the surrounding curly braces.

All "Repeater" Template objects can be linked to insure that no id attribute values collide with any repeaters. In addition, nested repeaters can be linked to insure that var attribute values don't collide with any parent repeaters var attribute values. The uniqueness of var and id attributes can be computed at the end of the XHTML template file processing, just prior to generating the binding objects.

A Funclet can be any script in the XHTML file enclosed by curly braces.

Each expression within the curly braces can be mapped to a generated function. The generated functions can be internal read/only functions that have the following shape:

```
function__templFunctNNN ( )
{
    return EXPRESSION;
}
```

NNN can be a unique ID (index incremented each time a curly block is encountered) used to associate SPath expression to the generated function.

EXPRESSION can be the SPath expression inside of the curly braces.

All funclets can be placed into the XScript context for this application. In one embodiment, there is one script context per application. When a new XHTML template file is loaded, the funclets associated with the old XHTML template file can be removed and new funclets generated from the new XHTML template file are injected into the script context. All user defined functions and actions in the XPF can be defined in the application's script context.

In one embodiment, each time a text value (text node) starts with an open curly brace and ends with a close curly brace a "Content" Template object can be created.

A funclet can be created and the funclet name can be associated with the Content Template object. In our sample the 3rd and 4th binding can generate the following funclets respectively:

```
function_templFunct3 ( )
{
    return $i.name;
}
function_templFunct4 ( )
{
    return $current.@@cuisines.length( );
}
```

Attribute binding can encompass two different bindings; attribute value binding and actions.

The simplest form attribute binding can be binding to non-event attributes. Setting the title attribute, of the span element, to some value based on a data bound value can set the tool tip for the span. For example:

```
<span title="{'Current cuisine is:'+
    $current.@@cuisines[0]}">Best
    Restaurant</span>
```

If current.@@cuisines[0] is equal to the value of French then the span element would be:

```
<span title="Current cuisine is: French">Best Restau-
    rant</span>
```

A funclet can be created just like text value binding:

```
function _templFunct5 ( )
{
    return 'Current cuisine is: ' + $current.@@cuisines[0];
}
```

Actions can be bound to event attributes of an HTML element. In our sample application the anchor tag's href attribute can be bound to $i.select( ). An action function wrapper can be generated for $i.select( ). In principal the idea is identical to a funclet however, in one embodiment, unlike a funclet; actions are only called as a result of a user's UI action on the anchor. Funclets can be called anytime the DMF signals that new data has arrived.

Both attribute value and attribute action can create an Attribute Template object. There can be a flag to signal if the binding is an action (isAction).

Figure 23:
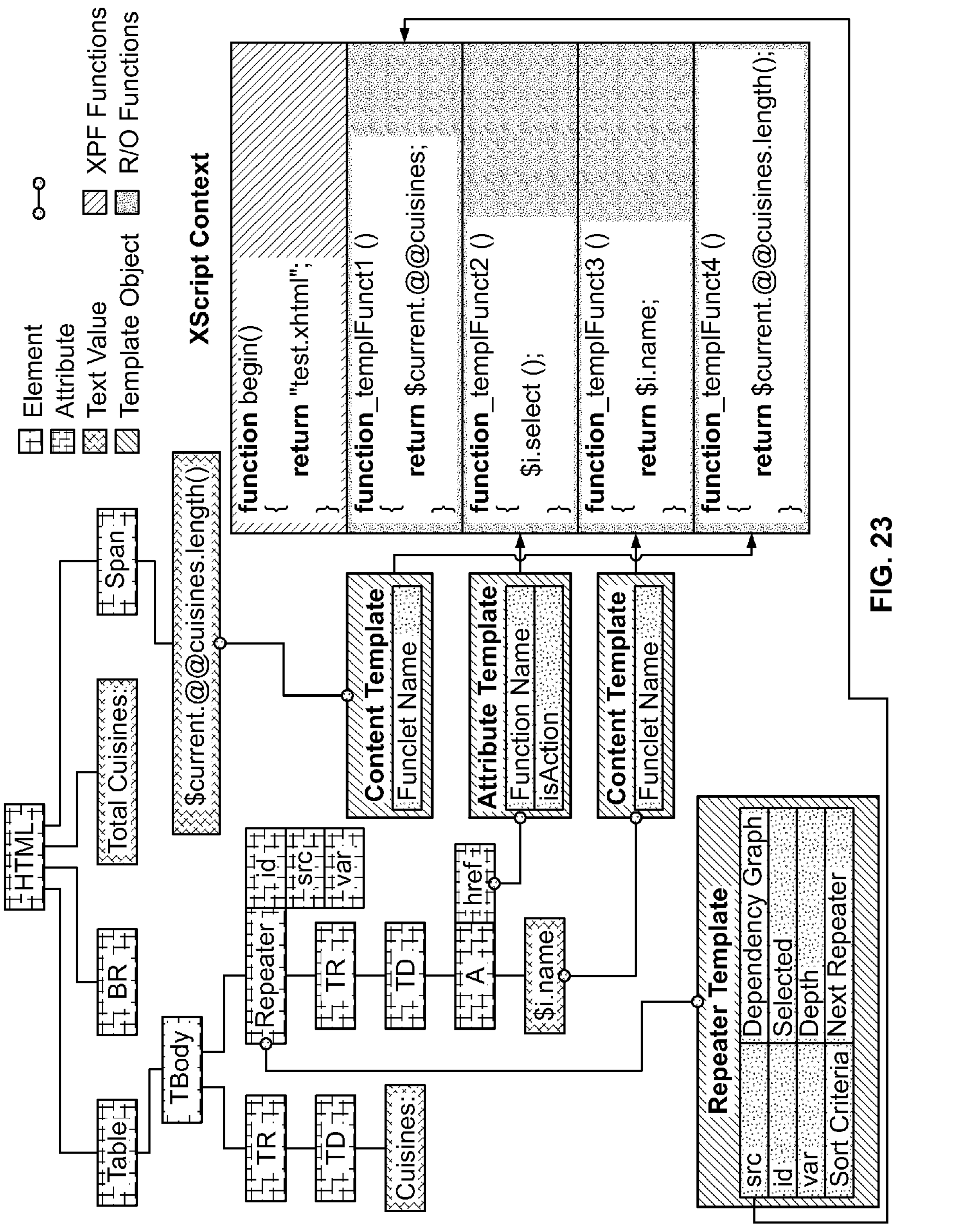
FIG. 23 illustrates a sample object pre-processed with template objects.

After parsing and preprocessing the XHTML file, Template objects can be created for all dynamically bound data values and actions can be attached to elements and repeaters as discussed in the above sections. FIG. 23 illustrates how the Sample Application would look after parsing and template preprocessing.

The page generator can generate a bound page once, if diff'ing is on (if diff'ing is off any change can cause a new bound page to be constructed).

The bound page can create objects that have links to the template and data instances in data model. This can be used by the diff'ing code to minimize correlates any UI gestures on the page to actions bound to data in the data model.

In one embodiment, if diff'ing is on, only the bound items of the page are re-computed and changed on the rendered page the non-bound items are static and will never change.

From the BoundPage, a page's changing bound data can be updated into the rendered page. This can eliminate the need to constantly re-clone the page's non-bound data.

The page can be constructed from the XML parse tree representation of the XHTML template. As the page generator walks the XML tree it can emit the elements, attributes and text values encountered. As it encounters an element, attribute or text value it can check to see if that object is associated with a Binding instance. If the Binding instance exists, the page generator can fetch the actual data value and injects that value into the page to be rendered.

A BoundPage can be the culmination of all information about the Template Object instance, the data it's bound to and where on the bound page the data is rendered.

Once an XHTML template has a BoundPage, the page's bound objects (repeater, funclets, etc.) can be iterated over generating the value(s) which those areas of the page are bound. As bound data areas of the page changes, hooks to specific areas in the generated page can be maintained. This can eliminate the need, in general, to push a newly generated page to the Renderer causing flicker, focus lost or typing context lost. Instead, in one embodiment, differences can be generated between the current rendered page and the newly generated page and only the differences are injected into the current page giving the user the appearance that the page is a live with asynchronous changes being pushed to the page.

The Bound Page can be recomputed every time an onShouldRefresh event is fired from the DMF. This event can cause all Bound objects to be iterated for the page. The particular funclet associated with the Bound object can be called. The return result of the funclet can be the data which is bound to the element (repeater), attribute or text value this value is injected into the rendered page.

Figure 24:
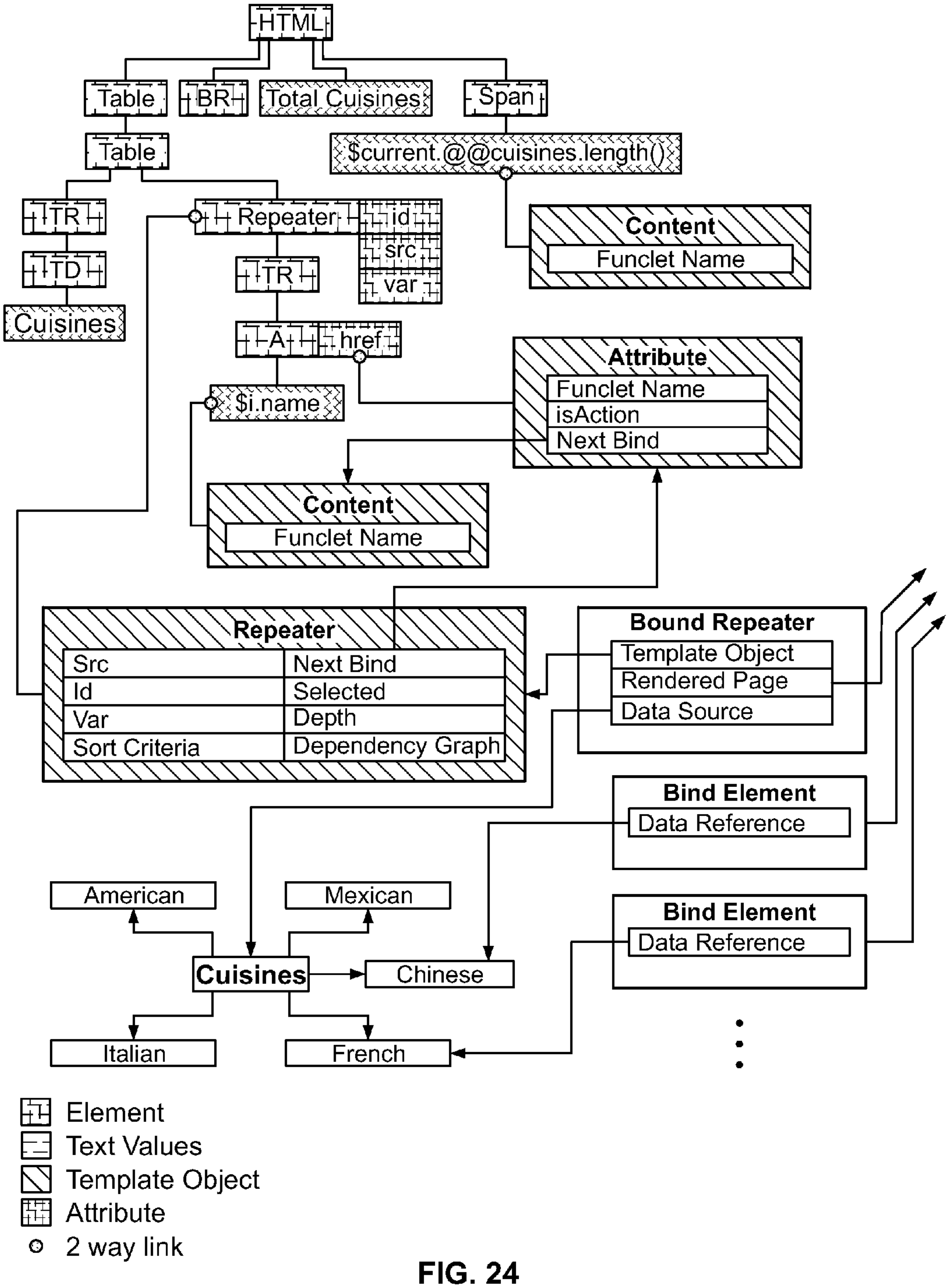
FIG. 24 illustrates objects created for a board page manager.

FIG. 24 illustrates objects created for a Bound Page Manager.

The Page Manager can keep a cache of all Bound Pages.

The Diff'ing engine can work in conjunction with the Bound Page. The Bound Page is used to speed up incremental changes to the rendered page. The diff'ing engine can run through the Bound objects on the Bound Page computing the values and comparing them to the current values in the rendered page. If the values differ then the new value can replace the old value. For repeaters, the record's unique identifier (computed by the Client Cache) can be used to compare against the current unique identifier; if different the Bound Object can be changed and repeated items inside of the repeater are re-computed.

Changes to the rendered page can be made via JAVAScript. The Renderer can be in non-managed space and can cross the JAVA JNI boundary. It may be slow to proxy all the DOM nodes, walk the tree and make changes to the tree crossing JNI each time. Instead, in one embodiment, 2 HTML trees of the rendered page can be kept; one in the Renderer (browser) and one in the Controller. The Controller keeps its tree in sync. The Controller can use JAVAScript statements to change its tree. When all changes to the page are complete the Controller can send the script to run to the Renderer and the page can change synchronizing the rendered page and the Controller mirrored page.

Actions can be functions that are attached to an event or href. It can signal to the controller that when an HTML element generates an UI event as a result of a user's UI gesture to that element like a mouse down. That UI event can cause the action (function) to be called.

The wiring up of an event in the Renderer to the action in the controller can be done by generating the appropriate onNNNNN where NNNNN is the event (e.g., onClick) to call a synthesized method which an argument the argument that describes the actual BindElement that is to receive the event and the BindElement remembers the actual action (function) that's associated with that event. The BindElement can cause the function to be called.

The following diagram can show how the action binding is done and how the event associated with the action is called. Given the following XHTML template fragment:

```
<netui:repeater id="$allCuisines" src="$root.@@cuisines" id="$i">
  <A href="{myAction( )}">{$i.name}</A>
</netui:repeater>
```

and given the XScript function:

```
function myAction ( )
{
  if ($i.selected( ))
    . . .
  else
    . . .
}
```

Figure 25:
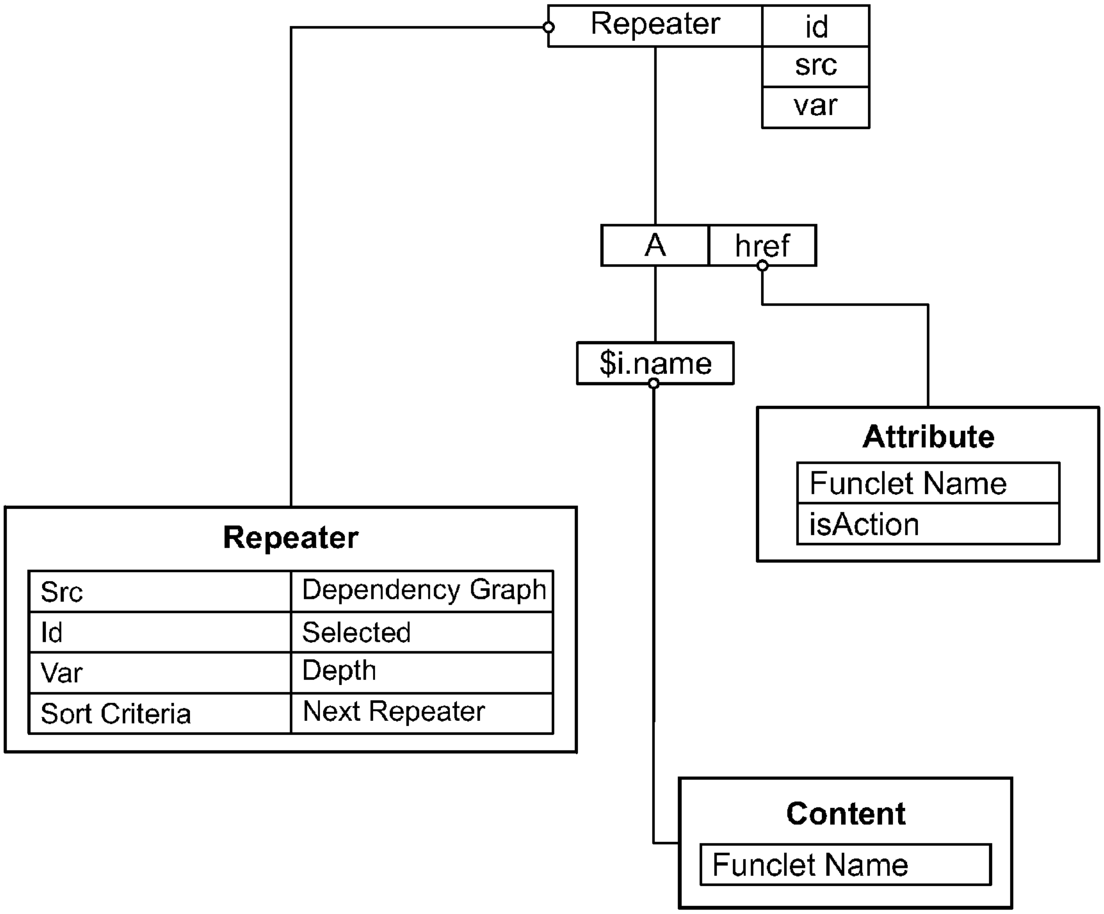
FIG. 25 illustrates objects created during template processing time.
Figure 26:
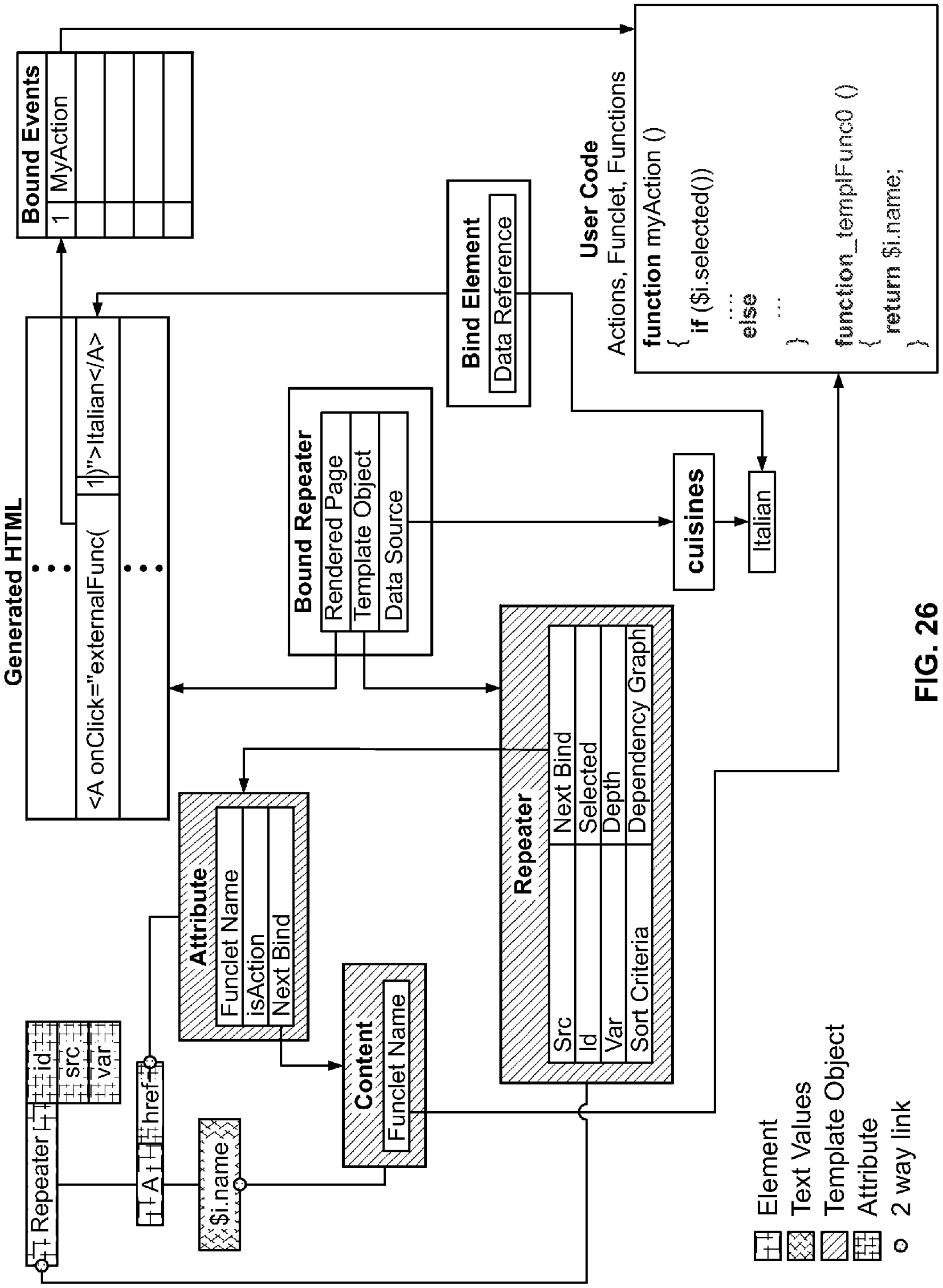
FIG. 26 illustrates objects created during page binding time as well as the generating HTML.

FIG. 25 objects illustrates created during template processing time:

FIG. 26 shows the objects that are created during page binding time as well as the generated HTML. A Bound Events table can map an ID (index of an entry in the list) to an action (function). The generated HTML, the <A> tag in this example, can add an onClick attribute with a special function name that passes the parameter of the unique ID that maps to the action (1 in this case).

When a user clicks on the anchor its special onClick method "externalfunc(1)" can be called. This can delegate the call to the Controller's interface onClick method using the parameter value passed in externalFunc onto the Controller's onClick method.

When the Controller's onClick method is called it can lookup the function associated with value passed, in our example the value is 1. That value corresponds to the index in the Bound Events list which points to the XScript action to call.

The object model (OM) exposed to the script author can be a very dynamic mechanism based on where in the template the funclet, action or function is called from. This can be primary exposed through the Scriptable interface (as described in the XScript Dispatching section).

The following static objects can be available anytime, and can be easily exposed as static objects:

| | |
|---|---|
| $root | $page |
| $current | $pageFlow |
| $context | $globalApp |
| $session | |

Other objects/variables are dynamic like the netui:repeater exposes a var and an id into the object model but only when an action, funclet or user function is called from within the scope of the repeater.

Given the following template:

```
1  <netui:repeater id="$first" src="$root.@@cuisines" var="$i">
2     <a href="{$i.select( )}">{$i.name}</a>
3     <netui:repeater id="$second" src="$root.@@prices" var="$j">
4        <a href="{$j.select( )}>{$i.name + " – " + $j.value}</a>
5     </netui:repeater>
6     <span>{$i.zip}</span>
7  </netui:repeater>
```

The OM exposed at line 2 is $first which can point at the repeater and $i would be the repeaterItem (iterating over the current data set of computed from src). The $first and $i can be R/O objects.3

The OM exposed at line 4 can be $first, $i, from the grandparent repeater at line 1, as well as $second and $j from the parent repeater at line 3.

The OM exposed at line 6 can be $first and $i again since the nested repeater at line 3 scope ended.

Deferring data synchronization can be possible by using the netui:bind attribute (see MAS Spec for details). This is used primary by the HTML INPUT element. One scenario can be to delay data operation by using an expando property on the $context object and relying on the user to update, create, or delete data when an action is called. The action can fetch the data stored in $context and perform the data operation.

For example:

```
<input type="text"netui:
    bind="$context.accoutName"I>
```

If we wanted users to change the accountName of a record, then prior to the above rendering $context.accountName can be assigned the current account name (e.g., $context.accountName=$root.@@sales.accountName). Then the value of $context.accountName can be fetched and displayed as the value of input box. As the user clicks the value of the input box is assigned to $context.accountName.

The netui:repeater can bind a data source to a variable. The name of the variable can be defined by the id attribute of the netui:repeater element. The repeater, during page generation can iterate over each top-level node in the data source and assign the iterator variable, whose name is defined by the var attribute value, to the current node.

The template preprocessor can create a dependency graph of repeaters used by the repeater's selection semantics.

Let's consider an application that displays three lists. The first is a list of cuisine types, our sample application. The second is a list of neighborhoods. The third is a list of restaurants matching the cuisine and neighborhood selected. Selecting the type of cuisine determines the list of neighborhoods and selecting a neighborhood displays the list of restaurants of a particular cuisine type in a particular neighborhood. The application would look something like:

1. On startup the application displays the list of known cuisines (FIG. 27A).
2. Selecting French cuisine displays the neighborhoods for French cuisines (FIG. 27B).
3. Selecting Westside neighborhood displays the French restaurants (FIG. 27C).
4. Selecting a different cuisine would deselect Westside; display a new list for Neighborhoods and an empty list for Restaurants (FIG. 27D).

Each list is a repeater. FIG. 28 shows the XHTML template file for the application of FIGS. 27A-D.

The first repeater (#1), handles the selection of the of the cuisine type, $i.select( ). The cuisines selected node/state is stored in the $cuisines variable. The second repeater (#2) displays the neighborhoods once the first list has a selection, $cuisines.isSelected( ). The second repeater similarly allows an item to be selected from its list, $j.select( ). Once the first and second repeater has a selection the third list displays the restaurants of a particular cuisine in a particular neighborhood.

Now, the interesting part is step 4. When the user selects "Italian" the other lists appear to magically de-select and disappear.

It works because the Controller can keep a dependency graph of the selectors. A simple list can be ordered top-to-bottom and left-to-right. This can be called the natural order and is how most applications are built (like the three list application). In one embodiment, any change in the up stream selection will cause the downstream (top-to-bottom and left-to-right) repeaters selection to be cleared and re-computed. To date this has not been an area of performance concern. If selection performance becomes a problem a more detailed graph may have to be built whose dependencies are computed from the expressions.

The Controller interface can be the set of methods that the Renderer will use to communicate to the Controller when a user makes a UI gesture in the Renderer. The UI gesture can be an action on the page or menu item being selected from the IE plug-in. Methods can be synchronous calls however; some methods might post an event to the Event Queue for proper ordering of the request in the Controller. In one embodiment, there is however, no additional notification to the Renderer when the operation is processed.

| Operation | Exposed Method | Description |
|---|---|---|
| Validate User | login | Validates user name and password, this validation show the list of apps available as well as running an app(s). |
| List of Applications | getApplicatons | Returns the list of known applications available to this user. Some apps may have been downloaded some are to be downloaded. |
| Handle UI Event | onNNNNN | Any event that the user attached an action to will be routed to the controller to call the action. When the user bound an action to an element a binding is created on the generated page to the Controller via a unique ID for the action which is passed back to the Controller from the Renderer. |
| Load binary blob | getAttachment | The URLs of an image (or any binary data) are changed to point to a special protocol (something not http) this causes the Renderer to get notified of when the binary is needed and the Renderer will call the Controller to fetch the data. This allows the binary to be either a local file or data to be located exogenously. Used for applet, img, etc. |
| Terminate Controller | terminate | Signals the Controller to shutdown. |
| Toggle online/offline | setOffline | Toggles connectivity. |
| Display error page | navigateErrorPage | |

The Controller can talk directly to the DMF via a synchronous interface. Most information can be returned immediately (synchronously) however, some calls can result in asynchronous requests being made to the MAS. As asynchronous requests are completed, the Controller is notified by the DMF posting an event into the Event Queue which is then processed later by the Controller.

| Operation | Exposed Method | Description |
|---|---|---|
| Load the Application | loadApplicaton | Signals to the DMF to load the latest version of the application and the application's META-data. This call returns immediately, the Controller waits for an onRegistrationComplete event being posted by the DMF to the Event Queue. This will signal to the Controller that the application is on the client and can run which causes the application's XPF file to be loaded and the begin function called. |
| Toggle online/offline | setOffline | Pass through from Controller interface to the DMF. |
| App Descriptor | getAppDesc | Get all application specific information like friendly application name, only run one copy at a time, etc. |
| Data navigation | getNavigator | This interface is exposed to allow the Controller to navigate around the data. See section on Navigator. |
| Start Page Render | beginPageRender | Signal to the DMF to do 2 things:<br>1. return navigation calls of the data in the cache immediately (synchronously)<br>2. make asynchronous call to the MAS, if connected, to return new/updated data not in the cache. When the asynchronous call is complete the DMF post the event onShouldRefresh to the Event Queue. |
| End Page Render | endPageRender | Stop trying to keep the cache up to date. Any navigation calls after this call will return only the data that's in the cache all navigation calls are synchronous. |
| Terminate App | terminate | Terminate the DMF and/or application associated with this DMF. |

The Navigator interface is yet another interface exposed by the DMF. This interface can let the Controller/XScript engine navigate the data model.

| Operation | Exposed Method | Description |
|---|---|---|
| Find the data | select | Build a vector of SliceEntry this is a query of ., . . . , scalar values, and operator, names, attributes. |
| Find all data | deepSelect | Similar interface as select with additional cookie and callback function. Will notify when all data is received by calling script function.<br>Maybe just register a special event callXScript with the function name. |

List of events which the DMF may post to the Event Queue as a result of asynchronous requests to the MAS are completed. The events can be processed by the Controller.

| Event | Description |
|---|---|
| onRegistrationComplete | Signals application is ready to run. The XPF can be loaded and the begin function can be called. |
| onShouldRefresh | More data has arrived from the MAS as a result of selects being done between beginPageRendere and endPageEnder. When received re-generate a new HTML page (running diff to update just the changes). |
| onUpdateSyncActivity | Return current sync statistics. |
| onDeepCallback | |

The script engine consists of a number of parts: a front-end parser/compiler, a back-end ICode generator, an interpreter and a run-time environment. The front-end can parse the XScript code and produce a parse tree. The back-end can read the parse tree and produces ICode and does any fix up to the ICode (branch offsets, variable names to dictionary ids, etc). The interpreter can execute the ICode using the XScript run-time environment. The run-time environment can consist of native objects (i.e., Date, String, Array, etc.) as well as the XMLRuntime environment.

The script engine can maintain a script context per current thread. In one embodiment, it is therefore not necessary for a script consuming component to remember a particular script context. The script engine can expose a set of static functions which components can use to load, change or run script. The thread that loaded the script can be the same thread that changes or runs the script.

Figure 29:
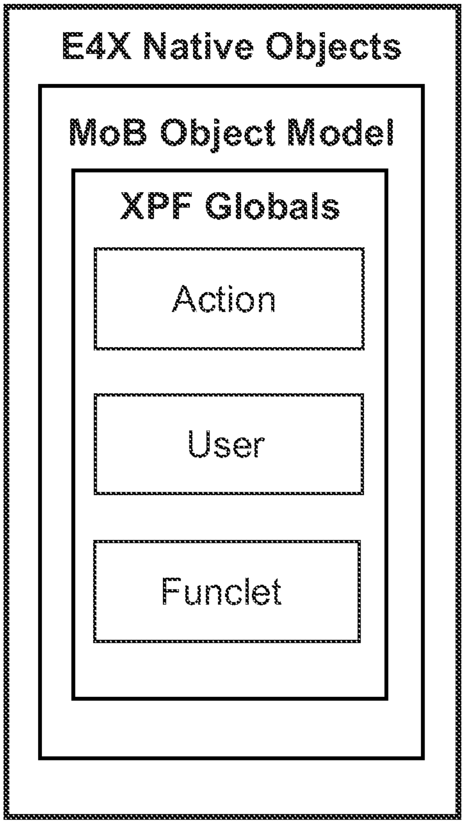
FIG. 29 illustrates a scope chain of one embodiment.

When any action, funclet, or user defined function is called, the scoping chain can be as shown in FIG. 29.

The E4X native objects can be the built-in objects like Date, String, Array, Math, Number, Boolean and XMLRuntime.

The MoB Object Model can be a dynamic set of objects, set as a result of where in the template the Action/User Function or funclet is invoked. For example, calling funclet code inside of a netui:repeater can create and set the properties for the selector attributes id and var. In addition, objects like $pageFlow, $history, etc. can be properties on the MoB object model. The MoB object model can be special in that the object is injected into the scope chain. This can imply that the method and properties in this object can appear as top-level globals.

The XPF globals can be any properties or methods at level zero in the XPF file. This can include the actions and user functions as well as any globals.

The Funclets can be any script in the template that's enclosed by curly braces (also can include the netui:selector src value attribute).

Every MoB object model non-scalar property can implement the Scriptable interface. For simplicity, there can be a ScriptableBase utility class.

XScript as an interpreted language can compute everything at run-time; as compared to a compiler which computes everything at compile-time. Which function to call, how many arguments to pass, what properties to get/set, and what object to fetch can all be computed at runtime. This requires an interface which any object, inside or outside the script engine, can be interrogated during run-time to determine if a property/method exist and if the method can be called.

In one embodiment, there are three functions in Scriptable which are used to find out if a property or method or indexed item in a list/array exists:

1. getProperty
2. getMethod
3. getItem

The interpreter can evaluate an expression of the form:

```
x.a.b( )
```

This can cause the interpreter to find the name x looking in the following scope order:

Current function

User's XPF global scope

MoB object model

Native Object

Once found the object that x points to, which implements Scriptable, can be returned. The interpreter can then call the getProperty method on x looking for the name a. The variable x can return another Scriptable object for a (if a wasn't found then x's getProperty can return Scriptable.NOT_FOUND).

The interpreter can determine that the next name in the expression is a function invocation and call a's Scriptable's object getMethod function. If the method b exists it can return a FunctionObject (another XScript interface) which the interpreter can actually invoke and call the actual JAVA function that is behind this object model's method.

An lvalue expression assigning to an object model property can work the same way with the assignment calling putProperty method in Scriptable with the value to assign to the property.

Xscript extensions can include:

- Add a new method or property to a native object
- Override an existing method or property of a native object with new functionality
- override a subsystem of a native object like navigation, compare, delete, etc.
- Delegate back to the original implementation in the native object A general mechanism to register an object for a particular class of native object can exist. XScript can expose an Extender class.

To add a new method such as create, to XML and XMLList the following code can be used:

```
Extender.register(XMLRuntime.XML.class,
new XMLAddOn( ));
Extender.register(XMLRuntime.XMLList.class,
new XMLListAddOn( ));
```

The extension can be done for any instance of XML or XMLList that is created by the script engine for this thread. Within the XScript's context can be the extensions which have been registered. In one embodiment, only script exposed properties and methods can be added which is why XMLAddOn and XMLListAddOn are Scriptable objects.

XScript can call XMLAddOn's functions getPropertyIds and getMethodIds the names of each property and method can be returned as an array of Strings. These values can be placed into the list of default property and method names. Each time a new instance of XML or XMLList is created, the lookup table used can be the one in the native object registry where there is one per thread.

Overriding an existing exposed name (method/property) can be handled in the same way as adding a new name with the addition that if a name collides with an already existing name the Scriptable object passed in is delegated to its getNNNN method. If the name overriding is dynamic, based on some runtime kind of information, then the Scriptable objects can return Scriptable.SUPER to cause the base implementation to be used.

The XScript engine can expose a certain set of interfaces which it will allow to be overridden. For example the XML comparison operator which might not be object identity but consist of comparing a GUID and version number. To do that XMLRuntime.XML can expose the XComparable interface. The Controller/MAS could override comparison by:

```
Extender.register(XMLRuntime.XML.class,
    XComparable.class,
    new MasCompare( ));
```

The MasCompare class can be an implementation of XComparable. The Extender can be on a per thread basis and anytime an instance is created it can point to these extended objects. The amount of extensions is finite and we would extend only those internal operations that are required for the Mobile project. Subsystem override can be a complete override with no ability to delegate to super. This can change if the need arises.

Here is a list of specifc extensions which will be made to various XScript native objects:

XML/XMLList update, select, keyref, label, META, syncState

There are a number of scripting subsystems which can be overridden. These include:

Navigation

Comparison

@@ operator delete operator label delegator

If one script engine context is allowed per thread, the context can be stored based on the current thread. Therefore, the mechanism can require no state to be held by the user in regards to the script context.

The order of startup can be:

Register any extensions to XScript's native objects and/or register any extensions to any of the XScript's subsystems.

Load the XPF file using the XScript class. The loading of script is:

XScript.loadScript(code, mobOM);

where code is the contents of the XPF file. The mobOM can be the global object that houses the object model. It can be dynamic in that the scope changes based on where in the template the code is running. At XPF startup time the mobOM can define $root, $context, $current, etc (see MAS spec on client programming model for complete OM). If loadScript is called with a current context the current context can be deleted and a new context created (an implicit unloadScript can be done). This can cause the script to be parsed and ICode generated.

Next the Controller can load the XHTML and produce the set of funclets (see Controller section on funclets). Funclets can be special kinds of functions that are marked read-only. In ECMAScript any function can be replaced; in one embodiment of the the mobile model can be funclets are immutable. Funclets are required to be exactly as described in the XHTML template.

The function:

```
XScript.loadROFunctions(funclets)
```

can compile, generate the ICode for the funclets and add the funclets as immutable functions to the current script context.

As a new template is loaded, the funclets associated with the old template can be unloaded and new funclets associated with the new template loaded into the current script context. This can be done by calling unloadROFunctions explicitly or by calling loadROFunctions. These calls can unload any existing RIO functions in the current context and then compile and load the new functions into the current context.

In addition, the MoB OM scope can change but it can be dynamic and can be built into the design.

Calling a function can require only a function name with a set of arguments. The callFunction method can be an optimized invoker with the only stipulation being that the arguments are values not expressions to be evaluated prior to calling the function.

For example to call a function named doIt with a parameter of value 10:

```
Object [ ] args = new Object[1];
args[0] = new Integer(10);
Variant result = XScript.callFunction("begin", args);
```

The returned value, if any, from the function can be a variant value.

Because the script engine is an untyped system all variables and properties can change shape easily (sometimes too easily). To accomplish these values can be contained in a morphable type called a variant. A variant can be capable of taking on any possible value with some efficiency. When a value is exposed to the outside world current type/value of the variant is exposed to the outside world. However, the variant can have a number of utility functions to coerce the value to any type (e.g., int to String, XmlDate to ECMAScript date).

It's also possible to return ECMAScript objects and enumerate the properties of that object.

In one embodiment, at runtime, the client, outside of design time, need not require the front-end or back-end of XScript just the interpreter and runtime environment. There can be a deploy process that saves the ICode for the XPF file to a file as well as the XScript funclets created from the XScript expressions in the XHTML file (expressions within curly braces).

Figure 30:
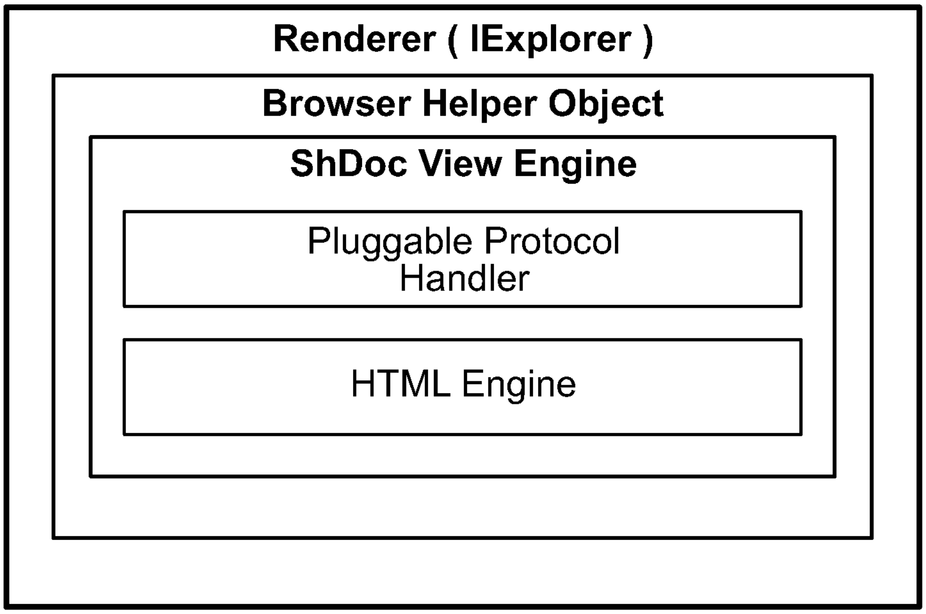
FIG. 30 illustrates components of an exemplary renderer.

The Renderer can be an HTML browser, for this discussion we will describe how to build a Renderer using a conventional browser by creating a Pluggable Protocol Handler (PPH), a toolbar plug-in, and a browser helper class. FIG. 30 shows the various components of the Renderer, of one embodiment.

Register a permanent asynchronous PPH to direct a protocol scheme (http, ftp, etc.) to a defined handler (class). For example, registering the xsync:: protocol scheme to call our PPH will cause any URL address with an URL like xsync::// myapplication typed in IE's address bar to call our protocol handler. The protocol handler can direct the address (our mobile application) to the Mobile Task Bar (MTB).

The Mobile Task Bar can be a single JAVA task bar process. This task bar can manage one VM for all applications. The applications can each be sandboxed by providing a unique class loader per application. In addition, the MTB can create a bootstrap instance to control the downloading and launching of a mobile application.

When the MTB starts an application that has been downloaded, it can spin up a Controller passing in an implementation of the View interface to the Controller. The View interface can be how the Controller communicates to the Renderer. The Controller returned to the Renderer can be an implementation of the Controller interface which is how the Renderer communicates to the Controller.

A Browser Helper Object (BHO) can be a class that has been registered has a BHO to IE it will attach itself to every new instance of the browser. The BHO can allow browser events to be intercepted, access to the browser window, and the DOM of a HTML page to be accessed. This can allow UI events on the page to be routed to the action managed by the Controller and allow minimal changes to the application's HTML page as new data asynchronously arrives (page diff'ing).

Figure 31:
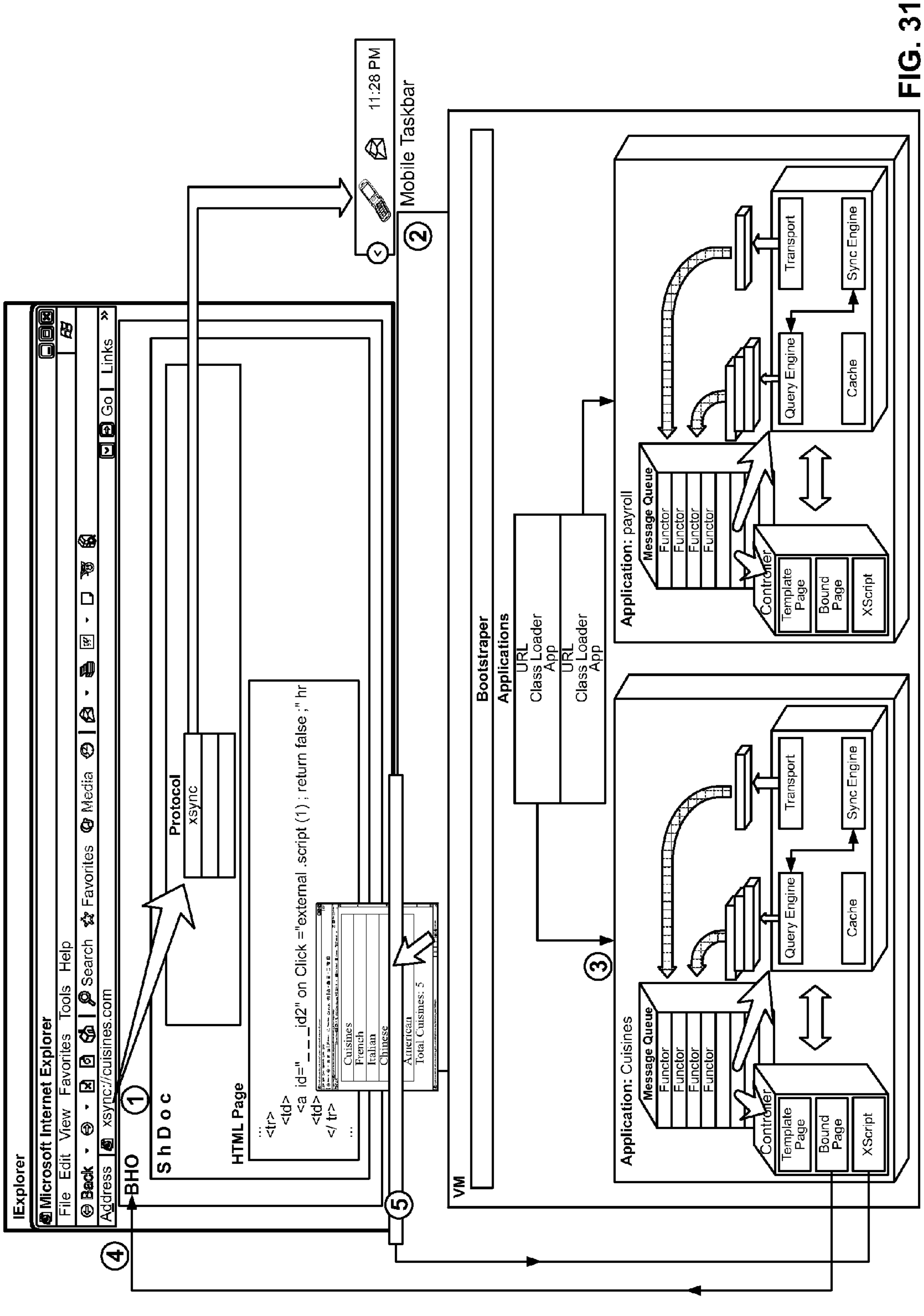
FIG. 31 is a view of a renderer's components and its interactions with external elements.

FIG. 31 is a view of the Renderer's components and its interactions to the outside:

- between the browser and the MTB managing a VM with sandboxed applications
- between the Application Framework and the Renderer using the Controller and View interfaces The above figure shows the life cycle of the Renderer, the MTB, a Mobile application and how a UI event is funneled through the system.

❶ Typing the application name in the browser address bar with the protocol "xsync:" causes the name to be routed to the Mobile Browser's PPH. This will cause the URL to be routed to the Mobile Taskbar (MTB).

❷ The MTB can cause an application to be downloaded either for the first-time or if the application's version has changed. The MTB can be responsible for spinning up the one VM and managing the sandbox environment of an application.

❸ The sandboxing can include creating a class loader for this application and spinning up the Application Framework (Controller, XScript, Bound Page, etc.) and Data Management Framework (cache, sync engine, transport, etc.).

❹ Once an application's generated HTML page is ready to be displayed the Controller can push the HTML page using the View interface to the Browser Helper Object (BHO), via IPC (JNI for JAVA).

❺ A UI gesture on the generated HTML page to an element with an action can cause the BHO to intercept the IE event and route the event through the MTB to the Controller interface via an IPC (JNI) call. This can cause the action to be called.

Figure 32:
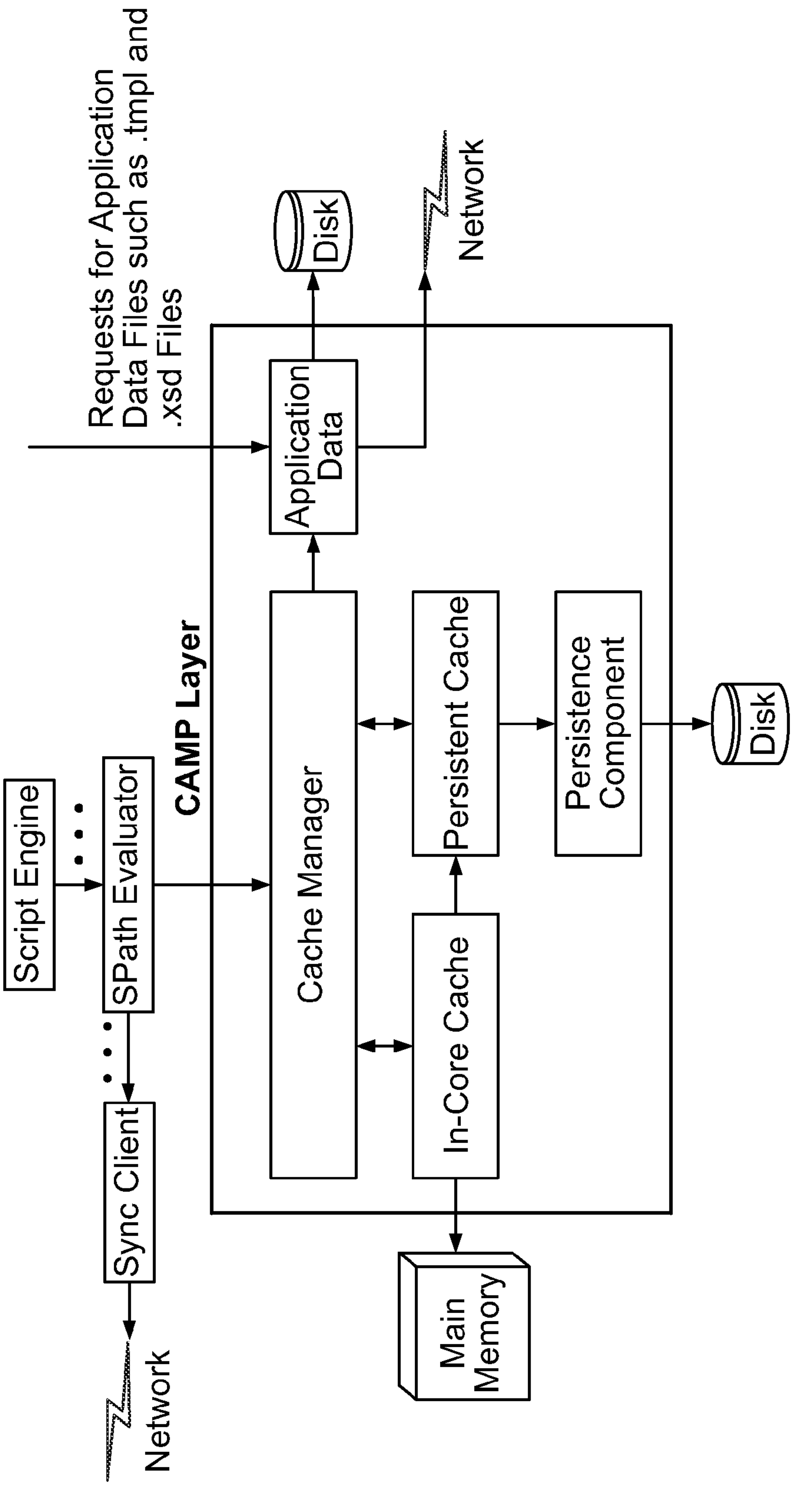
FIG. 32 illustrates a caching and persistence module of one embodiment.
Figure 33:
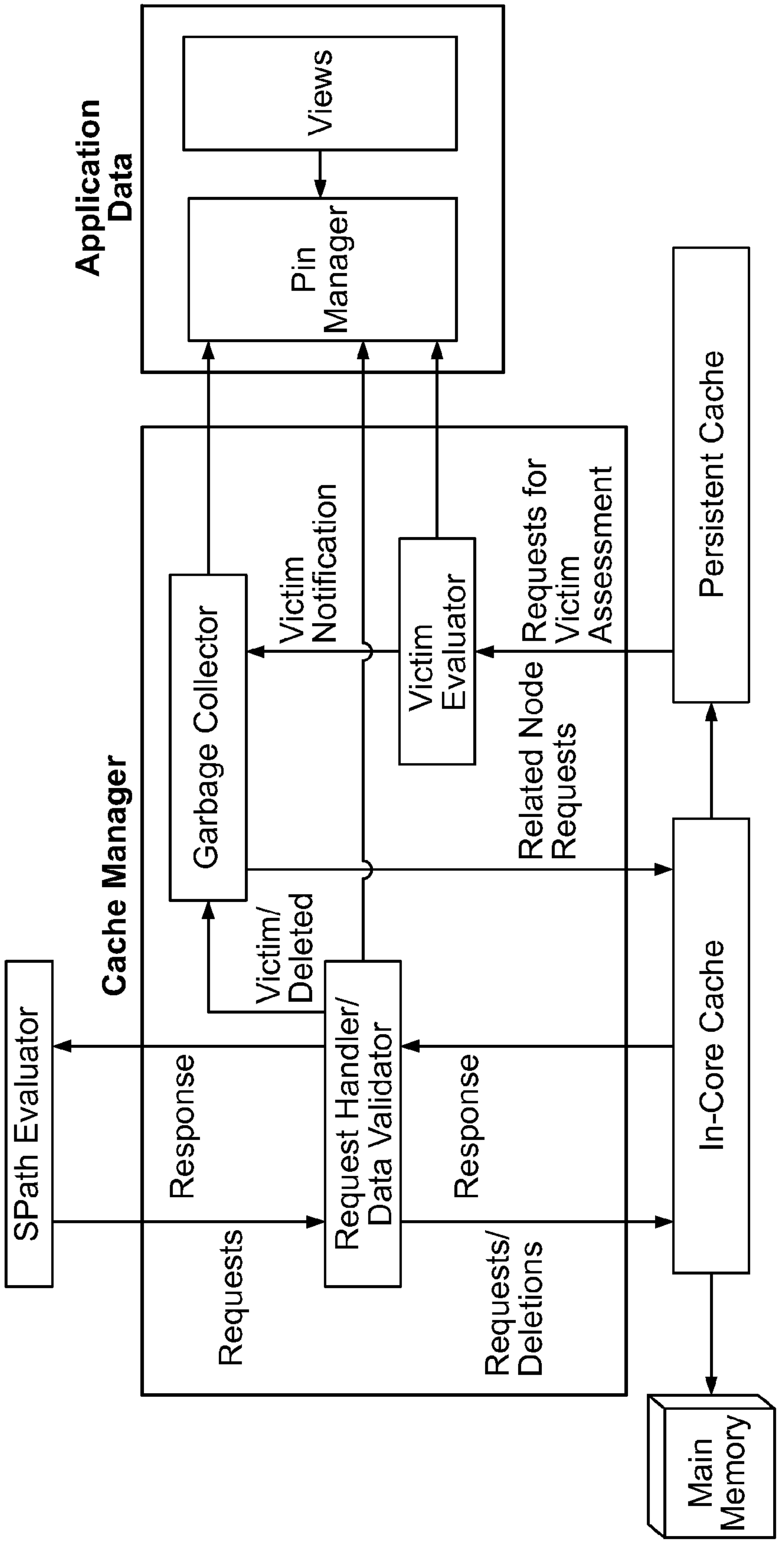
FIG. 33 illustrates a cache manager of one embodiment.
Figure 34:
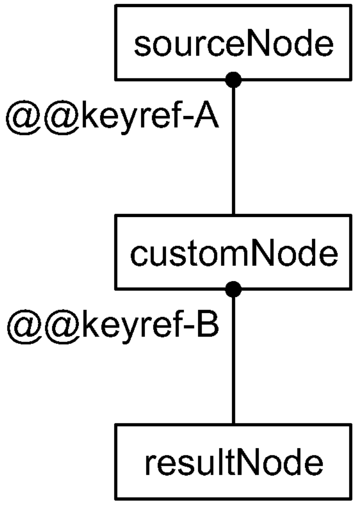
FIG. 34 illustrates keyref declarations.

FIG. 32 is a high level picture of this module. Edges connecting components indicate communication requests.

The following describes each of the components.

Most read and update requests for data can first pass through the cache manager. The cache manager can be bypassed completely by the Query evaluator depending on the semantics of the larger expression being evaluated.

From a high level the cache manager can support the following:

- An interface of CRUD operations over the data stored in the cache.
- Efficient traversal through KeyRefs.
- Efficient searches within a nodetype for all nodes that have a descendent element or attribute with a particular value. These searches will be supported by "value indexes" or vindexes. For example, a vindex could exist on the LastName element of a MAS node allowing for the efficient evaluation of $current.@@employees.where(.LastName="Foo") by avoiding a full scan of all employees.
- Discovery of the available access methods (in particular in V1 the set of all vindexes).
- Evaluation of the completeness of data that appears in the cache based on whether or not data has been removed from the cache or the age of the existing data. The cache may also throw away data based on its age.
- Perform garbage collection on orphaned data nodes.
- Maintain any auxiliary data structures to support all of the above efficiently.

The primary user for the cache manager can be the Query evaluator. The Query evaluator can use the set of possible access methods, along with simple heuristics, to choose a good query execution strategy.

The in-core cache can be a simple main memory. It can be configured with the amount of main memory available to it and the interface to a secondary cache. On the client the secondary cache can always be the data persistence layer. A stub (empty) secondary cache can be employed on the server when the server has been configured with "use-no-persistent-cache". A stub cache can implement the standard caching interface but can be essentially a big no-op.

The in-core cache and its secondary cache can be setup like an L1 and L2 cache. When the in-core cache cannot fully satisfy a request for data then it can ask its secondary cache. Data added to or removed from the in-core cache can be automatically added to or removed from the secondary cache. When data is retrieved from the secondary cache then this data can be added to the in-core cache (this includes vindex results).

The in-core cache need not build vindexes or other alternative access methods. Instead it can rely on the caching layer below it to define the set of available alternative access methods. Motivations for this decision are as follows:

It greatly simplified the design of the in-core cache component

In the normal configuration the in-core cache will be smaller than the persistent cache. Requiring the in-core cache to set aside some of main memory for auxiliary indexing structures limits the amount of "core" data that can be managed.

Indexing is an all or nothing thing that must be maintained for every piece of data that is managed. It cannot be turned on and off at random and you cannot manage indexed data the same way as core data since maintaining consistency between core and auxiliary data is required for correctness.

As a result of this design some of the interface methods supported by the in-core cache end up being a simple pass through to the secondary cache. For example, index discovery is passed directly to the secondary cache. Therefore, when there is no persistent cache then there are no index access methods available.

The persistent cache can be responsible for caching data persistently using an underlying persistence layer to store and retrieve the cached data. The persistent cache can define an encoding of MAS data into a form that can be supported by the persistence layer. In addition the persistent cache is responsible for building and maintaining auxiliary data structures to support efficient access patterns on the "core" data. In one embodiment, while in some ways these auxiliary data structures are also cached data they cannot be managed like cached data.

The persistence component can be a thin wrapper around the database and is responsible for abstracting away the actual storage of the data and mechanics of communicating with the database. This can allow us to hide the complexity of any database component and ensures that contortions that have to be done (for example for efficiency) only appear in a single place.

In one embodiment, there can be two types of application data.

Data which is stored persistently. This data may have version numbers associated with it that are checked on startup of the application. Examples are .tmpl, .xsd, and .xpf files.

Scratch pad information which is valid during the lifetime of the application only. Examples are view definitions, nodes which are pinned in the cache, user information, and authentication information.

The Cache, Application management and Persistence (CAMP) layer can be composed of three main parts:

Cache—caches data used by an application

Application/user data manager—manages transient user state such as view specifications and authentication information, as well as persistent application state such as the schema and template files.

Data persistence—cache and application data both benefit from persistence of the data.

The cache can be a fixed size collection of frequently accessed data that is usually faster to access than the source data. A software component can ask the cache for data and it provides what answers it can. Typically, the user of the cache is responsible for giving data to the cache to be cached, asking for data to be removed from the cache, and deciding whether responses provided by the cache are sufficient for its purposes given the age of the data returned.

In one embodiment, the cache can:

1. Have both an in-core component and a persistent component.
2. Since the amount of data that we will cache persistently could be large we want to build indexing structures on top of the persistently cached data to support efficient access. This can introduce a large number of complications.
   a. Construction and maintenance of auxiliary data structures.
   b. A widening of the interface exposed by the cache component to other software components.
   c. Indexing structures can improve overall processing time for some (important) types of Spath expressions however their usage is non-trivial.
   d. A mismatch between the data cached by the in-core cache and that which is constructed by the persistent cache (more on this later).
3. Pinning data in the cache. Software components may request that a cache pin some data so that it is not removed from the cache due to restrictions on the amount of data that the cache can manage. Data may be pinned for multiple reasons by different components. For example, a node may be pinned because it is accessible by multiple views and also because a user of the cache requested that the data be pinned. All three "pins" must be removed before we will consider removing the node.

FIG. 32 is a high level picture of a CAMP layer, of one embodiment, and some components that talk to the CAMP layer. This picture works for the CAMP layer on both the client and the server although the concrete implementations of some of the generic interfaces may differ between the client and server. Edges connecting components can indicate communication requests.

The following summarizes each of the components; details are provided in later sections.

Most read and update requests for data can first pass through the cache manager. In one embodiment, the cache manager may be bypassed completely by the Spath evaluator depending on the semantics of the larger expression being evaluated.

The cache manager can support the following.

An interface of CRUD operations over the data stored in the cache.

Efficient traversal through KeyRefs.

Efficient searches within a nodetype for all nodes that have a descendent element or attribute with a particular value. These searches will be supported by "value indexes" or vindexes. For example, a vindex could exist on the Last- Name element of a MAS node allowing for the efficient evaluation of $current.@@employees.where(.LastName="Foo") by avoiding a full scan of all employees.

Discovery of the available access methods (in particular in V1 the set of all vindexes).

Evaluation of the completeness of data that appears in the cache based on whether or not data has been removed from the cache or the age of the existing data. The cache may also throw away data based on its age.

Perform garbage collection on orphaned data nodes.

Maintain any auxiliary data structures to support all of the above efficiently.

The primary user for the cache manager can be the Spath evaluator. The Spath evaluator can use the set of possible access methods, along with simple heuristics, to choose a good query execution strategy.

The cache manager can treat the data managed by the cache as opaque data although this is violated when necessary.

The in-core cache can be a simple main memory. It can be configured with the amount of main memory available to it and the interface to a secondary cache. On the client the secondary cache can be the data persistence layer. A stub (empty) secondary cache may be employed on the server when the server has been configured with "use-no-persistent-cache". A stub cache can implement the standard caching interface but can be essentially a big no-op.

The in-core cache and its secondary cache can be setup like an L1 and L2 cache. When the in-core cache cannot fully satisfy a request for data then it can ask its secondary cache. Data added to or removed from the in-core cache can be automatically added to or removed from the secondary cache. When data is retrieved from the secondary cache then this data is added to the in-core cache (this includes vindex results).

In one embodiment, the in-core cache does not build vindexes or other alternative access methods. Instead it can rely on the caching layer below it to define the set of available alternative access methods.

It greatly simplified the design of the in-core cache component

In the normal configuration the in-core cache will be smaller than the persistent cache. Requiring the in-core cache to set aside some of main memory for auxiliary indexing structures limits the amount of "core" data that can be managed.

Indexing is an all or nothing thing that must be maintained for every piece of data that is managed. It cannot be turned on and off at random and you cannot manage indexed data the same way as core data since maintaining consistency between core and auxiliary data is required for correctness.

As a result of this design some of the interface methods supported by the in-core cache can end up being a simple pass through to the secondary cache. For example, index discovery can be passed directly to the secondary cache. Therefore, in one embodiment, when there is no persistent cache then there are no index access methods available.

The persistent cache can be responsible for caching data persistently using an underlying persistence layer to store and retrieve the cached data. The persistent cache can define an encoding of MAS data into a form that can be supported by the persistence layer. In addition, the persistent cache can be responsible for building and maintaining auxiliary data structures to support efficient access patterns on the "core" data. In one embodiment, while in some ways these auxiliary data structures are also cached data they cannot be managed like cached data.

The persistence component can be a thin wrapper around the database and can be responsible for abstracting away the actual storage of the data and mechanics of communicating with the database. This can allow us to hide the complexity of any database component and ensures that contortions that have to be done (for example for efficiency) only appear in a single place.

In one embodiment, there are two types of application data:

Data which is stored persistently. This data may have version numbers associated with it that are checked on startup of the application. Examples are .tmpl, .xsd, and .xpf files.

Scratch pad information which is valid during the lifetime of the application only. Examples are view definitions, nodes which are pinned in the cache, user information, and authentication information.

The following definitions are useful before introducing the components in more detail.

A primary key, or Pkey can be a tuple of the form <nodetype, $pk^0$, $pk^n$> where nodetype is the type of the MAS node and $pk^0, \ldots, pk^n$ is the composite key defined by the MAS node. A Pkey can uniquely identify a node in the MAS system.

The nodetype for a node can be the name assigned to the corresponding xsd node.

A nodeset can be a collection of nodes all of which have the same nodetype.

Every node and nodeset can have two TTL values associated with them. These values can be used to control how frequently the system will check the validity of information that is cached and how long the information can be used for.

The Expire TTL for a node or nodeset can be the time after which the node or nodeset should not be returned to any component above the CAMP layer.

The Refresh TTL for a node or nodeset can be the time after which the data is considered to be stale. This node can be returned to callers who are calling from outside of the CAMP layer, however they may choose to not use the data or take additional action to ensure that the data is updated.

In one embodiment, a node or nodeset result returned by the CAMP layer be either "complete" or "incomplete". A node is complete if the TTL values indicate that the information encapsulated by the node is not stale. A nodeset can be complete if the set itself is not stale nor is it known to be missing any members (within the boundaries of the nodeset TTL). The completeness property of a node or nodeset can be filled in by the CAMP layer and used by callers when deciding whether to do additional work such as requesting updates.

Every cache lookup result can have a "CacheState" which is a tuple of the form <Expire TTL, Refresh TTL, IsComplete >. The IsComplete can reflect the definition of completeness of a node or nodeset.

In one embodiment, although we only have a single index type right now, the vindex, it can be worthwhile to generalize the description of alternative access methods so that support for other types of indexing strategies can be incorporated later.

An alternative access method is any way to find data within the cache that doesn't use the primary key as a starting point.

An alternative access method which supports finding elements based on values of subelements or attributes can be called a vindex.

A vindex may be limited to certain types of predicate expressions. In one embodiment, V1 vindexes are limited to string equality or prefix expressions for xml element and attribute values.

The operator can be supported by an alternative access method is one of IntegerCompare, FloatCompare, String Equality, or String Prefix.

The cache can be a collection of frequently accessed heterogeneous data types. The following is a list of data types accessible through the cache interface, of one embodiment.

1. Node—Nodes accessed via PKeys
2. KeyRefSet—Nodesets accessed by the Pkey of a source node and a KeyRef relation
3. VindexSet—Nodesets accessed by vindex lookup.

In one embodiment, heterogeneity is required in order to support all cache functionality. The cache implementations must provide O(1) access times to the following key lookups.

| Name | Key | Use |
|---|---|---|
| Node | < Pkey p > | Find the node whose primary key is p. |
| KeyRefSet | < Pkey p, KeyRef f > | Find the set of nodes which are reachable starting from p and following f. |
| VindexSet | < nodetype n, TagOrAttributeName e, Operator o, Value v > | Vindex lookup. In V1 no attempt will be made to equate predicates with one another. (No predicate subsumption tests will be performed.) |

At a minimum, all caching components can support the functionality described in this section.

| | |
|---|---|
| Name: | getAllIndexes |
| Inputs: | < nodetype n > |
| Outputs: | { < nodetype n, TagOrAttributeName e, Operator o> } |

This method can return the set of all indexes which have been created for the nodetype n. The TagOrAttributeName can be either the tag for the xml element or the key value for xml attributes which have been indexed. Operator support for V1 can be limited to StringEquality and StringPrefix.

| | |
|---|---|
| Name: | vindexLookup |
| Inputs: | < nodetype t, TagOrAttributeName e, Operator o, value v > |
| Outputs: | < { Pkey } > |

The value index lookup, vindexLookup can return the set of all primary keys for nodes with type t that have an Xml element with tag e and value v or attribute key-value pair with key e and value v.

| | |
|---|---|
| Name: | pkeyFetch |
| Inputs: | < Pkey p > |
| Outputs: | < Datablob, CacheState > |

The pkeyFetch method can return null or the single node from the cache where the Datablob is the binary token stream representation of the node whose primary key is p.

< Primary key, KeyRef > –> { foreign keys }

| | |
|---|---|
| Name: | keyRefForwardAccess |
| Inputs: | <Pkey p, KeyRef f > |
| Outputs: | < {Pkey}, CacheState c > |

The keyRefForwardAccess method can return the set of PKeys whose nodetype is the target nodetype for the KeyRef f and which are reachable from the node p via f. This method follows the KeyRef in the direction that it is defined—from the source node to the target node. The CacheState's TTL values can be set to be the minimum of all Pkeys in the returned set.

< Foreign key, KeyRef > –> {primary keys}

| | |
|---|---|
| Name: | keyRefReverseAccess |
| Inputs: | <Pkey p, KeyRef f > |
| Outputs: | < {Pkey}, CacheState c > |

The keyRefReverseAccess method can return the set of PKeys whose nodetype is the source nodetype for the KeyRef f and whose target node is p. This method follows the opposite direction of the KeyRef and can also be used by the inverse KeyRef. The CacheState's TTL values are set to be the minimum of all Pkeys in the returned set

| | |
|---|---|
| Name: | nodeCreate |
| Inputs: | < nodetype t, XmlBean b > |
| Outputs: | < Pkey p, Datablob d > |

The nodeCreate method can create a new node whose nodetype is t and whose data is the contents of b. If a primary key value has not been defined for the node then a temporary primary key can be assigned and placed in the first primary key attribute of b. The nodeCreate method can convert the XmlBean into binary token stream format and store the node in the cache. The resulting node, along with p, the temporary primary key, can be returned. In one embodiment, the only adornment placed on the node is the MAS:IsTemporaryPkey attribute which is set to true when a temporary primary key has been defined for the node.

| | |
|---|---|
| Name: | nodeUpdate |
| Inputs: | < nodetype t, XmlBean b > |
| Outputs: | < Pkey p, Datablob d > |

The nodeUpdate method can update the node identified by p with the contents of b. The nodeUpdate method can convert the XmlBean into binary token stream format and update the cache and all related indexes. Some foreign keys in the node may be temporary foreign keys which will be fixed up later.

| | |
|---|---|
| Name: | nodeDelete |
| Inputs: | < Pkey p > |
| Outputs: | Outputs: < Success: [0\|1] > |

The nodeDelete method can purge a node from the cache. An output success value of 0 (no success) would be returned if the Pkey cannot be found in the cache.

| | |
|---|---|
| Name: | pkeyFixUp |
| Inputs: | < Pkey temp, Pkey actual > |
| Outputs: | Outputs: < Success: [0|1] > |

The pkeyFixUp method can be called on the client cache when the client receives a sync protocol message indicating that a primary key has been assigned for something that previously had a temporary primary key. This method can update the node identified by temp with the new primary key actual. pkeyFixUp can also find all other nodes with a reference to temp and patch them as well.

In one embodiment, the work performed by the pkeyFixUp method need not run as a Tx however the receipt and processing of the fixup sync message cannot be acknowledged until the pkeyFixup method returns. In one embodiment, if a failure occurs during the processing of this method then it is important that the sync message be reprocessed on startup in order to complete the patching of the temporary primary key.

The following is the pseudocode that could be used to evaluate the Spath expression $current.@@Accounts.*.@@Contact.

```
$contacts = { };
$result = { };
// Traverse from $current to all of the accounts. No need to get the account
entity.
< $accounts, $c > = keyRefForwardAccess( $current, Accounts );
// Enqueue a sync request if this node is not complete.
if( ! $c.isComplete ) makeSyncRequest( $current, Accounts );
// For each of the accounts deal with getting the contact.
for each $p in $accounts
   < $contact, $c > = keyRefForwardAccess( $p, Contact );
   if( ! $c.isComplete ) makeSyncRequest( $p, Contact );
   $contacts.append( $contact );
// The set $contacts has all of the contacts so I need to get each one
for each $c in $contacts
   < $contactDataBlob, $c > = pkeyFetch( $c );
   if( ! $c.isComplete ) makeSyncRequest( $c );
   $result.append( $contactDataBlob );
return $result;
```

The following is the pseudocode that could be used to evaluate the Spath expression $current.@@Accounts.*.@@Contact.where(. FirstName="Jimbob") where $current is already bound and it is known that a vindex exists on FirstName.

```
$contacts = { };
$result = { };
// Traverse from $current to all of the accounts. No need to get the account
entity.
< $accounts, $c > = keyRefForwardAccess( $current, Accounts );
// Enqueue a sync request if this node is not complete.
if( ! $c.isComplete ) makeSyncRequest( $current, Accounts );
// For each of the accounts deal with finding all PKeys for the contacts
// Note that we aren't fetching the actual data.
for each $p in $accounts
   < $contact, $c > = keyRefForwardAccess( $p, Contact );
   if( ! $c.isComplete ) makeSyncRequest( $p, Contact );
   $contacts.append( $contact );
< $vindexSet, $c > = vindexLookup( ContactType, FirstName, StringEquals,
"Jimbob" );
$contants.intersect( $vindexSet );
// The set $contacts has only the contacts that satisfy my predicate
or each $c in $contacts
   < $contactDataBlob, $c > = pkeyFetch( $c );
   if( ! $c.isComplete ) makeSyncRequest ( $c );
   $result.append( $contactDataBlob );
return $result;
```

In one embodiment, a vindex must be used correctly otherwise using the auxiliary data structure may result in incomplete results. The issue is that you cannot just use the vindex lookup method and work backwards up the SPath because you cannot ensure that all nodes captured by the vindex are up to date. The existence of the vindex only allows the efficient search for contacts that have been cached on the machine. The vindex does not encode or use TTL values for the set of things which are indexed. The simplest example of the improper usage of a vindex is the following. Suppose a vindex existed on FirstName of contacts but no contacts have been fetched yet. It is impossible for the cache manager to distinguish (in the general case) between a complete and incomplete result.

A vindex can be used only when the TTL values for the nodeset leading up to the nodetype that has a vindex defined has been checked. For example, given $current.@@accounts.*.@@orders.where(.price>1000) and a vindex on price the query execution engine must move from $current and fetch all accounts or ensure that the accounts node set is within its TTL. Then for each account it has to confirm the TTL or enqueues a sync request of all orders. Then it can use the vindex on orders to find all orders whose price >1000. This will return the set of all orders (in the entire system). We intersect this set with the set of orders that are reachable from this particular account. We can avoid scanning all orders off of disk and evaluating the SPath expression against all of them.

The request handler/data validator can be responsible for forwarding on requests for data to the configured subcache (the in-core cache) and for ensuring that the data returned by the cache manager has the appropriate CacheState.

The following algorithm can be used to evaluate potential results:

```
// For a NodeOrNodeSet n, CacheState s returned by my subcache
if( s.expireTtl != -1 && s.expireTtl > currentTime ) {
   if( n.type == Node && pinManager->is Pinned( n->pKey ) ) {
      s.IsComplete = false;
      // Result can still be returned to caller
   } else {
         gcManager->notifyNewVictim( n );
      subCache->deleteElement( n );
      // Result can not be returned to caller
   }
} else if( s.refreshTtl != -1 && s.refreshTtl > currentTime ) {
   s.IsComplete = false;
   // Result can be returned to caller
} else {
   s.IsComplete = true;
}
```

In one example:

1. If the query result is a node in a view then that node will always be returned to the caller even if the nodes data has expired. When the node has exceeded the expired TTL or refresh TTL the node will be marked as not complete so that the high layers can request a sync for the new data for the node. Note that the view definition overrides the Expire TTL.
2. If the expire TTL has been exceeded and the node is not part of a view then the garbage collection component is notified that a new node is being removed (thus potentially requiring the removal of other nodes) and the subcache is required to remove the node from its cache.
3. If the refresh TTL is exceeded then the result is marked as incomplete.

When a delete node request is passed to the request handler/data validator then this can be forwarded to both the in-core cache as well as the garbage collector.

The garbage collector can be responsible for clearing garbage out of the persistent cache. In one embodiment, the garbage collector need not be concerned about clearing out the in-core cache because 1. Victim selection for an in-memory cache is very inexpensive, and
2. We expect garbage to quickly age out of the cache The garbage collector can be notified by the victim evaluator and request handler/data validator when a node is being removed from the cache and a node is being deleted from the source (and therefore also from the cache).

The garbage collector can maintain a heap, h, of "potential orphaned nodes" along with the time that they were added to the list. (h={<n, time >}). The heap can support ordered access based on the time attribute, from oldest to newest.

When the garbage collector is given a node that is being removed, then it can add all foreign keys in the node to h.

The garbage collector can wake up periodically and considers collecting the potentially orphaned nodes. If the persistent cache believes that it would benefit from garbage collection then the GC algorithm can remove one or more of the potentially orphan nodes using the following algorithm:

```
if( persistentCache->performGC( ) ) {
  while(potential = h.top( ) ){
    if( ! pinManager->isPinned( potential.pKey ) ) {
      lastAccessTime = inCoreCache->lastAccessTime( potential.pKey );
      if( lastAccessTime <= potential.time ) {
        persistentCache->removeNode( potential.pKey );
        if( persistentCache->percentUsed( ) < 0.95 ) {
          return;
        }
      }
    }
  }
}
```

In this example:

1. according to this algorithm we will not remove a potentially orphaned node when it appears in the in-core cache and has been accessed more recently since we added it to the GCs heap;
2. we will also not remove a node if it is pinned (for example, it is being used in a view);
3. the persistent cache must support the "performGC" and "percentUsed" methods discussed further later;
4. a better algorithm could be constructed for applications that have a lot of sharing of data, although such an algorithm would be more expensive;
5. the algorithm is so simple that it shouldn't have a large impact on system performance;
6. no attempt is made to hold in the cache elements which have been modified on the client but have not yet been synced with the server (there is a stable version of these guys in a message queue somewhere);
7. the 0.95 can be tuned or a user-controlled value.

In one embodiment, nodes can be pinned in the persistent cache (but not the in-core cache) by pinning them. A pin manager can maintain a set of Pkeys for nodes which are currently pinned and the reason why they are pinned. (A node can be pinned for a variety of reasons.) The pin manager API can be made available to components outside of the CAMP layer (see issue). The pin manager need not persistently track the pin list—it can be lost by the application upon failure.

One user of the pin manager can be the view specification component. When a view is synchronized with the client then all nodes which are in the view can be automatically pinned.

The pin manager and the concept of pinning only can be used by the cache manager components in order to make better decisions about what remains in the cache and the validity of such data.

The cache manager's persistent cache can consult with a victim evaluator when it needs to choose a victim to be ejected from the cache due to space restrictions. In one embodiment, there are three types of cache elements (Node, KeyRefSet, and VindexSet) however the persistent cache builds and maintains the KeyRefSet and VindexSets therefore it will only evict MAS nodes and then, in order to maintain consistency in the auxiliary data structures remove those elements as well.

For the Node type the victim evaluator can return false ("this is not a good victim") if the node is pinned. Nodes can become pinned for a variety of reasons for example when it is participating in a view.

Note that while the cache manger's subcache is the in-core cache it doesn't necessarily need to consult the victim evaluator. It can use its own judgment in removing elements from the cache. Since the in-core cache sits in between the cache manager and the persistent cache it must forward all victim evaluation requests through to the cache manager.

The in-core cache can be configured with the amount of memory to use for the cache. It can provide O(1) point access to Node, KeyRefSet, and VindexSets and efficient victim selection. In one embodiment, unlike the persistent cache the cache does not dynamically generate the Node, KeyRefSet and VindexSets. Instead the in-core cache treats all cache elements the same both from a querying and selection standpoint.

The in-core cache can be implemented as a fixed-size static hash table with chaining. The hash value for a key element can depend first and foremost on the type of the data and then an efficient and well-distributed combination of the various key components. Any request for cached data which can return an incomplete result will automatically result in the in-core caching asking its subcache for the data as well. The result can then be combined with the in-memory cache result, put into the in-memory cache and returned to the caller.

In one embodiment, victim selection is done only when the cache is full and a new element is being added. We make room for the new element by removing one or more elements which have not been used "in awhile". Victims can be chosen until there is enough free space in the in-core cache to allow the storage of the new element.

Least Recently Used (LRU) is a common victim selection strategy. LRU can require that you have a total ordering across all elements in the cache which can be expensive to maintain especially when you have good locality of reference. We can qualify our victim replacement algorithm as choosing an element that had not be used "in awhile" since we are not choosing the globally LRU. The following strategy can be used.

We can generate the hash value of the element that will be inserted and determine the hash bucket that the new element is to be inserted into. We choose a victim from the chain of elements that appear in the same bucket as the new element. Each cache element can track the last time that it had been returned to a user of the CAMP layer. Every hash bucket can be maintained as a sorted list based on last access time so that the very first element in the bucket can be replaced. We can continue to remove the element that appears at the front of the list for a bucket until enough room remains for the new element. If no elements remain in the chain and there is still not enough room for the new element then a bucket can be chosen at random and the algorithm repeats.

Like the in-core cache the persistent cache can support the cache functionality outlined earlier with access to the three types of cache elements. The persistent cache can make use of an underlying persistence layer that supports the following:

The collection of data that can be addressed through a single name;

An entity in the collection may have many different parts;

Point access to the data in a collection using a subset of parts;

Generation of auxiliary data structures that refer to parts of the collections.

The persistent cache can differ from the in-core cache in that the KeyRefSet and VindexSet cache elements are created and maintained as data nodes are added, changed, and removed. In one embodiment, these cache elements cannot be selected as victims when making room for new cache elements and they need not be garbage collected since the persistent cache will ensure the consistency (including existence) of these elements when changes are made to the data nodes. For example, when a node is removed then any vindex entries that were created by this node can be atomically be removed from the persistent vindex structures.

The garbage collection component can use this algorithm, implemented by the persistent cache to determine whether garbage collectioccur:

```
// returns true when garbage collection should be performed and false
// otherwise
bool performGC( )
{
  float utilizationThisPeriod = 0;
  if( numVictimsThisPeriod_ != 0 ) {
    utilizationThisPeriod = numRequestsThisPeriod_/numVictimsThisPe-
riod_;
  }
  float nextUtilization = utilizationThisPeriod * 0.25 + utilization_ * 0.75;
  utilization_ = nextUtilization;
  numRequestsThisPeriod = 0;
  numVictimsThisPeriod = 0;
  return utilization_ > 0.05;
}
```

Note that the utilization of the cache can use an exponentially decaying of the previous utilization of the cache along with a portion of the new utilization factor. The 0.05 and the decay rate can be user-controllable parameters.

A table can be a persistent data structure that contains a collection of homogeneous elements.

A node table can be a table that is created and used for a MAS nodetype.

A vindex table can be a table that is created and used to support a single vindex.

A keyref table can be a table that is created and used to traverse KeyRef relationships. While the foreign key appears in the source (node table) data we create this alternative access method to enable quick traversals between nodes.

A temp key table can be a single table that is used to locate foreign key usages of a temporary primary key.

In one embodiment, on startup of an application, the persistent cache can examine the Xml schema files and ensure:

1. the creation of one node table per MAS nodetype,
2. the creation of one vindex table per index specification in the schema,
3. the creation of two keyref tables per KeyRef relationship, and
4. the existence of a single temp key table.

A consistent naming scheme for each of the tables described above can be used. When data is added, changed or removed any auxiliary tables (such as the vindex or KeyRef tables) can be changed in the same transaction as the node table changes. In the remainder of this section we detail the schemas for the tables and the algorithms that operate over the tables.

A node table can be named node_[nodetype] and has the schema

<$pk^0$, . . . , $pk^n$, expired TTL, refresh TTL, opaque data>

$pk^0$, . . . , $pk^n$ can be the primary key on this table. (Note that the nodetype for the data is encoded within the table itself since one table is created per nodetype.)

The length of time that a single row has been in the table can be computed by subtracting the MAS nodetype's TTL values from the TTL values for the row. This can be used during victim selection. In fact you can select all rows from a table and order them by one of the TTL values in order to determine their relative age as long as the versioning of the application removes all cached data or the versioning did not change the TTL values for nodetypes.

All the maintenance work can be required to ensure consistency between the node data and the auxiliary data appears in the corresponding cache element type.

If a Pkey value has not been specified then one must be generated, for node creation. Since the key value need only be locally unique then any number of simple generation schemes can be employed.

Node deletion can include removing the row from the table.

Node update can include updating the row in the table.

Edge creation and deletion can be the same as node updates.

A vindex table can be named vindex_[nodetype]_[TagOrAttributeName]_Op and can have the schema <Value, Pkey>.

Value can be the primary key on this table. Note that the nodetype, TagOrAttributeName, and Operator are all built into the vindex itself. That is one vindex table is created for each of these.

The cache manager can maintain consistency between source data changes and changes that are required to the vindex. When a node data element is created, deleted or modified then the cache manager can look to see if any vindexes exist for the nodetype. For each one it can perform the actions described below within the boundary of the transaction that is changing the core data.

Node creation example:

```
// I am given a Pkey $p, an XmlBean $b for the xml data of $p, and a
// vindex specification to be updated $vindexSpec
while( $value = $b->findNextTagOrAttribute
( $vindexSpec.tagOrAttribute ) ) {
  $vindexSpec->table->Insert( value, $p );
}
```

Node deletion example:

```
// I am given a Pkey $p, an XmlBean $b for the xml data of $p, and a
// vindex specification to be updated $vindexSpec
while( $value = $b->findNextTagOrAttribute
( $vindexSpec.tagOrAttribute ) ) {
  $vindexSpec->table->remove( $v, $k );
}
```

Node update can be treated as a node delete then create. Can be first determined whether the vindex value changed.

The schema of the keyref table can be

<Pkey, PkeyOfForeignTable, expired TTL, refresh TTL >

In one embodiment, when a node n, with primary key p, has a KeyRef whose "foreign key" value refers to a node whose type is m with primary key value q then the KeyRef table for the forward direction can contain the row <p, q, p.expiredTTL, p.refreshTTL>

We do not need to use the foreign key value anywhere in the keyref table, instead the entry points directly to the primary key of the node which is referred to by the source node.

Two Keyref tables can be created for each KeyRef type defined in the schema; one for the keyRefForwardAccess method and the other for the keyRefReverseAccess method.

Consistency can be maintained between the indexing structure and the source data. When a modification happens to a node then the cache manager can determine whether or not a key of the node has changed or a KeyRef has changed. For each one it can perform the actions described below within the boundary of the transaction that is changing the core data.

Node creation example:

```
// I am given a Pkey $p, an XmlBean $b for the xml data of $p, and a
// KeyRef specification $k.
while( $value = Sb-> findNextInstanceOfPath( $k->path ) ) {
  // We know that $value is a foreign key into $k->target.
  $pkeyOfForeignTable = findPrimaryKey( $k->target, $k->key, $value );
  $k->table->Insert( $p, $pkeyOfForeignTable, $k->targetExpireTtl,
    p->targetRefreshTtl );
  $k->tableReverse->Insert( $pkeyOfForeignTable, $p, $k->targetEx-
pireTtl,
    p->targetRefreshTtl );
  maybeCreateTempDependency( $pkeyOfForeignTable, $p, $k );
}
```

Efficiency of this algorithm can require that the findPrimaryKey method be efficient. We can ensure this by automatically creating a vindex on all keys defined for a nodetype.

Node deletion example:

```
// I am given a Pkey $p, an XmlBean $b for the xml data of $p,and a
// KeyRef specification $k.
$k->table->Remove( $p, null );
$k->tableReverse->Remove( null, $p );
maybeRemoveTempDependency( $pkeyOfForeignTable, $p, $k );
```

If a node update change is to a KeyRef or Key part of the node, then it can be treated as edge deletion followed by edge creation.

Edge creation can imply that a new KeyRef has been added to a node.

```
// I am given a Pkey $p, the new KeyRef value $v, and a
// KeyRef specification $k.
$pkeyOfForeignTable = findPrimaryKey( $k->target, $k->key, $v );
$k->table->Insert( $p, $pkeyOfForeignTable, $k->targetExpireTtl,
   p->targetRefreshTtl );
$k->tableReverse->Insert( $pkeyOfForeignTable, $p, $k->targetExpireTtl
   p->targetRefreshTtl );
maybeCreateTempDependency( $pkeyOfForeignTable, $p, $k );
```

Edge deletion can imply that a subelement or attribute of a node has been removed.

```
// I am given a Pkey $p, the old KeyRef value $v, and a
// KeyRef specification $k.
$pkeyOfForeignTable = findPrimaryKey( $k->target, $k->key, $v );
$k->table->Remove( $p, $pkeyOfForeignTable );
$k->tableReverse->Remove( $pkeyOfForeignTable $p );
maybeRemoveTempDependency( $pkeyOfForeignTable, $p, $k );
```

These methods can make use of the following helper.

```
// maybeCreateTempDependency
//
// I am given a Pkey which may be a temporary primary key $possibleTemp
and
// a Pkey $p for a foreign key and a KeyRef specification $k.
if( isTemp( $possibleTemp ) ) {
  // Jason :: TODO: Would be nice if this received node rather than
  // primary key
  tempTable->Insert( $possibleTemp, $p, $k, 0 );
  tempTable->Insert( $p, $possibleTemp, $k, 1 );
}
```

The schema of the temp table can be:

<TempPkey, Pkey, KeyRef, isForward >

Each row in this table can indicate that the temporary primary key appears in the opaque data identified by Pkey in the KeyRef position. The same entry can be indexed in our KeyRef table, and this need be fixed up. When isForward is set to be false then we know that the entry appears only in the reverse KeyRef table for a keyref.

Prior to inserting a new node (or making a non-trivial update) the persistent cache can ensure that it has enough space for the new node and its required auxiliary data. Like the in-core cache the persistent cache can first remove node from the nodetype of the new node. Ordering of the nodes in the nodetype can be done based on the expired TTL values. Since this can likely be an expensive operation then the application can remove more than is required to leave a buffer.

All communication to the database, such as BDB, can be done through the persistence encoding component. It is responsible for:

1. Creating and maintaining multiple DbEnvs
2. Creating and maintaining multiple Dbs per nodetype
3. Using BDB in an efficient way. For example Db.open is an expensive operation so it should maintain a set of open database connections that it uses and potentially shares.

Each MAS application will have its own DbEnv. We can use a template DbEnv to provide defaults for all new DbEnvs created. Each DbEnv can store its state inside of a DbEnv.txt file inside of the directory for the application. Creation of the BDB's DbEnv can be done using the DbEnv.txt file.

In one embodiment, while BDB supports the creation of secondary indexes on database tables, we cannot take advantage of this because we are hiding the data within binary token stream.

We can create four types of tables:

1. Node table—a BDB Btree table
2. Vindex table—a BDB Hash table
3. Keyref table—a BDB Hash table
4. temp key table—a BDB Hash table The CAMP layer can get a programmer handle to the schema file so that it can answer the following questions.

What are the nodetypes and KeyRefs? The set of nodetypes and KeyRefs is required to build the table structure to store data for the application. What are the set of attributes which define the primary key? The set of attributes (most commonly the singleton set) is used to assign a temporary primary key and also to retroactively patch a temporary primary with the actual primary key.

In one embodiment, the occasionally-connected application server platform provides a framework for developing, deploying and managing sophisticated mobile solutions, with a simple Web-like programming model that integrates with existing enterprise components.

Connected-connected applications may consist of a data model definition, user interface templates, a client side controller, which includes scripts that define actions, and, on the server side, a collection of conduits, which describe how to mediate between the data model and the enterprise. In one embodiment, the occasionally-connected application server assumes that all data used by mobile applications is persistently stored and managed by external systems. The data model can be a META data description of the mobile application's anticipated usage of this data, and can be optimized to enable the efficient traversal and synchronization of this data between occasionally connected devices and external systems.

The occasionally-connected data model can describe the structure (and other properties) of all persistent application data. The model itself can be synchronized with the mobile browser so that the client is able intelligently to traverse data and synchronize data with the server.

The occasionally-connected data model can describe the data that will be cached and synchronized on the client and, optionally, cached on the server. Much of the programming model is described by META data, which affords administrators and end users a high level of control over deployed applications.

In one embodiment, the programming model can be fully supported within WebLogic Workshop of BEA Systems, San Jose, Calif.—using Workshop's visual design tools and roundtrip development model, and enabling developers to leverage other WebLogic Platform components such as LiquidData, and Integration.

Building mobilized solutions can as straight-forward as building Workshop Web applications and not require a specialist mobile team. The goal is a great mobile experience with great total cost of ownership from development, deployment, maintenance, to daily use.

Figure 1B:
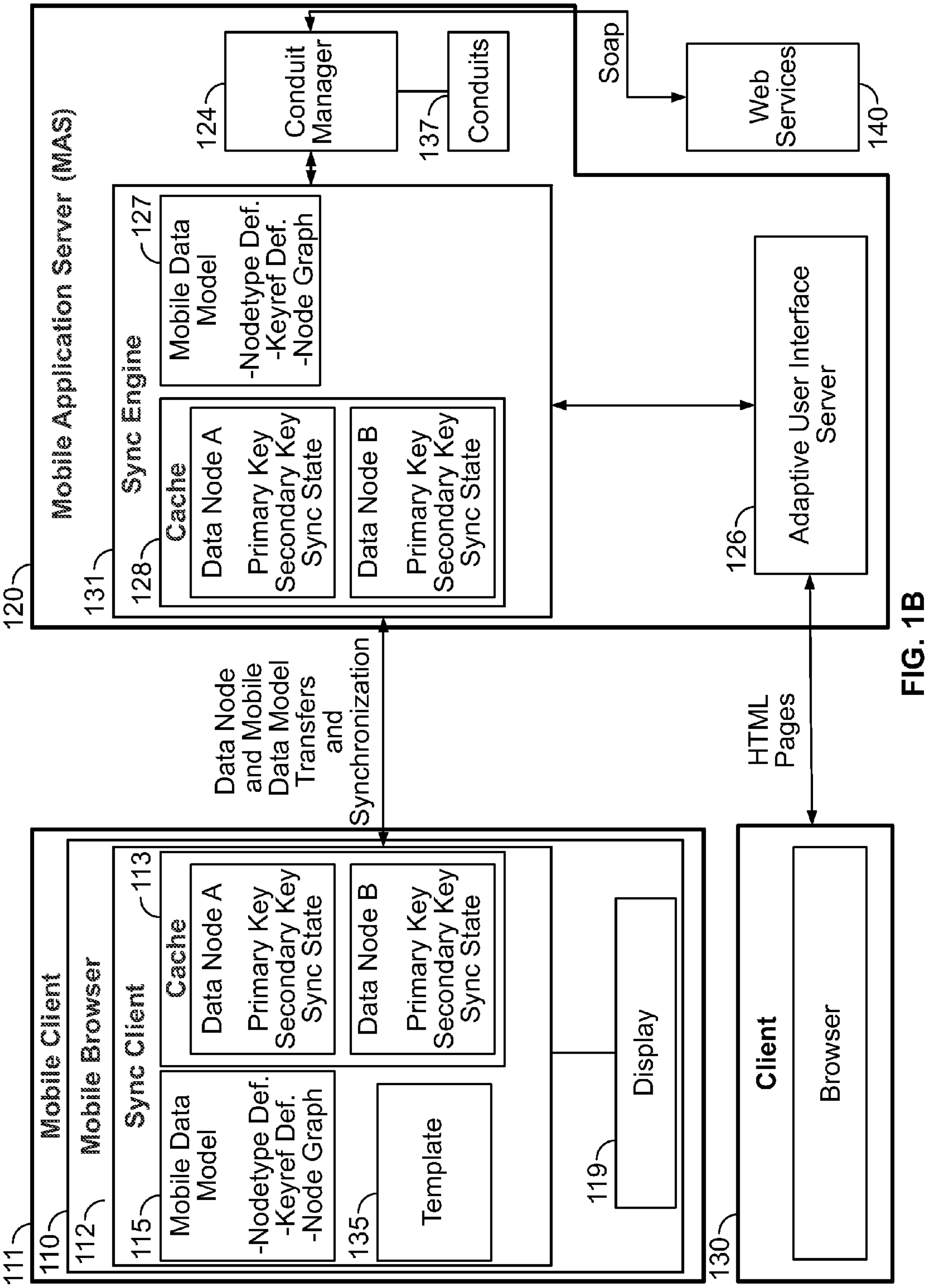

FIGS. 1A-B illustrates an overall system architecture 100 of one embodiment, which comprises a mobile browser 110, occasionally-connected application server 120 and external Web services 140.

The occasionally-connected application server 120 (OCAS), such as a Mobile Application Server (MAS), can mediate exchanges of data between client applications running on the mobile browser and external systems accessed through Web services. This mechanism can have two stages: first, the OCAS 120 can coordinates the translation of data between external systems and the occasionally-connected data model; second, the OCAS 120 can coordinate synchronization between the client cache and the external Web services.

One embodiment of the present invention is an occasionally-connected application server 120 for mobile clients 111. The occasionally-connected application server 120 can comprise memory to store a occasionally-connected data model 127, such as a mobile data mobile; and a cache 128 to store data nodes as defined by the occasionally-connected data model 127. The occasionally-connected application server 120 can cache data nodes in the cache 128 as indicated by METAdata in the occasionally-connected data model.

The occasionally-connected application server 120 can be software run on one or more machines. The occasionally-connected application server 120 can run on top of or be a part of an application server. The occasionally-connected client 111 can be a personal digital assistant (PDA), phone, notebook computer or other mobile computing device. The clients can also include stationary computers especially those with intermittent contact with a server.

The occasionally-connected application server 120 can translate data between external systems, such as web services 140, and data nodes defined by the occasionally-connected data model 127.

One embodiment of the present invention is a system including an occasionally-connected application server 120. The occasionally-connected application server 120 can be configured to provide an application to a client. The application can allow a client to read and update application data without requiring current access to the occasionally-connected application server. The occasionally-connected application server 120 can be adapted to obtain application data from an external system to send to the client. The occasionally-connected application server can be adapted to translate data from the external system into data nodes. The external system can be a service bus, a web service or some other system.

The occasionally-connected data model 127 can indicate the mobile client's anticipated usage of external data and obtain external data before it is requested by the mobile client 111.

The data nodes can be independent chunks of data, such as XML data. The model data model 127 can include an XML definition, such as an XML schema or XML DTD, for the data nodes.

One embodiment of the present invention is a system including an occasionally-connected application server 120. The occasionally-connected application server 120 can be configured to provide an application to a client. The application can allow a client to read and update application data without requiring current access to the occasionally-connected application server. The occasionally-connected application server 120 can be adapted to obtain application data from an external system to send to the client. The occasionally-connected application server can be adapted to translate data from the external system into data nodes. The external system can be a service bus, a web service or some other system.

The mobile client 111 can transfer the data nodes and the occasionally-connected data model 115 to produce a display at the mobile client 111. An adaptive user interface server 126 can construct HTML pages from the data nodes in the cache 128 and the occasionally-connected data model 127 for clients 130. Clients 130 can include traditional web browsers that have consistent access to the server 120. The Adaptive UI Server 126 can provide a mechanism for running client applications on the server, enabling access from thin clients (e.g., ordinary Web browsers, SMS phones, etc.).

The mobile client 111 can run an application using the data nodes and the occasionally-connected data model 115 without being in contact with the occasionally-connected application server 120. The data nodes in the cache 113 and occasionally-connected data model 115 can be used by a sync client 112 at mobile browser 110 to produce a display such as the HTML view 119. In one embodiment, templates can be used to produce the display at the mobile browser 110.

The data nodes and occasionally-connected data model can be synchronized between the occasionally-connected application server 120 and the mobile client 111. This synchronization can be done in the background as a connection between the mobile client 111 and the occasionally-connected application server 120 is available.

One embodiment of the present invention is an occasionally-connected application server 120 comprising a synchronization unit 131, such as a sync engine, to synchronize data nodes, such as data nodes in cache 128, with a client 111 for an application defined by the occasionally-connected data model; and a conduit manager 124 to translate between data from external systems and the data nodes defined by the occasionally-connected data model 127.

One embodiment of the present invention is method comprising, at an occasionally-connected application server 120, storing an occasionally-connected data model 127 defining nodes and relations between nodes; and, at the occasionally-connected application server 120, caching data nodes as defined by the occasionally-connected data model 127. The occasionally-connected application server 120 can cache data nodes as indicated by METAdata in the occasionally-connected data model 127.

One embodiment of the present invention is an occasionally-connected application server 120 comprising a memory to store an occasionally-connected data model 127 and a cache 128 to store data nodes as defined by occasionally-connected data model 127. The data node including a primary key and a synchronization state. The primary key identifies the data mode. The data node can also include at least one secondary key. The synchronization state can be used to synchronize the data node with a mobile client. The occasionally-connected data model 127 can include an XML schema for the date node.

One embodiment of the present invention is an occasionally-connected application server 120. The occasionally-connected application server 120 can include a memory to store an occasionally-connected data model 127, the occasionally-connected data model 127 can define nodes and relations between nodes, and a conduit manager 124 to translate between data from external systems and data nodes defined by the occasionally-connected data model 127.

The conduit manager 124 can use conduits 137 which define transforms between data nodes defined by occasionally-connected data model 127 and data for requests and responses for a specific web service 140. The transforms can be contained as META data.

A request transform can include an XQuery function that creates outgoing message body. A response transform include an Xquery function that processes incoming response and creates data nodes defined by the occasionally-connected data model 127.

One embodiment of the present invention is an occasionally-connected application server 120 for mobile clients 111 comprising a conduit manager 124 which evokes external web service 140 operations. The conduit manager 124 can uses conduits 137. The conduits can define transforms between data defined by an occasionally-connected data model and requests and responses for a specific web service 140.

One embodiment of the present invention is a method comprising at an occasionally-connected application server 120, using conduits 137 to transform between data nodes in an occasionally-connected data model 127 and requests and responses for web services 140, the data nodes being XML data; and at the occasionally-connected application server 120, using the data nodes to provide data to a mobile client 111 for a mobile browser display. The data nodes can be transferred to the mobile client 111 for the display.

One embodiment of the present invention is a mobile client 111 comprising data nodes, which can be stored in cache 113. The data nodes can be in the XML format. The data nodes at the mobile client can have an associated synchronization state. The synchronization state can indicate whether the data node has been synchronized with a server 120. The data nodes can be synchronized in the background as access to the server is made available and a display at the mobile client 111 is made using the data modes at the mobile client 111 without requiring current access to the server 120.

The synchronization states can include an indications that the data node was locally created or modified; an indication that the data node was locally created or modified and ready for synchronization with server; and an indication that that the data node has a server synchronization is pending; an indication that the data node was synchronized with the server; and, an indication that that synchronization was rejected by the server; an indication that there was a conflict between a local modification and a server update. These and other synchronization states can be used to update data nodes at the client 111.

The mobile client 111 can be transferred the data nodes and the occasionally-connected data model from the server 120 to produce a display at the mobile client. The mobile client 111 can run an application using the data nodes and the occasionally-connected data model 115 without being in current contact with a server. The synchronization of the data nodes between the server 120 and the mobile client 111 can be done in the background.

One embodiment of the present invention is an occasionally-connected application server 120 comprising an occasionally-connected data model 115 defining node types and the relations between nodes; and data nodes. The data nodes can be in the XML format. The occasionally-connected application server 120 can pass synchronization states for the data nodes back and forth with the mobile client 111 to synchronize the data node. The data nodes can be synchronized in the background as access to the server is made available and a display at the mobile client 111 is made using data modes at the mobile client 111 without requiring current access to the server 120.

One embodiment of the present invention is a method for synchronizing a mobile application on a mobile device. The method comprises displaying a first user interface on the mobile device, the first user interface derived from a template stored on the mobile device; receiving a first input from a user on the mobile device; updating a synchronization parameter in the mobile device; displaying a second user interface on the mobile device, the second user interface derived from a second template stored on the mobile device and selected based on the user input; and retrieving data from an application server, the data including one or more templates selected based on the synchronization parameter.

One embodiment of the present invention is a mobile unit 111 comprising a local cache 113 of data nodes in the XML format, and an occasionally-connected data model 115 defining node types and the relations between nodes, wherein the mobile unit 111 uses the data nodes and the occasionally-connected data model to produce an application which is displayed at the mobile unit.

A template 135 can be used for producing a interface for the data nodes at the mobile unit.

One embodiment of the present invention is a mobile unit 110 comprising a local cache 128 of data nodes in the XML format; an occasionally-connected data model 115 defining node types and the relations between nodes; and actions that allow the modification of the data nodes.

One embodiment of the present invention is a mobile unit 110 comprising a memory storing an occasionally-connected data model 115 and a local cache 113 of data modes as defined by the occasionally-connected data model 115. The data nodes including primary keys and synchronization states.

In one embodiment, at least one of the data modes includes a least one secondary key. The synchronization state can be used to synchronize the mode data with an occasionally-connected application server. The occasionally-connected data model 115 can include at least one XML schema for the data node.

One embodiment of the present invention is an occasionally-connected application server 120 for mobile clients comprising a conduit manager to translate between external systems, such as web services 140, and an occasionally-connected data model 127. A cache 128 can be used to store data nodes as defined by the occasionally-connected data model 127; and adaptive user interface server 126. Some mobile clients 111 are transferred the data nodes and the occasionally-connected data model to produce a display at the mobile client 111 and other clients receive HTML pages from the occasionally-connected application server 120 which are constructed by the adaptive user interface server 126 using the data nodes and occasionally-connected data model.

Clients 130 served by the adaptive user interface server 124 can have a traditional browser. Mobile clients 111 can have a special browser 110 that uses data nodes and the occasionally-connected data model to produce a display.

One embodiment of the present invention is a method comprising at a server 120, storing data nodes as defined by an occasionally-connected data model 127 and the occasionally-connected data model 127; and transferring to some clients 111 the data nodes and the occasionally-connected data model so that the client can produce a display; and transferring to other clients 130 HTML pages constructed at the server from the data nodes and the occasionally-connected data model.

One embodiment of the present invention is an occasionally-connected data model comprising nodetypes describing the structure of nodes. The nodes can be logically independent units of data; and keyref declarations that describe the relations between nodes.

The nodes can include a root node. A variable can point to the root node. A mobile browser 110 can use data nodes and the occasionally-connected data model 115 to produce a display at a mobile unit 111. The occasionally-connected data model 115 can include a node graph. The node graph can indicate which data modes to cache.

The nodetypes can include a XML definition, such as an XML schema, that is a complex type definition. The keyref declaration can define a key and key ref. The key can be a primary key. The keyref can be a foreign key definition referencing a primary key. The keyref definition can define legal traversals between nodes in a data graph.

One embodiment of the present invention is an occasionally-connected data model comprising nodetypes which are an XML definition of nodes structure; and META data, such as a keyref definition, that describes the relations between nodes. The nodes can be logically independent units of data.

One embodiment of the present invention is a method for implementing a proxy, comprising mapping a web service operation to data within a programming model, such as an occasionally-connected data model, receiving a request regarding associated with the data; and initiating a invoke to a corresponding web service operation.

One embodiment of the present invention is a mobile unit 111 comprising a local cache 113 of application data nodes, the data nodes being in the XML format, an occasionally-connected data model 115 defining node types and the relations between nodes; and a template 135 for producing an interface for the data nodes.

The template 135 can be an XHTML template. The template 135 can use Spath expressions.

The template 135 can access a current position in the occasionally-connected data model 115. A current variable can indicate the current position. In one embodiment, the template 135 does not modify the occasionally-connected data model.

In one embodiment, the template 135 can invoke actions. Actions can modify data nodes. The actions can allow the modification of the data nodes without a connection to the server 120.

The template 135 can be usable for multiple applications, each application having its own occasionally-connected data model and data node. The template 135 can be validated by a browser 110.

Figure 11A:
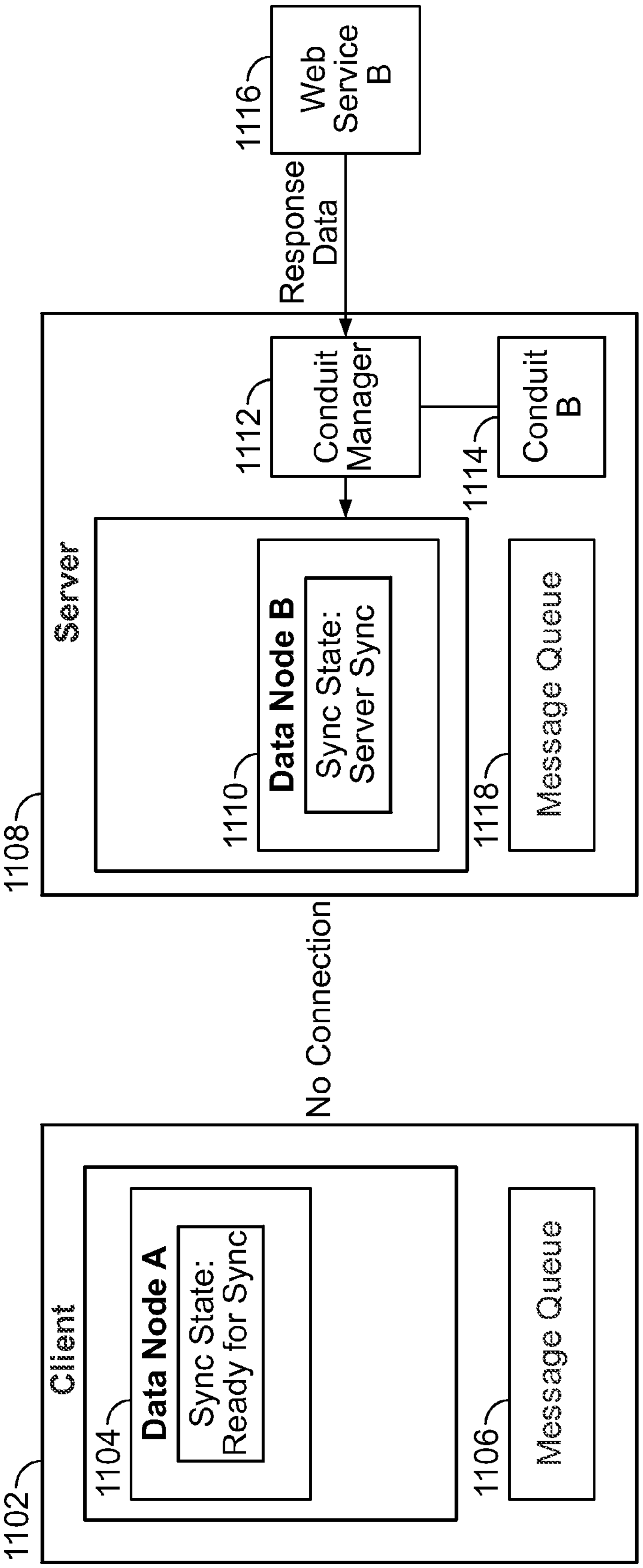
FIGS. 11A-B are illustrations of synchronization method of one embodiment of the present invention.
Figure 11B:
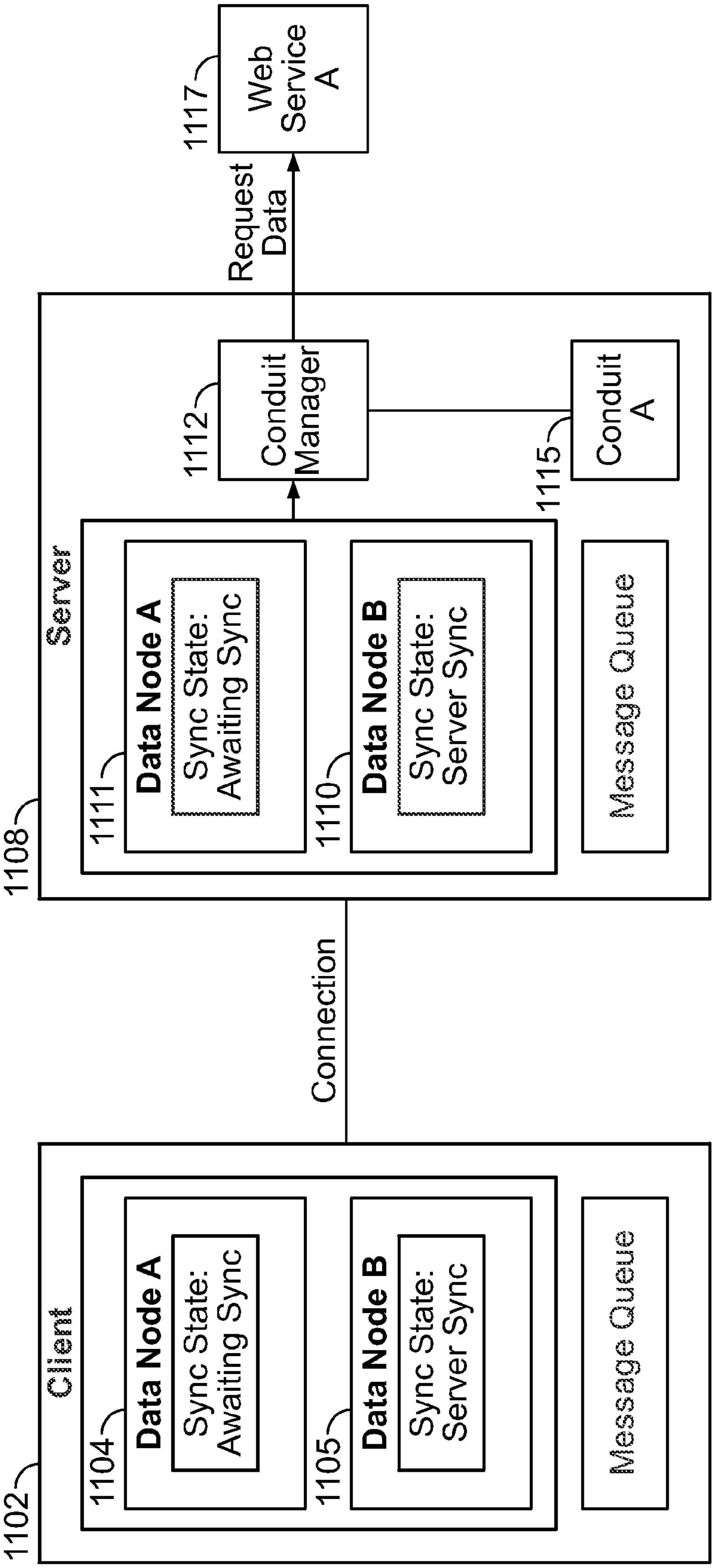

FIGS. 11A-B are illustrations of a synchronization method of one embodiment of the present invention. In the example of FIG. 11A, the client 1102 includes a client version of "data node A" 1104. The client version of "data node A" 1104 has the sync state "ready for sync". The client version of "data node A" 1104 can include data constructed or modified at the client 1102. In the example of FIG. 11A, there is no active connection between the client 1102 and the server 1108. The client version of "data node A" 1104 can be used by an application at the client without waiting for synchronization. The changes to "data node A" can be included in a message in message queue 1106 to be sent when a connection is available.

The server 1108 has a server version of "data node B" 1110 which has not been sent to the client 1102. The server version of "data node B" 1110 can be constructed from data obtained from the "web service B" 1116. The conduit manager can use "conduit B" 1114 to translate response data from the "web service B" 1116 into the server version of "data node B" 1110. The "data node B" can be included in a message in message queue 1118 to be sent when a connection is available.

FIG. 11B show the situation when a connection is made available. The client version of "data node A" 1104 can be sent to the server 1108; and the client version of "data node A" 1104 can have its sync state set to "awaiting sync". The server 1108 can cache a server version of "data node A" 1111. The conduit manager 1112 can use "conduit A" 1115 to construct request data to send to "web service A" 1117. The client 1102 can store a client version of "data node B" 1105 obtained from the server 1108.

The use of data nodes that are synchronized in the background with a server allow clients with intermittent connectivity to the server to run applications with the local version of the data nodes and be updated as conductivity is made available.

The following description gives one non-limiting implementation of one embodiment. The discussion below gives one embodiment, but those skilled in the art will understand that other implementations of the above-described concepts can be done. Any potentially limiting language given below is to be interpreted in the context of the specific non-limiting implementation and is not meant to limit the general concepts.

One embodiment of the present invention is a system for providing an occasionally connected access mechanism, comprising a browser 110. The browser 110 can be configured to be implemented on a mobile device 111 and provide a user interface to a user. The user interface can be derived from a template 135. An application server 120, the application server 120 configured to provide a persistent data store and receive and transmit information with the browser.

In one embodiment, the Occasionally-connected application server 120 (MAS) runs on top or is a part of an application server, such as BEA Systems' WebLogic server. Occasionally-connected application server 120 contains a persistent data store to store application META data, and a data cache 128 to optimize client requests.

The Occasionally-connected application server 120 can be accessible to the mobile browser via a collection of Web based synchronization services, which can extend the SyncML standard. This enables different types of clients to leverage the MAS data model and synchronization capabilities.

The Occasionally-connected application server 120 need not keep the full state of the client. Instead, the Occasionally-connected application server 120 can intelligently cache data based on META data in the occasionally-connected data model 127. Additionally, the Occasionally-connected application server 120 can incorporates a dynamic content adaptation mechanism, known as the Adaptive UI Server 126, which is capable of delivering mobile application functionality to thin clients (e.g., HTML Web site, WAP, SMS).

In one embodiment, the occasionally-connected data model can be a META data description of the mobile application's anticipated usage of external data, and be optimized to enable the efficient traversal and synchronization of this data between occasionally connected devices and external systems.

The occasionally-connected data model can be a relational model that describes nodes of data (or entities) associated with external services, and traversals (or relations) between them. For example, given a Web service that provides access to a Customer Relationship Management (CRM) application, the data model might have nodes for Accounts, Contacts, and Purchase Orders, etc., with traversals that let the application "navigate" from a given node (e.g., an Account) to all related nodes (e.g., Contacts and Purchase Orders).

The occasionally-connected data model can be surfaced to the developer as a virtual XML document with a manifest variable, $root which points to the root node in the data model. Navigation to related nodes can be defined within the virtual XML document via keyref declarations. This enables a simple traversal syntax using a subset of Xpath notation used in ECMAScript for XML and known in this document as Spath. In addition, the mobile browser can always have as context, a current position within the data model (for example a particular customer or set of orders). The template and script can access this current position through another manifest variable $current.

In one embodiment, the mobile browser 110 is, or includes, an extension of a Web browser that enables occasionally connected laptops and other devices to run applications regardless of whether they happen to be connected or offline. The browser can incorporates the same HTML renderer as current Web browsers, but also a user interface template and page flow mechanism, a data cache with intelligent synchronization capabilities, and an extended scripting language that provides access to the data cache.

The mobile browser's user interface can consist of page templates. Templates can be XHTML pages with embedded bindings to cached data using Spath expressions. In one embodiment, Templates have no server side dependencies, so they can be rendered regardless of the status of the browser's network connection (i.e., online or offline).

Templates can generate user interface events, which can be captured by a controller; the controller can call action scripts, which are able to modify the data in the client cache and determine page flow. The client synchronization unit can automatically synchronize data accesses and changes with the Occasionally-connected application server 120.

Applications can be provisioned to the mobile browser 110 by pointing to a URL, which references an XML application package implementing the client user interface and occasionally-connected data model for the application. The application can then be synchronized to the sync client 112. Furthermore, once an application has been deployed, application updates can be automatic and seamless.

In one embodiment, the Adaptive UI Server 124 can be a proxy that runs the client application (templates, page flow, actions, etc.) for each active user. It can generate HTML pages (or SMS, etc.), which are sent to the browser 130, and the HTML pages can contain suitable hyperlinks that generate HTTP requests, which the adaptive server interprets into corresponding action calls. The adaptive server 126 can use the same synchronization mechanism as the mobile browser 110.

Client applications can communicate with the server via synchronization. The synchronization process can trigger conduit requests to fetch new or more recent data, or to request client changes to be posted back to the external Web services 140. Conduits 137 can contain META-data that describes how to package the Web service requests and how to interpret their responses in the context of the data model.

For example, supposing a client application modifies the rating code for a particular Account node (record) that is cached on the client; the synchronization mechanism can generate an update command that is sent to the server. If the client application then retrieves Contacts associated with the Account, and then adds a new Contact, then the synchronization mechanism can generate commands to fetch and add the corresponding data nodes. Conduits can describe how to invoke the various Web service operations required to implement each of these operations.

The system can use standard Web services to exchange information with external data resources and business processes. The conduit mechanism can enable the Occasionally-connected application server 120 to call these operations to update the mobile data cache 128. Operations can act as getters and setters for a particular data type; a collection of operations can be managed by a conduit, which can act as an adapter. The conduit manager can coordinate synchronization requests from the OCAS's data cache, and conduit operations.

Conduits can be the META data used to associate Web services with three types of requested actions related to the data model:

- Navigating to related data; e.g. getting Contacts associated with an Account;
- CRUD operations; i.e., requests to create, read, update, and delete data; for example, creating a Contact related to an Account, updating the Contact details, or even requesting that the Contact be deleted;
- Custom operations, which are actions that need to take place in the enterprise related to some data, but are opaque to the data model; for example, requesting that a task be closed.

The Conduit META data can map the OCAS data model and synchronization commands to and from SOAP messages associated with the corresponding Web service operations. Conduit META data can be defined using XML Query or Xscript.

A principal disadvantage of the current Web browser architecture with respect to mobility is the synchronous (blocking) request-response messaging protocol (i.e., HTTP). In the OCAS, messaging may be asynchronous. That is, user interface activity (e.g., browsing pages and modifying data) can run asynchronously with respect to the network connectivity and synchronization requests may run asynchronously with respect to the browser.

FIG. 2 illustrates an exemplary asynchronous interaction between mobile browser 210, OCAS 220, and external Web services 230. The system implements reliable, ordered, message queues between the browser and the OCAS, and may use durable JMS queues between the OCAS and Web services (for asynchronous operation calls).

If the browser is online, then sync messages can be enqueued and later sent to the OCAS. Otherwise, the synchronization unit can keep track of these events and generates sync messages whenever a connection is established.

On the server, if the OCAS has cached data related to the client's synchronization request, then it can respond immediately. If the cache does not hold the appropriate data (or the data is stale) then the synchronization unit can call the conduit manager. The synchronization unit can then deliver the updated data to the browser. Since there may have been multiple conduits invoked for a particular sync request, the OCAS may deliver multiple sync messages to the browser.

When a sync message is received by the browser, the local cache can be updated and an event sent to the controller. If data that is currently being displayed has been modified (i.e., data bound to the current template) then controller can cause the current page to be refreshed. That is, the page data bindings can be recomputed and the page incrementally redisplayed in the browser, without flickering or losing current user input, caret, or focus.

OCAS applications can consist of client and server components. FIG. 3 illustrates the programming model 300 for an exemplary OCAS application. Programming model 300 includes mobile client 310, OCAS 320 and external system 330.

In one embodiment, all communication to external systems (i.e., the enterprise) can be achieved via Web services (i.e., SOAP messages). The server programming model can comprise of a data model definition 3223 for each application, and a set of conduit definitions 324 that describe Web service operations. The data model consists of a set of XML Schema definitions that describe data types and relations. Conduit definitions contain Xscript and XML Query (Xquery) functions that map incoming and outgoing SOAP messages onto the data model.

The client programming model can comprise of the data model 311 (which is a copy of the model defined on the server), a set of XHTML templates 312, and a controller definition 313, which includes an XPF page flow definition and Xscript actions and functions. The contents of the entire application can be described by a single XML file, which is used by the framework automatically to provision application components to the client.

In one embodiment, each OCAS application may have its own occasionally-connected data model. The occasionally-connected data model can describe the logical structure (and other properties) of the application data, as exposed by the back-end applications via Web services. The occasionally-connected data model can consists of nodetypes, which describe the nodes (or entities) in the data model, and keyrefs, which define the relationships between the nodetypes. The occasionally-connected data model can act as the *lingua franca* used by the other OCAS components to process data or to exchange data with each other.

The actual design of an application's data model (which is done by the application designer) can take into account the anticipated usage of the data, so as to optimize both data access by the client applications and data synchronization between the server and occasionally connected devices.

Additional META-data can also be specified to make it easier for applications to display data-driven (i.e., automatic) user interfaces. In one embodiment, the occasionally-connected data model only describes the data; the OCAS assumes that all operational data is stored and managed (owned) by the external systems i.e., no operational data permanently resides in the OCAS.

The occasionally-connected data model can be used to describe the data that may be cached both on the client and on the server and can be essentially a virtual cached view on top of data in the enterprise fetched through Web services. In one embodiment, within the occasionally-connected data model, there is a magic starting node, known as mas:root (referenced by $root in the programming model) from whence everything flows.

From any node can be possible to access related nodes via traversals. Nodes can conform to XML Schema definitions (/schema/*.xsd). Traversals can also be defined by schema definitions, using keyref declarations.

An automatic synchronization mechanism can coordinate changes between client and server data. Data can be retrieved and exchanged with external system via a mechanism known as conduits. Conduits can be configured by a set of conduit files (/conduit/*.jsx) that define conduit operations—Xscript and Xquery functions that invoke and process the results from external Web service operations.

Conduit operations can consist of a pair of XML Query functions associated with a given keyref; one function can format the outbound request to the appropriate Web service operation, the other can process the inbound response. Conduit operations can also define procedural logic in the associated Xscript function.

The occasionally-connected data model can represented as a data graph consisting of nodes and traversals—analogous to entities (i.e., table rows) and relations (i.e., primary/foreign key fields) in a relational database. A node is a logically independent unit of data (or entity—for example, a customer, purchase order, or contact record) and can be represented as an XML data object, which is defined by an XML schema. Inside the data cache, each node can include a primary key, synchronization state (e.g., including a sequence number), and possibly, multiple foreign keys that reference other nodes. A nodetype can describe the information about a particular type of node; this can include an XML Schema definition, which describes the structure of the data nodes. A traversal can be a directional relationship between two nodes. Traversals can be primarily a mechanism for navigating from one node to a set of related nodes. For example, an Account may be associated with a set of Contacts and a set of Tasks, each of which may also be associated with a Contact. Relations between nodes can be defined by a keyref declaration. It can define both source and target nodetypes, and can include META data to determine cardinality or the nodeset (e.g., exactly 1, 0 or more, 1 or more, etc.) The conduit manager's META data can be associated with the keyref and determines whether or not nodes can be created, updated, linked, or removed. For example, the conduit's META data determines whether or not there is a known Web service operation for inserting a Note about an Account, or for updating an Account. A specific collection of nodes defined by a keyref can be called a nodeset.

Data Nodes can contain structured data (i.e., an XML document), but can be atomic with respect to traversals; i.e. In one embodiment, a traversal represents a specific relationship between two nodes, but cannot reference data inside a particular node; nor can data inside a node reference another node.

Often a single enterprise document may be made up of multiple nodetypes. For example, a purchase order may contain a sequence of line items (each with product references), and a customer reference. In this case, purchase order, line item, product and customer may all be represented as different nodetypes.

In the case of these "composite" nodes, keyrefs within the data model can define cardinality; for example, a line item is associated with exactly one product. Conversely, depending on the needs of the application, a single purchase order nodetype might be defined to contain all of the above information in a single schema. The decision lies with the application designer—based on the need to independently link different nodes based on different traversals, collections and template requirements. For example, if line items are never linked or displayed outside of the purchase order then it might make sense to define a composite purchase order-line item nodetype.

Relational Model

The occasionally-connected data model can consist of schema and keyref declarations that are analogous to the relational entity and relation (primary/foreign key) constructs.

Primary and Foreign Keys

Figure 4:
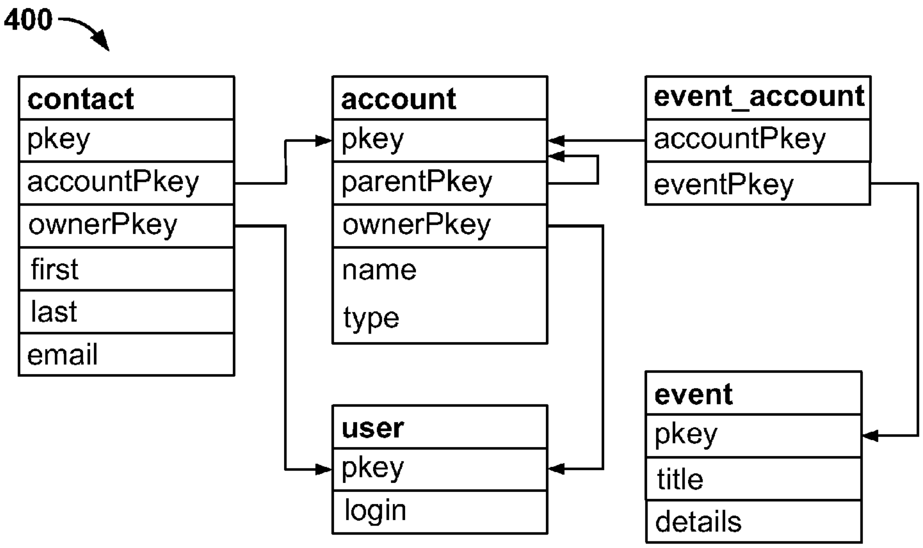
FIG. 4 is an illustration of an entity relationship diagram in accordance with one embodiment of the present invention.

An example CRM system (referenced throughout this document for purposes of illustration) is implemented using a relational database. The Entity Relationship Diagram (ERD) 400 illustrated in FIG. 4 represents the account, contact, event, and user entities.

The account, contact and user entities are defined by the following SQL.

```
CREATE TABLE account (
pkey            INT NOT NULL PRIMARY KEY,
parentPkey        INT FOREIGN KEY REFERENCES account(pkey),
ownerPkey         INT FOREIGN KEY REFERENCES user(pkey),
name            VARCHAR,
type            CHAR
)
CREATE TABLE contact (
pkey            INT NOT NULL PRIMARY KEY,
accountPkey       INT NOT NULL FOREIGN KEY REFERENCES
                account(pkey),
ownerPkey         INT FOREIGN KEY REFERENCES user(pkey),
first           VARCHAR,
last            VARCHAR,
email             VARCHAR
)
CREATE TABLE user (
pkey            INT NOT NULL PRIMARY KEY,
login           VARCHAR
)
```

Both account and contact entities contain a foreign key reference to a user (owner); each contact entity defines a foreign key reference to an account. Also, each account has an optional foreign key referencing a parent account (i.e., accounts have sub accounts).

Sample Queries

Given the primary key of an account, pa, the following SQL selects all contacts:

```
SELECT * FROM contact WHERE accountPkey=pa
```

Given the primary key of a contact, pc, the following SQL selects the account:

```
SELECT account.* FROM account, contact
WHERE account.pkey = contact.accountPkey
AND contact.pkey = pc
```

However, given a full contact record, c, this simple SELECT query selects the corresponding account:

```
SELECT * FROM account WHERE
    account.pkey=c.accountPkey
```

Join Tables

Suppose that events can belong to multiple accounts and contacts (e.g., a sales meeting with two accounts present). This would be modeled using a join table, for example:

```
CREATE TABLE event (
pkey            INT NOT NULL PRIMARY KEY,
title         VARCHAR,
details         VARCHAR
)
CREATE TABLE event_account (
eventPkey       INT FOREIGN KEY REFERENCES EVENT(pkey),
accountPkey       INT FOREIGN KEY REFERENCES ACCOUNT(pkey)
)
```

Here, the many-to-many relationship is modeled by the event account join table.

Given the primary key of an account, pa, the following SQL (join) selects all related events:

```
SELECT event.* FROM event, event_account
WHERE event_account.accountPkey = pa
AND event.pkey = event_account.eventPkey
```

Similarly, given the primary key of an event, pe, the following SQL selects all related accounts:

```
SELECT event.* FROM event, event_account
WHERE event_account.accountPkey = pa
AND event.pkey = event_account.eventPkey
```

XML Schemas can define the nodetypes in the data model used by the application. The schemas subdirectory may contain multiple .xsd files—all of which are loaded by the framework on start-up.

Schema type definitions can consist of two parts: a complexType definition, which describes the type's structure and a META data definition (using the mas namespace), which for example, defines how to construct a label for a particular type.

For example, the following schema fragment defines the contact type.

```
<?xml version="1.0"?>
<xsd:schema targetNamespace="http://example.com/"
  elementFormDefault="qualified" attributeFormDefault="unqualified"
  xmlns:xsd="http://www.w3.org/2001/XMLSchema"
```

-continued

```
    xmlns:mas="run:bea.com"
    xmlns="http://example.com/">
...
<xsd:element name="contact" type="contactType">
    <xsd:annotation>
        <xsd:appinfo>
            <mas:nodeAnnotation>
                <mas:label>$node.first + " " + $node.last</mas:label>
            </mas:nodeAnnotation>
        </xsd:appinfo>
    </xsd:annotation>
</xsd:element>
<xsd:complexType name="contactType">
    <xsd:sequence>
        <xsd:element name="salutation" type="contactSalutationEnum"/>
        <xsd:element name="first" type="xsd:string"/>
        <xsd:element name="last" type="xsd:string"/>
        <xsd:element name="email" type="xsd:string"/>
    </xsd:sequence>
</xsd:complexType>
<xsd:simpleType name="contactSalutationEnum">
    <xsd:restriction base="xsd:string">
        <xsd:enumeration value="Mr"/>
        <xsd:enumeration value="Mrs"/>
        <xsd:enumeration value="Ms"/>
        <xsd:enumeration value="Dr"/>
    </xsd:restriction>
</xsd:simpleType>
...
</xsd:schema>
```

The following XML represents a contact element.

```
<contact>
    <salutation>Mr</salutation>
    <first>Roger</first>
    <last>Reed</last>
    <email>roger@acme.com</email>
</contact>
```

The occasionally-connected data model can consist of standard XML Schema definitions for all application types. The schemas can define nodes that contain XML elements and attributes that are references to other XML nodes. The definition of these references can be made using key ref declarations.

A keyref definition can consist of two parts: key and keyref.

The key definitions can define the places in the document that contain primary keys. For example, the following key says that an accountKey occurs in each <account> element as an attribute called id.

```
<xsd:key name="accountKey">
    <xsd:selector xpath="account"/>
    <xsd:field xpath="@id"/>
</xsd:key>
```

In one embodiment, a key may uniquely identify a single node. Keys may not be used to identify repeating elements within a node (e.g., if line items are defined within the schema for purchase order, then key definitions may not be used to define individual line items).

The keyref definitions can define the places in the document that contain foreign keys; the refer attribute refers to an associated key definition. For example, the following keyref says that each contact contains an account attribute, which is a foreign key referencing the accountKey definition (above).

```
<xsd:keyref name="contactAccountRef" refer="accountKey">
    <xsd:selector xpath="contact"/>
    <xsd:field xpath="@accountId"/>
</xsd:keyref>
```

There can be many keyref (foreign key) definitions referencing the same (primary) key definition.

UML can be used to illustrate nodetype and keyref diagrams.

Figure 5:
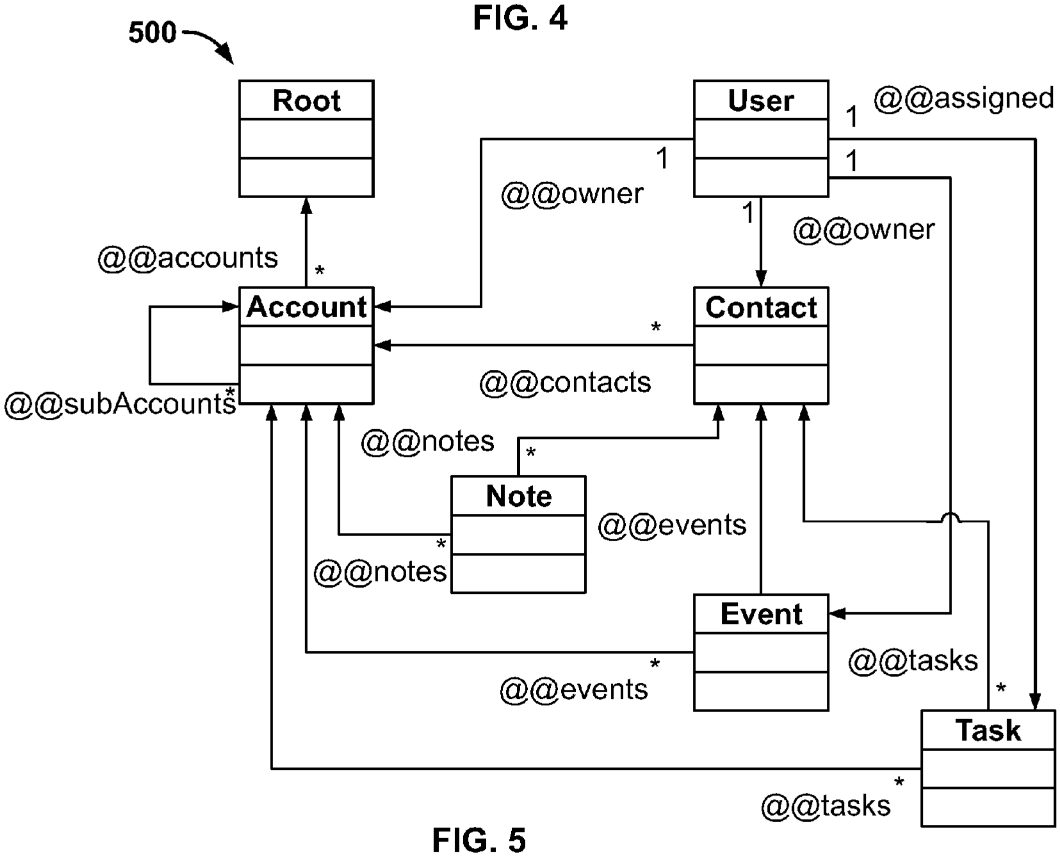
FIG. 5 is an illustration of an UML Entity Relationship Diagram in accordance with one embodiment of the present invention.
Figure 6:
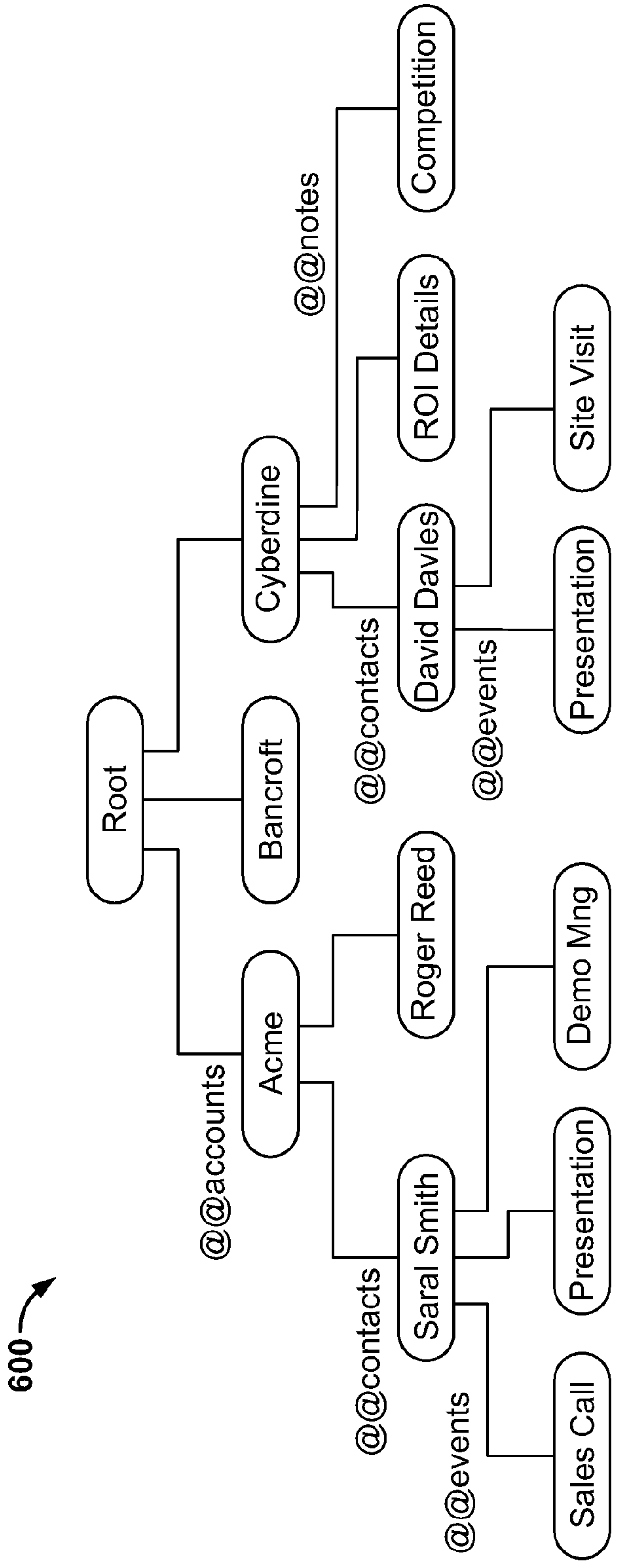
FIG. 6 is an illustration of a node instance diagram in accordance with one embodiment of the present invention.

FIG. 5 illustrates the UML Entity Relationship Diagram (ERD) 500 for the sample CRM application. In this diagram, each entity represents an application nodetype (i.e., schema). Note, the root entity is a system nodetypes The arcs represent relations (i.e., keyref definitions), where the black diamond represents the target nodetype of the source nodetype's foreign key. The star annotation represents a many-to-one relation. Each arc is labeled with the corresponding keyref's alias name. FIG. 6 illustrates a node instance diagram for the CRM use case.

An exemplary name space embodiment is given below. The server programming model can use namespaces to distinguish between framework and application XML elements. Namespace definitions can be included as attributes within the top-level element of an XML source file.

Elements prefixed with the mas namespace represent system elements.

```
xmlns:mas="urn:bea.mas"
```

By convention, elements prefixed with the app namespace prefix represent the application.

```
xmlns:app="http://example.com/"
```

Also, by convention (in this document), the ws namespace prefix is used to indicate elements defined by an example Web service definition (i.e., WDSL file); the sfdc prefix is used to indicate the SalesForce Web service.

```
xmlns:ws="http://www.openuri.org/"
xmlns:sfdc="urn:partner.soap.sforce.com"
```

The following XML Schema data types can be supported.

| State | Meaning |
|---|---|
| xsd:base64Binary | Base 64 encoded byte array (i.e., array of bytes). |
| xsd:boolean | Boolean value (i.e., "true" or "false"). |
| xsd:date | |
| xsd:decimal | |
| xsd:double | IEEE 64 bit floating point number. |
| xsd:integer | Signed integer of arbitrary length. |
| xsd:string | Arbitrary length string. |

Schema Annotations

Standard XSD schema definitions can be extended by declaring mas elements within an

```
<xsd:appinfo> element.
    <xsd:element name="typeName" type="type">
        <xsd:annotation>
            <xsd:appinfo>
                ...
            </xsd:appinfo>
            <xsd:documentation>schema documentation</xsd:documentation>
        </xsd:annotation>
    </xsd:element>
```

The following schema annotations can be supported:

| Element | Meaning |
| --- | --- |
| mas:label | Declare label XPath expression. |

The mas:label element can declare the default label for a node; it declares an Xpath expression, which is used to construct a string. The expression may optionally reference the $node variable, which refers to the top level element of the XML node object.

Syntax

```
<mas: label>spath-expression</mas: label>
```

Example

The following label definition constructs a string from the contact's first and last name.

```
<xsd:element name="contact" type="contactType">
  <xsd:annotation>
    <xsd:appinfo>
      <mas:label>$node.first + " " + $node.last</mas:label>
    </xsd:appinfo>
  </xsd:annotation>
</xsd:element>
```

This is equivalent to the following expression.

```
<mas:label>first+" "+last</mas:label>
```

Label definitions may also contain Xscript functions and operators.

```
($node.first)+($node.first.length( )>0?" ": "
    ")+$node.last
```

Anatomy of an Application Data Model Definition

The following XML Schema describes a simple application data model defining account and contact nodetypes:

```
<xsd:schema . . .>
  <xsd:complexType name="accountType">
    <xsd:all>
      <xsd:element name="name" type="xsd:string"/>
      <xsd:element name="type" type="xsd:string"/>
    </xsd:all>
    <xsd:attribute name="id" type="xsd:string" use="required"
    mas:type="pkey"/>
    <xsd:attribute name="ownerId" type="xsd:string" use="required"/>
    <xsd:attribute name="parentId" type="xsd:string"/>
  </xsd:complexType>
  <xsd:complexType name="contactType">
    <xsd:all>
      <xsd:element name="first" type="xsd:string"/>
      <xsd:element name="last" type="xsd:string"/>
      <xsd:element name="email" type="xsd:string"/>
    </xsd:all>
    <xsd:attribute name="id" type="xsd:string" use="required"
    mas:type="pkey"/>
    <xsd:attribute name="ownerId" type="xsd:string" use="required"/>
    <xsd:attribute name="accountId" type="xsd:string" use="required"/>
  </xsd:complexType>
  <xsd:element name="graph">
    <xsd:complexType>
      <xsd:element name="root" type="mas:rootType"/>
      <xsd:sequence>
        <xsd:element name="account" type="accountType"
maxOccurs="unbounded"/>
        <xsd:element name="contact" type="contactType"
maxOccurs="unbounded"/>
      </xsd:sequence>
```

-continued

```
    </xsd:complexType>
    <xsd:key name="accountKey">
      <xsd:selector xpath="account"/>
      <xsd:field xpath="@id"/>
    </xsd:key>
    <xsd:keyref name="contactAccountRef" refer="accountKey"
    mas:alias="account"
      mas:inverseAlias="contacts">
      <xsd:selector xpath="contact"/>
      <xsd:field xpath="@accountId"/>
    </xsd:keyref>
  </xsd:element>
</xsd:schema>
```

The schema file can consist of three parts: nodetypes (complex type definitions), a graph definition, which defines the structure of the cache "document" and a set of key/keyref definitions, which are relative to the graph (i.e., document) structure.

The data model can consist of XML schema definitions. The following schemas define the account and contact nodetypes.

```
<xsd:schema . . .>
  <xsd:complexType name="accountType">
    <xsd:all>
      <xsd:element name="name" type="xsd:string"/>
    </xsd:all>
    <xsd:attribute name="id" type="xsd:string" use="required"
    mas:type="pkey"/>
    <xsd:attribute name="ownerId" type="xsd:string" use="required"/>
    <xsd:attribute name="parentId" type="xsd:string"/>
  </xsd:complexType>
  <xsd:complexType name="contactType">
    <xsd:all>
      <xsd:element name="first" type="xsd:string"/>
      <xsd:element name="last" type="xsd:string"/>
      <xsd:element name="email" type="xsd:string"/>
    </xsd:all>
    <xsd:attribute name="id" type="xsd:string" use="required"
    mas:type="pkey"/>
  <xsd:attribute name="ownerId" type="xsd:string" use="required"/>
    <xsd:attribute name="accountId" type="xsd:string" use="required"/>
  </xsd:complexType>
```

All types can define a primary key field (or attribute), which is declared to be a key.

In the examples, all types can define an external identifier, id, which represents the primary key of the external record; the contact type also defines an attribute, @accountId, which represents a foreign key.

The schema definitions above would allow the following instance data:

```
<account id="1.1">
    <name>Acme</name>
  </account>
  <contact id="1.2" accountId="1.1">
    <first>Bob</first>
    <last>Harris</last>
    <email>bob@acme.com</email>
  </contact>
  <contact id="1.3" accountId="1.1">
    <first>Maggie</first>
    <last>Cheung</last>
    <email>maggie@acme.com</email>
  </contact>
```

Note the identifier values shown are illustrative; also, the examples do not show the mas attributes, which are managed by the framework and are not visible to the programming model.

The occasionally-connected data model can be surfaced to the developer as a virtual XML document, or data graph. Applications define the structure of the data graph by specifying schema and keyref declarations.

However, the key keyref declarations themselves can include Xpaths that are relative to a fixed document structure defined by the application schema's <graph> element.

The graph type can defines a "flat" sequence of node declarations.

```
<xsd:complexType name="rootType"/>
<xsd:element name="root" type="rootType"/>
<xsd:complexType name="graphType">
  <xsd:sequence>
    <xsd:element ref="root"/>
  </xsd:sequence>
</xsd:complexType>
<xsd:complexType name="graphType">
  <xsd:complexContent>
    <xsd:extension base="mas:graphType">
      <xsd:sequence minOccurs="0" maxOccurs="unbounded">
        <xsd:choice>
          <xsd:element name="nodeName" type="nodeType"/>
        </xsd:choice>
      </xsd:sequence>
    </xsd:extension>
  </xsd:complexContent>
</xsd:complexType>
<xsd:element name="graph" type="graphType">
  <key-definitions>
  <keyref-definitions>
</xsd:element>
```

Example

```
<xsd:element name="graph">
  <xsd:complexType>
    <xsd:element name="root" type="rootType"/>
    <xsd:sequence>
      <xsd:element name="account" type="accountType"
maxOccurs="unbounded"/>
      <xsd:element name="contact" type="contactType"
maxOccurs="unbounded"/>
    </xsd:sequence>
  </xsd:complexType>
```

This defines the type of the root element, and the set of all schema types that make up the application.

Note, the graph structure cam be largely an implementation detail—developers traverse the data graph using the key/keyref definitions. One proposed graph implementation is flat—i.e., all nodetypes are first level children of the <graph> element.

The example above would allow the following instance data:

```
<graph>
  <account id="1.1">
    <name>Acme</name>
  </account>
  <contact id="1.2" accountId="1.1">
    <first>Bob</first>
    <last>Harris</last>
    <email>bob@acme.com</email>
  </contact>
  <contact id="1.3" accountId="1.1">
    <first>Maggie</first>
    <last>Cheung</last>
```

-continued

```
    <email>maggie@acme.com</email>
  </contact>
<graph>
```

The schema definition file can also contains key and key ref definitions, which can declare the primary key and foreign key relations between the data types.

A key definition can define a primary key. Key's may include multiple field declarations (i.e., for compound keys).

A keyref definition defines a foreign key which references a key definition.

For example, the following key and keyref definitions define a many-to-1 (lookup) relation from a contact node to its related account node, and a 1-to-many relation from the root to accounts.

```
      <xsd:key name="accountKey">
        <xsd:selector xpath="account"/>
        <xsd:field xpath="@id"/>
      </xsd:key>
      <xsd:keyref name="contactAccountRef" refer="accountKey"
      mas:alias="account">
        mas:inverseAlias="contacts">
        <xsd:selector xpath="contact"/>
        <xsd:field xpath="@accountId"/>
      </xsd:keyref>
    </xsd:graph>
  </xsd:schema>
```

Key and keyref definitions should have unique names. The following naming convention for key and keyrefs respectively:

```
<xsd:key name="<schema>Key" . . .
<xsd:keyref name="<sourceSchema><element|attribute>Ref" . . .
```

For example, fooBarRef means a keyref from the foo schema that is defined by the element or attribute named bar. I.e., (usually) the keyref's selector Xpath is "foo/bar" or "foo/@bar".

In general, the keyref name is the "amelback" mangled name constructed from concatenating the keyref's selector and field, and stripping any mas elements. E.g.,

```
<xsd:keyref name="contactAccountRef" refer="accountKey">
  <xsd:selector xpath="contact"/>
  <xsd:field xpath="@accountId"/>
</xsd:keyref>
<xsd:keyref name="messageFromRef" refer="contactEmailKey">
  <xsd:selector xpath="message"/>
  <xsd:field xpath="from"/>
</xsd:keyref>
<xsd:keyref name="messageToRef" refer="contactEmailKey">
  <xsd:selector xpath="message/to"/>
  <xsd:field xpath="."/>
</xsd:keyref>
```

Note the type can usually be inferred from the last part of the name, since this is the element or attribute name, which following XML guidelines should explain the purpose of the contained data.

The framework can ensure that keyref names do not clash with top level element attributed names.

Aliases

Keyref declarations can define legal traversals between nodes within the data graph. The @@ operator can used to traverse the graph, and by default, uses the keyref name. However, an alias may be defined to make the code more readable.

The mas:alias attribute defines a string, which optionally has two parts:

```
mas:alias="[Xpath:]name"
```

Where name represents the alias name, and the optional Xpath prefix represents the Spath (relative to the graph) that must come before the @@ operator and the alias name. i.e.

```
var refNode=srcNode.Spath.@@name
```

If the colon delimiter is not present, then the alias Xpath prefix is the same as the keyref's selector Xpath. If no alias is defined, then the keyref name must be used (relative to the keyref selector Xpath).

Key definitions may also declare a mas:alias attribute, which indicates that a nodeset containing the associated nodetype is traversable from the root node. The alias name for key definitions is a simple string, and this is also used by the @@ operator: mas:alias="name"

Examples

The following XML represents an instance of an account node:

```
<account id="1.1" type="Web" ownerId="bob">
  <name>Acme</name>
  <events>
    <eventRef>1.2</eventRef>
    <eventRef>1.3</eventRef>
  </events>
  <purchaseOrders>
    <purchaseOrder>
      <lineItem><prodId>ABC-1234</prodId></lineItem>
      <lineItem><prodId>XYZ-4321</prodId></lineItem>
    </purchaseOrder>
  </purchaseOrders>
</account>
```

The key definitions for account nodes is as follows:

```
<xsd:key name="accountKey" mas:alias="accounts">
  <xsd:selector xpath="account "/>
  <xsd:field xpath="@id"/>
</xsd:key>
```

This allows for the following navigation syntax:

```
var accounts=$root.@@accounts.*;
```

The "product" alias is defined as follows:

```
<xsd:keyref name="accountProductsRef" refer="productKey"
mas:alias="product">
  <xsd:selector xpath="account/purchaseOrders/purchaseOrder/lineItem"/>
  <xsd:field xpath="prodId"/>
</xsd:keyref>
```

The following expression traverses to the product referenced by the first line item of the first purchase order.

```
var product=account.purchaseOrders.*[0].lineItems.*
    [0].@@product;
```

The "owner" alias is defined as follows:

```
<xsd:keyref name="accountOwnerRef" refer="UserKey"
mas:alias="owner">
  <xsd:selector xpath="account"/>
  <xsd:field xpath="@ownerId"/>
</xsd:keyref>
```

The following expression traverses to the user node referenced by the keyref described by the "owner" alias.

```
var user=account.@@owner;
```

The "events" alias is defined as follows:

```
<xsd:keyref name="accountEventsRef" refer="eventKey"
mas:alias="events">
  <xsd:selector xpath="account/events/eventRef"/>
  <xsd:field xpath="."/>
</xsd:keyref>
```

The following expression traverses to all event nodes referenced by the keyref described by the "events" alias.

```
var events=account.@@events.*;
```

Note, the "products" alias could also be defined as follows:

```
<xsd:keyref name="accountProductsRef" refer="productKey"
  mas:alias="account:products">
  <xsd:selector xpath="account/purchaseOrders/purchaseOrder/lineItem"/>
  <xsd:field xpath="prodId"/>
</xsd:keyref>
```

The following expression traverses to all products for all line items (for all purchase orders).

```
var products=account.@@products.*;
```

Keyref declarations can optionally define an inverse keyref, which enables navigation in the reverse direction. Typically, a many-to-one keyref declares an inverse keyref, which enables the reverse one-to-many traversal.

```
<xsd:keyref name="name" refer="keyName" mas:alias="alias"
  mas:inverseAlias="inverseAlias">
```

The inverse attributes are defined below:

| Attribute | Meaning |
|---|---|
| mas:inverseAlias | Alias for inverse relation. |

For example, the keyref definition below represents the contact→account and account→contact relations:

```
<xsd:keyref name="contactAccountRef" refer="accountKey"
mas:alias="account"
  mas:inverseAlias="contacts">
  <xsd:selector xpath="contact"/>
  <xsd:field xpath="@accountId"/>
</xsd:keyref>
```

Each contact node contains an @accountId attribute (foreign key) that references an account node. I.e.,

```
var account=contact.@@accountId;
```

The inverse relation says that the foreign key can be used to traverse from the account node to contact nodes. I.e.,

```
var contacts=account.@@contacts.*;
```

In one embodiment, the inverse alias attribute must only contain an attribute name (cf. keyref aliases above), and is always relative to the top-level node.

Note, multiple keyref definitions may declare inverse relations that "point back" to the same nodetype. In these cases, the inverse alias must of course be unique for the target nodetype. For example, a bug node may have keyrefs for owner and assignedTo, which define inverse aliases of bugs and assignedBugs respectively.

Inverse relations also allow the framework to ensure that navigation in both directions is consistent within the cache.

It is possible to define relations between nodes that do not depend on foreign key values. For example, a set of nodes may be defined by a query that uses the current user's information, or other external information (e.g., time of day, real time data, external system state). In these cases, the nodeset may be attached to arbitrary nodetypes within the data model. Typically, however, these nodesets are attached to the root node.

In the CRM example, the set of accounts accessible to a particular user may be defined by the user's login name, defined by the system variable $user/username. The application may wish to define a traversal from the root node to this nodeset; i.e.:

```
var accounts=$root.@@accounts.*;
```

We define an optional artificial foreign key value for each account node that references the root node. This is achieved by the following keyref definition:

```
<xsd:keyref name="accountRootRef" refer="mas:rootKey"
mas:inverseAlias="accounts">
  <xsd:selector xpath="account"/>
  <xsd:field xpath="@rootId"/>
</xsd:keyref>
```

Note, the account schema must also define the optional @mas:rootId attribute for the keyref to be valid:

```
<xsd:complexType name="accountType">
  <xsd:all>
    <xsd:element name="name" type="xsd:string"/>
    <xsd:element name="type" type="xsd:string"/>
  </xsd:all>
  <xsd:attribute name="id" type="xsd:string" use="required"
   mas:type="pkey"/>
  <xsd:attribute name="ownerId" type="xsd:string"/>
  <xsd:attribute name="parentId" type="xsd:string"/>
  <xsd:attribute name="rootId" type="mas:rootId" use="optional"/>
</xsd:complexType>
```

The @mas:rootId attribute references system a definition defined by the framework; the system's schema definition is imported into the application's schema by the following directive:

```
<xsd:import namespace="urn:
    bea.mas"schemaLocation="mas.xsd"/>
```

Navigation is the act of moving from one page to the next within a page flow. This may or may not change the $context system variable.

Traversal is the act of moving within the data graph (cache). Spath expressions "traverse" the graph using the @@ operator for example:

```
foo.@@bar
```

Where foo represents a node (or child element of a node), and bar is the name of a child element defined to be a foreign key by a keyref definition (name or alias), or a key alias.

For example, suppose we have the data below:

```
<account id="1.1" type="Web">
  <name>Acme</name>
  <contacts>
    <contactRef>1.2</contactRef>
    <contactRef>1.3</contactRef>
  </contacts>
  <purchaseOrders>
    <purchaseOrder>
      <lineItem @prodId="ABC-1234"/>
      <lineItem @prodId="XYZ-3000"/>
      <lineItem @prodId="EOW-2004"/>
    </purchaseOrder>
    <purchaseOrder>
      <lineItem @prodId="XYZ-3000"/>
    </purchaseOrder>
  </purchaseOrders>
</account>
<contact id="1.2" accountId="1.1">
  <email>bob@acme.com</email>
</contact
<product id="ABC-1234">
  <price>1000.00</price>
</product>
```

And the following keyref definitions:

```
<xsd:keyref name="accountContactsRef" refer="contactPrimaryKey"
  mas:alias=".:contacts">
  <xsd:selector xpath="account/contacts/contactRef"/>
  <xsd:field xpath="."/>
</xsd:keyref>
<xsd:keyref name="accountProductsRef" refer="productKey"
  mas:alias="purchaseOrders/purchaseOrder/lineItem:product">
  <xsd:selector xpath="account/purchaseOrders/purchaseOrder/lineItem"/>
  <xsd:field xpath="@prodId"/>
</xsd:keyref>
```

Without using aliases, the following expressions are valid:

```
var contacts = account.contacts.*.@@contactRef;
var price = account.purchaseOrders.*[0].lineItems.*[0].@@(@prodId).price;
```

Using aliases allows the following expressions:

```
var contacts = account.@@contacts.*;
var email = account.@@contacts[0].email;
var price = account.purchaseOrders.*.lineItems.*[0].@@product.price;
```

All external records that can be represented as a node in the data model must define a unique primary key (pkey); the primary key must be exposed as part of the Web services SOAP interface. In one embodiment, primary keys can be consistent across operation invocations for all users since in some cases the framework may place data obtained by one user in a shared cache.

The externals systems' Web service operations may optionally return a sequence number (seq) associated with a particular node, which enables the system to detect updated records. Typically, the sequence number corresponds to a database timestamp. If the Web service does not provide a sequence number, the framework computes an MD5 hash based on the record's XML values.

Schema definitions can define elements that define the external application's identifier, and optionally, a sequence number (or timestamp). The corresponding schema element defines a mas:type attribute, which denotes the system property "pkey" or "seq".

For example, the following schema defines the application contact type:

```
<xsd:complexType name="contactType">
  <xsd:all>
    <xsd:element name="first" type="xsd:string"/>
    <xsd:element name="last" type="xsd:string"/>
    <xsd:element name="email" type="xsd:string"/>
  </xsd:all>
  <xsd:attribute name="id" type="xsd:string" use="required"
  mas:type="pkey"/>
  <xsd:attribute name="timestamp" type="xsd:string"
  mas:type="seq"/>
  <xsd:attribute name="ownerId" type="xsd:string"
  use="required"/>
  <xsd:attribute name="accountId" type="xsd:string"
  use="required"/>
</xsd:complexType>
```

This schema defines attributes, @id and @timestamp, which represent the primary key and sequence number respectively. For example, the following XML represents an instance of the contact node as returned by the conduit:

```
<app:contact id="83FEB4C38AB36520" timestamp="12388832"
accountId="B3F234AD3342ABA6">
  <app:first>Bob</app:first>
  <app:last>Harris</app:last>
  <app:email>bob@harris.com</app:email>
</app:contact>
```

The schema can also include appropriate key definitions, for example:

```
<xsd:key name="contactPrimaryKey">
  <xsd:selector xpath="contact"/>
  <xsd:field xpath="id"/>
</xsd:key>
<xsd:key name="contactEmailKey">
  <xsd:selector xpath="contact"/>
  <xsd:field xpath="email"/>
</xsd:key>
```

Note, the mas:type="pkey" schema element declaration is needed to identify the primary key for the node.

Since key values may be long, by default these values are not transmitted to the client, nor accessible by the client programming model. The mas:visible attribute may be specified to suppress this default behavior.

The schema decorations are listed below:

| Attribute | Value | Meaning |
|---|---|---|
| mas:type | "pkey"\|"seq" | Defines special element or attribute, which is mapped onto the corresponding mas:pkey or mas:seq attribute. |
| mas:visible | boolean | If true, element or attribute value is available to the client programming model; default value is false. |

In the case that a key (not keyref) field is not marked as visible, any attempt to access the field on the client will null (as if a non-existent field were accessed). Even if visible, key fields are read-only.

```
var x = contact.id;        // returns null
var y = contact.email;   // returns email address
```

Primary key and sequence number values are set by the external system. As with any field defined to be a key, attempting to modify the value of the field will generate a runtime error. When creating a new node, these fields should not be included; e.g.,

```
var contact =
  <contact>
    <first>Maggie</first>
    <last>Cheung</last>
    <email>maggie@acme.com</email>
  </contact>
```

Assigning Foreign Keys by Reference

Foreign key values can be set by assignment. If the RHS of the assignment expression evaluates to a node, then this is automatically coerced to the node's primary key.

In the following example, the contact node's account foreign key (defined by the account keyref definition to be the account attribute) is set to reference the supplied account node.

```
function setAccount(contact, account)
  contact.@@accountId = account;
}
```

Assigning Foreign Keys by Value

If the schema that is referred to by the keyref definition declares a mas:visible primary key, then the corresponding foreign key values may be set by a literal value (i.e., not a node reference).

For example, the following account schema defines a visible pkey attribute:

```
<xsd:complexType name="accountType">
  <xsd:complexContent>
    <xsd:all>
      <xsd:element name="name" type="xsd:string"/>
    </xsd:all>
    <xsd:attribute name="id" type="xsd:string" use="required"
      mas:type="pkey" mas:visible="true"/>
    <xsd:attribute name="ownerId" type="xsd:string"
    use="required"/>
    <xsd:attribute name="parentId" type="xsd:string"/>
  </xsd:complexContent>
</xsd:complexType>
```

Therefore, the application may access the value directly.

```
var account=account.@@id;
```

It may also set any foreign keys that reference account nodes by value, for example:

```
function setAccount(contact)
  contact.@@account = "A-1234";
}
```

Note, the foreign key value may not resolve to a node currently cached on the client. Furthermore, if a bad value is set, then the associated conduit operation should fail.

Many-to-One (Lookups)

Many-to-1 relations can be implemented using key and keyref definitions, which parallel relational primary and foreign keys.

```
<xsd:key name="accountKey">
  <xsd:selector xpath="account"/>
  <xsd:field xpath="@id"/>
</xsd:key>
<xsd:keyref name="contactAccountRef" refer="accountKey">
  <xsd:selector xpath="contact"/>
  <xsd:field xpath="@accountId"/>
</xsd:keyref>
```

This key definition above says that an accountKey (primary key) occurs in each <account> node as an attribute called id. The keyref definition says that the contactAccountRef (foreign key) refers to the account attribute of <contact> nodes.

For example, given the following instance data:

```
<account id="1.1">
  <name>Acme</name>
</account>
<contact id="1.2" accountId="1.1">
  <first>Bob</first>
  <last>Harris</last>
  <email>bob@acme.com</email>
</contact>
```

the following defines the primary key for an account (i.e., accountKey):

```
<account id="1.1">
```

The following defines a foreign key from a contact to the same account (i.e., contactAccountRef):

<contact id="1.2" accountId="1.1">

Sometimes we will want to use data contained within a node as a foreign key value. For example, extending the CRM example to include email messages that are associated with contacts. The schema below describes the message node; this contains two "natural" foreign keys represented by the "from" and "to elements" (note, that each message may have multiple to elements).

```
<xsd:complexType name="messageType">
  <xsd:sequence>
    <xsd:element name="from" type="xsd:string" minOccurs="1"
    maxOccurs="1"/>
    <xsd:element name="to" type="xsd:string"
    maxOccurs="unbounded"/>
    <xsd:element name="subject" type="xsd:string"/>
    <xsd:element name="body" type="xsd:string"/>
  </xsd:sequence>
</xsd:complexType>
```

It has been defined that the contact element contains an email element.

```
<xsd:complexType name="contactType">
  <xsd:all>
    <xsd:element name="first" type="xsd:string"/>
    <xsd:element name="last" type="xsd:string"/>
    <xsd:element name="email" type="xsd:string"/>
  </xsd:all>
  <xsd:attribute name="id" type="xsd:string" use="required"
  mas:type="pkey"/>
  <xsd:attribute name="ownerId" type="xsd:string"
  use="required"/>
```

-continued

```
    <xsd:attribute name="accountId" type="xsd:string"
    use="required"/>
  </xsd:complexType>
```

The contact type already defines a primary key:

```
<xsd:key name="contactPrimaryKey">
  <xsd:selector xpath="contact"/>
  <xsd:field xpath="@id"/>
</xsd:key>
```

The following key definition defines that the email element within the contact node may also be used as a key.

```
<xsd:key name="contactEmailKey">
  <xsd:selector xpath="contact"/>
  <xsd:field xpath="email"/>
</xsd:key>
```

The following keyref definitions define the two foreign key elements within the message node.

```
<xsd:keyref name="messageFromRef" refer="contactEmailKey">
  <xsd:selector xpath="message"/>
  <xsd:field xpath="from"/>
</xsd:keyref>
<xsd:keyref name="messageToRef" refer="contactEmailKey">
  <xsd:selector xpath="message/to"/>
  <xsd:field xpath="."/>
</xsd:keyref>
```

The messageFromRef keyref could also be written as follows (although, the framework always uses the form above; note, the messageToRef must be written in the form above since there may be multiple <to> elements):

```
<xsd:keyref name="messageFromRef" refer="contactEmailKey">
  <xsd:selector xpath="message/from"/>
  <xsd:field xpath="."/>
</xsd:keyref>
```

One-to-Many (Collections)

One-to-Many relationships can be implemented either as inverse keyrefs, or as manifest foreign key values contained within a data node.

All many-to-one traversals may declare an inverse keyref that defines a one-to-many traversal.

Certain nodetype's schema declarations may define complex XML documents that contain a repeated sequence of elements—each of which may contain a foreign key value.

Example

The following schema definition describes a purchase order entity.

```
<xsd:element name="purchaseOrder" type="purchaseOrderType">
<xsd:complexType name="purchaseOrderType">
  <xsd:sequence>
    <xsd:element name="price" type="xsd:double"/>
    ...
    <xsd:complexType name="lineItems">
      <xsd:sequence maxOccurs="unbounded">
```

-continued

```
      <xsd:complexType ref="lineItem">
        <xsd:sequence>
          <xsd:element name="prodId" type="xsd:string"/>
          . . .
        </xsd:sequence>
      </xsd:complexType>
    </xsd:sequence>
  </xsd:complexType>
 </xsd:sequence>
 <xsd:attribute name="id" type="xsd:string" mas:type="pkey"/>
</xsd:complexType>
```

The following key declaration defines the primary key for the purchase order nodetype.

```
<xsd:key name="purchaseOrderKey">
  <xsd:selector xpath="purchaseOrder"/>
  <xsd:field xpath="id"/>
</xsd:key>
```

The following keyref declaration identifies the elements within the purchase order that are foreign keys referencing products.

```
<xsd:keyref name="purchaseOrderProductRef" refer="productKey"
    mas:alias="purchaseOrder:products">
    <xsd:selector xpath="purchaseOrder/lineItems/lineItem"/>
    <xsd:field xpath="prodId"/>
  </xsd:keyref>
```

Figure 12A:
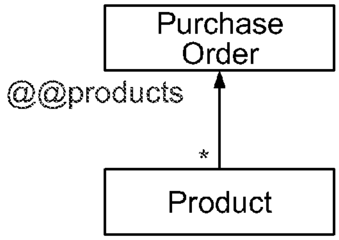
FIGS. 12A-D illustrates exemplary keyref definitions of one embodiment of the present invention.

This relationship can be illustrated by FIG. 12A. For example, the following Xscript expression retrieves the product referenced by the first line item of the purchase order.

```
var product=purchaseOrder.@@products.*;
```

Figure 12B:
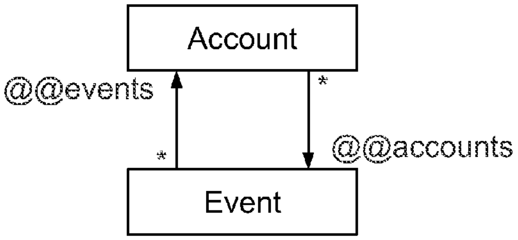

Many-to-many relations can be implemented as pairs of one-to-many relations. An example is given in FIG. 12B.

I.e., account and event declare the following schemas:

```
<xsd:complexType name="accountType">
  <xsd:all>
    <xsd:element name="name" type="xsd:string"/>
  </xsd:all>
  <xsd:attribute name="id" type="xsd:string" use="required"
  mas:type="pkey"/>
  <xsd:attribute name="ownerId" type="xsd:string" use="required"/>
  <xsd:attribute name="parentId" type="xsd:string"/>
</xsd:complexType>o0
<xsd:complexType name="eventType">
  <xsd:all>
    <xsd:element name=" first" type="xsd:string"/>
    <xsd:element name="last" type="xsd:string"/>
  </xsd:all>
  <xsd:attribute name=" id" type="xsd:string" use="required"
  mas:type="pkey"/>
</xsd:complexType>
```

And declare the following keyref definitions:

```
<xsd:keyref name="accountEventRef" refer="eventKey">
  <xsd:selector xpath="account"/>
  <xsd:field xpath="events"/>
</xsd:key>
```

-continued

```
<xsd:keyref name="eventAccountRef" refer="accountKey">
  <xsd:selector xpath="event"/>
  <xsd:field xpath="accounts"/>
</xsd:keyref>
```

In one embodiment, many-to-many keyrefs cannot declare inverse keyrefs since, in general, the framework would not have enough information to maintain consistency.

In one embodiment, one-to-one relations can be implemented as paired many-to-one relations.

Example

Figure 12C:
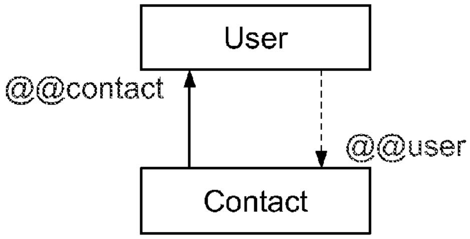

Supposing each user of the system also has a contact record as shown in FIG. 12C.

I.e., contact and user define the following keyrefs:

```
<xsd:keyref name="userContactRef" refer="contactKey"
mas:alias="contact"
  mas:inverseAlias="user">
  <xsd:selector xpath="user"/>
  <xsd:field xpath="@contactId"/>
</xsd:key>
```

One-to-one keyrefs should always declare an inverse keyref.

```
var contact = user.@@contact;
contact.@@user == user;
```

System Data Types

Node Schema Definition

The following XML schema defines the structure of a node.

```
<?xml version="1.0"?>
<xsd:schema targetNamespace="urn:bea.mas"
  elementFormDefault="qualified" attributeFormDefault="unqualified"
  xmlns:xsd="http://wvvw.w3.org/2001/XMLSchema"
  xmlns="urn:bea.mas">
<xsd:element name="nodeType">
  <xsd:complexType>
    <xsd:sequence>
      <xsd:any minOccurs="0" maxOccurs="1"/>
    </xsd:sequence>
    <xsd:attribute name="state" type="mas:syncStateType"/>
  </xsd:complexType>
</xsd:element>
```

Node definitions may include the following attributes.

| Attribute | Type | Description |
|---|---|---|
| state | syncStateType | determines current synchronization state |

In one embodiment, for each application there is a special root node, which has the nodetype mas:root; this node does not contain application data and may not be modified. The framework automatically creates an instance of the root node, which is referenced via the $root variable. Keyrefs may reference mas:root as their source type, for example:

```
<keyref name="accounts"sourceType="mas:
    root"targetType="app: contact"/>
```

In one embodiment, nodes may either be instantiated by a client programming or by server conduits.

Apart from the root node, all nodes can belong to a nodeset, which corresponds to a keyref. A nodeset can be defined by the following XML Schema:

```
<?xml version="1.0"?>
<xsd:schema targetNamespace="run:bea.com"
   elementFormDefault="qualified" attributeFormDefault="unqualified"
   xmlns:xsd="http://www.w3.org/2001/XMLSchema"
   xmlns="run:bea.com">
<xsd:element name="nodeSet">
   <xsd:complexType>
      <xsd:sequence>
         <xsd:element ref="node" maxOccurs="unbounded"/>
      </xsd:sequence>
      <xsd:attribute name="keyref" type="xsd:string"/>
   </xsd:complexType>
</xsd:element>
```

The <nodeset> element contains an unbounded sequence of <node> elements. Each nodeset corresponds to a keyref (defined by the keyref attribute), which determine the nodetype that contains node elements.

All persistent application data can be stored in nodes, which are synchronized with the server. Each data node can have a state synchronization attribute, mas:state, which has a value defined by the syncStateType type.

```
<xsd:simpleType name="syncStateType">
   <xsd:restriction base="xsd:string">
      <xsd:enumeration value="dsync"/>
      <xsd:enumeration value="modified"/>
      <xsd:enumeration value="pending"/>
      <xsd:enumeration value="uptodate"/>
      <xsd:enumeration value="rejected"/>
      <xsd:enumeration value="conflict"/>
      <xsd:enumeration value="deleted"/>
   </xsd:restriction>
</xsd:simpleType>
```

The state variable can be passed between client and server to coordinate synchronization. The client sets the node state to one of the following value:

| State | Meaning |
|---|---|
| DSYNC | locally created or modified but not ready to be synchronized. |
| MODIFIED | node locally created or modified |
| PENDING | insert/update sync message sent to server (awaiting response) |

Note, in one embodiment, the state variable does not distinguish between created and modified nodes, since this can be distinguished by a global sequence number of zero.

The synchronization process triggers a corresponding conduit operation; on completion, the server assigns each node with one of the following values:

| State | Meaning |
|---|---|
| UPTODATE | node up-to-date (synchronized with server) |
| REJECTED | node insert/update was rejected by the server (or Web service) |
| CONFLICT | Web service responded with overridden value |
| DELETED | node has been deleted on server (no longer exists) |

For example, the following table illustrates a possible life cycle of a node.

| | State | Meaning |
|---|---|---|
| t0 | MODIFIED | node created or modified on client |
| t1 | PENDING | node sent to server |
| t2 | REJECTED | operation NACK'ed by server (e.g., due illegal value) |
| t3 | MODIFIED | node modified on client (e.g., to fix error) |
| t4 | PENDING | node resent to server |
| t5 | UPTODATE | update ACK'ed by server |

In one embodiment, client applications do not directly call Web service operations—instead the conduit mechanism maps the semantics of individual (constrained) Web service operations onto the programming model against the client's virtual XML document (e.g., CRUD semantics (create, read, update, delete), navigating, custom operations, etc.) Client data model changes are synchronized to the server, which then triggers the conduit manager to invoke the external Web service operations.

In one embodiment, conduits define a coordinated set of Web service operations for a particular keyref. Each keyref can be associated with exactly one conduit. Web services may be interfaces to existing systems such as databases, LDAP directories, ERP applications, and Web sites. They may also be wrappers that abstract complex long running asynchronous processes (workflows) coordinated by procedural logic (e.g., WLI JPD).

In one embodiment, although Web services used by the system may have certain requirements (e.g., each record must include a unique primary key, and ideally a sequence number or timestamp), there are no occasionally-connected data model specific requirements placed on them. Therefore, the MAS may be one of many consumers of these resources.

In one embodiment, conduits do not assume that the Web service was written with the data model in mind; that is, the types passed into the request may not be isomorphic to the nodetypes in the data model, and the responses may also be different. Therefore, the schema used by the Web service request and response do not need to be the same as the schema for any of the nodes in the data model.

Conduits can contain METAdata to map from the data model into the request document for the Web service operation invocation, and to map from the Web service response back into the data model. These META data are known as transforms, and can be expressed in the XML Query language. Indeed, the transform model is general enough that a Web service may return a response document that maps to several different related nodes in the data model and still successfully map back into the data model.

META data that is crucial to the MAS cache (i.e., the record type's primary key and sequence number/timestamp) can also mapped using transforms.

The conduits subdirectory may contain multiple .jsx files—all of which are loaded by the framework on start-up; these files contain conduit definitions. Conduit files can consist of XScript and XQuery functions that implement conduit operations; these files can also contain META data defined in comment blocks. The annotations model enables the developer to use both visual tools and script editors to build conduit files.

Each conduit file can contain a header comment that may declare the following tags:

| Tag | Description |
|---|---|
| mas:conversational | Declares that the conduit is stateful and causes member variables to be persisted. |
| common:xmlns | Defines namespaces used within the conduit file. |

For example:

```
/**
 * @mas:conversational shared="false"
 * @common:xmlns namespace="http://schemas.xmlsoap.org/soap/
envelope/" prefix="soap"
 * @common:xmlns namespace="urn:partner.soap.sforce.com"
prefix="sfdc"
 * @common:xmlns namespace="http://example.com/" prefix="app"
 */
```

mas:conversational

The mas:conversational tag has the following attributes:

| Attribute | Description |
|---|---|
| shared | If the optional shared attribute is true, then the conduit may be used by multiple users. |

common:xmlns

The common:xmlns tag has the following attributes:

| Attribute | Description |
|---|---|
| namespace | Defines a namespace URN. |
| prefix | Defines a logical name that is used within the file to refer to the namespace. |

The conduit file can also contain (possibly multiple) object declarations that represent Web service controls. Control definitions appear in the header block immediately before the corresponding variable declaration.

Example

```
/**
 * @common:control
 * @jc:location http-url="http://enterprise.soap.sforce.com/"
 */
ws = new WebServiceControl( );
```

The following tags are defined:

| Tag | Description |
|---|---|
| common:control | Declares a WLW supported control. |
| jc:location | Declares the initial URL of a Web service control. |

jc:location

The jc:location tag has the following attributes:

| Attribute | Description |
|---|---|
| http-url | Initial URL of Web service. |

The WebServiceControl object manages the invocation of Web service operations.

The WebServiceControl object implements the following methods:

| Method | Description |
|---|---|
| invoke (msg) | Sends the specified message object, msg, to the Web service defined by the control definition; returns the response message. |

Message objects can be passed into and returned from the Web service control's invoke( ) function.

```
var response=control.invoke(message);
```

The message object has the following properties:

| Property | Description |
|---|---|
| header | XML SOAP header |
| body | XML SOAP body |
| error | null if no error occurred during invoke( ) |

For example, suppose the following SOAP message was returned from the Web service:

```
<soapenv:Envelope xmlns:SOAP-ENC="http://schemas.xmlsoap.org/
soap/encoding/"
  xmlns:soapenv="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <soapenv:Header>
    <SessionHeader xmlns="urn:partner.soap.sforce.com">
      <sessionId>12345678</sessionId>
    </SessionHeader>
  </soapenv:Header>
  <soapenv:Body>
    <createResponse xmlns="urn:partner.soap.sforce.com">
      <result>
        <errors xsi:nil="true"></errors>
        <id>87654321</id>
        <success>true</success>
      </result>
    </createResponse>
  </soapenv:Body>
</soapenv:Envelope>
```

The following function first checks that there was no error generated by the invoke( ) function call before printing the session element from the message header, and a result element from the message body.

```
function select($msg) {
  var response = ws.invoke($msg);
  if (! response.error) {
    print("Session: " + response.header.SessoinHeader.sessionId);
    print("ID: " + response.body.createResponse.result.id);
  }
  return response;
}
```

This would log the following output:

Session: 12345678

ID: 87654321

Conduit operations can map directly onto Web service operations. In one embodiment, each conduit operation declares up to three functions:

1. request transform: an XQuery function that creates an outgoing message body;
2. response transform: an XQuery function that processes the incoming response body, creating MAS nodes that are processed by the conduit manager;
3. custom function: an XScript (or JAVA) function that implements custom procedural logic (e.g., to create the message header, or to invoke custom transport or any other controls).

Annotations

Custom functions also include annotations in a header block immediately before the function prototype. For example:

```
/**
 * @mas:operation type="operationType" keyref="keyrefName"
   inverse="true"
 * @mas:transform type="request" function ="foo_request"
 * @mas:transform type="response" function="foo_response"
 */
function foo($msg, $source) {
   return ws.invoke($msg);
}
```

The custom function may declare the following tags:

| Tag | Description |
|---|---|
| mas:operation | Declares the binding between the operation and the data model. |
| mas:transform | Declares associates request and response transforms. |
| mas:namespace | Declares the default namespace for the function. |
| mas:field | Declares custom source fields that are required to call the function. |

mas:operation

The mas:operation tag has the following attributes:

| Attribute | Description |
|---|---|
| type | Operation type (e.g., "select", "insert", "update", etc.) |
| keyref | Keyref name that defines select relation. |
| inverse | If true, then implements the inverse keyref definition. |
| node | Nodetype for insert/update/delete operations. |

Operations can reference either a keyref or schema (node) definition.

```
@mas:operation type="operationType" keyref="keyrefName"
@mas:operation type="operationType" node="nodeType"
```

The inverse attribute indicates that the operation is called on the inverse keyref.

```
@mas:operation
    type="operationType"keyref="keyrefName"inverse="true"
```

For example, given the following keyref and key definitions:

```
<xsd:keyref name="contactAccountRef" refer="accountKey"
      mas:alias="account" mas:inverseAlias="contacts">
   <xsd:selector xpath="contact"/>
   <xsd:field xpath="@account"/>
</xsd:keyref>
<xsd:key name="accountKey">
   <xsd:selector xpath="account"/>
   <xsd:field xpath="@id"/>
</xsd:key>
<xsd:key name="contactKey">
   <xsd:selector xpath="contact"/>
   <xsd:field xpath="@id"/>
</xsd:key>
```

The conduit can implement the following select operations:

```
/** @mas:operation type="select" keyref="app:contactAccountRef" */
function selectAccount($msg, $source) {
   return ws.invoke($msg);
}
/** @mas:operation type="select" keyref="app:contactAccountRef"
inverse="true" */
funciton selectContacts($msg, $source) {
   return ws.invoke($msg);
}
```

The traversal contact.@@account would call selectAccount( ), while account.@@contacts.* would call selectContacts( ).

mas:transform

The mas:transform tag has the following attributes:

| Attribute | Description |
|---|---|
| type | Declares a request\|response value. |
| function | Specifies the name of a function in the current file. |
| file | Specifies a file that contains the single function. |

The framework automatically can call the request and response transforms if a corresponding @mas:transform tag is declared. The request transform can return an XML object that is used to construct the body of the $msg variable. The response transform can process the response of the conduit operation.

Note, in JAVA, the request and response Query transforms are either contained within the comment block for the custom operation (which is auto generated), or are contained in separate files which are referenced by annotations.

mas:namespace

The mas:namespace tag declares the default namespace for the function and has the following attributes:

| Attribute | Description |
|---|---|
| target | Specifies the target namespace for the output of transforms; uses a namespace prefix defined at the top of the file. |

mas:field

The mas:field tag declares custom source fields that are required to call the function; it has the following attributes:

| Attribute | Description |
| --- | --- |
| XPath | References XML element within node object. |

The body of the custom function can be generated by WLW. The default body for a select operation is as follows:

```
/**
 * @mas:operation type="select" keyref="keyrefName"
 */
function operationTypeSourceType($msg, $source) {
  return control.invoke($msg);
}
```

The $msg variable references an XML message object; if a matching request transform is declared (see below) then the message object's body is created from the XML object returned by the query. The $source variable can contain the source context node (e.g., node.@@keyrefName.*).

For an insert, update, and delete operations, the default body can be as follows:

```
/**
 * @mas:operation type="insert|update|delete" keyref="keyrefName"
 */
function operationTypeSourceType($msg, $node) {
  return ws.invoke($msg);
}
```

The $node variable contains the node to be inserted/updated/deleted.

For a custom operation, the body can be as follows:

```
/**
 * @mas:operation type="custom" node="nodeName"
   name="operationName"
 */
function operationTypeSourceType($msg, $source, $node) {
  return ws.invoke($msg);
}
```

Here, the $node variable contains the query object created by the client calling the custom operation.

Operations may optionally define request and response transform functions using the mas:transform annotations.

The following exemplary operation implements the select operation that retrieves contacts given an account identifiers (i.e., the inverse keyref defined by contactAccountRef):

```
/**
 * select contacts for an account: $account.@@contacts.*
 * @mas:operation type="select" keyref="app:contactAccountRef"
   inverse="true"
 * @mas:transform type="request" function="selectContacts_request"
 * @mas:transform type="response" function="selectContacts_response"
 */
function selectContacts($msg, $source) {
  return ws.invoke($msg);
}
```

The request transform can be called before the conduit operation is invoked; it returns the XML body of the outbound message, which is inserted into the message object, $msg, passed to the conduit operation.

```
/**
 * @mas:namespace target="sfdc"
 * @language:body type="xquery"
 */
function selectContacts_request($source) {
    <query>
    <queryString>
        SELECT * FROM Contact
        WHERE AccountId = "{string($source/@id)}"
      </queryString>
    </query>
}
```

The response transform can be called after the conduit operation returns (unless the operation returns an <error> object). It is passed the XML message body returned from the service control's invoke( ) function. The response transform returns a list of application nodes to the conduit manager.

```
/**
 * @mas:namespace target="app"
 * @language:body type="xquery"
 */
function selectContacts_response($response) {
    for $i in $response/sfdc:queryResponse/sfdc:result/sfdc:records
    return
      <contact id="{string($i/sfdc:Id)}" accountId=
      "{string($i/sfdc:AccountId)}">
        <modified>{string($i/sfdc:SystemModstamp)}</modified>
        <first>{string($i/sfdc:FirstName)}</first>
        <last>{string($i/sfdc:LastName)}</last>
        <email>{string($i/sfdc:Email)}</email>
      </contact>
}
```

Note, the conduit operation is able to manipulate the header and body of the service response message before the body is processed by the response transform.

Conduit operations can map Web service operations onto framework operations that are exposed to the application programming model.

Each operation can defines a pair of queries that map the corresponding incoming and outgoing XML messages received from and sent to the associated Web service operation. These transforms consist (typically) of XQuery expressions that translate data from the external system data format, to the MAS application data format defined by the schemas.

In the client programming model, operations can be invoked either on nodes (including $root), or on keyrefs. For example:

```
$root.create(xml);                  // create node
node.@@keyref.create(xml);            // create and link node
node.@@keyref.*;                    // implicit select
node.@@keyref.select(spath);        // deep select
node.update( );                     // update node
$root.foo(xml);                     // custom operation
```

Depending on the operation type, different input parameters are required to be passed to the conduit operation.

Except for update and delete, all other operations are passed (part of) the node that represents the context (or source) of the operation (the mas:field declaration determines how much of the source node is transferred to the server). This is referenced by the conduit functions using the $source variable.

In the case of update operations (i.e., insert, update, and custom operations), the data node used to invoke the conduit operation is referenced in the XQuery transform using the $node variable. In addition, all operations have implicit access to the $user system variable, which contains information about the current user.

The following input parameters are defined for conduit operations:

| Variable | Description |
|---|---|
| $source | Source node of operation. |
| $node | XML data node (i.e., for insert, update, delete, and custom operations.) |
| $keyset | Set of primary keys. |
| $seq | Node's sequence number. |
| $user | Information about the current user. |

The following table shows the different types of operations that may be defined for a particular conduit operation.

| Operation Type | Input | Description |
|---|---|---|
| select | $source | Select set of nodes given the primary key of a node that defines the context. The context nodetype is defines by the source of the keyref. |
| insert | $source, $node | Create node and associate this with the defined context. |
| update | $node | Update the given node (XML document). |
| delete | $node | Delete node. |
| custom | $source, $node | Invoke custom Web service operation. |
| select_pkey | $source | Select set of primary keys for a particular association. |
| select_set | $source, $keyset | Select set of nodes given set of primary keys. |
| select_diff | $source, $seq | Select set of nodes from context that has been modified. |

Each conduit operation may define a pair of queries (transforms) that create and process XML objects corresponding to incoming and outgoing XML messages received from and sent to the associated Web service operation.

Transform functions can be declared using the mas:transform annotation on the corresponding conduit function. By convention transform function names can use the same name as the conduit function with the _request and _response suffixes. However, in some cases, response transforms may be reused by multiple conduit operations.

Transforms can be implemented as XQuery (XML Query) functions.

The following exemplary operation implements the select operation that retrieves contacts given an account identifier (i.e., the inverse keyref defined by contactAccountRef):

```
/**
 * select contacts for an account: $account.@@contacts.*
 * @mas:operation type="select" keyref="app:contactAccountRef"
   inverse="true"
 * @mas:transform type="request" function="selectContacts_request"
 * @mas:transform type="response" function="selectContacts_response"
 */
function selectContacts($msg, $source) {
      return ws.invoke($msg);
}
/**
 * @mas:namespace target="sfdc"
 * @language:body type="xquery"
 */
function selectContacts_request($source) {
      <query>
      <queryString>
```

-continued

```
            SELECT * FROM Contact
            WHERE AccountId = "{string($source/@id)}"
         </queryString>
      </query>
}
/**
 * @mas:namespace target="app"
 * @language:body type="xquery"
 */
function selectContacts_response($response) {
      for $i in $response/sfdc:queryResponse/sfdc:result/sfdc:records
      return
         <contact id="{string($i/sfdc:Id)}" accountId=
         "{string($i/sfdc:AccountId)}">
            <modified>{string($i/sfdc:SystemModstamp)}</modified>
            <first>{string($i/sfdc:FirstName)}</first>
            <last>{string($i/sfdc:LastName)}</last>
            <email>{string($i/sfdc:Email)}</email>
         </contact>
}
```

The request transform can construct the body of the SOAP message that invokes the query Web service operation. The response transform processes the body of the Web service operation's response SOAP message and constructs a set of <contact> nodes.

The request transform can create the outgoing Web service message from framework and data model elements. Depending on the operation type (see operations table above) the transform can reference the following system variables, which provide context for the operation.

| Variable | Description |
|---|---|
| $source | Nodeset's source node (not available for update and delete operations). |
| $node | Node element for insert and update operations. |
| $user | Object representing the current user. |

The select conduit operation method above invokes the query Web service operation, which expects a SOAP message with a body that conforms to the following XML Schema definition.

```
. . .
<element name="query">
   <complexType>
      <sequence>
         <element name="queryString" type="xsd:string"/>
      </sequence>
   </complexType>
</element>
. . .
```

The following transform references the $source system variable to specify the AccountId foreign key required for the query.

```
/**
 * @mas:namespace target="sfdc"
 * @language:body type="xquery"
 * @mas:namespace target="sfdc"
 */
function selectContacts_request($source) {
      <query>
      <queryString>
            SELECT * FROM Contact
            WHERE AccountId = "{string($source/@id)}"
```

-continued

```
            </queryString>
        </query>
    }
```

For example, this might generate the following outgoing SOAP message body:

```
<query xmlns="urn:enterprise.soap.sforce.com">
    <queryString>SELECT * FROM Contact WHERE AccountId =
    1000</queryString>
</query>
```

The response transform can process the incoming Web service message and creates a node (or nodeset) that is processed by the conduit manager. All response transforms can reference the following system variables:

| Variable | Description |
|---|---|
| $response | References the incoming SOAP message body. |
| $user | Object representing the current user. |

Following the example above, the query Web service operation returns a SOAP message corresponding to the following XML Schema.

```
. . .
<element name="queryResponse">
  <complexType>
    <sequence>
      <element name="result" type="tns:QueryResult"/>
    </sequence>
  </complexType>
</element>
<complexType name="QueryResult">
  <sequence>
    <element name="done" type="xsd:boolean"/>
    <element name="queryLocator" type="tns:QueryLocator"
    nillable="true"/>
    <element name="records" minOccurs="0" maxOccurs="unbounded"
      type="ens:sObject"/>
    <element name="size" type="xsd:int"/>
  </sequence>
</complexType>
. . .
```

Each <QueryResult> element contains a sequence of <sObject> elements, which is the base type for the <Contact> schema type:

```
  <complexType name="sObject" abstract="true">
    <sequence>
      <element name="Id" minOccurs="0" type="tns:ID"/>
      . . .
    </sequence>
  </complexType>
  <complexType name="Contact">
    <complexContent>
      <extension base="ens:sObject">
        <sequence>
          <element name="AccountId" minOccurs="0" type="tns:ID"/>
          <element name="Email" minOccurs="0" type="xsd:string"/>
          <element name="FirstName" minOccurs="0"
          type="xsd:string"/>
          <element name="LastName" minOccurs="0"
          type="xsd:string"/>
          <element name="SystemModstamp" minOccurs="0"
type="xsd:dateTime"/>
          . . .
        </sequence>
      </extension>
    </complexContent>
  </complexType>
  <element name="Contact" type="ens:Contact"/>
```

For example, an incoming SOAP message body might be in the following form:

```
<sfdc:queryResponse xmlns:sfdc="urn:enterprise.soap.sforce.com">
  <sfdc:result>
    <sfdc:records xsi:type="urn:Contact">
      <sfdc:Id>1234</sfdc:Id>
      <sfdc:AccountId>1000</sfdc:AccountId>
      <sfdc:Email>reoger@acme.com</sfdc:Email>
      <sfdc:FirstName>Roger</sfdc:FirstName>
      <sfdc:LastName>Reed</sfdc:LastName>
    </sfdc:records>
    <sfdc:records xsi:type="urn:Contact">
      <sfdc:Id>5678</sfdc:Id>
      <sfdc:AccountId>1000</sfdc:AccountId>
      <sfdc:Email>sarah@acme.com</sfdc:Email>
      <sfdc:FirstName>Sarah</sfdc:FirstName>
      <sfdc:LastName>Smith</sfdc:LastName>
    </sfdc:records>
  </sfdc:result>
</sfdc:queryResponse>
```

The $response system variable points to the top-level <queryResponse> element (within the SOAP message body). Therefore, the following XPath expression should be used to reference the array of <Contact> elements.

```
$response/sfdc: queryResponse/sfdc: result/sfdc:
    records
```

The following transform processes the incoming SOAP message and creates a list of <contact> elements.

```
/**
 * @mas:namespace target="app"
 * @language:body type="xquery"
 */
function selectContacts_response($response) {
  for $i in $response/sfdc:queryResponse/sfdc:result/sfdc:records
  return
    <contact id="{string($i/sfdc:Id)}"
    accountId="{string($i/sfdc:AccountId)}">
      <modified>{string($i/sfdc:SystemModstamp)}</modified>
      <first>{string($i/sfdc:FirstName)}</first>
      <last>{string($i/sfdc:LastName)}</last>
      <email>{string($i/sfdc:Email)}</email>
    </contact>
}
```

All request transforms generate nodes, which may be cached by the server, and synchronized with the client's data model.

The operations defined by a conduit determine the operations that may be invoked on corresponding nodesets on the client. For example, if the conduit does not define an insert operation, then the client cannot attempt to create and insert a node for the corresponding nodeset—if it attempts to do so (e.g., in a custom action) this will trigger a runtime error. The client side programming model will enforce these constraints.

For example, suppose account is pointing to a particular account node, and that account nodes are associated with the orders keyref. In this case, unless there is a defined conduit insert operation associated with the orders keyref, then the following code would case an error.

```
account.@quotes.create(
  <quoteRequest>
    <prodId>A1</prodId><qty>10</qty>
  </quoteRequest>
);
```

Similarly, unless the update operation is defined for the contact nodetype, then the following code would also cause a error.

```
contact.address.zip="11201";
```

In one embodiment, the implementation of client operations (e.g., the create( ) function) are matched with conduit operations (e.g., insert). For example, the conduit operation, insert, both inserts a node and traversals it to another node using a keyref relationship; therefore the creation of a node on the client must be atomically paired with a traversal operation to a corresponding nodeset.

The META data describing implemented conduit operations is accessible to the user programming model (via the associated keyref). The automatic user interface is able to use this information to generate basic menus (insert, update, etc.)

The conduit mechanism can distinguish between two kinds of errors: system errors (e.g., protocol and transport errors), and application errors (e.g., invalid data). Furthermore, application errors can be raised in two different ways: as a SOAP fault (i.e., protocol level error), and as part of the SOAP (or plain XML) response message.

| Error Type | System | Application |
|---|---|---|
| SOAP fault | X | X |
| SOAP message | n/a | X |

Conduit operations are implemented as SOAP calls; SOAP faults arise if there is an error in the processing of a message; this can be either due to an infrastructural failure (e.g., transport failure), a protocol failure (e.g., badly formed message), or an application state error (e.g., update failed). System errors arise if there is an error creating or processing the outgoing or incoming SOAP message (e.g., XQuery transform error).

Application errors arise if the external application rejects an operation request based on the values that are passed as part of the message body (e.g., update failed). SOAP faults are raised by the SOAP stack during the invocation of the invoke( ) function on the Web service control.

Normally the body of the XML object returned by the conduit operation is processed by the response transform. However, if the operation returns a system <mas:error> object, then this object passed directly to the conduit manager. Note, either the main conduit function, or the response transform may return <mas:error> objects.

The <mas:error> schema definition is given below:

```
<xsd:complexType name="errorType">
  <xsd:sequence>
    <xsd:element name="pkey" type="xsd:any" minOccurs="0"
    maxOccurs="1"/>
    <xsd:element name="system" type="mas:systemErrorType"
    maxOccurs="1"/>
    <xsd:element name="message" type="xsd:string"/>
```

-continued

```
    <xsd:element name="field" type="mas:errorFieldType"
    maxOccurs="unbounded"/>
  </xsd:sequence>
</xsd:complexType>
<xsd:complexType name="systemErrorType">
  <xsd:sequence>
    <xsd:element name="code" type="xsd:any"/>
    <xsd:element name="message" type="xsd:string"/>
  </xsd:sequence>
</xsd:complexType>
<xsd:complexType name="errorFieldType">
  <xsd:sequence>
    <xsd:element name="code" type="xsd:any"/>
    <xsd:element name="message" type="xsd:string"/>
  </xsd:sequence>
  <xsd:attribute name="xpath" type="xsd:string"/>
</xsd:complexType>
```

I.e., the <mas:error> object has the following form:

```
<mas:error>
  <mas:pkey>primary-key</mas:pkey>
  <mas:system>
    <mas:code>error-code</mas:code>
    <mas:message>message-string</mas:message>
  </mas:system>
  <mas:message>message-string</mas:message>
  <mas:field xpath="spath-expression">
    <mas:code>error-code</mas:code>
    <mas:message>message-string</mas:message>
  </mas:field>
  . . .
</mas:error>
```

Each error object may contain the primary key of the node affected by the error. For select operations, this will be the source node's primary key; for update and delete operations this will reference the updated node.

System errors can be logged by the server. All other error values can be returned to the client and passed to the corresponding callback function.

An error object is returned to the application's callback function; this object has properties corresponding to the schema above.

Examples

The following operation returns a system error if the invoke( ) function invocation returns an error.

```
/**
 * @mas:operation type="select" keyref="keyrefName"
 */
function operationTypeSourceType($msg, $source) {
  var response = control.invoke($msg);
  if (response.error) {
    return
      <mas:error>
        <mas:system><mas:message>system-
        error</mas:message></mas:system>
      </mas:error>;
  }
  return response;
}
```

Where appropriate, it can be the responsibility of the conduit operation to retry failed invoke( ) invocations. In this case, the conduit has to ensure that the Web service operation either is idempotent, or that some form of reliable messaging is employed.

The following operation returns a system error after retrying the invoke( ) function on failure.

```
/**
 * @mas:operation type="select" keyref="keyrefName"
 */
function operationTypeSourceType($msg, $source) {
    for (i=0; i<3; i++) {
        var response = control.invoke($msg);
        if (!response.error) {
            return response;       // OK
        }
    }
    return
        <mas:error>
            <mas:system><mas:message>Retry failed</mas:message>
            </mas:system>
        </mas:error>;
}
```

The following operation first checks for a system error if the invoke( ) function returns an error; otherwise it returns a general application error. If invoke( ) succeeds, but the Web service response includes application errors, then it calls a utility function to parse the error message and returns a compound <error> object that may contain multiple <field> errors.

```
/**
 * @mas:operation type="create" keyref="keyrefName"
 */
function operationTypeSourceType($msg, $source) {
    var response = control.invoke($msg);
    if (response.error) {
        if (response.error.code == 101) {
            return
                <mas:error>   <mas:system>
                    <mas:code>{response.error.code}</mas:code>
                    <mas:message>system-error</mas:message>
                </mas:system></mas:error>;
        }
        else {
            return
                <mas:error>
                    <mas:message>general-error</mas:message>
                </mas:error>;
        }
    }
    // check for application errors
    if (response.body.createResponse.result.errors) {
        return process_error(response.body.createResponse.result.errors);
    }
    return response;       // OK
}
// utility function to process field errors
function process_error(errors) {
    var fields;
    for (i=0; i<errors.length i++) {
        var path = match_path(errors[i].fields[0]);
        fields +=
            <mas:field xpath="{path}">
                <code>{$i/statusCode}</code>
                <mas:message>{$i/message}</mas:message>
            </mas:field>
    }
    return <mas:error>{fields}</mas:error>;
}
```

CRUD Operations

CRUD (Create Read Update Delete) operations represent the four basic relational data operations. These operations can map directly onto the MAS data model and client programming model.

The Web service's contact schema has a different shape from the application's contact schema defined above. The select operation example below illustrates how this mapping is achieved.

The select operation can enable the framework to retrieve nodes defined by a keyref for a particular source node. Typically, all conduits define a select operation since this is the basic mechanism used to retrieve nodes by the client application.

Subsequent select operations (for different keyrefs) can be invoked to construct the data graph. For example, navigating from an account node to the purchase orders keyref invokes the getPurchaseOrders operation of the AccountManager Web service; then, navigating from a purchase order node to the line items keyref will call the getLineItems operation of the OrderManager Web service.

Select operations have the following form:

```
/**
 * @mas:operation type="select" keyref="keyrefName" [inverse="true"]
 * @mas:transform type="request" function="functionName_request"
 * @mas:transform type="response" function="functionName_response"
 */
function functionName($msg, $source) {
    return ws.invoke($msg);
}
```

Select operations are used to retrieve nodes corresponding to the keyrefName defined for a particular source nodetype; e.g., selecting the account referenced by the foreign key for a particular contact node. The inverse attribute defines that the operation implements the reverse relation; e.g., selecting all contacts that reference a particular account by via a foreign key.

Keyref definitions can have the following form:

```
<xsd:keyref name="keyrefName" refer="targetType"
    mas:alias="relationName" mas:inverseAlias="inverseRelationName">
    <xsd:selector xpath="sourceType"/>
    <xsd:field xpath="foreignKey"/>
</xsd:keyref>
```

In relational terms, the select operation corresponds to the following SQL expression:

```
SELECT * FROM keyref.targetType WHERE
    primary_key=$source/foreign_key
```

An operation implementing the inverse keyref corresponds to the following SQL expression:

```
SELECT * FROM keyref.sourceType WHERE
    foreign_key=$source/primary_key
```

The select operation's request transform can create the message body for the Web service operation; it can reference the following system variables, which provide context for the operation:

| Variable | Meaning |
|---|---|
| $source | Source node associated with the keyref. |
| $user | Object representing the current user |

The select operation's response transform can map the response message body onto a list of nodes. Node elements correspond to application defined schema for the corresponding nodetype defines by the keyref. The select operation's response transform can reference the following system variables:

| Variable | Meaning |
|---|---|
| $response | Body of the SOAP message response. |
| $user | Object representing the current user. |

Select By Foreign Key (Many-to-One)

Relational foreign keys implement many-to-one (or "lookup") relationships.

For example, given the following schema and keyref definitions, it is natural to think of the accountId attribute of the contact node as a pointer to the account node to which the contact belongs:

```
<xsd:complexType name="contactType">
   <xsd:all>
      <xsd:element name="first" type="xsd:string"/>
      <xsd:element name="last" type="xsd:string"/>
      <xsd:element name="email" type="xsd:string"/>
   </xsd:all>
   <xsd:attribute name="id" type="xsd:string" use="required"
   mas:type="pkey"/>
   <xsd:attribute name="ownerId" type="xsd:string" use="required"/>
   <xsd:attribute name="accountId" type="xsd:string" use="required"/>
</xsd:complexType>
<xsd:keyref name="contactAccountRef" refer="accountKey"
mas:alias="account">
   <xsd:selector xpath="contact"/>
   <xsd:field xpath="@accountId"/>
</xsd:keyref>
```

This would enable the following client traversal (note, the @@ operator references the alias name of the keyref definition):

```
var account=contact.@@account;
```

The following conduit operation implements this keyref relation:

```
/**
 * @mas:operation type="select" keyref="contactAccountRef"
 * @mas:transform type="request" function=
   "selectAccountByContact_request"
 * @mas:transform type="response" function=
   "selectAccountByContact_response"
 */
function selectAccountByContact($msg, $source) {
   return ws.invoke($msg);
}
/**
 * @language:body type="xquery"
 * @mas:namespace target="sfdc"
 * @mas:field xpath="@accountId"
 */
function selectAccountByContact_request($source) {
   <query>
   <queryString>
         SELECT * FROM Account
         WHERE Id = {string($source/@accountId)}
      </queryString>
   </query>
}
/**
 * @language:body type="xquery"
 * @mas:namespace target="app"
 */
function selectAccountByContact_response($response) {
   let $i := $response/sfdc:queryResponse/sfdc:result/sfdc:records
   return
```

-continued

```
      <account id="{string($i/sfdc:Id)}">
         <modified>{string($i/sfdc:SystemModstamp)}</modified>
         <name>{string($i/sfdc:Name)}</name>
         <type>{string($i/sfdc:Type)}</type>
      </account>
}
```

The conduit operation function can be auto generated by the platform; it can reference the accountOwnerRef keyref definition and has declarations (generated by tools) to the request and response transforms functions.

```
/**
 * @mas:operation type="select" keyref="contactAccountRef"
 * @mas:transform type="request" function=
   "selectAccountByContact_request"
 * @mas:transform type="response" function=
   "selectAccountByContact_response"
 */
function selectAccountByContact($msg, $source) {
   return ws.invoke($msg);
}
```

The request transform can reference the $source variable that represents the account node. The function annotations can declare the language (XQuery) and target namespace of the outgoing message document (referencing a namespace prefix declared in the conduit file's header annotation).

The function can also declares a field annotation indicating that the @accountId attribute of the contact node is required by the function; this declaration can ensure that the foreign key value is sent from the invoking client to the server as part of the synchronization request.

```
/**
 * @language:body type="xquery"
 * @mas:namespace target="sfdc"
 * @mas:field xpath="@accountId"
 */
function selectAccountByContact_request($source) {
   <query>
   <queryString>
         SELECT * FROM Account
         WHERE Id = {string($source/@accountId)}
      </queryString>
   </query>
}
```

The response transform can reference the $response variable that represents the XML body of the message returned from the Web service. The function annotations can also declare the language (XQuery) and the target namespace of the XML object returned to the conduit manager.

The function can assume that a single record is returned by the Web service <query> request. The function can transform this into a single <account> node with the corresponding primary key (id) and data fields conforming to the schema definition (including the <modified> element representing the sequence number).

```
/**
 * @language:body type="xquery"
 * @mas:namespace target="app"
 */
function selectOwnerByAccount_response($response) {
   let $i := $response/sfdc:queryResponse/sfdc:result/sfdc:records
```

-continued

```
    return
        <account id="{string($i/sfdc:Id)}">
            <modified>{string($i/sfdc:SystemModstamp)}</modified>
            <name>{string($i/sfdc:Name)}</name>
            <type>{string($i/sfdc:Type)}</type>
        </account>
}
```

The <account> node can be returned to the conduit manager and synchronized back to the calling application. The conduit manager may also elect to place the node into the server's cache.

The many-to-one relationships defined by foreign keys can, of course, be thought of in the reverse direction as a one-to-many relationship.

Given the same schema and keyref definitions as in the section above, it is natural to think of a set of contact nodes belonging to an individual account node:

```
<xsd:complexType name="contactType">
    <xsd:all>
        <xsd:element name="first" type="xsd:string"/>
        <xsd:element name="last" type="xsd:string"/>
        <xsd:element name="email" type="xsd:string"/>
        <xsd:element name="modified" type="xsd:string"/>
    </xsd:all>
    <xsd:attribute name="id" type="xsd:string" use="required"
    mas:type="pkey"/>
    <xsd:attribute name="ownerId" type="xsd:string" use="required"/>
    <xsd:attribute name="accountId" type="xsd:string" use="required"/>
</xsd:complexType>
<xsd:keyref name="contactAccountRef" refer="accountKey" mas:alias=
"account"
    mas:inverseAlias="contacts">
    <xsd:selector xpath="contact"/>
    <xsd:field xpath="@accountId"/>
</xsd:keyref>
```

This time, however, the mas:inverseAlias attribute of the keyref definition is used to traverse the keyref in the reverse direction:

```
var contacts=account.@@contacts.*;
```

The following conduit operation implements this inverse keyref relation:

```
/**
 * @mas:operation type="select" keyref=
    "contactAccountRef" inverse="true"
 * @mas:transform type="request" function=
    "selectContactsByAccount_request"
 * @mas:transform type="response" function=
    "selectContactsByAccount_response"
 */
function selectContactsByAccount($msg, $source) {
    return ws.invoke($msg);
}
```

```
/**
 * @language:body type="xquery"
 * @mas:namespace target="sfdc"
 * @mas:field xpath="@id"
 */
function selectContactsByAccount_request($source) {
    <query>
    <queryString>
        SELECT * FROM Contact
        WHERE accountId = {string($source/@id)}
```

-continued

```
        </queryString>
    </query>
}
/**
 * @language:body type="xquery"
 * @mas:namespace target="app"
 */
function selectContactsByAccount_response($response) {
    for $i := $response/sfdc:queryResponse/sfdc:result/sfdc:records
    return
        <contact id="{string($i/sfdc:Id)}" accountId=
        "{string($i/sfdc:AccountId)}">
            <modified>{string($i/sfdc:SystemModstamp)}</modified>
            <first>{string($i/sfdc:FirstName)}</first>
            <last>{string($i/sfdc:LastName)}</last>
            <email>{string($i/sfdc:Email)}</email>
        </contact>
}
```

The conduit operation function can be auto generated by the platform; it references the accountOwnerRef keyref definition and has declarations (generated by tools) to the request and response transforms functions. The operation also declares that it represents the inverse keyref relationship.

```
/**
 * @mas:operation type="select" keyref=
    "contactAccountRef" inverse="true"
 * @mas:transform type="request" function=
    "selectContactsByAccount_request"
 * @mas:transform type="response" function=
    "selectContactsByAccount_response"
 */
function selectContactsByAccount($msg, $source) {
    return ws.invoke($msg);
}
```

The request transform can reference the $source variable that represents the contact node. The function annotations declare the language (XQuery) and target namespace of the outgoing message document (referencing a namespace prefix declared in the conduit file's header annotation).

The function can also declare a field annotation indicating that the @id attribute of the account node is required by the function; this declaration can ensure that the foreign key value is sent from the invoking client to the server as part of the synchronization request.

```
/**
 * @language:body type="xquery"
 * @mas:namespace target="sfdc"
 * @mas:field xpath="@id"
 */
function selectContactsByAccount_request($source) {
    <query>
    <queryString>
        SELECT * FROM Contact
        WHERE accountId = {string($source/@id)}
    </queryString>
    </query>
}
```

The response transform can reference the $response variable that represents the XML body of the message returned from the Web service. The function annotations can also declare the language (XQuery) and the target namespace of the XML object returned to the conduit manager.

The function can assume that multiple records are returned by the Web service <query> request. The function iterates through the results and transforms them into a set of <contact> nodes. Each node can contain the corresponding primary key (id) and data fields conforming to the schema definition; this includes the account foreign key (accountId attribute) and sequence number (<modified> element).

```
/**
 * @language:body type="xquery"
 * @mas:namespace target="app"
 */
function selectContactsByAccount_response($response) {
    for $i := $response/sfdc:queryResponse/sfdc:result/sfdc:records
    return
        <contact id="{string($i/sfdc:Id)}" accountId=
        "{string($i/sfdc:AccountId)}">
            <modified>{string($i/sfdc:SystemModstamp)}</modified>
            <first>{string($i/sfdc:FirstName)}</first>
            <last>{string($i/sfdc:LastName)}</last>
            <email>{string($i/sfdc:Email)}</email>
        </contact>
}
```

The <contact> nodes can be returned to the conduit manager and synchronized back to the calling application. The conduit manager may also elect to place these nodes into the server's cache.

It is possible to define relations between nodes that do not depend on foreign key values. For example, a set of nodes may be defined by a query that uses the current user's information, or other external information (e.g., time of day, real time data, external system state). In these cases, the nodeset may be attached to arbitrary nodetypes within the data model. Typically, however, these nodesets are attached to the root node.

Conduit select operations can reference a keyref definition; since context-free selects, by definition, do not require the context of the source node, in one embodiment, they are always implemented on inverse keyrefs.

The following example illustrates how, in the CRM demo, the set of accounts for the current users are retrieved by a conduit select operation. The account nodetype has the following key definition.

```
<xsd:key name="accountKey" mas:alias="accounts">
    <xsd:selector xpath="account "/>
    <xsd:field xpath="@id"/>
</xsd:key>
```

The mas:alias attribute indicates that the nodeset of accounts is traversable from the root node; i.e.,

```
var accounts=$root.@@accounts.*;
```

The conduit can be implemented in the same way as the inverse keyref select operation (above).

```
/**
 * @mas:operation type="select" key="accountKey" inverse="true"
 * @mas:transform type="request" function="selectAccounts_request"
 * @mas:transform type="response" function="selectAccounts_response"
 */
function selectAccounts($msg, $source) {
    return ws.invoke($msg);
}
/**
 * @language:body type="xquery"
 * @mas:namespace target="sfdc"
 */
function selectAccounts_request($source) {
    <query>
    <queryString>
```

-continued

```
        SELECT *.Account FROM Account, User
        WHERE User.Alias = {string($user/username)}
        AND User.Id = Account.OwnerId
    </queryString>
  </query>
}
/**
 * @language:body type="xquery"
 * @mas:namespace target="app"
 */
function selectAccounts_response($response) {
    for $i := $response/sfdc:queryResponse/sfdc:result/sfdc:records
    return
        <account id="{string($i/sfdc:Id)}">
            <modified>{string($i/sfdc:SystemModstamp)}</modified>
            <name>{string($i/sfdc:Name)}</name>
            <type>{string($i/sfdc:Type)}</type>
        </account>
}
```

The request transform can reference the $user system variable, which is used to construct the request query sent to the Web service.

```
/**
 * @language:body type="xquery"
 * @mas:namespace target="sfdc"
 */
function selectAccounts_request($source) {
    <query>
    <queryString>
        SELECT *.Account FROM Account, User
        WHERE User.Alias = {string($user/username)}
        AND User.Id = Account.OwnerId
    </queryString>
    </query>
}
```

In this case, the service can implement a join query that selects all accounts that are owned by the current user (i.e., have an OwnerId foreign key that matches the ID of the current user). Note, the transform does not reference the $source variable.

The response transform can process the set of accounts returned by the Web service operation in the same way as the response transforms defined in previous sections.

```
/**
 * @language:body type="xquery"
 * @mas:namespace target="app"
 */
function selectAccounts_response($response) {
    for $i := $response/sfdc:queryResponse/sfdc:result/sfdc:records
    return
        <account id="{string($i/sfdc:Id)}">
            <modified>{string($i/sfdc:SystemModstamp)}</modified>
            <name>{string($i/sfdc:Name)}</name>
            <type>{string($i/sfdc:Type)}</type>
        </account>
}
```

Note, the @mas:rootId attribute can be automatically computed by the conduit manager when the set of <account> nodes are returned to it.

Insert operations can be called by the conduit manager when a client application synchronizes newly created nodes to the server.

On the client, nodes can be created in one of two ways; i.e., the create( ) function can either be called on a keyref or on the root node:

```
var node = source.@@keyref.create(<xml>);    // contextual create
var node = $root.create(<xml>);              // context free create
```

In both cases, just the node's XML object can be transferred to the server (i.e., not the source node). This is because in the case of a contextual create operation, the node must contain a foreign key value that references the source node; this value is set automatically by the framework based on the keyref definition.

Insert operations have the following form:

```
/**
 * @mas:operation type="insert" node="nodeName"
 * @mas:transform type="request" function="functionName_request"
 * @mas:transform type="response" function="functionName_response"
 */
function functionName($msg, $source) {
  return ws.invoke($msg);
}
```

Insert operations can be used to create nodes corresponding to the schema referenced by the nodeName declaration.

The insert operation's request transform creates the message body for the Web service operation; it can reference the following system variables, which provide context for the operation:

| Variable | Meaning |
|---|---|
| $node | Node created by the application. |
| $user | Object representing the current user. |

The insert operation's response transform can map the response message body onto a partially constructed node that contains the primary key (and optionally sequence number) of the record created by the Web service. The insert operation's response transform can reference the following system variables:

| Variable | Meaning |
|---|---|
| $response | Body of the SOAP message response. |
| $user | Object representing the current user. |

The node's primary key (and, optionally, sequence number) can be returned to the conduit manager, which synchronizes this information back to the client. Nodes are initially created on the client with a temporary primary key; this value must be replaced by the external system's primary key.

Nodes typically include foreign key values that reference other nodes. If multiple nodes are created on the client that reference each other, then the system has to ensure that the insert conduit operations are called in the appropriate dependency order, and that primary key values returned from the Web service are used to replace temporary foreign key values for pending nodes.

In one embodiment, non-relational insert operations do not have foreign keys that reference other nodetypes within the data mode.

For example, the user nodetype can be defined by the following schema:

```
<xsd:complexType name="userType">
  <xsd:all>
    <xsd:element name="email" type="xsd:string"/>
  </xsd:all>
  <xsd:attribute name="id" type="xsd:string"/>
</xsd:complexType>
```

Suppose an administration application was able to create new users for the system; the client code to do this might be as follows:

```
$root.create(<user><email>bob@acme.com</
    email></user>);
```

In one embodiment, this would require the following insert conduit operation:

```
/**
 * @mas:operation type="insert" node="app:user"
 * @mas:transform type="request" function="insertUser_request"
 * @mas:transform type="response" function="insertUser_response"
 */
function insertUser($msg, $node) {
  return ws.invoke($msg);
}
/**
 * @language:body type="xquery"
 * @mas:namespace target="sfdc"
 */
function insertUser_request($node) {
  <create>
    <sObjects xsi:type="User">
      <Email>{string($node/app:email)}</Email>
    </sObjects>
  </create>
}
/**
 * @language:body type="xquery"
 * @mas:namespace target="app"
 */
function insertUser_response($response) {
  <user id="{string($response/sfdc:createResponse/sfdc:result/
  sfdc:Id)}"/>
}
```

The request transform can reference the $node variable that represents the user node created by the application. The function annotations can declare the language (XQuery) and target namespace of the outgoing message document (referencing a namespace prefix declared in the conduit file's header annotation).

```
/**
 * @language:body type="xquery"
 * @mas:namespace target="sfdc"
 */
function insertUser_request($node) {
  <create>
    <sObjects xsi:type="User">
      <Email>{string($node/app:email)}</Email>
    </sObjects>
  </create>
}
```

The response transform can reference the $response variable that represents the XML body of the message returned from the Web service. The function annotations can also declare the language (XQuery) and the target namespace of the XML object returned to the conduit manager.

On success, the Web service can return a message body that conforms to the following schema definition.

```
<element name="createResponse">
   <complexType>
      <sequence>
         <element name="result" minOccurs="1" type="tns:SaveResult"/>
      </sequence>
   </complexType>
</element>
<complexType name="SaveResult">
   <sequence>
      <element name="id" type="tns:ID"/>
      <element name="success" type="xsd:boolean"/>
      <element name="errors" minOccurs="0"
      maxOccurs="unbounded" type="tns:Error"/>
   </sequence>
</complexType>
```

The transform can create a partially constructed <user> node that contains the primary key attribute (id) defined by the application's schema.

```
/**
 * @language:body type="xquery"
 * @mas:namespace target="app"
 */
function insertUser_response($response) {
   <user id="{string($response/sfdc:createResponse/sfdc:result/sfdc:id)}"/>
}
```

This primary key value can be processed by the conduit manager and synchronized with the client application.

Relational Inserts

Relational inserts can involve nodes that contain foreign key values that reference other nodes within the cache.

For example, the contact schema, below, defines foreign keys for an owner node (@ownerId) and account node (@accountId).

```
<xsd:complexType name="contactType">
   <xsd:all>
      <xsd:element name="first" type="xsd:string"/>
      <xsd:element name="last" type="xsd:string"/>
      <xsd:element name="email" type="xsd:string"/>
   </xsd:all>
   <xsd:attribute name="id" type="xsd:string" use="required"
   mas:type="pkey"/>
   <xsd:attribute name="ownerId" type="xsd:string" use="required"/>
   <xsd:attribute name="accountId" type="xsd:string" use="required"/>
</xsd:complexType>
```

Initially, the contact XML object may be constructed by an XScript assignment:

```
var contact =
   <contact>
      <first>Sarah</first>
      <last>Smith</last>
      <email>sarah@acme.com</email>
   </contact>;
```

Nodes that contain foreign keys may be created in a number of ways. Given the contact XML object above, and variables representing owner and contact nodes, the following function creates a contact node by calling the create( ) function on the root node. Note, foreign keys must be set before create( ) is called.

```
function createContact1(account, owner, contact) {
   contact.@@account = account;
   contact.@@owner = owner;
   return $root.create(contact);
}
```

However, the following functions achieve the same goal:

```
function createContact2(account, owner, contact) {
   contact.@@owner = owner;
   return account.@@contacts.create(contact)
}
function createContact3(account, owner, contact) {
   contact.@@account = account;
   return owner.@@contact = contact;
}
```

Note in both of these cases, the missing foreign key value is supplied by the framework before the node is synchronized to the server. Therefore, regardless of how the node is created by the application, the conduit operation need only be bound to the nodetype. The conduit operation can be implemented in the same way as the operation defined in the previous section:

```
/**
 * @mas:operation type="insert" node="app:contact"
 * @mas:transform type="request" function="insertContact_request"
 * @mas:transform type="response" function="insertContact_response"
 */
function insertContact($msg, $node) {
   return ws.invoke($msg);
}
/**
 * @mas:namespace target="sfdc"
 * @language:body type="xquery"
 */
function insertContact_request($node) {
   <create>
      <sObjects xsi:type="Contact">
         <AccountId>{string($node/app:@accountId})</AccountId>
         <OwnerId>{string($node/app:@ownerId})</OwnerId>
         <FirstName>{string($node/app:first)}</FirstName>
         <LastName>{string($node/app:last)}</LastName>
         <Email>{string($node/app:email)}</Email>
      </sObjects>
   </create>
}
/**
 * @mas:namespace target="app"
 * @language:body type="xquery"
 */
function insertContact_response($response) {
   <contact id="{string($response/sfdc:createResponse/sfdc:result/
   sfdc:id)}"/>
}
```

This primary key value returned by the response transform can be processed by the conduit manager and synchronized with the client application. This value replaces the temporary primary key assigned by the application when the node was first created.

However, in one embodiment, if multiple nodes that reference each other are created by the application, then primary key values returned by the server must also be used to update foreign key values of nodes that reference newly inserted nodes.

For example, the following function first creates an owner node, then creates a contact node that references it.

```
function createContact4(account) {
    var owner =
    $root.create(<user><email>sarah@acme.com</email></user>);
    var contact =
        <contact>
            <first>Sarah</first>
            <last>Smith</last>
            <email>sarah@acme.com</email>
        </contact>;
    contact.@@owner = owner;
    return account.create(contact);
}
```

The conduit insert operation for the user node is called before the conduit insert operation for the contact node, and that the contact node's ownerId attribute contains the appropriate foreign key value returned from the first conduit operation.

In some cases the Web service method that is called to create a node may not return a sequence number. The conduit is able to make multiple Web service calls within a single conduit operation to retrieve this information.

For example, the conduit operation defined in the previous section is extended below:

```
/**
 * @mas:operation type="insert" node="app:contact"
 * @mas:transform type="request" function="insertContact_request"
 * @mas:transform type="response" function="insertContact_response"
 */
function insertContact($msg, $source) {
    var response = ws.invoke($msg);
    var id = response.sfdc:createResponse.sfdc:result.sfdc:id;
    // retrieve sequence number
    var msg2 = createMessage(requestTimestamp(id));
    var response2 = ws.invoke(msg2);
    // return both responses
    response.body += response2.body.sfdc:queryResponse;
    return response;
}
/**
 * @language:body type="xquery"
 * @mas:namespace target="sfdc"
 */
function requestTimestamp($id) {
    <query>
    <queryString>
        SELECT Id, SystemModstamp FROM Contact
        WHERE Id = "{$id}"
    </queryString>
    </query>
}
/**
 * @language:body type="xquery"
 * @mas:namespace target="sfdc"
 */
function insertContact_request($node) {
    <create>
        <sObjects xsi:type="Contact">
            <AccountId>{string($node/app:@accountId})</AccountId>
            <OwnerId>{string($node/app:@ownerId})</OwnerId>
            <FirstName>{string($node/app:first)}</FirstName>
            <LastName>{string($node/app:last)}</LastName>
            <Email>{string($node/app:email)}</Email>
        </sObjects>
    </create>
}
/**
 * @language:body type="xquery"
 * @mas:namespace target="app"
 */
function insertContact_response($response) {
    <contact id="{string($response/sfdc:createResponse/sfdc:result/
    sfdc:id)}">
        <modified>
            {string($response/sfdc:queryResponse/sfdc:records/
```

-continued

```
            sfdc:SystemModstamp)}
        </modified>
    </contact>
}
```

The request transform can create the same Web service message as defined in the previous section:

```
/**
 * @language:body type="xquery"
 * @mas:namespace target="sfdc"
 */
function insertContact_request($node) {
    <create>
        <sObjects xsi:type="Contact">
            <AccountId>{string($node/app:@accountId})</AccountId>
            <OwnerId>{string($node/app:@ownerId})</OwnerId>
            <FirstName>{string($node/app:first)}</FirstName>
            <LastName>{string($node/app:last)}</LastName>
            <Email>{string($node/app:email)}</Email>
        </sObjects>
    </create>
}
```

However, in this case, the conduit's auto generated XScript function can be modified to invoke two Web service calls. First, the message returned from the request transform can be used to insert the node and to retrieve the inserted node's primary key.

```
/**
 * @mas:operation type="insert" node="app:contact"
 * @mas:transform type="request" function="insertContact_request"
 * @mas:transform type="response" function="insertContact_response"
 */
function insertContact($msg, $source) {
    var response = ws.invoke($msg);
    var id = response.sfdc:createResponse.sfdc:result.sfdc:id;
```

Next, a new message object is created by passing the inserted node's primary key, id, into a helper XQuery function, requestTimestamp( ), defined in the conduit.

```
    // retrieve sequence number
    var msg2 = createMessage(requestTimestamp(id));
    var response2 = ws.invoke(msg2);
```

Helper functions declare the same language and namespace annotations as transforms; however they are not referenced by the conduit operation's annotation. The function constructs the appropriate message to invoke a conduit operation to return the sequence number for the newly created node:

```
/**
 * @language:body type="xquery"
 * @mas:namespace target="sfdc"
 */
function requestTimestamp($id) {
    <query>
    <queryString>
        SELECT Id, SystemModstamp FROM Contact
        WHERE Id = "{$id}"
    </queryString>
    </query>
}
```

Finally, the results of both Web service operations can be combined by creating a single XML object composed of both message bodies:

```
    // return both responses
    response.body += response2.body.sfdc:queryResponse;
    return response;
}
```

The response transform can process the XML object created by the conduit function and returns a single <contact> node containing both the primary key and the sequence number of the node.

```
/**
 * @language:body type="xquery"
 * @mas:namespace target="app"
 */
function insertContact_response($response) {
   <contact id="{string($response/sfdc:createResponse/sfdc:result/
   sfdc:id)}">
      <modified>
         {string($response/sfdc:queryResponse/sfdc:records/
         sfdc:SystemModstamp)}
      </modified>
   </contact>
}
```

Update operations can be called by the conduit manager when a client application modified a node.

When the enterprise is requested to update data, it is possible that it will refuse—either because there is a policy/process that denies it or because someone else changed the data first. The first problem is unavoidable and requires that the update operation, like all others, can handle failures. The framework can implement an optimistic concurrency model for the second case.

When an update request is sent to a Web service operation it can include not only the changed values, but a sequence number that can be used to determine whether the record was up-to-date when it was modified. (The conduit manager cab compute an MD5 hash based on the nodes values if the Web service on the select operation doesn't return its own sequence number.)

On the client, nodes can be modified by script expressions, however, updates are not synchronized to the server until the update( ) function is called on a particular node; for example:

```
function modify(contact, address) {
   contact.email = address;
   contact.update( );
}
```

In one embodiment, neither client applications nor update operations may modify key values (i.e., any field described by key definitions).

Update operations can have the following form:

```
/**
 * @mas:operation type="update" node="nodeName"
 * @mas:transform type="request" function="functionName_request"
 * @mas:transform type="response" function="functionName_response"
 */
function functionName($msg, $source) {
   return ws.invoke($msg);
}
```

The operation annotation declared the nodetype, which corresponds to an application schema.

The update operation's request transform can create the message body for the Web service operation; it can reference the following system variables, which provide context for the operation:

| Variable | Meaning |
|---|---|
| $node | Node created by the application. |
| $user | Object representing the current user |

The update operation's response transform can map the response message body onto a partially constructed node that contains the sequence number of the modified record. The update operation's response transform can reference the following system variables:

| Variable | Meaning |
|---|---|
| $response | Body of the SOAP message response. |
| $user | Object representing the current user. |

Example

The following functions implement the update conduit operation for contact nodes:

```
/**
 * @mas:operation type="update" node="app:contact"
 * @mas:transform type="request" function="updateContact_request"
 * @mas:transform type="response" function="updateContact_response"
 */
function updateContact($msg, $source) {
   ws.invoke($msg);
   // retrieve sequence number
   var msg2 = createMessage(requestTimestamp($source/@id));
   var response2 = ws.invoke(msg2);
   return response2;
}
/**
 * @language:body type="xquery"
 * @mas:namespace target="sfdc"
 */
function updateContact_request($node) {
   <update>
      <sObjects xsi:type="Contact">
         <Id>{string($node/app:@id})</Id>
         <LastModifiedDate>{string($node/app:modified})
         </LastModifiedDate>
         <AccountId>{string($node/app:@accountId})</AccountId>
         <OwnerId>{string($node/app:@ownerId})</OwnerId>
         <FirstName>{string($node/app:first)}</FirstName>
         <LastName>{string($node/app:last)}</LastName>
         <Email>{string($node/app:email)}</Email>
      </sObjects>
   </update>
}
/**
 * @language:body type="xquery"
 * @mas:namespace target="app"
 */
function updateContact_response($response) {
   let $i := $response/sfdc:queryResponse/sfdc:result/sfdc:records
   return
      <contact id="{string($i/sfdc:Id)}">
         <modified>{string($i/sfdc:SystemModstamp)}</modified>
      </contact>
}
```

The request transform can create the Web service message used to invoke the update operation:

```
/**
 * @language:body type="xquery"
 * @mas:namespace target="sfdc"
 */
function updateContact_request($node) {
  <update>
    <sObjects xsi:type="Contact">
      <Id>{string($node/app:@id})</Id>
      <LastModifiedDate>{string($node/app:modified})
      </LastModifiedDate>
      <AccountId>{string($node/app:@accountId})</AccountId>
      <OwnerId>{string($node/app:@ownerId})</OwnerId>
      <FirstName>{string($node/app:first)}</FirstName>
      <LastName>{string($node/app:last)}</LastName>
      <Email>{string($node/app:email)}</Email>
    </sObjects>
  </update>
}
```

The request transform can be passed in the node's primary key and an element, LastModifiedDate, which represents the timestamp when the record was retrieved from the service. This enables the Web service operation to implement optimistic concurrency; i.e., if the timestamp value sent to the operation does not match the current system timestamp value, then the operation fails.

As with the insert operation, the conduit's auto generated XScript function can be modified to invoke two Web service calls. First, the message returned from the request transform is used to update the node.

```
/**
 * @mas:operation type="update" node="app:contact"
 * @mas:transform type="request" function="updateContact_request"
 * @mas:transform type="response" function="updateContact_response"
 */
function updateContact($msg, $source) {
  ws.invoke($msg);
```

Next, a new message object can be created by passing the updated node's primary key, id, into a helper XQuery function, requestTimestamp( ), defined in the conduit (this is the same function defined for the insert operation above).

```
// retrieve sequence number
var msg2 = createMessage(requestTimestamp(id));
var response2 = ws.invoke(msg2);
```

Finally, the result of the second Web service operation can be returned to be processed by the response transform.

```
    return response2;
  }
```

The response transform can process the XML object created by the conduit function and returns a single <contact> node containing both the primary key and the sequence number of the node.

```
/**
 * @language:body type="xquery"
 * @mas:namespace target="app"
 */
```

-continued

```
function updateContact_response($response) {
  let $i := $response/sfdc:queryResponse/sfdc:result/sfdc:records
  return
    <contact id="{string($i/sfdc:Id)}">
      <modified>{string($i/sfdc:SystemModstamp)}</modified>
    </contact>
}
```

Node conflicts can occur when a client tries to modify and synchronize a "stale" node that has already been updated (either by another client or other exogenous change process) in the external system. A stale node is one that has a different sequence number than the current sequence number held by the server.

If the MAS has cached a more recent version of the node than the one the client is trying to update, then it may respond directly with the updated node (i.e., without invoking the conduit operation), setting the mas:state attribute to"conflict".

If the conduit operation rejects the update because the node is stale, then can return an up-to-date node with the appropriate mas:state attribute; this may involve another round-trip to select the up-to-date node.

Example

The following update operation function checks for an error value returned by the Web service. The request transform is the same as is defined above.

```
/**
 * @mas:operation type="update" node="app:contact"
 * @mas:transform type="request" function="updateContact_request"
 * @mas:transform type="response" function="updateContact_response"
 */
function updateContact($msg, $source) {
  var response = ws.invoke($msg);
  // check for error
  if (! response.body.sfdc:updateResponse.sfdc:result.sfdc:success) {
    // retrieve server's record
    msg = createMessage(selectContact_request($source/@id));
    response = ws.invoke(msg);
    // set state expando
    var node =
    response.body.sfdc:queryResponse.sfdc:result.sfdc:records;
    node.@state="conflict";
  }
  else {
    // retrieve sequence number
    msg = createMessage(requestTimestamp($source/@id));
    response = ws.invoke(msg);
  }
  return response;
}
/**
 * @language:body type="xquery"
 * @mas:namespace target="app"
 */
function updateContact_response($response) {
  let $i := $response/sfdc:queryResponse/sfdc:result/sfdc:records
  if ($i.@!= null)
  then
    <contact id="{string($i/sfdc:Id)}"
    accountId="{string($i/sfdc:AccountId)}"
      mas:state="{$response.result.@state}">
      <modified>{string($i/sfdc:SystemModstamp)}</modified>
      <first>{string($i/sfdc:FirstName)}</first>
      <last>{string($i/sfdc:LastName)}</last>
      <email>{string($i/sfdc:Email)}</email>
    </contact>
```

-continued

```
else
  <contact id="{string($i/sfdc:Id)}">
    <modified>{string($i/sfdc:SystemModstamp)}</modified>
  </contact>
}
```

The conduit function can first check for an error value returned by the Web service.

```
function updateContact($msg, $source) {
  var response = ws.invoke($msg);
  // check for error
  if (! response.body.sfdc:updateResponse.sfdc:result.sfdc:success) {
```

If an error is returned, then the function can send a request query to the Web service for the entire node; here, the operation reuses the context free select operation's request transform:

```
// retrieve server's record
msg = createMessage(selectContact_request($source/@id));
response = ws.invoke(msg);
```

The operation then created an expando state attribute so that the response transform can detect that the conflict record has been retrieved from the server.

```
// set state expando
var node = response.body.sfdc:queryResponse.sfdc:result.sfdc:records;
node.@state="conflict";
```

If the original Web service methods succeed, then the function just requests just the updated sequence number (as above).

```
// retrieve sequence number
msg = createMessage(requestTimestamp($source/@id));
response = ws.invoke(msg);
```

Regardless of whether the update succeeded either response is processed by the response transform.

```
    return response;
  }
```

The response transform can first check to see if the state expando attribute was created by the conduit operation. If it was, then the transform can construct a complete node element; otherwise it can return just the primary key and sequence number as above.

```
function updateContact_response($response) {
  let $i := $response/sfdc:queryResponse/sfdc:result/sfdc:records
  if ($i.@state != null)
  then
    <contact id="{string($i/sfdc:Id)}" accountId=
    "{string($i/sfdc:AccountId)}"
      mas:state="{$i.@state}">
      <modified>{string($i/sfdc:SystemModstamp)}</modified>
      <first>{string($i/sfdc:FirstName)}</first>
      <last>{string($i/sfdc:LastName)}</last>
```

-continued

```
      <email>{string($i/sfdc:Email)}</email>
    </contact>
  else
    <contact id="{string($i/sfdc:Id)}">
      <modified>{string($i/sfdc:SystemModstamp)}</modified>
    </contact>
}
```

Nodes can be modified by XScript expressions. This also applies to foreign key values. The examples in this section use the account and contact nodetypes, which declare the following key definitions.

```
<xsd:key name="accountKey">
  <xsd:selector xpath="account"/>
  <xsd:field xpath="@id"/>
</xsd:key>
<xsd:key name="contactPrimaryKey">
  <xsd:selector xpath="contact"/>
  <xsd:field xpath="@id"/>
</xsd:key>
<xsd:key name="contactEmailKey">
  <xsd:selector xpath="contact"/>
  <xsd:field xpath="email"/>
</xsd:key>
```

The following function would generate a runtime error, since an attempt is made to modify a node's key value.

```
function foobar(contact) {
  contact.first = $context.first;
  contact.last = $context.last;
  contact.email = $context.email;     // runtime error
}
```

However, the following function successfully changes the account attribute, which changes the foreign key value, which references the account node.

```
function foo(contact, account) {
  contact.first = $context.first;
  contact.last = $context.last;
  contact.@@accountId = account;     // changes account foreign key
  contact.update( );
}
```

Here, the foreign key is defined by the following keyref declaration:

```
<xsd:keyref name="contactAccountRef" refer="accountKey"
mas:alias="account">
  <xsd:selector xpath="contact"/>
  <xsd:field xpath="@accountId"/>
</xsd:keyref>
```

Similarly, the function below uses the +=operator (a.k.a. link( ) function) to add a contact node to the set of contacts for the account:

```
function bar(account, contact) {
  account.@@contacts += contact;
}
```

This one-to-many relation is defined by the following keyref declaration, which includes an inverse relation:

```
<xsd:keyref name="contactAccountRef" refer="accountKey"
    mas:alias="account" mas:inverseAlias="contacts">
  <xsd:selector xpath="contact"/>
  <xsd:field xpath="@accountId"/>
</xsd:keyref>
```

In reality (i.e., the external database) this operation can be implemented by setting the account foreign key of the contact entity (row) to the primary key of the account. Setting a foreign key value in a source node (e.g., contact.@@accountId) should naturally enable a reverse traversal from the target node back to the source node (e.g., account.@@contacts.*), and vice versa.

Given the above definition, the following functions are equivalent.

```
function foo1(contact, account) {
  contact.first = $context.first;
  contact.last = $context.last;
  contact.@@accountId = account;
  update(contact);
}
function foo2(contact, account) {
  contact.first = $context.first;
  contact.last = $context.last;
  account.@@contacts += contact;
  update(contact);
}
```

In one embodiment, the schema's foreign key element (or attribute) declaration matches the external system's constraints (or those implied by the Web service operations' semantics). In particular, NOT NULL foreign key values (e.g., declared on a database table field), should be mirrored by xsd:use"required" in the case of an attribute and minOccurs="1" maxOccurs="1" in the case of an element.

For example, given the definitions above, the following function would generate a runtime error.

```
function foo(contact) {
  contact.first = $context.first;
  contact.last = $context.last;
  contact.@@accountId = null;
  update(contact);
}
```

Data can be retrieved by implementing select conduit operations that relate to a defined keyref relationship between two nodetypes; i.e., a foreign key value contained within one node identifies the primary key of a related node. The output of these select operations can be nodes that are folded into the local cache by the framework.

Custom queries can be conduit queries (or other procedural logic) that are opaque to the client programming model; i.e., do not explicitly select (or modify) data based exclusively on primary and foreign key relationships. For example, a search operation may return a set of XML objects that match a natural language expression.

Figures 7, 8:
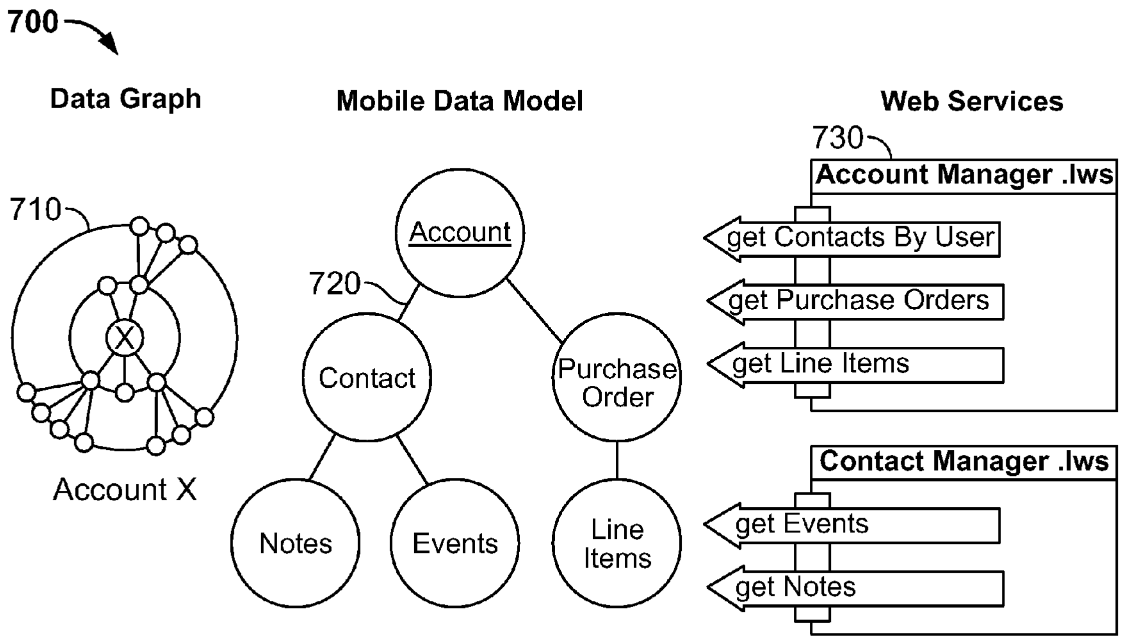
FIG. 7 is an illustration of select operations in accordance with one embodiment of the present invention.
FIG. 8 is an illustration of an input output matrix in accordance with one embodiment of the present invention.
Figure 9:
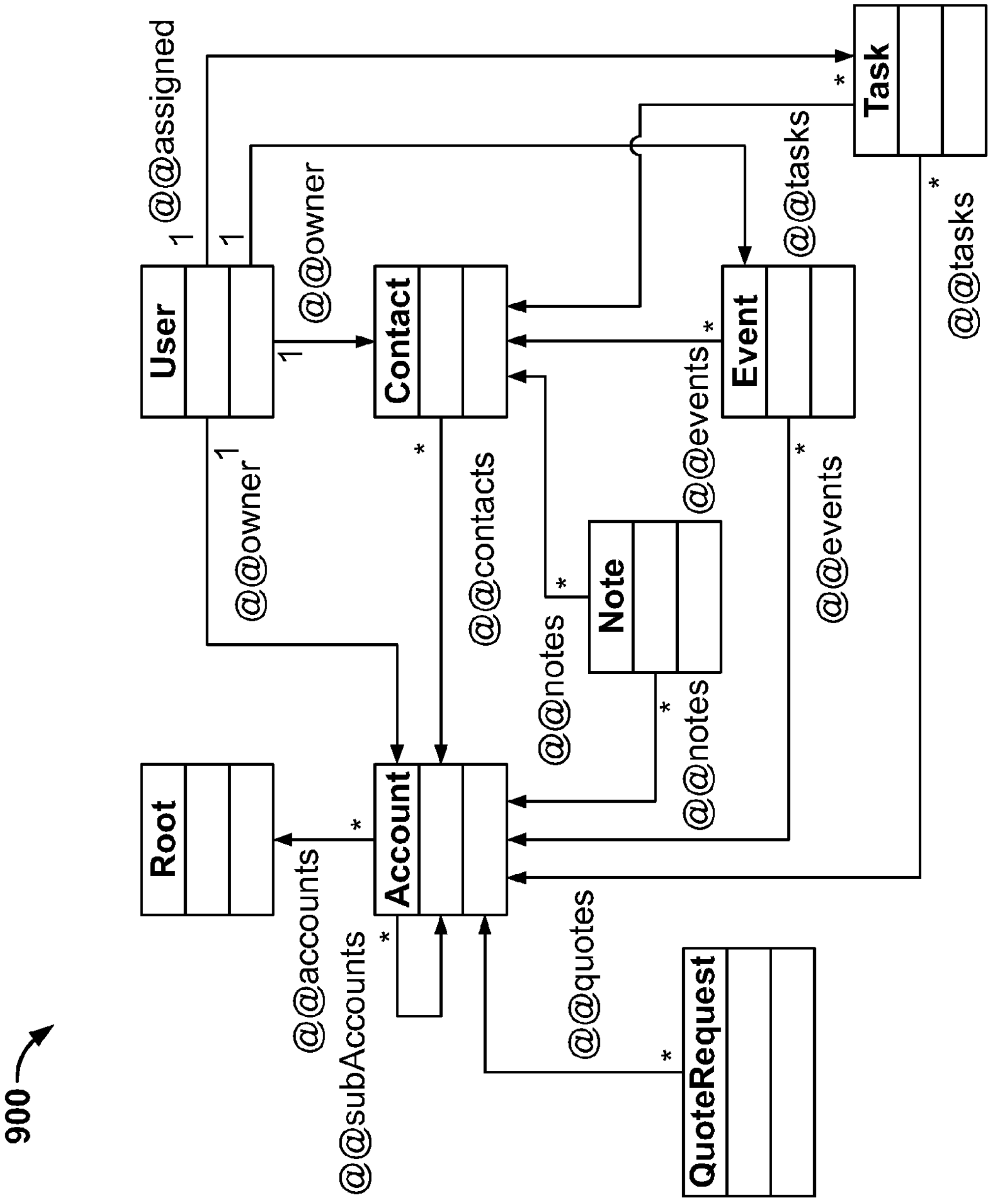
FIG. 9 is a CRM schema type diagram in accordance with one embodiment of the present invention.

The different kinds of operations are characterized by the matrix 800 of FIG. 8. Operations have inputs and output that is classified as either temporary data or permanent data. In one embodiment, temporary data is not part of the application's node graph; i.e., it is not defined by schema, key or keyref declarations, and is not automatically folded by the framework into the local cache. Temporary data is not assumed to be persistent, although it may be referenced by system $context or $session variables, which have life cycles determined by the client application framework. Permanent data can consist entirely of application data nodes defined by schema.

In one embodiment, there are two mechanisms for implementing custom queries:

1. Custom Operations can allow the client to pass an opaque, temporary XML object (document) to a specific conduit operation. The operation can asynchronously return a temporary XML document to a client callback. For example, the following custom operation, myQuery, takes an XML object <myRequest> as input, and return an XML object the myCallback( ) function:

```
$root.myQuery(<myRequest>product mobile application</myRequest>,
myCallback);
function myCallback(myOutput) {
  . . .
}
```

2. Custom Objects can involve the creation of a non-persistent node (defined by schema), which becomes part of the graph. The operation can be invoked when the client "traverses through" a corresponding keyref, in which case, the custom object is passed as the $source node into the corresponding select conduit operation.
   For example, the following custom object <taskQuery> is sent to the select conduit operation defined for the keyref that relates task nodes to taskQuery nodes:

```
var query = $root.@@taskQueries.create(<taskQuery priority="1"/>);
var tasks = query.@@tasks.*;
```

Custom operations can be a mechanism for calling custom conduit operations (functions). Both the function inputs and outputs can be XML document literals (not defined by schema). In one embodiment, the framework does not fold results directly into the local cache.

For example, suppose we wanted to retrieve a set of email addresses for contacts (for a particular account) that have not opted out of receiving email.

The following code client code calls a custom operation, getList, which is passed an XML object, <query>.

```
function bar( ) {
  account.getList(<query optedOut="false"/>, callback);
}
function callback(result) {
  for (i = 0; i < result.length; i++) {
    addAddress(result[i].email);
  }
}
```

The callback processes results once they are returned from the MAS.

The XQuery function below implements the custom request:

```
/**
 * @mas:namespace target="sfdc"
 * @mas:field xpath="@id"
 * @language:body type="xquery"
```

-continued

```
 */
function foo_request($source, $query) {
   <query>
   <queryString>
        SELECT Id, Email FROM Contact
        WHERE AccountId = "{string($source/@id)}"
        AND HasOptedOutOfEmail = {boolean($query/@optedOut)}
     </queryString>
   </query>
}
```

The response from the Web service can be processed by the following function. Note, the results are returned to the client callback as a single XML document—i.e., this is not interpreted as nodes that are folded into the local cache.

```
/**
 * @mas:namespace target="app"
 * @language:body type="xquery"
 */
function foo_response($response) {
   for $i in $response/sfdc:queryResponse/sfdc:result/sfdc:records
   return
     <contact id="{string($i/sfdc:Id)}">
        <email>{string($i/sfdc:Email)}</email>
     </contact>
}
```

The custom operation definition can declare the client function name and the context for the operation.

```
/**
 * custom operation on contact: account.getList(<query optedOut=
   "false"/>);
 * @mas:operation type="custom" node="app:account" name="getList"
 * @mas:transform type="request" function="foo_request"
 * @mas:transform type="response" function="foo_response"
 */
function foo($msg, $source, $query) {
   $msg.header += createHeader( );
   return ws.invoke($msg);
}
```

Custom objects can involve the creation of a non-persistent node (defined by schema), which becomes part of the graph. The operation can be invoked when the client "traverses through" a corresponding keyref, in which case, the custom object can be passed as the $source node into the corresponding select conduit operation.

In effect, the custom object can contain the input data for a conduit operation that will return nodes bound to the custom object. This can enable the results to become part of the client cache—and for these nodes to be referenced by subsequent client templates and actions, and for the operation to be rerun to keep these results up to date.

For example, the following schema declaration can define a custom object, taskQuery, which is used to select a subset of task nodes based on the value of the priority attribute.

```
<xsd:complexType name="taskQuery">
   <xsd:attribute name="priority" type="xsd:string"/>
</xsd:complexType>
```

The following key definition ensures that each taskQuery object is unique:

```
<xsd:keyref name="taskQueryKey">
   <xsd:selector xpath="taskQuery"/>
   <xsd:field xpath="@priority"/>
</xsd:keyref>
```

The following keyref definition is used to bind taskQuery nodes to the root node; it declares a dummy foreign key attribute mas:root that references the root node; the inverseAlias attribute declares a traversal from the root node to the set of taskQuery nodes; i.e., $root.@@taskQueries.*.

```
<xsd:keyref name="taskQueryRootRef" refer="mas:rootKey"
      mas:inverseAlias="taskQueries">
   <xsd:selector xpath="taskQuery"/>
   <xsd:field xpath="@mas:rootId"/>
</xsd:keyref>
```

The following keyref defines the relationship between taskQuery nodes and the task nodes that are returns by the conduit query operation. Each task node declares a dummy taskQuery foreign key attribute that identifies the corresponding query that selected it; the inverseAlias attributed declares a traversal from the taskQuery node to the set of task nodes; i.e., query.@@tasks.*.

```
<xsd:keyref name="taskTaskQueryRef" refer="TaskQueryKey"
      mas:inverseAlias="tasks">
   <xsd:selector xpath="task"/>
   <xsd:field xpath="@taskQuery"/>
</xsd:keyref>
```

Figure 12D:
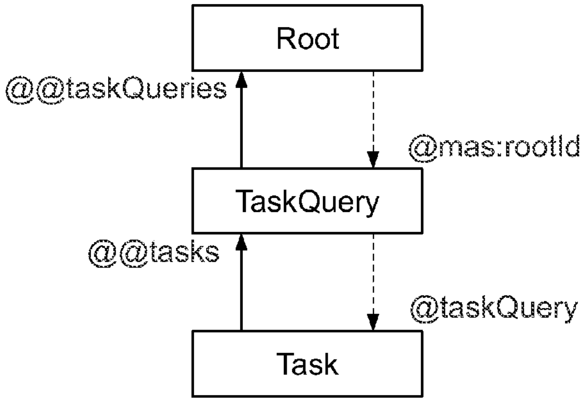

These keyref definitions define the following relationships between the root node and taskQuery and task nodes as shown in FIG. 12D.

The taskQuery nodes may be created by client script using the standard create( ) function.

```
function init( ) {
   var f = $root.@@taskQueries.create(<taskQuery priority="1"/>);
}
```

In one embodiment, there is no conduit insert operation defined for the taskQueryRootRef keyref, so this client script does not trigger any server activity. The following template traverses the inverse taskTaskQueryRef keyref definition.

```
<netui:repeater id="$s"
   source="$root.@@taskQueries.where(priority=='1').@@tasks.*">
   <p>{$s}</p>
</netui:repeater>
```

This causes an implicit select on the associated conduit operation; the repeater's source attribute references the taskNode created above, and this is used as the source context for the traversal; i.e., the node, <taskQuery priority=17>, is passed into the operation as the $source variable.

The corresponding conduit select operation is defined by the following functions:

```
/**
 * @mas:operation type="select" keyref="app:taskTaskQueryRef"
   inverse="true"
 * @mas:transform type="request" function="selectTasks_request"
 * @mas:transform type="response" function="selectTasks_response"
 */
function selectTasks($msg, $source) {
   return ws.invoke($msg);
}
/**
 * @mas:namespace target="sfdc"
 * @mas:field xpath="@priority"
 * @language:body type="xquery"
 */
function selectTasks_request($source) {
   <query>
   <queryString>
        SELECT Id, Priority, Subject FROM Task
        WHERE Priority = "{string($source/@priority})"
     </queryString>
   </query>
}
/**
 * @mas:namespace target="app"
 * @language:body type="xquery"
 */
function selectTasks_response($response) {
   for $i in $response/sfdc:queryResponse/sfdc:result/sfdc:records
   return
      <task id="{string($i/sfdc:Id)}"
         priority="{string($i/sfdc:Priority)}">
         <subject>{string($i/sfdc:Subject)}</subject>
      </task>
}
```

Applications can also define conduit select operations to "seed" the custom objects that represent "pre-canned" queries. For example, the following operation implements a select operation that returns a (constant) set of taskQuery objects when the client traverses $root.@@taskQueries.*.

```
/**
 * @mas:operation type="select" keyref="app:taskQueryRootRef"
   inverse="true"
 */
function selectTasks($msg, $source) {
   return <taskQuery priority='1'/><taskQuery priority='2'/>;
}
```

This queries could, for example, be referenced by the following template:

```
<td>
   <netui:repeater id="s1" source="$root.@@taskQueries.*">
      <a href="s1.select(s1.iterator)">Priority {s1}</a>
   </netui:repeater>
</td>
<td>
   <netui:repeater id="s2" source="s1.selected.@@tasks.*">
      <p>{s2}</p>
   </netui:repeater>
</td>
```

The first repeater, s1, displays the set of taskQuery objects; the second repeater, s2, displays the resulting tasks retrieved from the taskQuery selected by the first repeater.

| | |
|---|---|
| Priority 1 | Prepare RFP |
| Priority 2 | Sales Meeting |
| | Annual report |

Of course, it is also possible to define conduit operations that insert, update, and delete custom objects by implementing a Web service that persist these query objects—in effect, treating them as ordinary nodes within the data model.

When a custom object node is modified—either directly by the client application, or indirectly by a sync select operation—all corresponding related nodes can be automatically unlinked from the custom object; i.e., nodes that reference the object via foreign key values, have this foreign key set to null. This ensures that nodes traversed to via a custom object accurately reflect the state of the custom object.

The select operation can enable the framework to retrieve nodes for a particular keyref. Conduits can define a select operation since this is the basic mechanism used to retrieve nodes by the client application.

Normal select operations can trigger automatically by client applications as they navigate the data model. For example, the following client SPath expression causes the accounts keyref's select operation to be invoked.

```
$account.@@contacts.*
```

The conduit select operation can be passed the primary key of the corresponding account object. This section details other forms of select operations.

Both the client and MAS can cache the data that are returned by the conduit manager. Therefore, every data graph traversal need not generate a select request. Both client and server caches can maintain META data for each node and nodeset that determines how long the corresponding set of data can be relied upon to be up-to-date, before a new select request is generated.

Often, the amount of data that needs to be transferred following a select operation is quite large. Therefore, given the availability of suitable Web service operations, certain optimizations can be implemented by the framework.

The select_pkey operation is invoked in exactly the same manner as the select operation; however, it returns only sets of primary key values. For example, the select_pkey operation for the corresponding select operation on the contacts keyref above would implement the following response transform.

```
/**
 * @language:body type="xquery"
 * @mas:namespace target="app"
 */
function selectContactsByAccount_response($response) {
   for $i := $response/sfdc:queryResponse/sfdc:result/sfdc:records
   return
      <contact id="{string($i/sfdc:Id)}">
         <modified>{string($i/sfdc:SystemModstamp)}</modified>
      </contact>
}
```

The MAS is then able to determine, which (if any) of the node elements are currently in the cache.

For any node that is not contained within the cache, the framework can then call the select_set operation, which like the normal select operation returns complete nodes for the requested set of pkey values. The select_set operation for the example above would implement the following request transform:

```
/**
 * @language:body type="xquery"
 * @mas:namespace target="sfdc"
 */
function selectContacts_request($keyset) {
   <query>
   <queryString>
         SELECT * FROM Contact
         WHERE Id IN (
            {
               for $x in $keyset
               return
                  {$x},
            }
         )
   </queryString>
   </query>
}
```

The response transform can be the same as for the normal select operation.

Select operations may return nodes that are defined as complex documents that contain repeated elements. There is no restriction placed on the complexity of a nodetype's schema definition. However, there may be practical limits to the size of a node record. The next section details the case when a complex document may be split into multiple nodes.

Example

The schema below illustrates a purchaseOrder nodetype that contains multiple lineItem elements.

```
<xsd:element name="purchaseOrder" type="purchaseOrderType">
<xsd:complexType name="purchaseOrderType">
   <xsd:sequence>
      <xsd:element name="price" type="xsd:double"/>
      . . .
      <xsd:complexType name="lineItems">
         <xsd:sequence maxOccurs="unbounded">
            <xsd:complexType ref="lineItem">
               <xsd:sequence>
                  <xsd:element name="prodId" type="xsd:string"/>
                  . . .
               </xsd:sequence>
            </xsd:complexType>
         </xsd:sequence>
      </xsd:complexType>
   </xsd:sequence>
</xsd:complexType>
```

For example, the following XML document illustrates the purchase order schema.

```
<purchaseOrder>
   <price>1000.00</price>
   . . .
   <lineItems>
      <lineItem>
         <prodId>Widget-X</prodId>
         . . .
      </lineItem>
      <lineItem>
         <prodId>Widget-Y</prodId>
         . . .
      </lineItem>
      . . .
   </lineItems>
</purchaseOrder>
```

The following conduit function contains a nested loop that generates a set of purchase orders, each with a nested set of line items.

```
/**
 * @mas:operation type="select" keyref="purchaseOrderAccountRef"
   inverse="true"
 * @mas:transform type="request"
   function="selectPurchaseOrders_request"
 * @mas:transform type="response"
   function="selectPurchaseOrders_response"
 */
function selectPurchaseOrders($msg, $source) {
   var response = ws.invoke($msg);
   var pos = response.sfdc:queryResponse.sfdc:result.sfdc:records;
   // retrieve line items for each purchase order
   for (i = 0; i < pos.length−1; i++) {
      var msg2 = createMessage(requestLineItems(pos[i].sfdc:Id));
      var response2 = ws.invoke(msg2);
      pos[i] +=
      response2.body.sfdc:queryResponse.sfdc:result.sfdc:records;
   }
   return response;
}
/**
 * @language:body type="xquery"
 * @mas:namespace target="sfdc"
 * @mas:field xpath="@id"
 */
function selectPurchaseOrders_request($source) {
   <query>
   <queryString>
         SELECT * FROM PurchaseOrder
         WHERE PurchaseOrder.AccountId = {string($source/@id)}
      </queryString>
   </query>
}
/**
 * @language:body type="xquery"
 * @mas:namespace target="sfdc"
 */
function selectLineItems($id) {
   <query>
   <queryString>
         SELECT * FROM LineItem
         WHERE LineItem.PurchaseOrderId = $id
      </queryString>
   </query>
}
/**
 * @language:body type="xquery"
 * @mas:namespace target="app"
 */
function selectPurchaseOrders_response($response) {
   for $po := $response/sfdc:queryResponse/sfdc:result/sfdc:records
   return
      <purchaseOrder id="{string($po/ws:Id)}">
         <price>{string($po/ws:Price)}</price>
         . . .
         <lineItems>
         {
            for $li in $po/ws:records
            return
               <lineItem>
                  <prodId>{string($li/ws:ProdId)}</prodId>
                  . . .
               </lineItem>
         }
         </lineItems>
      </purchaseOrder>
}
```

Select operations may return nodes that are defined as complex documents that contain repeated elements. There is no restriction placed on the complexity of a nodetype's schema definition.

In some cases, it is desirable to split parts of a complex document into independent nodes, bound by keyref relationships. These nodes form a tree, which is synchronized back to the client and incorporated into the cached data graph.

The advantage of splitting compound documents into multiple nodes is improved performance by retrieving multiple levels of keyrefs in a single operation (e.g., select all contacts for a particular account, and all associated tasks).

Example

In the following schema definitions, both the purchaseOrderType and lineItemType have been declared as nodetypes with the following schema definitions.

```
<xsd:complexType name="purchaseOrderType">
  <xsd:complexType>
    <xsd:sequence>
      <xsd:element name="price" type="xsd:double"/>
      . . .
    <xsd:sequence>
  </xsd:complexType>
<xsd:complexType>
<xsd:element name="lineItemType">
  <xsd:complexType>
    <xsd:sequence>
      <xsd:element name="prodId" type="xsd:string"/>
      . . .
    </xsd:sequence>
  </xsd:complexType>
</xsd:element>
```

The schema also declares the following key and keyref definitions:

```
<xsd:key name="purchaseOrderKey">
  <xsd:selector xpath="purchaseOrder"/>
  <xsd:field xpath="@id"/>
</xsd:key>
<xsd:key name="lineItemKey">
  <xsd:selector xpath="lineItem"/>
  <xsd:field xpath="@id"/>
</xsd:key>
<xsd:keyref name="lineItemPurchaseOrderRef"
refer="purchaseOrderKey"
  mas:inverseAlias="lineItems">
  <xsd:selector xpath="lineItem"/>
  <xsd:field xpath="@purchaseOrderId"/>
</xsd:keyref>
```

The FIG. 12D represents the corresponding keyrefs.

Whenever compound documents are broken into individual nodes, the framework can ensure that client operations on the constituent nodes (e.g., line items) are supported by the conduit. For example, the client application can be prevented from creating new line item objects unless there is a corresponding insert operation for the lineItems keyref.

The conduit definition below is a modified version of the example above. Here, the inner loop creates node elements within a nodeset element. Note, the inner objects must also each define a primary key.

```
/**
 * @mas:operation type="select" keyref="purchaseOrderAccountRef"
   inverse="true"
 * @mas:transform type="request"
   function="selectPurchaseOrders_request"
 * @mas:transform type="response"
   function="selectPurchaseOrders_response"
 */
function selectPurchaseOrders($msg, $source) {
  var response = ws.invoke($msg);
  var pos = response.sfdc:queryResponse.sfdc:result.sfdc:records;
  // retrieve line items for each purchase order
  for (i = 0; i < pos.length−1; i++) {
    var msg2 = createMessage(requestLineItems(pos[i].sfdc:Id));
    var response2 = ws.invoke(msg2);
```

-continued

```
    pos[i] +=
    response2.body.sfdc:queryResponse.sfdc:result.sfdc:records;
  }
  return response;
}
/**
 * @language:body type="xquery"
 * @mas:namespace target="sfdc"
 * @mas:field xpath="@id"
 */
function selectPurchaseOrders_request($source) {
  <query>
  <queryString>
      SELECT * FROM PurchaseOrder
      WHERE PurchaseOrder.AccountId = {string($source/@id)}
    </queryString>
  </query>
}
/**
 * @language:body type="xquery"
 * @mas:namespace target="app"
 */
function selectPurchaseOrders_response($response) {
  for $po := $response/sfdc:queryResponse/sfdc:result/sfdc:records
  return
    <purchaseOrder id="{string($po/ws:Id)}">
      <price>{string($po/ws:Price)}</price>
      . . .
      <mas:nodeset keyref="lineItemPurchaseOrderRef">
      {
        for $li in $po/ws:records
        return
          <lineItem id="{string($li/ws:Id)}">
            <prodId>{string($li/ws:ProdId)}</prodId>
            . . .
          </lineItem>
      }
      </mas:nodeset>
    </purchaseOrder>
}
```

As discussed above, applications can traverse the data graph using SPath expressions; these traversals can cause the framework to synchronize the required data in the background. In one embodiment, since the synchronization mechanism is invoked asynchronously, it is frequently likely that a SPath expression cannot be fully evaluated against the currently cached data graph.

For example, the following SPath expression will return an empty list if the keyrefs accounts and contacts have not been previously synchronized and cached by the client.

```
$root.@@accounts.*.@@contacts.*.@@tasks.*;
```

In one embodiment, subsequent keyref traversals cannot be initiated unless the preceding nodes are currently resident in the cache. In one embodiment, the client code would first have first to traverse $root.@@accounts.*, and then wait for a synchronization notification, then select $root.@@accounts.*.@@contacts.*, wait for another synchronization notification, and then finally the expression would invoke the synchronization of all tasks for all contacts for all accounts.

The select( ) function can enable the client to request the server to evaluate the SPath expression on its behalf, and then to synchronize the resulting graph of nodes to the client. For example:

```
$root.select
    (@@accounts.*.@@contacts.*.@@tasks.*);
```

Here, the entire SPath expression is passed to the server, which calls successive keyref traversals and manages the synchronization of the nodes. Note, the server may return the entire graph in one synchronization message or over multiple messages.

SPath expressions may also contain predicates using the where( ) function For example:

```
$root.select
    (@@accounts.*.@@contacts.*.@@tasks.*.where(priority==1));
```

The predicate expression can be resolved on the server before the resulting nodes are synchronized to the client.

The following expression can be retrieve all contacts and notes for all accounts that have the type="Direct" element.

```
$root.select(@@accounts.where(.type="Direct").key-
    ref("contacts", "notes").*;
```

Session state can be managed by the conduit's custom procedural code.

The conduit can define a variable to store a session identifier. This may be created by the conduit, or returned by the Web service—as in this case:

```
// session object returned from Web service
var sessionId = null;
```

The conduit can define a function that creates and sends a message to initiate the session; the function can then processes the response to extract any session related information returned by the service.

The function below sends the <login> message to the Web service and extracts the session identifier from the response body. It also sets the URL of the Web service control returned by the service.

```
// create and send login message and process results
function login( ) {
  var body =
    <login>
      <username>{$user.username}</username>
      <password>{$user.password}</password>
    </login>;
  var response = ws.invoke(body);
  // set session id
  sessionId = string(response.body.sfdc:result.sfdc:sessionId);
  // set URL for subsequent calls (from this conduit)
  ws.endPoint = string(response.body.sfdc:result.sfdc:serverUrl);
}
```

The $user XML variable contains information about the current user; it is a system variable accessible to all functions.

Each conversational method can specify a header containing the session identifier, the following (ordinary) conduit function first checks if a conversation has been started (calling login if it hasn't) then returns the appropriate header XML fragment.

```
// create conversational header
function createHeader( ) {
  if (sessionId == null) {
    login( );
  }
  return
    <SessionHeader>
      <sessiondId>{sessionId}</sessiondId>
    </SessionHeader>;
}
```

For example, the following XScript function implements custom session management required by the Web service:

```
/**
 * @mas:operation type="select" keyref="app:contactAcoountRef"
   inverse="true"
 * @mas:transform type="request" function="selectContacts_request"
 * @mas:transform type="response" function="selectContacts_response"
 */
function selectContacts($msg, $source) {
  $msg.header += createHeader( );
  return ws.invoke($msg);
}
```

The function is passed in a message object, $msg, that contains a body created by the request transformation.

Next, the function calls createHeader( ) function to obtain an XML object that contains the necessary header information. This function triggers the login( ) function (above) if a session has not currently been started. The header object is then added to the message.

The invoke( ) function then sends the message (including the header) to the Web service; this uses the transport provided by the specified control.

The $user variable contains data about the user on whose behalf the conduit operation is being invoked.

| Property | Description |
|---|---|
| username | Name (i.e., login/alias) of current user. |
| password | Password of current user. |

A user can access an application by referencing its URL on the MAS. The first time a user does that from a client machine, all the components of an application can be automatically "downloaded" from the server. If the application developer has only specified a data model for the application, the META data for the data model can be downloaded. The META data can contain enough information for the mobile browser to provide a minimal user interface for the application. Using the META data, the mobile browser can initially display the root node and its keyrefs. The user can navigate through the application data by clicking on these keyrefs. As the user selects a keyref, the data sync engine asynchronously fetches the nodes for that keyref and automatically displays the data when available. For example, the user could traverse the Accounts link to cause the Account nodes to be fetched; and then traverse an Account's Contacts keyref to view its Contacts for the Account. This model is functional, but not particularly pleasant—the UI is stark and the experience "jerky" since no data is pre-fetched. This section describes how the application programmer can customize the user interface.

There are two basic artifacts that the programmer uses to customize a client application. The first is "templates" which can be used to present a custom user interface for a set of data. The programmer can attach customized ways to render nodes and nodesets using "templates" which can be XHTML templates with embedded SPath expressions to access data from the data model and embedded elements to repeat over nodesets. The occasionally-connected data model itself is presented as a big virtual XML document rooted in a magic variable, $root. In One embodiment, there is a "current" position within the data model (for example an Account or a Contacts for an Account) and this is available to the template through another magic variable, $current. URL's can express both branching to another template or new "current" data within the template (e.g. going to an Account to its Contacts).

While templates can be expressed in XHTML, they can contain an important extension to the XHTML model itself, "selection" which is explained below. It enables to enable a richer more interactive UI than HTML normally provides but which is possible when the client is also the controller.

The second artifact lets programmers attach offline behavior to buttons and URL's in the page. Every URL can reference "actions" written in ECMAScript for XML (a.k.a. JAVAScript) in a page flow file (controller.xpf) which is also placed in the client directory. This file contains a set of script "actions". Actions have full access to the data model so that they can compute values, modify data on the client thus triggering deferred synchronization, explicitly trigger synchronization and deep selects, invoke custom operations, or cause navigation to set currency to another part of the data model. Each "action" in the controller can return both the new currency within the data model (or CONTINUE if the action doesn't actually change "currency" within the data model) and usually the specific template to use in the context of that currency. For example, an action in a page listing Contacts to see related Contacts might simply be a one liner to set the currency to the related Contacts and use the Contact list templates to display them which would be something like:

```
function showContactsForAccount($account) {
  $context.account = $account;
  return [$account.@@contacts.*, "ContactsTemplate.tmpl"];
}
```

MAS client applications can consist of a page flow file (controller.xpf), which may contain XScript actions and functions, and a set of page templates (.tmpl).

The client can maintain a local cache of the application data. This data is described by the occasionally-connected data model and is referenced and manipulated using SPath.

Templates are XHTML pages which contain embedded SPath expressions. These expressions can reference any data in the cache and systems variables and functions. Since templates can only reference local data, they can be rendered independent of the machine's network connection state (i.e., enabling users to run the application offline).

The system variable, $current, can act a cursor into the data; $current references either a single node or a node list. The value of $current can be changed by actions and anchors that invoke system functions; this is known as navigation. The system variable, $context, can provide a mechanism for actions and templates to exchange temporary variables. For example, a template may bind input fields to either context variables or node elements within the cache.

Templates may also contain repeaters, which iterate over a specified part of the data or data mode. Repeaters enable the template to automatically build up complex lists and tables, and enable the user to select individual records and to invoke actions on them.

The page flow mechanism invokes actions in response to user interface and external events. User interface events can be triggered by <a> anchors within templates; external events can be triggered by external sync updates to the data. When the application first starts, it can call the begin ( ) action within the page flow, which determines the first template to be displayed.

Actions can be XScript functions that are invoked by templates and external events. Actions may modify the data, and $current and $context variables that are accessible to the templates. The system variable $page references the currently visible page document; this enables actions to access page controls properties.

Navigation can occur when either the $page or $current system variables are changed by an action. The client cab maintain a history stack of <$page×$current×$context> variables. This enables the user to navigate backwards and forwards through the history and for the template to maintain their context (and, for example, the bound values of input elements).

XScript

SPath Expressions

The client programming model can use ECMAScript for XML (E4X, XScript), which is essentially JAVAScript with native support for XML; SPath is an XPath-like language, which enables applications to query the XML data graph. It uses the "dot" operator to "traverse" elements within the graph. Elements may be either regular XML elements or data nodes.

XML Operations

System variables can be prefixed with the '$' symbol and are untyped. The use of other variables is defined by the XScript spec.

The following declarations create variables foo and bar.

```
foo = 100;
var bar = "Alchemy";
```

The var keyword places the variable within the local scope of the current function; variables that do not declare var are placed in the global scope.

The following declaration set the value of foo to the newly created XML object:

```
var foo=<foo>Alchemy</foo>;
```

Compound XML objects can also be created and referenced as follows:

```
var foo = <foo><bar>Alchemy</bar></foo>;
var bar = foo.bar
bar == "Alchemy"
```

XML object may also declare attributes, which are referenced using the '@' operator, for example:

```
var foo = <foo id="100"><bar>Alchemy</bar></foo>;
var id = foo.@id;
```

Attributes can be added implicitly (i.e., expando):

```
foo.@ping="200";
```

The following example changes the value of the text node of the <bar> element:

```
var foo = <foo><bar>Alchemy</bar></foo>;
foo.bar = "MAS";
foo == <foo><bar>MAS</bar></foo>
```

The following example replaces the entire <bar> element:

```
var foo = <foo><bar>Alchemy</bar></foo>;
for.bar = <foobar>Mobilized</foobar>
foo == <foo><foobar>Mobilized</foobar></foo>
```

The +=operator is used to add or insert an new XML element to an existing parent element, for example:

```
var foo = <foo><bar>Alchemy</bar></foo>;
for.bar += <bar>Mobilized</bar>
foo == <foo><bar>Alchemy</bar><foobar>Mobilized</foobar></foo>
```

Conversely, the delete operator is used to remove elements.

```
var foo = <foo><bar>Alchemy</bar></foo>;
delete foo.bar
foo == <foo></foo>
```

Data Graph Operations

The occasionally-connected data model can surface to the developer as a virtual XML document with a manifest variable, $root, which points to the root node in the data model. Navigation to related nodes can model within the virtual XML document via keyref definitions and using the @@ operator.

Node Manipulation

In this document, the term node is used to indicate a data model node. For example, the following sample creates an XML element.

```
var account =
  <account>
    <name>Acme</name>
    <type>Direct</type>
  </account>
```

In one embodiment, the XML element is considered a node when it is inserted (currently using the create ( ) function) into the data cache.

New nodes can be created by calling the create ( ) function on a keyref. For example, the following example creates a new account node.

```
$root.@@accounts.create(<account>
    <name>Brooklyn Industries</name></ac-
    count>);
```

The data contained within a node element can be referenced and modified using regular SPath expressions. The following example changes the text value of an element within the $contact node.

```
account.name="Acme Ltd";
```

New XML elements may also be created within a node by assignment, for example:

```
account.address=<address><street>335 Madison</
    street><zip>11211</zip></address>
```

Relations between nodetypes can be defined by keyref definitions in the occasionally-connected data model. For example, the following declaration specifies that the accounts keyref originates from the root node, and contains nodes of type account (which is defined by a schema).

```
<keyref name="accounts"sourceType="mas:
    root"targetType="app:account">
```

In the client programming model, keyrefs can be traversed using the @@ operator. For example:

```
$root.@@accounts
```

The keyref( ) function can also be used to reference named keyrefs. The following example is equivalent to the example above:

```
$root.keyref("accounts")
```

The keyref can be thought of as referencing the keyref for the specified parent nodes. The following examples references all account nodes of the accounts keyref of the $root node.

```
$root.@@accounts.*
$root.keyref("accounts").*
```

This expression returns a nodeset where each node will be of the type account, for example:

```
<account>
  <name>Acme</name>
</account>
<account>
  <name>Bancroft</name>
</account>
```

The [ ] operator can be used to access a particular node within a nodeset. The following expression returns the first node in the accounts nodeset:

```
$root.@@accounts.*[0]
```

The length( ) function can be used to return the number of nodes in a nodeset.

```
$root.@@accounts.*.length( )
```

Note, this is quite different from the following expression, which returns the value 1 (one).

```
$root.@@accounts.length( )
```

I.e., $root.@@accounts returns a single element, <accounts>.

The data graph can be filtered using the where( ) function, which takes an SPath expression as an argument. For example, the following statement matches all contact nodes in the accounts keyref with specified last name and returns a node list.

```
$root.@@accounts.*.where(.name=="Acme");
```

Note that this is equivalent to the following expression.

```
$root. @@accounts.*. (thisXML.name=="Acme");
```

Where clauses can evaluate to node lists, and may be followed by subsequent SPath expressions. For example, the following expression returns a node list of contacts for all accounts named "Acme".

```
$root.@@accounts.*.where(.name=="Acme")
    .@@contacts.*;
```

Each nodetype declaration may define a label, which is an SPath expression that references the node. The label( ) function returns the computed string.

```
<p>{$context.account.label( )}</p>
```

Keyrefs may also define labels that are returned by the label( ) function.

```
<p>{$root.@@accounts.label( )}</p>
```

The label for a node is obtained by the label ( ) function. For example:

When a node or keyref is referenced by itself, coercion automatically invokes the label( ) function. The following examples are equivalent to the examples above.

```
<p>{$context.account}</p>
<p>{$root.@@accounts}</p>
```

In client programming model, all operations can be implemented in the application's own default namespace.

The default namespace is set using the setDefaultNamespace function.

```
function begin( ) {
    $pageFlow.setDefaultNamespace("http://example.com/");
    . . .
}
```

This automatically adds the default application namespace to all XML operations. For example, the following expression:

```
var account=<account><name>Acme</name></ac-
    count>;
```

generates the following XML:

```
<account xmlns="http://example.com/">
    <name>Acme</name>
</account>
```

System Variables and Functions Reference

This section documents system variables and functions that can extend the ECMAScript for XML standard.

System Variables

All system variables can be prefixed with the '$' symbol; user variables may also use the '$' symbol by convention.

The framework defines the following system variables, which may be referenced from both templates and actions:

| Variable | Meaning |
|---|---|
| $root | Root node of graph. |
| $current | Current node or node list. |
| $context | Current context for template. |
| $session | Global variables maintained for the lifetime of the application. |
| $page | Current page template. |
| $pageFlow | Current page flow. |
| $globalApp | The global app object for the application. |
| .user | Current user. |
| .device | Current device profile. |
| .history | Stack of navigation frames <$current × $context × $page>. |

The client data model can represent persistent data for the application. However, an application may need to temporarily store information that is maintained across page transitions, but not synchronized to the MAS; this could be used, for example, to implement "clipboards", "wizards", and other multi-page processes. The developer is able to create new variables within the $context and $session objects.

$context

The $context variable represents additional data that the calling action may wish to pass to the template. This is analogous to a forward bean in JPF, or HTTP GET attributes. Context variables can be preserved as part of the history.

$session

The $session variable represents that application's "session" state; unlike the $context object, it does not get stored as part of the history. It is typically used to store information that is relevant to the entire application (i.e., not a specific page). These variables survive for the lifetime of the application and are persisted and dehydrated whenever the application (and browser) shuts down and starts up.

For example, the following function might be used to set a user defined count status variable.

```
function onExternalSync( ) {
    $session.count = $root.@@messages.*.length( );
}
```

Each page could then include the following XHTML segment, which would be updated automatically whenever the bound status variable changes.

```
<p>You have {$session.count} messages.</p>
<p>Click
<a href="$pageFlow.navigate($root.@@messages.*,
'showMessages.tmpl')">here</a> to see them</p>
```

$current

The $current variable represents a node (or node list) and is typically used by a template with relative SPath expression to bind UI elements to data.

$user

The $user variable contains data about the user on whose behalf the conduit operation is being invoked. The object contains the following fields.

| Field | Meaning |
|---|---|
| username | name (login) of current user |
| password | password of current user |

$history

The $history variable can be modified by the controller.

The $history variable can implement the following functions.

| Function | Meaning |
|---|---|
| home( ) | move to beginning of history |
| end( ) | move to end of history stack |
| back( ) | move to previous history state |
| forward( ) | move to next history state |
| length( ) | length of history stack |
| position( ) | current position in history stack |

$pageflow

The $pageFlow object supports the following functions.

| Function | Meaning |
|---|---|
| reset( ) | Application's $history, $context, and $session variables |
| navigate(SPath[, template]) | Causes navigation and sets $context and $page variables |
| addTimer(callback, delay[, period]) | Creates an optionally repeating timer that invokes the user callback function. delay and period are in milliseconds. |

-continued

| Function | Meaning |
|---|---|
| cancelTimer(timerId) | Cancels the timer identified by the timerId variable. |

$globalApp

The $globalApp variable implements the following functions.

| Function | Meaning |
|---|---|
| setMessage(message) | Set the client's status bar message; the message parameter is a string that can contain bound SPath expressions (e.g., "{$root.@@messages.*.length} messages"); as with templates, the expression is reevaluated when the underlying data changes. |

Data Model Functions

The following functions are defined on nodes:

| Function | Meaning |
|---|---|
| update([callback, id]) | Cause the specified node to be synchronized to the server using the update operation associated with the keyref defined by the SPath parameter; the optional callback parameter specifies the name of a function that is invoked once the sync mechanism has received an acknowledgement from the server. |
| select(spath, [callback, id]) | Invoke select mechanism for node graph described by the SPath expression relative to the source node; optionally define a callback handler and cookie, which is invoked once the sync process is complete. |
| keyref("keyrefName") keyref("I1"[, "I2", . . .]) keyref("*") | Equivalent to .@@keyrefName; keyref("*") returns an XMLList of keyrefs. |
| label( ) | Return label constructed from schema definition. |
| META( ) | Return object that contains data model META data. |
| syncState( ) | Return sync state string for node. |

The following functions are defined on keyrefs:

| Function | Meaning |
|---|---|
| create(xml[, callback, id]) | Add node to keyref; the optional callback parameter specifies the name of a function that is invoked once the sync mechanism has received an acknowledgement from the server. |
| where(spath-expr) | The SPath expression is evaluated as a predicate (or filter) on the nodeset |
| link(node) += node | Set foreign key value of node (defined by keyref) to value of nodeset's source node. |
| unlink(node) −= node | Set foreign key value of node (defined by keyref) to null. |
| META( ) | Return object that contains system state |

META Data Functions

The client programming model can allows the developer to access part of the META data that describes the application.

META( )

Data model META data can be accessible by calling the META( ) function on either a node, or a keyref, for example:

```
$root.META( );
$root.keyref("accounts").META( );
```

The following functions are defined on the META object:

| Function | Meaning |
|---|---|
| schema( ) | returns schema object for node or keyref |

schema( )

The following functions are defined on the schema object:

| Function | Meaning |
|---|---|
| getFieldLabel(spath) | return field name; this value is used to construct forms with human readable labels corresponding to XML document elements |
| keyref("*") | return list of keyrefs that refer to this schema; this function enables the client application to navigate the keyref graph without requiring instance data from the local cache |

For example, the following template sample uses nested repeaters to construct a table representing the keyref hierarchy.

```
<netui:repeater id="s1" source="$root.keyref('*')" iterator="$i">
  <p>{$i}</p>
  <ul>
  <netui:repeater id="s2" source=
  "$s1.selected.META( ).schema( ).keyref('*')"
    iterator="$j">
    <li>{j}</li>
  </netui:repeater>
  </ul>
</netui:repeater>
```

The output below would be generated for the CRM use case.

accounts
owner
subAccounts
quoteRequests
contacts
notes
events
tasks

Occasionally-connected data model

The data model described in the above Section can be surfaced to the developer as a virtual XML document with a manifest variable, $root which points to the root node. In one embodiment, the mobile browser always has as context, a current position within the data model (for example a particular account or set of contacts). The template and script can access this current position through another manifest variable $current.

FIG. illustrates the schema diagram 900 for the CRM application; the application defines six nodetypes: Account, Contact, Note, Event, Task, and QuoteRequest. The framework generates an XML Schema that describes the entire application data model. This can be generated using the application schema and keyref definitions.

For example, the CRM application has the following schema:

```
<?xml version="1.0"?>
<xsd:schema targetNamespace="http://example.com/"
  elementFormDefault="qualified" attributeFormDefault="unqualified"
  xmlns:xsd="http://www.w3.org/2001/XMLSchema"
  xmlns:mas="run:bea.com"
  xmlns="http://example.com/">
<xsd:element name="graph">
  <xsd:complexType>
    <xsd:sequence>
      <xsd:element ref="root" minOccurs="1" maxOccurs="1">
      <xsd:element ref="account" maxOccurs="unbounded">
      <xsd:element ref="contact" maxOccurs="unbounded">
      <xsd:element ref="note" maxOccurs="unbounded">
      <xsd:element ref="event" maxOccurs="unbounded">
      <xsd:element ref="task" maxOccurs="unbounded">
      <xsd:element ref="quoteRequest" maxOccurs="unbounded">
    </xsd:sequence>
  </xsd:complexType>
</xsd:element>
. . .
</xsd:schema>
```

The <graph> element can represent the top level element of the application data model; this can contain exactly one <root> node declaration, plus unlimited instances for each node of each of the application schemas (account, contact, note, event, task, and quoteRequest).

The <root> element can be referenced by the $root system variable. Since the root node is a special system type, there is not user data object contained within a root node.

```
$root.@@accounts.*;
```

The occasionally-connected data model can define the application nodetypes; these can be constructed from the application schema and keyref definitions. For example, the following sample details the account nodetype; this contains the schema elements (name and type), and the keyref definitions (owner, subAccounts, contacts, notes, events, tasks, and quotes).

```
<xsd:element name="account">
  <xsd:complexType>
    <xsd:sequence>
      <xsd:element name="name" type="xsd:string"/>
      <xsd:element name="type" type="accountType"/>
    </xsd:sequence>
    <xsd:attribute name="ownerId"/>
    <xsd:attribute name="parentAccountId"/>
  </xsd:complexType>
</xsd:element>
```

The account node definition defines the elements (and possible attributes) described by the corresponding schema defined on the server. As above, the keyref definition determines the traversals possible from an account node. For example:

```
var user = account.@@owner;
var contacts = $root.@@accounts.*.@@contacts.*;
```

Similarly, the following sample defines the contact nodetype.

```
<xsd:element name="contact">
  <xsd:complexType>
```

-continued

```
    <xsd:sequence>
      <xsd:element name="salutation" type="contactSalutationEnum"/>
      <xsd:element name="first" type="xsd:string"/>
      <xsd:element name="last" type="addressType"/>
      <xsd:element name="email" type="xsd:string"/>
    </xsd:sequence>
    <xsd:attribute name="accountId"/>
    <xsd:attribute name="ownerId"/>
  </xsd:complexType>
</xsd:element>
```

The following XML illustrates a client model for how the user accesses this data although, at no time is there ever an actual XML file that looks like this.

```
<graph>
<root accounts="a1 a2"/>
<account id="a1" owner="bob" contacts="c1 c2" notes="n1"
events="e1" tasks="t1">
  <name>Acme</name>
  <type>Direct</type>
</account>
<account id="a2" owner="bob" contacts="c3">
  <name>Bancroft</name>
  <type>Web</type>
</account>
<contact id="c1" owner="bob" events="e2" tasks="t2">
  <salutation>Mr</salutation>
  <first>Roger</first>
  <last>Reed</last>
  <email>roger@acme.com</email>
</contact>
<contact id="c2" owner="bob" notes="n2">
  <salutation>Ms</salutation>
  <first>Sarah</first>
  <last>Smith</last>
  <email>sarah@acme.com</email>
</contact>
<contact id="c2" owner="bob" notes="n2">
  <salutation>Ms</salutation>
  <first>Sarah</first>
  <last>Smith</last>
  <email>sarah@acme.com</email>
</contact>
<note id="n1">
  <title>ROI information</title>
  <body>Attached document details ROI for product</body>
</note>
<note id="n2">
  <title>Customer requirements</title>
  <body>Attached document presents customer's current and
  anticipated needs</body>
</note>
<event id="e1" assigned="fred">
  <title>Sales meeting</title>
</event>
<event id="e2" assigned="fred">
  <title>Product demonstration</title>
</event>
<task id="t1" assigned="fred">
  <title>Prepare RFP for sales call</title>
  <status>Not started</status>
</task>
<task id="t2" assigned="fred">
  <title>Send white paper to customer</title>
  <status>Completed</status>
</task>
</graph>
```

Overview

In one embodiment, there are two ways for the client to modify the data graph. First, input elements in templates can be bound directly to data nodes; this mechanism enables the user to modify XML elements belonging to existing nodes and requires no code. Second, (and typically) the template invokes an action, which modifies the data.

In one embodiment, these changes to the data are not synchronously sent to the server. Instead, a background process synchronizes updates to and from the server. In fact, since the entire page flow mechanism can run independently of network (server) connection, there will typically be multiple offline changes to the data, which will by synchronized and reconciled with the server once a connection is established.

The programming model can also implement a mechanism to defer the synchronization of updated or inserted records. For example, a node could be created that represents a purchase order, but the user may not want to synchronize this until all of the line items have been added and then clicked a "submit" button.

The server may reject synchronization requests due to optimistic concurrency conflicts with other users, or due to external application errors. Each node has synchronization state which is managed by the framework. This can enable the application to display flags that indicate which records are pending synchronization, up-to-date, or rejected by the server.

Schema Validation

When the create( ) and update( ) functions are invoked the framework does the following:

A) validates the object against the application schema, and validates all required foreign keys;

B) ensures that the cache is consistent for relations that may be traversed in the reverse direction (i.e., inverse relations).

If either condition is not met, a runtime error is generated. Also, key/keyref consistency is enforced when the link( ) or unlink( ) functions (also +=/−=operators) are invoked.

Creating Nodes

The following action can create a node using the create( ) function.

```
var po = <purchaseOrder><date>03/12/05</date></purchaseOrder>;
po.lineItems += <lineItem><prodId>ABC</prodId><qty>100</qty>
</lineItem>
po.lineItems += <lineItem><prodId>XYZ</prodId><qty>200</qty>
</lineItem>
po = $account.@@purchaseOrders.create(po);
```

The node, po, can be constructed by the XML assignment expression (first line). The second and third expressions modify the XML node. However, the node need not be validated until the create ( ) function is called.

Updating Nodes

Similarly, the application can modify existing nodes by directly accessing the node's data. For example, the following code retrieve a particular purchase order, and then changes the status and adds a new line item:

```
po = $account.@@purchaseOrders.where(.date == "03/12/05").*[0];
po.status = "getQuote";
po.lineItems += <lineItem><prodId>DEF</prodId><qty>300</qty>
</lineItem>
$po.update( );
```

Again, the update( ) function is called to validate the node.

Creating Nodes

The create ( ) function can be used to create new nodes on the client.

```
var node=sourceNode.@@keyrefcreate(<node>[, call-
    back, id]);
```

The function can be called on a keyref that supports the insert conduit operation. The function returns a node object.

| Parameter | Type | Description |
|---|---|---|
| node | xml | well formed XML object conforming to application schema for nodetype. |
| callback | function | optional callback parameter specifies the name of a function that is invoked once the sync mechanism has received an acknowledgement from the server. |
| id | value | optional id parameter is passed into the callback function to identify the invocation context. |

Example

For example, the following XScript constructs a new contact node within the contacts keyref for the specified $account object.

```
var contact =
  <contact>
    <salutation>Mr</salutation>
    <first>Sydney</first>
    <last>James</last>
    <email>sydney@james.com</email>
  </contact>;
node = account.@@contacts.create(contact);
```

Nodes are typically created in three stages: first an action creates a context variable, and then causes a template to be displayed.

```
function init( ) {
  $context.contact = <contact><salutation/><first/><last/><email/>
  </contact>;
  return ["editContact.tmpl"];
}
```

Next, the template binds input controls to individual context elements.

```
<input type="text"netui:bind="$context.email"/>
```

Next, the template invokes a second action; the framework automatically transfers HTML input values back into the context variable before calling the action. The action then creates the new node.

```
function create( ) {
  $context.contact = $account.@@contacts.create($context.contact);
  return ["showContact.tmpl"];
}
```

In the example above, the action replaces the current context variable ($context.contact) with the node constructed by the create( ) function; this enables the next template (showContact.tmpl) to reference to created node. Note, before the create( ) function is called $context.contact just contains a well formed XML element; afterwards it points to a validated node (e.g., that supports the various node function.

In one embodiment, keyrefs that define an insert conduit operation allow nodes to be created and attempting to create a node on an invalid nodeset will cause a runtime error.

Callbacks

The create( ) function may also specify a callback function, which is invoked when the sync mechanism receives an acknowledgement from the server that the node has been created (i.e., the associated conduit operation succeeded in returning the new primary key). For example:

```
function foo(account, quote) {
    node = account.@@requests.create(quote, bar);
}
function bar(request) {
    $context.lastRequest = request;
}
```

The callback function can be passed the created node as a parameter.

Updating Nodes

The update( ) function can be used to synchronize nodes modified on the client.

```
node.update([callback, id]);
```

The function is called on a keyref that supports the update conduit operation.

| Parameter | Type | Description |
|---|---|---|
| callback | function | optional callback parameter specifies the name of a function that is invoked once the sync mechanism has received an acknowledgement from the server. |
| id | value | optional id parameter is passed into the callback function to identify the invocation context. |

Nodes can be modified using regular XScript expressions. As with created nodes, synchronization runs as a background process. However, a modified node is not marked for synchronization unless the update( ) function is called.

The update( ) function can set the syncState attribute of the associated node to MODIFIED. This mechanism can enable multiple edits to be made to a single node before the node is synchronized.

Example

In the following code, the first two expressions can set the syncState of the $contact node to DSYNC; and the last expression set the syncState to MODIFIED.

```
contact.first = "Bob";
contact.address = <address><zip>10017</zip></address>;
$contact.update( );
```

Callbacks

The update( ) function may also specify a callback function, which is invoked when the sync mechanism receives an acknowledgement from the server that the node has been updated (i.e., the associated conduit operation succeeded). For example:

```
function foo(account, quote) {
    quote.update(bar);
}
function bar(request) {
    $context.lastRequest = request;
}
```

The callback function can be passed the created node as a parameter.

Conflict Management

In one embodiment, node conflicts occur when a client tries to modify and synchronize a "stale" node that has already been updated (either by another client or other exogenous change process) in the external system. A stale node is one that has a different sequence number than the current sequence number held by the server.

If the server rejects the update because the node is stale, then it returns an up-to-date node with the synchronization state attribute set to "conflict".

Update operations may set a callback, which is invoked when the node is returned from the server (whether or not there is a conflict). If a callback is not set, then the client framework automatically replaces the client's stale node with the up-to-date node returned by the server.

The callback function should first test for the conflict state using the syncState( ) system function. It must then set a global variable (i.e., $session) for the application; e.g.,

```
function updateCallback(node) {
  if (node.syncState( ) == CONFLICT) {
    $session.message = "<a href='showConflict( )'>edit conflicts</a>";
    $session.conflict = node;
  }
}
```

In order to notify the user that a conflict has occurred, each template might include a status area that contains references this global variable; e.g.,

```
<netui:html>{$session.message}</netui:html>
```

Here, the global variable contains an HTML anchor that enables the user to navigate to an action that will display the conflict editor page:

```
function showConflict( ) {
    $context.node = $session.conflict;
    return ["showConflict.tmpl"];
}
```

The showConflict template below displays the values of the stale node and the up-to-date node side-by-side.

The Spath expression calls the conflict( ) function which is defined for data nodes; this returns the up-to-date node. Note, although the conflict node may contain foreign key values, the @@ operator cannot traverse from a conflict node.

```
<p>Contact record conflicted with server.</p>
<form netui:action="$pageFlow.updateConflict( )">
  <table><tbody>
    <tr>
      <td>First</td>
      <td>{$context.node.conflict( ).first}</td>
      <td><input type="text" netui:bind="$context.node.first"/></td>
    </tr>
    <tr>
      <td>Last</td>
      <td>{$context.node.conflict( ).last}</td>
    td><input type="text" netui:bind="$context.node.last"/></td>
    </tr>
    <tr>
      <td>Email</td>
      <td>{$context.node.conflict( ).email}</td>
      <td><input type="text" netui:bind="$context.node.email"/></td>
    </tr>
    <tr colspan="3">
      <td><input type="submit" value="Create"/></td>
    </tr>
  </tbody></table>
</form>
<a href="copyValues($context.node)">Copy server's record.</a>
```

If the submit button is pressed, then the form invokes the updateConflict( ) action below:

```
function updateConflict( ) {
    $context.node.update( );
    $status.message = null;
    $status.conflict = null;
    return ["BACK"];
}
```

This calls the update( ) function on the current node, which triggers the synchronization mechanism to try again. Here, the controller immediately returns to the previous page that was being displayed before the user clicked on the status area.

The template above also defines an anchor that calls the copyValues( ) action below when clicked:

```
function copyValues(node) {
    node.copy(node.conflict( ));
    return ["CONTINUE"];
}
```

This action copies the up-to-date node values into the stale node and returns to the showConflict page.

Linking and Unlinking Nodes

In one embodiment, the link( ) function is used to add a node (or list of nodes) to a keyref that represents a 1-to-many relationship.

```
node.@@keyref.link(nodeList);
```

Note, the nodeList parameter must reference nodes that have already been created.

The unlink( ) function is used to remove a node (or list of nodes) from a keyref that represents a 1-to-many relationship.

```
node.@@keyref.unlink(nodeList);
```

Examples

The function below removes all "Web" accounts from the associated keyref of the current (contact) node. It then links the single newAccount node passed into the function.

```
function foo(newAccount) {
    contact = $current.@@accounts.*.where(.type == "Web");
    current.@@accounts.unlink($contact);
    contact.@@account.link(newAccount);
}
```

Error Handling

Error objects can be generated by the server and returned to the client whenever a conduit operation fails.

The error object is returned to the application's callback function; this object has properties corresponding to the schema above.

An error object is returned to the application's callback function; this object has properties corresponding to the schema above.

```
function updateNode(node) {
    node.update(updateCallback, <token/>)
}
function updateCallback(id, error) {
    var msg = error.message;
```

-continued

```
    var node = error.node( );
    var fields = error.field.*;
}
```

The error object can also implements the field( ) function which is used to access individual error fields; e.g.,

```
var msg=error.field(spath).message;
```

Custom Objects

Neither templates nor actions can directly access external resources (e.g., Web services). Instead, external processes are modeled as data objects, which are synchronized by the MAS framework.

Most of the conduit operations can map onto CRUD operations on node entities (i.e., select, create, update, etc.); these operations corresponding directly to client programming model functions (navigation, create, update, etc.) However, typically, it will not be possible to map all Web service operations onto the framework's standard operations. For example, a Web service operation may require a set of parameters that are made up from multiple node elements, or that contain temporary values input by the user. In these cases, the application defines a custom nodetype, which contains the input and output parameters for the Web service operation. This mechanism is known as custom operations. The create( ) function can be used to create new custom objects in the same way that ordinary nodes are created.

```
var customNode=$sourceNode.@@keyref-A.create
    (<node>[, callback]);
```

Custom objects typically do not implement an insert conduit operation for the corresponding keyref. Instead, the custom object is used as the context for subsequent traversals that trigger select conduit operations. E.g.,

```
var resultNodes=customNode.@@keyref-B.*;
```

The keyref declarations are illustrated by the following diagram:

Example

The following example assumes a Web service operation that has the following prototype:

```
xsd:double submitQuote(xsd:string prodId, xsd:inte-
    ger qty);
```

The operation takes prodId and qty input parameters and returns a price value.

This requires a custom XML Schema definition for a nodetype that will contain the prodId and qty parameters, and the price response field.

Custom nodes are created the same as ordinary nodes. For example, the following XML represents a well formed quoteRequest element.

```
<quoteRequest><prodId/><qty>0</qty></quoteRe-
    quest>
```

Typically, an action is invoked to create a context variable by assigning a well formed XML object containing default values. The following example creates a quoteRequest element and causes the controller to navigate to the inputRequest template.

```
function initiateRequest( ) {
  $context.request =
  <quoteRequest><prodId/><qty>0</qty></quoteRequest>;
  return ["inputRequest.tmpl"];
}
```

The template which binds <input> elements to the individual field values.

```
<table><tbody>
  <tr>
    <td>Product ID</td>
    <td><input netui:bind="$context.quoteRequest.prodId"/></td>
  </tr>
  <tr>
    <td>Quantity</td>
    <td><input netui:bind="$context.quoteRequest.qty"/></td>
  </tr>
  <tr>
    <td colspan="2">
      <input type="submit" value="Submit"
      onClick="submitQuoteRequest( )"/>
    </td>
  </tr>
</tbody></table>
```

The template has a submit button that invokes the submitRequest action to create a node from the well formed quoteRequest element.

```
function submitQuoteRequest( ) {
  $current.@@quotes.create($context.request);
  return ["showRequests.tmpl"];
}
```

The create( ) function returns immediately having marked the newly created node for synchronization. As with creating normal nodes, the synchronization occurs as a background process. Therefore, the action causes the navigator to display the current set of quote requests.

The showRequests template references both the input and output values of the template. Note, the response.price element for the newly created request will initially return and empty value

```
<netui:repeater id="$quotes" source="$current.@@quotes.*"
iterator="$i">
  <tr>
    <td>{$i.prodId}</td>
    <td>{$i.qty}</td>
    <td>{$i.response.price}</td>
  </tr>
</netui:repeater>
```

| | |
|---|---|
| Widget-Z | 1000 |

At some point the synchronization mechanism can send the created node to the server, which will invoke the associated custom operation. If successful, this creates the <response> element and synchronizes the node back to the server.

```
<quoteRequest>
  <prodId>Widget-Z</prodId>
  <qty>1000</qty>
```

-continued

```
  <response>
    <price>2000.00</price>
  </response>
</quoteRequest>
```

If the showRequests template is still visible, the client framework causes the template to be re-rendered, which updates the corresponding table row.

| | | |
|---|---|---|
| Widget-Z | 1000 | 2000.00 |

Selecting Nodes

The select( ) function can be called on any keyref and returns immediately with no value. The function cannot be called from within a template.

```
node.@@keyrefselect(spath, [callback, id]);
```

The select( ) function may also be called on the root node:

```
$root.select(spath, [callback, id]);
```

The mechanism enables the client to request synchronization of part of the virtual XML document described by the SPath expression.

For example, the following expression requests all contacts for all accounts that are currently in the cache.

```
$root.@@accounts.*.select(@@contacts.*);
```

The following expression requests all contacts for all accounts accessible from the root node.

```
$root.select(@@accounts.*.@@contacts.*);
```

In one embodiment, the SPath expression does not reference local functions; and, the expression does not reference local variables that cannot be resolved to non-scalar values. The expression is passed to the server, which translates the expression into a corresponding XPath expression.

Select with Predicates

Some keyrefs may be large and impractical to fully synchronize to the client. In these cases, the client is able to filter the keyref using the where( ) function.

For example, the following select expression causes only account nodes matching the where( )predicate to be synchronized.

```
$root.select(@@accounts.*.where(.type=="Web"));
```

The following expression selects all contacts for the matching accounts above.

```
$root.select(@@accounts.*.where(.type==
    "Web")).contacts.*;
```

The following expression selects all contacts (from all accounts) that have the matching email address.

```
$root.select(@@accounts.*.@@contact.*.where
    (.email=="bob@acme.com"));
```

The predicate select mechanism can also be used to allow the user to pre-select nodes that should be synchronized. For example, one could add a Boolean attribute, checked, to the account nodetype and bind this to a checkbox element within a template.

```
<netui:repeater id="s1" source="$root.@@accounts.*" iterator="i">
  <tr>
    <td><input type="checkbox"
```

-continued

```
            netui:bind="i.@@checked"></a></td>
            <td>{i}</td>
        </tr>
    </netui:repeater>
```

The following expression (contained within an action invoked by the template) would cause the sync mechanism to retrieve all contacts for all of the checked accounts.

```
$root.select(@@accounts.*.where
    (.@@checked==true).@@contacts.*);
```

Callbacks

The callback mechanism enables the caller to specify a function to be called once the entire synchronization for the SPath has been completed. For example:

```
$root.select(@@accounts.*.@@contacts.*, $id, call-
    backFn);
```

This example sends a sync script to the server to retrieve all contacts for all accounts, and registers the function callbackFn as a callback to be invoked by the client framework once the synchronization has completed. The $id variable is passed into the function in order to identify a particular select invocation.

Example

For example, one application of this mechanism might be having all templates for a particular application contain a "status bar" element at the bottom of each page, which binds to a temporary data value (e.g., $session.message).

```
<p>Status: <span>{$session.message}</span></p>
```

An action might be called from one template that initiates a select with a callback.

```
q1 = "Q1";
function beginSearch(email) {
    $root.select(@@accounts.*.@@contact.*.where(.email == email), q1,
    onUpdate);
}
```

In this case, the beginSearch( ) function takes a parameter that represents a contact's email address and selects all contacts (for all accounts) that having match email address elements.

The user defined callback function onUpdate( ) is called when the synchronization request completes.

```
function onUpdate(id) {
    if (id == q1) {
        $session.message = + " Received results.";
    }
    . . .
}
```

The function matches the id input variable with the request constant passed into the select( ) function above; it then changes the $session.message variable, which causes any templates binding to this variable to be refreshed.

Synchronization

Normally sync can run in the background. In one embodiment, the only control that the user has on influencing sync is registering a callback when a select operation has complete.

However, when creating or modifying nodes, it is sometimes necessary to ensure that a set of operations are executed as a logically complete unit. Note, this is a lower bar than requiring full transactional semantics.

For example the function below changes the first and last name of a contact, as well as the foreign key referencing the account node.

```
function foo(contact, account) {
    contact.first = $context.first;
    contact.last = $context.last;
    contact.@@accountId = account;
}
```

In one embodiment, when nodes are created or modified, they have their sync state set to DSYNC (deferred sync). However, they are not scheduled for synchronization until the original action invoked by the controller returns without error. At this point all nodes marked DSYNC are promoted to MODIFIED.

Actions may invoke subsequent actions, in which case, the outermost action forms the scope of this implicit transaction.

The client framework implements a single threaded (per application) actions model. This includes both actions invoked by incoming sync messages, and the processing of sync messages by the framework. Therefore, it is not possible for an incoming sync update to "clobber" data being operated on within an action.

In some cases, the cache will be updated by a pageflow that invokes a series of templates (e.g., a "wizard"). In these cases, in order to defer synchronization until the entire pageflow has successfully completed, the application must create or copy the relevant data into context variables. The final pageflow action then updates the cache.

User Delayed Synchronization

Sometimes, the user will want to defer apparent synchronization until a record is ready to be submitted (e.g., by pressing a submit( ) function).

For example, the following template displays a list of purchase orders (for an account) and a checkbox for each item. The checkbox is bound to an attribute, which determines the item's status.

```
<netui:repeater id="s1" source="$account.@@purchaseOrders.*"
iterator="i">
    <tr>
        <td><input type="checkbox"
        netui:bind="i.@@complete"></a></td>
        <td>{i}</td>
    </tr>
</netui:repeater>
<input type="submit" onClick="$pageFlow.submit( )"/>
```

The submit button calls the submit( ) action, which calls update( ) for all purchase orders that have been set as complete.

```
funciton submit( ) {
    for (i = 0; i < $accounts.@@purchaseOrders.*.length( ); i++) {
        var po = $account.@@purchaseOrders.*[i];
        if (po.syncState( ) == "DSYNC" && po.@@complete == true) {
            $po.update( );
        }
    }
}
```

This example requires that the external system interpret the meaning of the complete attribute; i.e., defer processing the record (while managing persistence) until the appropriate value has been set by the user.

Templates

Templates can be well formed (and validated) XHTML pages that make up the application's user interface. Templates typically reference the data in the cache; they may also cause actions to be invoked. In one embodiment, templates do not contain script expression that can modify the data graph directly.

Templates can reference the $current system variable, which acts a cursor; $current references either a single node or a node list. In one embodiment, the value of $current can only be changed by actions and anchors that call system functions; this is known as navigation.

Templates may also contain repeaters, which iterate over a specified part of the data or data model. Repeaters enable the template automatically to build up complex lists and tables, and for the user to be able to select individual records and to invoke actions or navigation on them.

The system variable, $context, can provide a mechanism for actions and templates to exchange temporary variables. For example, a template may bind input fields to either context variables or data node elements. When the template invokes an action, the page's input values are automatically copied back into the bound variables.

Templates can generate events by defining HTML <a> anchors, which are triggered when the user clicks on them. In one embodiment, Anchors have three different purposes:

1) Navigation
   An anchor can specify an Spath expression (e.g., $current.@@orders.*), which causes the controller to change the $current variable to point to a different node or nodeset; this is known as navigation. The system can provide META data that can associates particular templates with certain nodetypes and keyrefs, enabling the browser automatically to select the appropriate template.
2) Invoking system functions
   The framework can implement various system functions that modify the behavior of the application. For example, the navigate( ) function navigates to specific template and sets the $current variable; the select( ) function (called within a repeater) is used to select a particular node from a list or table.
3) Invoking actions
4) Actions may process context variables bound to the preceding template and perform calculations or modify the data. The action may then return directly back to the current page, in which case any data bound form controls are updated and the display is refreshed. Actions may also cause the controller to change the $current and $page variables, which cause navigation to occur.

Synchronization can occur in the background. Nodes created and modified by the client pass through various synchronization states, which are also accessible to the template via system functions and can be displayed to the user. Also synchronization updates from the server cause templates that bind to associated nodes to be instantly updated.

Expression Evaluation

In one embodiment, templates can incorporate data form the cache directly into the page by quoting Spath expressions within curly braces. The result of the evaluated expression is treated as regular XHTML.

For example, the following expression displays the label of the current node.

```
<p>{$current.label( )}</p>
```

In one embodiment, expressions contained within curly braces are evaluated each time the page is refreshed. Pages are refreshed whenever control is passed back from an action. Therefore, expressions contained within curly braces can be used to define dynamic values for XHTML tags.

For example, the following expression evaluates the content of the variable $context.address and puts the result into the anchor tag's href attribute:

```
<a href="{$context.address}">Click</a>
```

An action might change the value of this context variable:

```
$context.address="mailto:alchemy@bea.com";
```

This would case the following XHTML expression to be generated when control passes back to the page:

```
<a href="mailto:alchemy@bea.com">Click</a>
```

System Variables

This section details the three system variables ($current, $context, and $page) that are maintained on the history stack in one embodiment.

$current

The $current variable references a node list (one or more nodes). This may be an explicit reference to a node or nodeset, or an evaluated Spath expression that results in a node list.

Templates are designed to either handle a single node or a node list. $current[0] is guaranteed to point to a single node. Also, the $current.length( ) expression can be used to detect the number of nodes in the node list.

For example, the CRM application may implement an accountDetail.tmpl page that expects $current to point to a single account node.

```
<html>
<head>
    <META current="node"/>
    <title>Account Detail</title>
</head>
<body>
<p>Account: {$current}</p>
<a href="$pageFlow.navigate($current.@@contacts.*,
'contacts.tmpl')">Contacts</a>
. . .
</body>
</html>
```

Conversely, the contacts.tmpl page expects $current to contain a set the entire set of contacts for all accounts.

```
<html>
<head>
   <META current="nodelist"/>
   <title>Contacts</title>
</head>
<body>
<table><tbody><tr>
<netui:repeater id="$contacts" source=»$current» iterator=»
$i»focused="true">
   <td>first</td><td>{$i.first}</td>
   <td>last</td><td>{$i.last}</td>
   <td>email</td><td>{$i.email}</td>
   <td><a href=»$s.previous( )»>Previous</a></td><td><a
   href=»$s.next( )»>Next</a></td>
</netui:repeater>
</tr></tbody></table>
</body>
</html>
```

Here, the focused repeater allows the user to cycle through the collection of contact nodes.

$context

Context variables provide a "scratch pad" for templates and actions to coordinate multi-page processes; they are conceptually similar to session variables.

Context variables are created by assignment operations executed within an action.

```
$context.foo = 100;
$context.foo.bar = <bar>FooBar</bar>
```

The template references context variables using the expression language syntax.

```
<p>{$context.foo}</p>
<p>{$context.foo.bar}</p>
```

Actions can call the reset( ) function on the $context object to remove all current context variables.

$context.reset( )

$page

The $page variable contains the currently rendered template. This is used by actions to access the state of HTML controls within the currently rendered page.

XHTML Tag Extensions

This section details the extensions to XHTML supported by the client framework.

In one embodiment, templates must contain well formed and validated XHTML. The XHTML extensions described in this section are defined within the netui namespace; all examples require the following namespace declaration.

```
<html xmlns="http://www.w3.org/1999/xhtml"xmlns:
    netui="http://www.bea.com/netui">
```

Anchor Tag

The <a> (anchor) tag creates a hyperlink, which the user can click on causing an event to be triggered. Anchor are used to navigate, invoke system functions (including selecting items), and to invoke actions.

An anchor can specify a Spath expression (e.g., $current.@@orders.*), which causes the controller to change the value of the $current variable to point at a different node or nodeset; this is known as navigation.

An anchor can invoke one of the various system functions. For example, the navigate( ) function navigates to specific template and sets the $current variable the select( ) function called within a repeater is used to select a particular node from a list or table.

An anchor may invoke an action, which may process context variables bound to template to perform calculations or modify data. The action may then return directly back to the current page, in which case any data bound form control are updated and the display seamlessly refreshed. Actions may also cause the controller to change the $current and $page variables, which cause navigation to occur.

```
<a href="url"/>
```

Anchors can use the following attributes.

| Attribute | Type | Description |
|---|---|---|
| href | url | SPath expression, system function or action name, which is invoked when the user clicks on the anchor. |

The url attribute can have one of the following forms:

| Type | Form | Description |
|---|---|---|
| navigation | spath-expr, or $pageFlow.navigate (spath-expr, template) | The expression, which must evaluate to a node or node list is used to set the value for $current causing navigation. |
| Selection | $repeaterfunction(. . .) | Invokes system function on the identified repeater control. |
| Function | $pageFlow.function(. . .) | Invokes system function. |
| Action | $pageFlow.actionName (. . .) | Invokes user defined action defined in the controller. |

Anchors are typically used either to navigate to a different page, or to select data.

Navigation

Navigation can be achieved by various means; the following example all cause the browser to navigate to the root node.

```
<a href="$root">Example 1</a>
<a href="$pageFlow.navigate($root, 'bar.tmpl')">Example 2</a>
<a href="$pageFlow.foo($root, 'bar.tmpl')">Example 3</a>
function foo($s, $p) {
    return [$s, $p];
}
```

```
<a href="$globalApp.history.home( )">Example
    4</a>
```

Example 1 declares a Spath expression, which is evaluated directly by the controller and used to set the value of $current.

Example 2 calls the system navigate( ) function, which sets $current to the evaluated Spath expression, and uses the optional second parameter to set the template.

Example 3 invokes a user action (defined in the controller file), which uses the passed in parameters to create a forward object (array); this has the same effect as example 2.

Example 4 invokes the home( ) system function, which is called on the $history object.

Selection

The following example shows listing a set of orders and "selecting" one of them to be the "selected" order by clicking on it.

```
<netui:repeater id="foo" source="$current.@@orders.*" iterator=
"$thisorder">
  <a href="$foo.select($thisorder)">{$thisorder.label( )}</a>
</netui:repeater>
```

The Following example displays one order at a time and let the user move forward or backwards through them.

```
<netui:repeater id="foo" source="$current.@@orders.*" iterator=
"$thisorder"
focused="true">
  <tr>
    <td>OrderID: </td><td>{$thisorder.id}</td>
    <td>OrderDate: </td><td>{$thisorder.date}</td>
    <td>OrderAmount: </td><td>{$thisorder.amount}</td>
  </tr>
  <tr>
    <td><a href="$foo.previous( )">Previous</a></td>
    <td><a href="$foo.next( )">Next</a></td>
  </tr>
</netui:repeater>
```

Forms

In one embodiment, to display data, all that is required is an Spath enclosed in curly braces.

For example if $current refers to a contact, then the following would show the contact's name and address:

```
<tr>
  <td>First:</td><td>{$current.name.first}</td>
  <td>Last:</td><td>{$current.name.last}</td>
</tr>
```

But this is a read only model.

In one embodiment, to write to variables, HTML form elements are supported with the addition of the netui:bind attribute to map user input onto the data model.

| Binding | Submit data | Don't submit data |
|---|---|---|
| bind to cache | Create form with submit, form action specifies submit data action | Create form with submit, form action does not specify submit data action |
| don't bind to cache | No way to do this, must change nodes to submit them | Use submit/bind to cache case, except do not hit submit button. |

The following HTML form elements are supported for binding read/write variables.

| HTML Tag | Description |
|---|---|
| <form> | Encloses form elements and specifies action. |
| <input> | General purpose input tag that implements various simple controls based on the value of the type attribute. |
| <textarea> | Allows user to input multiple lines of text. |
| <select> | Allows user to select from a combo list. |

These tags each support the netui:bind attribute, which references a read/write variable using a Spath expression.

```
<input type="inputType"netui:bind="Spath"/>
```

The Spath expression typically references a $context variable. For example:

```
<input type="text"netui:
    bind="$context.address.name"/>
```

The variable is used to set value of input field when the page is rendered.

Bound values are written back into the variable whenever a submit action is invoked (including via the <input type="submit"> tag below) or when a navigation occurs (see anchors, above).

Input Tag

The <input> tag is a general purpose input tag that implements various simple controls based on the value of its type attribute.

```
<input type="inputType"netui:bind="spath-exper"/>
```

The framework adds the netui:bind attribute to the standard attributes supported in XHTML.

The following types of <input> tags are supported.

| Input Type | Variable Type | Description |
|---|---|---|
| text | string | Allows user to input/edit a single line of text. |
| radio | Boolean | Allows user to select a single value from a list of choices. Radio inputs are joined by common netui:bind variables. |
| checkbox | Boolean | Allows user to check a box to add the checkbox 'value' to bound variable. |
| password | string | Allows user to enter a string displaying a series of "*" characters instead of the actual string contents. |
| hidden | string | Allows hidden value to be bound. |
| readonly | string | Allows read-only value to be bound. |
| image | coordinates | Triggers form submit and can optionally bind coordinates of image click to bind variable. |
| button | n/a | Creates a button that does not trigger form submit. |
| submit | n/a | Creates a submit button. |
| reset | n/a | Resets values of input elements to initial values. |

The following examples illustrate the various forms of <input> tag.

```
<input type="text" netui:bind="$context.contact.email"/>
<input type="radio" netui:bind="$context.contact.selected" value="yes"/>
<input type="radio" netui:bind="$context.contact.selected" value="no"/>
<input type="checkbox" value="chinese" netui:bind=
"$context.contact.langsSpoken"/>
<input type="password" netui:bind="$context.login.password"/>
<input type="hidden" netui:bind="$context.contact.MailingCountry"
value="USA"/>
<input type="button" value="press this button"/>
```

radio

The radio tag may be grouped so that only a single value may be selected; each radio tag within the same logical group must bind to the same Spath expression.

```
<p>Selected:
<input type="radio" netui:bind="$context.contact.selected"
value="yes">Yes</input>
<input type="radio" netui:bind="$context.contact.selected"
value="no">No</input>
</p>
```

The currently selected control binds the value specified by the value attribute to the Spath expression. If no value attribute is specified then the Boolean value true is set.

Submit

The submit type defines an onClick attribute, which behaves in the same way as an anchor (see above).

```
<input
    type="submit"onClick="$pageFlow.submitContact(
    )"/>
```

When clicked, this causes all bound variables (on the page) to be written with the current input tag values.

TextArea Tag

The <textarea> tag enables the user to input and edit multiple lines of text, which may involve displaying scrollbars.

```
<textarea netui:bind="spath-expr"/>
```

The framework adds the netui:bind attribute to the standard attributes supported in XHTML.

For example, the following XHTML element creates a <textarea> element that is bound to the comments child element of a note node, which is referenced by the $context variable.

```
<textarea netui:bind="$current.note.comments"/>
```

Select Tag

The <select> tag enables the user to select one of many application defined values from a dropdown control.

```
<select netui:bind="spath-expr"/>
```

The framework adds the netui:bind attribute to the standard attributes supported in HTML.

The contactType schema definition contains a salutation element, which is defined to have the contactSalutationEnum type.

```
<xsd:complexType name="contactType">
  <xsd:sequence>
    <xsd:element name="salutation" type="contactSalutationEnum"/>
    <xsd:element name="first" type="xsd:string"/>
    <xsd:element name="last" type="xsd:string"/>
    <xsd:element name="email" type="xsd:string"/>
  </xsd:sequence>
</xsd:complexType>
<xsd:simpleType name="contactSalutationEnum">
  <xsd:restriction base="xsd:string">
    <xsd:enumeration value="Mr"/>
    <xsd:enumeration value="Mrs"/>
    <xsd:enumeration value="Ms"/>
    <xsd:enumeration value="Dr"/>
  </xsd:restriction>
</xsd:simpleType>
```

The following XHTML is used to create the <select> element.

```
<select netui:bind="$context.contact.salutation">
```

Option values can be declared explicitly:

```
<select netui:bind="$context.contact.salutation">
    <option value="Mr">Mr</option>
    <option value="Ms">Ms</option>
    <option value="Mrs">Mrs</option>
    <option value="Dr">Dr</option>
</select>
```

Alternately, option values can be created using a repeater:

```
<select netui:bind="$context.contact.salutation" iterator="i">
  <netui:repeater source=
  "$globalApp.schema('contactSalutationEnum')">
  <option value="{$i.@value}">{$i.@value}</option>
  </netui:repeater>
</select>
```

Note, the value matching the netui:bind expression is selected as the default option. If the bound value is null, then the first option is selected.

Examples

The following example binds the email context variable to a text input field. The corresponding action can either be invoked using the form's action attribute, or with a nested anchor tag.

```
<form netui:action="$pageFlow.inputEmailAddress( )">
    <input type="text" netui:bind="$context.email"/>
```

-continued

```
    <input type="submit" value="Submit"/>
</form>
```

Typically context variables are first instantiated in a preceding action that causes the template to be displayed. The following anchor invokes the addContact( ) action:

```
<a href="$pageFlow.addContact( )/>Create New Con-
    tact</a>
```

The action then creates three context variables, then directs the controller to display the addContact template. The action first resets all existing context variables, then creates new variables using the assignment operator.

```
function addContact( ) {
    $context.reset( );
    $context.account = $current;
    $context.salutation = " ";
    $context.first = " ";
    $context.last = " ";
    $context.email = " ";
    return ["addContact.tmpl"];
}
```

The addContact template displays a form with bound input fields.

```
<form netui:action="$pageFlow.createContact( )">
  <table><tbody>
    <tr>
      <td>Title</td>
      <td>
        <select netui:bind="$context.salutation">
          <option value="Mr">Mr</option>
          <option value="Ms">Ms</option>
          <option value="Mrs">Mrs</option>
          <option value="Dr">Dr</option>
        </select>
      </td>
    </tr>
    <tr>
      <td>First</td><td><input type="text" netui:bind=
      "$context.first"/></td>
    </tr>
    <tr>
      <td>Last</td><td><input type="text" netui:bind=
      "$context.last"/></td>
    </tr>
    <tr>
      <td>Email</td><td><input type="text" netui:bind=
      "$context.email"/></td>
    </tr>
    <tr colspan="2">
      <td><input type="submit" value="Create"/></td>
    </tr>
  </tbody></table>
</form>
```

When a template containing bound variables invokes an action, the variables can be set with the current XHTML form values. In this case, the submit <input> element invokes the form's createContact action below.

```
function createContact( ) {
  $context.account.@@contacts.create(
    <contact>
      <salutation>{$context.salutation}</salutation>
      <first>{$context.first}</first>
      <last>{$context.last}</last>
```

-continued

```
        <email>{$context.email}</email>
      </contact>
    );
    return ["showContacts.tmpl"];
  }
```

Conditional Tags

The <netui:if> tag can be used to conditionally include XHTML segments based on a computed condition.

```
<netui:if cond="spath-expr"> . . . </netui:if>
```

The cond attribute defines a Spath expression, which is evaluated when the page is rendered. If this expression evaluates to true, then the XHTML segment contained within the <netui:if> element is inserted into the XHTML page.

The expression uses standard Xscript coercion to evaluate a Boolean result. The following expressions all evaluate to true:

```
{true}
{100}
{"some string"}
{<xml>}
{$root}
```

The example below includes the <if> tag to implement conditional template. Here, the $current.email table column is only displayed if the variable is non-null (i.e., empty, or zero length, text); all other values coerce to true.

```
<table><tbody>
  <tr>
    <td>{$current.salutation}</td>
    <td>{$current.first}</td>
    <td>{$current.last}</td>
<netui:if cond="$current.email">
    <td>{$current.email}</td>
</netui:if>
  </tr>
</tbody></table>
```

Note, conditional template can be represented as a property sheet in the template designer.

Repeater Tag

Templates incorporate regular XHTML elements and data from the data graph and system variables. They may also contain elements that generate XHTML when they are rendered.

A repeater is an HTML generator tag that repeats over an element list (e.g., a node list of accounts). The <netui:repeater> is a tag used to repeat the same HTML for element; all child elements of the <netui:repeater> element are repeated for each element in the evaluated Spath expression.

Syntax

```
<netui:repeater
  id="tag-id"
  source="spath-expr"
 [iterator="variable-name"]
 [selected="spath-expr"]
  [orderBy="orderBy-expr"]/>
```

Each <netui:repeater> element has a source attribute that describes a set of nodes it should iterate over. Conceptually, all the XHTML inside of the template gets repeated for each node described by the source attribute. The repeated XHTML segment can access the iterated node instance referenced by the iterator attribute.

Repeaters define the following attributes.

| Attribute | Type | Description |
|---|---|---|
| id | identifier | uniquely defines the repeater tag |
| repeater | SPath | specifies SPath expression, which results in a node list (e.g., $root.@@accounts.*) |
| iterator | iterating variable | defines the variable containing the iterated node; this variable only has scope within the contained XHTML |
| selected | SPath | contains the currently selected node(s); set by the select( ) function; reset when the value of the source expression changes |
| orderBy | String | specified an Xquery-like BNF expression that determines the sort order. |

The following functions may be called on a repeater object.

| Function | Description |
|---|---|
| select($i) | set selected attribute to $i |
| position($node) | returns the ordinal position of the node in the repeater source (or −1 if not found) |
| length( ) | return number of items in list |

Repeating Sections

The following template segment defines a repeater that displays the list of nodes defined by the accounts keyref.

```
<ul>
<netui:repeater id="$repeater1" source="$current.@@accounts.*"
iterator="$i">
  <li>{$i.label( )}</li>
</netui:repeater>
</ul>
```

This creates the following output:

```
Acme
Bancroft
Cyberdine
```

All XHTML elements contained within the <netui:repeater> elements are repeated for each node in the node list defined by the source attribute (i.e., each account node).

Navigating and Selecting

The repeated section may contain anchors that invoke actions or system functions. For example, the repeater below displays a list of accounts, displaying an anchor (hyperlink) with the label of each account.

```
<ul>
<netui:repeater id="$repeater1" source="$current.@@accounts.*"
iterator="$i">
  <li><a href="$pageFlow.navigate($i,
  'showDetail.tmpl')">{$i.label( )}</a></li>
</netui:repeater>
</ul>
```

Clicking on one of the anchors causes the system navigate function to be invoked, causing the controller to navigate to the showDetail.tmpl template with $current set to point at the node referenced by the value of $i for the corresponding repeated element.

Repeaters implement the built-in function, select( ), that enables the user to select a particular element from the list. For example, the following template fragment represents the node list above as a list of HTML anchors:

```
<ul>
<netui:repeater id="$repeater 1" source="$current.@@accounts.*"
iterator="$i">
   <li><a href="$repeater 1.select($i)">{$i.label( )}</a></li>
</netui:repeater>
</ul>
```

Clicking on a particular anchor causes the repeater's selected attribute to be set to the current value of the $i variable. Other parts of the template may reference the repeater's currently selected value.

```
<ul>
<netui:repeater id="$repeater 1" source="$current.@@accounts.*"
iterator="$i">
   <li>
      <a href="$repeater 1.select($i) "
         style='{$repeater 1.selected.contains($i) ?
         "background-color:yellow":""}>
      {$i.label( )}</a>
   </li>
</netui:repeater>
</ul>
```

```
<p>Type: {$ repeater 1.selected.type}<p>
```

This creates the following output:

```
Acme
Bancroft
Cyberdine
Type: Direct
```

Type: Direct

Note, the <a> anchor above declares a style attribute, which contains an Spath expression that changes the background color of the element if the associated item is selected.

The selected attribute can be accessed by other repeaters (known as chaining) and by subsequently invoked actions. The repeated HTML section can also reference the selected attribute to visually indicate the currently selected item(s).

Chained Repeaters

Repeaters can be chained together so that the selection of an element in a parent repeater influences what is displayed in a child repeater. For example, the following repeater displays the list of messages associated with the selected node (Contact) in the previous repeater.

```
<ul>
<netui:repeater id="$repeater 1" source="$current.@@accounts.*"
iterator="$i">
   <li><a href="$ repeater 1.select($i)">{$i.label( )}</a></li>
</netui:repeater>
</ul>
<br/>
<ul>
<netui:repeater id="$repeater2"
source="$ repeater 1.selected.@@contacts.*" iterator="$j">
   <li>$j.label( )</li>
</netui:repeater>
</ul>
```

The following template illustrates nested repeaters that create a multi-columned display (illustrated below).

```
<table><tbody>
  <tr>
    <td>App</td><td>Repeater 1</td><td>Repeater 2</td><td>
    Contacts</td>
  </tr>
  <tr>
    <td>{$current}</td>
    <td><ul>
      <netui:repeater id="$x" source=» $current.@@keyref('*') »
      iterator=» $i » >
        <li><a href="$x.select($i)">{$i}</a></li>
      </netui:repeater>
    </ul></td>
    <td><ul>
      <netui:repeater id="$y" source="$x.selected.*" iterator="$j">
        <li><a href="$y.select($j)">{$j}</a></li>
      </netui:repeater>
    </ul></td>
    <td><ul>
      <netui:repeater source=» $y.selected.@@contacts.* »
      iterator=» $k » >
        <li>{$k}</li>
      </netui:repeater>
    </ul></td>
  </tr>
</tbody></table>
```

The first repeater generates a list of keyref anchors; the second repeater binds its source variable to the previous repeater's selected node, and generates a list of node anchors. The final repeater generates a list of contact nodes. Note, this repeater's source attribute specifically traverses to the contacts keyref—skipping the automated keyref column.

When a repeater's select( ) function is invoked, it automatically triggers the redisplay of the template—modifying the source of dependent repeaters, and setting the selected variable of dependent repeaters to null. Templates must avoid circular dependencies between repeaters. The select mechanism is not considered to be navigation since the template's current cursor is not changed.

The sample above results in the following display:

| App | Repeater 1 | Repeater 2 | Contacts |
|---|---|---|---|
| root | accounts | Acme<br>Bancroft<br>Cyberdine | Sarah Smith<br>David Davies |

The template above represents the navigation part of the UI—enabling the end user to traverse a series of keyrefs.

We can further modify the UI to represent a table of nodes. For example:

```
<td>
  <table><tbody>
    <netui:repeater source="$y.@@contacts.*" iterator="$k">
      <tr>
        <td>{$k.email}</td>
        <td>{$k.label( )}</td>
      </tr>
    </netui:repeater>
  </tbody></table>
</td>
```

This creates the following output:

| App | Repeater 1 | Repeater 2 | Contacts | |
|---|---|---|---|---|
| root | accounts | Acme<br>Bancroft<br>Cyberdine | sarah@acmo.com<br>david@Acme.com | Sarah<br>Smith<br>David<br>Davies |

Focused Repeaters

The repeater may also be defined to be "focused", which means that instead of iterating over the entire collection of elements defined by the source attribute, the repeater only shows one element at a time and maintains a cursor.

The following additional functions may be called on a focused repeater object.

| Function | Description |
|---|---|
| next( ) | if focused, move to next item |
| previous( ) | if focused, move to previous item |
| begin( ) | if focused, move to first item |
| end( ) | if focused, move to last item |
| position( ) | return index position within nodeset |

In the following example, the focus attribute declares that a single node from the nodeset is to be displayed. The action below invokes the template containing the focused repeater and sets $current to the node list relating to the specified account's contact keyref:

```
function selectContacts($account) {
  $context.cursor = $account.*[0];
  return [$account.*,«focusedContacts.tmpl» ];
}
```

The anchors invoke functions on the repeater, which move the repeater's cursor.

```
<netui:repeater id=» $s» source=» $curren»
iterator=» $i» >
  <netui:if cond=» $s.position($context.cursor) == $i.count( )» >
    <td>first</td><td>{$i.first}</td>
    <td>last</td><td>{$i.last}</td>
    <td>email</td><td>{$i.email}</td>
  </netui:if>
</netui:repeater>
<netui:if cond=» $s.position($context.cursor) > 0» >
  <a href=» $context.cursor =
  $current[$s.position($context.cursor)−1]» >previous</a>
</netui:if>
<netui:if cond=» $s.position($context.cursor) < ($s.length( )−1)» >
  <a href=» $context.cursor =
  $current[$s.position($context.cursor)+1]» >next</a>
</netui:if>
```

This creates the following output:

| | | |
|---|---|---|
| first Sarah<br>last Smith<br>email:<br>sarah@acme.com<br>next | first David<br>last Davies<br>email:<br>david@acme.com<br>previous next | first Roger<br>last Reed<br>email:<br>roger@acme.com<br>previous |

By default, focused repeaters set the cursor to point to the first node in the $current node list. If the selected attribute is defined, it is used to set the cursor to the appropriate node (usually defined by a context variable set by a preceding action).

```
<netui:repeater id=» $s» source=» $curren»
iterator=» $i» selected=» $context.selected» >
  <td>first</td><td>{$i.first}</td>
  <td>last</td><td>{$i.last}</td>
  <td>email</td><td>{$i.email}</td>
</netui:repeater>
```

Sorted Repeaters

Repeaters can specify the order in which elements are enumerated by declaring an orderBy attribute. The orderBy attribute is a string that contains an Xquery-like expression:

```
<netui:repeater id=>>id>>source=>>source>>
    iterator=>>var>>orderBy=>>OrderByClause>>>
```

Where OrderByClause is conforms to the following BNF grammar (The Spath expression represent a field value for a particular repeater item):

```
OrderByClause ::= OrderSpec (“,” OrderSpec)*
OrderSpec ::= SPath OrderModifier
OrderModifier ::= (“ascending” | “descending”) ?
              ((“empty” “greatest”) | (“empty” “least”)) ?
                 (“collation” StringLiteral)?
```

Note, the expression assumes a stable order (i.e., order of equal values should be preserved across multiple invocations).

For example, the following repeater lists contacts by the descending value of the contact's last name (i.e., $i.last).

```
<netui:repeater id=» $s» source=» $current.@@contacts.*»
iterator=» $i»
  orderBy=» $i.last descending» >
  <td>last</td><td>{$i.last}</td>
  <td>first</td><td>{$i.first}</td>
  <td>email</td><td>{$i.email}</td>
</netui:repeater>
```

The following repeater sorts by last name in ascending order (i.e., default) and then by first name in descending order.

```
<netui:repeater id=»$s»
source=»$current.@@contacts.*»iterator=»$i»
  orderBy=»$i.last empty least, $i.first descending»>
```

Note, in the example above, empty last name values are to be considered of least significance.

META Data Repeaters

Repeaters can also be used to repeat over META data defined by the data model.

For example, the node.keyref('*') function returns a list of keyref elements that describe the possible navigations from the corresponding nodetype. This may be used as the source of a repeater to display a list of keyrefs.

```
<ul>
<netui:repeater id=“$ repeater1” source=“$current.@@keyref(‘*’)”
iterator=“$i”>
    <li>{$i.label( )}</li>
</netui:repeater>
</ul>
```

The example above would return the following output if $current points to an account node:

owner
subAccounts
contacts
notes
events
quotes

The node.schema( ) function returns an XML document that represents the corresponding nodetype's XML schema definition. This may be used as the source of a repeater to build an input form.

```
<netui:repeater id="repeater1" source="$current.META( ).schema( )"
    showNull="true" iterator="$i">
    <tr>
        <td>{$current.META( ).schema( ).getFieldLabel($i)}</td>
        <td>{$i)</td>
    </tr>
</netui:repeater>
```

The example above produces the following output:

| Salutation | Ms |
|---|---|
| first | Sarah |
| last | Smith |
| email | sarah@acme.com |

Image Tag

The standard XHTML <img> tag is used to display images.

```
<img
    [src="filename"]
    [netui:content="spath-expr"]
        [netui:type="content-type"]/>
```

The image tag defines the following attributes.

| Attribute | Type | Description |
|---|---|---|
| src | string | Filename. |
| netui:content | SPath | Raw binary |
| netui:type | string | Browser supported image type (e.g., "bmp", "gif"). |

In addition to the standard XHTML attributes, the framework supports netui:content and netui:type attributes to declare a SPath expression which references an element that contains the image's binary source. This requires that one of the nodetypes define a suitable element within its XML Schema definition.

For example, the contact schema below has been extended to incorporate an <image> data element.

```
<xsd:complexType name="contactType">
    <xsd:sequence>
        <xsd:element name="salutation" type="contactSalutationEnum"/>
        <xsd:element name="first" type="xsd:string"/>
        <xsd:element name="last" type="xsd:string"/>
        <xsd:element name="email" type="xsd:string"/>
        <xsd:element name="image" type="xsd:base64Binary"/>
    </xsd:sequence>
</xsd:complexType>
```

This would be referred to using the following XHTML:

```
<img netui:content="$current.contactimage"netui:
    type="bmp"/>
```

Include Tag

The standard <netui:include> tag is used to insert referenced

```
<netui:include template="templateFile"
    [$current="spath-expr"]/>
```

The include tag defines a template attribute that names a template to be inserted into the current page. The optional current attribute is used to set the $current variable within the scope of the inserted template.

For example, the following XHTML segment extends the chained repeater example, and incorporates a new repeater ($z), which displays a list of Contacts (for a particular Account, $y). The <netui:include> tag includes the detail.tmpl template and defines its $current variable to be the selected node of the repeater (i.e., a contact node).

```
<td><ul>
    <netui:repeater id="$z" source="$y.@@contacts.*" iterator="$k">
    <li><a href="select($k)">{$k}</a></li>
    </netui:repeater>
</ul></td>
<td>
    <netui:include current="$z.selected" template="detail.tmpl"/>
</td>
```

The detail.tmpl template is defined below.

```
<td>
    <table><tbody>
        <tr><td>Detail</td></tr>
        <tr><td>{$current.label( )}</td></tr>
        <tr><td>{$current.email}</td></tr>
    </tbody></table>
</td>
```

This results in the following output.

| App | Repeater 1 | Repeater 2 | Contacts | Detail |
|---|---|---|---|---|
| root | accounts | Acme<br>Bancroft<br>Cyberdine | Sarah<br>Smith<br>David<br>Davies | David Davies<br>david@Acme.com |

HTML Tag

The <netui:html> tag is used to insert raw XHTML into the current page.

```
<netui:html>{spath-expr}</netui:html>
```

Normally SPath expressions are evaluated and the resulting value is interpreted as a string and not processed as HTML. However, all evaluated SPath expressions contained between the opening and closing <netui:html> tag are inserted into the page as HTML to be processed by the browser.

For example, given the following action code:

```
$current.productDesc="<p>A<b>great</b>new prod-
    uct.</p>";
```

The following template HTML would return the output below:

```
<netui:html>{$current.productDesc}</netui:html>
```

A great new product.

HTML and expressions may be combined within a <netui:html> element. For example, the following template HTML would return the output below:

```
<netui:html>
  <ul><li>{$current.productDesc}</li><li>
  {$current.productDetail}</li><ul>
</netui:html>
```

A great new product.

From the people who brought you WebLogic.

Controller

The controller can be responsible for processing events raised by the user interface and the database in response to external sync messages. The controller can cause action scripts to be executed and templates to be instantiated and displayed by the browser. The default behavior of the controller can be extended by implementing a controller.xpf which is written in ECMAScript for XML and is essentially an ECMAScript version of a JPF).

The controller file can contain action and regular ECMAScript function and global variable definitions.

Page Flow

The controller.xpf file can define the page flow for the application. The client part of an application consists of a controller definition, actions, and a set of templates.

The controller file can consist of XScript function and action definitions. Actions are invoked by templates (and other actions) and can access the same $root, $current and $context variables; they are not able directly to modify the $current variable—instead, they return a forward array that is interpreted by the controller to determine values for $current and $page. Actions are able to modify and add new $context variables, which are used to pass state to and from pages. This context state is also stored on the history stack.

Each application defines a controller file, which should minimally include a definition for the begin function (or action); this is called when an application is run. Minimally, the begin function should return a forward array that contains the filename of the first template to be displayed.

```
function begin( )
{
    return ["home.tmpl"];
}
```

Forward Array

The forward array is an array of XScript objects (i.e., strings, variables, SPath expressions), which are interpreted by the controller to determine the next template to display (i.e., $page variable), and to set values for the $current system variable.

The following types of forward objects are defined:

| Forward Object | Controller Action |
|---|---|
| template-filename | navigate to specified template; i.e., set $page=template-filename |
| spath-expression | navigate to specified node or nodeset; i.e., set $current=spath-expression |
| action-name | invoke another niladic action (actions can be "chained") |
| CONTINUE | redisplay current template |
| BACK | Go back in history stack |
| FORWARD | Go forward in history stack |

The forward array can consist of forward objects in any order. It may not contain multiple SPath expressions, multiple template filenames, or a template filename and a navigational string constant (e.g., "CONTINUE"). The following are all legal forward arrays.

```
return ["BACK"]
return ["home.tmpl"];
return ["home.tmpl", $root.@@accounts.*];
return [nextAction];
return [ ];
```

Note, actions that return nothing, or an empty forward array, do not modify the $page and $current variables; this is equivalent to returning ["CONTINUE"].

In the example below, the action uses a context variable to perform a calculation and on success navigates to the showOrder template. On error, the action sets the error context variable and instructs the controller to remain on the current template.

```
function calulateTotal( ) {
    if ($context.order.qty <= 0) {
        $context.error = "Error: Quantity not set.";
        return ["CONTINUE"];
    }
    $context.order.total = $context.order.price * $context.order.qty;
    return ["showOrder.tmpl"];
}
```

Actions

Actions can provide a mechanism for the application to modify the data, modify the current template, or to affect navigation. For example, actions might create or update a data node, compute a total on a particular nodeset or redirect the browser to a different part of the data model. Since, in one embodiment, templates can only access data stored in the local data cache (or in $context), actions provide a mechanism to interact with external systems (via the internet).

Actions are invoked by template anchors. Action invocations use the same syntax as regular ECMAScript functions, except that they are invoked as methods on the $pageFlow (controller) object.

```
$pageFlow.actionName([param1[, param2[, . . . ]]])
```

Examples

The following anchor declaration invokes the foo( ) action, passing in a string parameter.

```
<a href="$pageFlow.foo('World')">Foo</a>
```

The action definition (defined in controller.xpf) is show below.

```
function foo($p) {
    $context.bar = <hello>{$p}</hello>;
    return ["CONTINUE"];
}
```

In this case, the action sets a $context variable (an XML object containing the input parameter) and returns control to the current template.

The following example returns a forward object that changes the $current variable to point at the nodeset contained by the accounts keyref.

```
function example1($p) {
    . . .
    return [$root.@@accounts.*];
}
```

The following example change $current to point at the root node, and also changes the current template.

```
function example2($p) {
    . . .
    return [$root, "bar.tmpl"];
}
```

Timers

Timers implement a simple eventing mechanism. The addTimer( ) function is used to register a callback function, which is invoked after a specified delay, and optionally at regular intervals.

```
var timerId=$pageFlow.addTimer(callback, delay[,
    period]);
```

The function is called on the $pageflow object and returns an identifier, which uniquely identifies the timer instance.

| Parameter | Type | Description |
|---|---|---|
| callback | function | specifies the name of the function to be invoked; the callback is passed the timer ID and a counter. |
| delay | integer | specifies the initial delay (in milliseconds). |
| period | integer | optionally, specifies the repeat interval (in milliseconds). |

The cancelTimer( ) function is used to cancel the timer.

```
$pageFlow.addTimer(timerId);
```

The function is called on the $pageflow object and returns an identifier, which uniquely identifies the timer instance.

| Parameter | Type | Description |
|---|---|---|
| timerId | int | Identifier for the timer object. |

Example

In the following example, the function foo( ) sets a timer, which immediately schedules the bar( ) function, then repeatedly at 1 second intervals.

```
function foo( ) {
  var timerId = $pageFlow.addTimer(bar, 0, 1000);
}
function bar(timerId, count) {
  $root.select(@@accounts.*.@@contacts.*.@@tasks.*.where
  (.priority == 1));
  if (count == 10) {
    $pageFlow.cancelTimer(timerId);
  }
}
```

Here, the callback function, bar( ) invokes a deep select operation, which polls the server for updates on the data set defined by the SPath expression. The timer is cancelled on the 10th invocation, by calling the cancelTimer( ) system function.

The browser implements a single threaded execution model; therefore, the callback function isn't executed at least until the calling function returns.

History

Each time navigation occurs a <$current×$context×$page> tuple is placed onto the history stack, accessible by the $history system variable.

Calling the back( ) system action causes these values to be rolled back to the previous history state; similarly forward( ) moves these values to the next history state. If the user moves back and then causes a different navigation to occur (i.e., instead of moving forward), then the entire forward history is truncated.

Moving backwards and forwards through the history stack preserves the currently selected values of all repeaters; form values are also preserved since all $context variables are part of the history frame.

The functions defined for the $history object are defined above.

Page Flow Example

Figure 10:
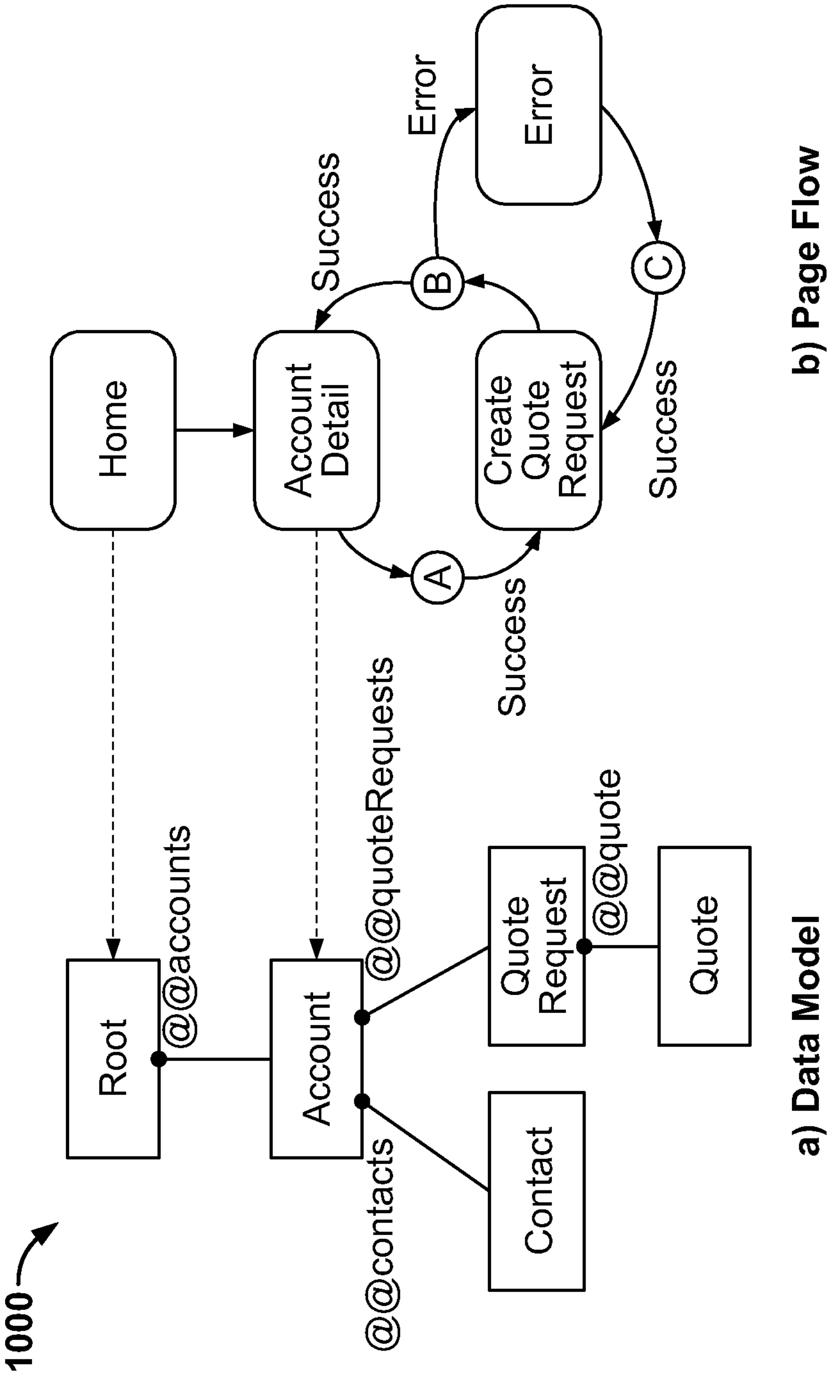
FIG. 10 is an illustration of a page flow for part of a CRM application in accordance with one embodiment of the present invention.

FIG. 10 illustrates a simple page flow for part of the CRM application 1000; diagram a) represents part of the data model (schema and keyrefs); diagram b) represents the page flow, which consists of four templates—each with a dotted line indicating the $current nodetype. This scenario implements a custom operation to initiate a quote request for a particular account. This example illustrates the process of creating a custom object (quote request), which is used as the context of a select operation.

The Home template contains repeaters that enable the user to navigate to a particular account, which invokes the AccountDetail template (see below). The AccountDetail template shows a list of previous price quotes and enables the user to invoke the createQuoteRequest action (A).

```
<a href="$pageFlow.createQuoteRequest( )">Create
    Quote Request</a>
```

This causes the following action to be invoked.

```
function createQuoteRequest( ) {
    $context.quoteRequest.prodId = " ";
    $context.quoteRequest.qty = 0;
    return ["createQuoteRequest.html"];
}
```

This action creates a <quoteRequest> XML object within the current context and sets values for the prodId and qty child elements. Note, this creates a well formed <quoteRequest> element and is equivalent to the following expression:

```
$context.quoteRequest=<quoteRequest><prodId/></
    qty>0<qty></quoteRequest>;
```

The action then returns a "template" forward path, invoking the createQuoteRequest template without changing the $current variable. The createQuoteRequest template is shown below. Note, that $current still points to the account node.

```
<p>Quote Request for {current.label( )}</p>
<table><tbody>
    <tr>
        <td>Product ID</td>
        <td><input netui:bind="$context.quoteRequest.prodId"/></td>
    </tr>
    <tr>
        <td>Quantity</td>
        <td><input netui:bind="$context.quoteRequest.qty"/></td>
    </tr>
```

-continued

```
    <tr>
        <td colspan="2">
            <input type="submit" value="Submit"
            onClick="submitQuoteRequest( )"/>
        </td>
    </tr>
</tbody></table>
```

| Quote Request for Acme | |
|---|---|
| Product ID | |
| Quantity | 0 |
| Submit | |

This template enables the user to edit the <quoteRequest> element created by the previous action. The form submit action copies the current form values into the bound $context variables, then invokes the submitQuoteRequest action (B) below.

```
function submitQuoteRequest( ) {
    if ($context.quoteRequest.prodId != " " ||
    $context.quoteRequest.qty <= 0) {
        return ["CONTINUE"];
    }
    else {
        $current.@@quoteRequests.create($context.quoteRequest);
        return ["BACK"];
    }
}
```

The action performs validation on the <quoteRequest> element's values and returns to the template (CONTINUE) if there is an error. Otherwise, it adds the <quoteRequest> element to the quoteRequests keyref for the current account. Note, the $context.quoteRequest variable is a well-formed <quoteRequest> element containing the values bound from the form, for example:

```
<quoteRequest>
    <prodId>Widget-Z</prodId>
    <qty>1000</qty>
</quoteRequest>
```

On success, the action navigates "BACK" to the previous AccountDetail template (BACK). The AccountDetail template, below, displays the list of synchronized priceQuotes.

```
<p>Account: {$current}</p>
<td>Product ID</td><td>Quantity</td><td>Price</td>
<netui:repeater source="$current.@@quoteRequests.*" iterator="i">
    <td>{$i.prodId}</td>
    <td>{$i.qty}</td>
    <td>{$i.@@quote.price}</td>
</netui:repeater>
```

```
<a href="$pageFlow.createQuoteRequest( )">Create
    Quote Request</a>
```

This template would create the display below:

| Account: Acme | | |
|---|---|---|
| Product ID | Quantity | Price |
| Widget-X | 100 | 2000.00 |
| Widget-Y | 200 | 1575.00 |
| Widget-Z | 1000 | |
| Create Quote Request | | |

Note, the submitQuoteRequest action above returns immediately, so the new quoteRequest node will not display a price field until the server has responded with a synchronized quote node.

Building the Prototype

To build and run the prototype, the following applications need to be installed: Apache Ant, Sun JAVA JDK, Perforce client, BEA Workshop 8.1. The following environment variables should also be set.

| Environment Variable | Typical Value | Meaning |
|---|---|---|
| ANT_HOME | C:\JAVA\apache-ant-1.5.3-1 | ant home directory |
| BEA_HOME | C:\bea\weblogic81 | BEA platform directory |
| JAVA_HOME | C:\JAVA\j2sdk1.4.2 | JAVA home directory |
| Path | | ant, JAVA, perforce bin paths |

This tutorial assumes that a Perforce client has been set-up and with a view mapping //alchemy/mas to C:\alchemy\mas. Use the following commands to sync the latest source code and rebuild the framework.

```
C:\alchemy\mas> p4 sync
C:\alchemy\mas> ant rebuild
```

Running Applications

The prototype browser can be invoked via the browser's ant build file (\alchemy\mas\src\browser\build.xml).

The following runtime variables are defined:

| Runtime Variable | Meaning |
|---|---|
| mas.appname | name of application to run at start-up or " " |
| client.geometry | browser window size (e.g., 400 × 200) |

For example, the following command invokes the browser, running the navigator application with the specified window size.

```
ant-f . . . \ . . . \src\browser\bulid.xml-
    Dmas.appname=crm-Dclient.geometry=400×200
    run
```

It is convenient to create a batch file (e.g., run.bat) to invoke this command.

The browser can also be configured by setting the following environment variables:

| Environment Variable | Meaning |
|---|---|
| MAS_APPNAME | default application name |
| MAS_PROPS | application properties |

The properties variable may include the following settings:

| Property | Default Value | Meaning |
|---|---|---|
| mas.appname | none | Specify application to run. |
| mas.approot | none | Specifies the application directory for the server component (only applicable if mas.singleproc is set to false); note, client and server application directories should be different. |
| mas.client.appname | same as mas.appname | Specifies an alternative client to run against the server application; this option enables generic client's (e.g., the navigator) to interpret the application's META data. |
| mas.client.approot | \alchemy\mas\apps | Specifies the application directory for the client. |
| mas.client.clobber | false | If true, then server updates over locally modified nodes. |
| mas.singleproc | true | If true, the browser and server runs standalone in a single JVM; this requires that applications are already locally deployed. |
| mas.persistent | false | Determines whether or not the client cache is persistent. |
| mas.serverCache | true | Determines whether or not the server cache is used. |
| mas.username | none | Supplies user's login name. |
| mas.password | none | Supplies user's password. |

For example, the following command runs the browser in client mode and turns on data persistence:

```
set MAS_PROPS=-Dmas.singleproc=false-
    Dpersistent=true
```

Note, the Web service URL defined in the service definition (conduit META file) can be mapped to a physical server by declaring a physical IP address in the Windows hosts file (C:\WINDOWS\SYSTEM32\DRIVERS\ETC\hosts); for example, the following hosts file declaration maps the Web service above onto the alchemy test server.

172.17.33.34 example.com

Debugging

All errors and trace information is written to the \alchemy\mas\alchemy.log file.

Application Packaging

The table below represents the file and directory structure for an individual MAS application.

| | | |
|---|---|---|
| apps/ | | Application root directory |
| appName/ | | Application sub directory |
| run.bat | | Client start-up script |
| schemas/ | *.xsd | Application nodetypes |
| METAdata/ | *.xml | Conduit META and keyrefs |
| client/ | | Client application files |
| | controller.xpf | Page flow file |
| | *.tmpl | Template files |
| .mas/ | | Cache files (client/server) |
| workshop/ | | Demo WS projects |

The prototype loads all files within the schemas and META directories.

The application root directory (/apps) corresponds to the mas.approot and mas.client.approot runtime properties (above).

Deploying and Managing Applications

Applications can be deployed to the client from the MAS (running within Workshop).

1. Workshop must be running the application manager server (see below).

2. The application components (controller templates, META files, and schema files above) must first be zipped into a single file (app.zip); to do this, create a new zip file, then drag the entire app folder (e.g., \mas\apps\crm) into WinZip (make sure "save full path info" in NOT checked).
3. View the application admin page: http://www.localhost.com:7001/mas. Note, this may take a while.
   i. Click "Browse . . . " and select the zip file;
   ii. Click "Deploy" to upload the application to the server (in the location defined by the mas.approot property above).
4. The admin page displays the deploy URL for each application.
5. To "install" the application on the client, run the mobile browser in single process mode (without specifying an mas.app property; this will invoke the app selector dialog.

```
set MAS_PROPS=-Dmas.singleproc=false

ant-f . . . \ . . . \src\browser\bulid.xml run
```

6. Enter the application URL into the appropriate edit box and click OK.

Running the Application Manager Server

1. Set the following global environment variable

```
set JAVA_OPTIONS=-Dmas.approot=c:\al-
    chemy\mas\apps
```

2. Load \alchemy\mas\src\masjws.work into workshop
3. Double-click the controller.jpf file in the project pane
4. If prompted for library upgrade, say yes then click Install. The red "could not be replaced" warnings are safe to ignore
5. Start the server (Tools 4 WebLogic Server 4 Start WebLogic Server)
6. After the server's started, run the following command (safe to ignore the WebLogic deployment errors).

```
C:\alchemy\mas >ant deploy
```

7. From Workshop, click the run button (green triangle) with the Controller.jpf file selected. Eventually (after the standard slow server bootstrap stuff) you should see a web page enumerating installed applications and their URLs, along with a Deploy button to upload a new app.
8. Create c:\temp\apps for client app deployments
9. Set the following environment variable:
   set MAS_PROPS=-Dmas.client.approot=c:\temp\apps-Dmas.singleproc=false
10. Run the following command:

```
C:\alchemy\mas\src\browser >ant run
```

11. Paste any of the URLs listed in the web page (above) into the dialog and click Install.

Eventually the application will be listed in the combo box up top, and you can log in.

MAS Schema Definitions

Application schema definitions should import the public MAS schema file using the following schema directive:

```
<xsd:import namespace="urn:
    bea.mas"schemaLocation="mas.xsd"/>
```

The MAS schema file contains definitions for all framework XML types.

```
<?xml version="1.0" encoding="UTF-8"?>
<xsd:schema targetNamespace="urn:bea.mas" xmlns="urn:bea.mas"
    xmlns:xsd="http://www.w3.org/2001/XMLSchema"
    elementFormDefault="qualified"
```

-continued

```
    attributeFormDefault="unqualified">
    <xsd:simpleType name="idType">
        <xsd:restriction base="xsd:anySimpleType"/>
    </xsd:simpleType>
    <xsd:complexType name="nodeSetType">
        <xsd:sequence>
            <xsd:any minOccurs="1" maxOccurs="1"/>
        </xsd:sequence>
        <xsd:attribute name="keyref" type="xsd:string"
        use="required"/>
    </xsd:complexType>
    <xsd:complexType name="rootType"/>
    <xsd:element name="root" type="rootType"/>
    <xsd:complexType name="graphType">
        <xsd:sequence>
            <xsd:element ref="root"/>
        </xsd:sequence>
    </xsd:complexType>
    <xsd:complexType name="errorType">
        <xsd:sequence minOccurs="0" maxOccurs="unbounded">
            <xsd:choice>
                <xsd:element name="pkey" type="idType"/>
                <xsd:element name="system"
                type="systemErrorType"/>
                <xsd:element name="message" type="xsd:string"/>
                <xsd:element name="field" type="fieldErrorType"/>
            </xsd:choice>
        </xsd:sequence>
    </xsd:complexType>
    <xsd:complexType name="systemErrorType">
        <xsd:sequence>
            <xsd:element name="code" type="xsd:anySimpleType"/>
            <xsd:element name="message" type="xsd:string"/>
        </xsd:sequence>
    </xsd:complexType>
    <xsd:complexType name="fieldErrorType">
        <xsd:sequence>
            <xsd:element name="code" type="xsd:anySimpleType"/>
            <xsd:element name="message" type="xsd:string"/>
        </xsd:sequence>
        <xsd:attribute name="xpath" type="xsd:string"/>
    </xsd:complexType>
</xsd:schema>
```

Automatic User Interface

The framework incorporates an automatic browser (called the navigator), which can be used to traverse the node graph. The output below would be generated from the CRM example using the following command line syntax.

```
ant-f . . . \ . . . \src\browser\bulid.xml-Dmas.app=crm-
    Dmas.client.app=navigator run
```

The navigator first shows all keyrefs associated with the root node (i.e., accounts).

| Node | Keyref |
|---|---|
| root | accounts |

When a keyref is selected, the corresponding nodes are displayed; in this case, the accounts keyref is selected and the corresponding account nodes are displayed.

| Node | Keyref | Node |
|---|---|---|
| root | accounts | Acme<br>Bancroft<br>Cyberdine |

Next, an account node is selected, and the keyrefs associated with the account nodetype (i.e., sourceType="account") are displayed.

| Node | Keyref | Node | Keyref |
|---|---|---|---|
| root | accounts | Acme<br>Bancroft<br>Cyberdine | owner<br>subAccounts<br>contacts<br>notes<br>events<br>tasks<br>quotes |

Now, when the contacts keyref is selected, the corresponding list of contact nodes displayed.

| Node | Keyref | Node | Keyref | Node |
|---|---|---|---|---|
| root | accounts | Acme<br>Bancroft<br>Cyberdine | owner<br>subAccounts<br>contacts<br>notes<br>events<br>tasks<br>quotes | Sarah<br>Smith<br>Roger Reed<br>David<br>Davies |

This navigator uses the same template repeater and navigation mechanism described above. Therefore, it is possible incrementally to extend the default navigator with custom templates, actions, and page flows.

The automatic UI consists of two templates: the first is the "navigator" template, which displays the currently "focused" node ($current) and a list of keyrefs that the user can navigate to; the second template is the "detail" form view of a particular node.

In the navigator template, once a keyref is selected, the node list of the associated nodeset is displayed as a list.

```
<table><tbody>
  </tr>
    <td><b>{$current}</b></td>
  </tr>
  <tr>
    <netui:repeater id="$x" source="$current.keyref('*').*" iterator="$i">
      <td><img src="bullet.gif"></td>
      <td><a href="select($i)">{$i}</a></td>
    </netui:repeater>
  </tr>
  <tr>
    <netui:repeater id="$y" source="$x.selected.*" iterator="$j">
      <td><a href="$pageFlow.navigate($j, 'navigator.tmpl')">
  NAV</a></td>
      <td><a href="$pageFlow.navigate($j, 'detail.tmpl')">{$j}</a></td>
    </netui:repeater>
  </tr>
</tbody></table>
```

Two anchors (hyperlinks) are displayed per node in the node list: the first anchor, "NAV", enables the user to navigate to the associated node, redisplaying the current navigator template with the selected node, $j, as $current; the second anchor (which displays the coerced node $j's label) navigates to the detail template below.

```
<table><tbody>
  <tr colspan="2">
    <td><b>{$current.label( )}</b></td>
  </tr>
  <netui:repeater id="$i1" source="$current.*" iterator="$i">
    <tr>
      <td>{$current.name( )}</td>
      <td>{$i}</td>
```

-continued

```
      </tr>
    </netui:repeater>
  </tbody></table>
```

The detail template displays the current node label and contains a repeater that iterates through the node's XML document and displays the element tag name and the corresponding value.

The output of the automatic browser navigating the CRM example is illustrated below.

| Root | Acme | Sarah Smith |
|---|---|---|
| Accounts | SubAccounts | Title: Ms |
| | Contacts | first: Sarah |
| | Notes | last: Smith |
| | Events | email: |
| | Tasks | sarah@acme.com |
| NAV Acme | NAV Sarah Smith | |
| NAV Bancroft | NAV Roger Reed | |
| NAV Cyberdine | NAV David Davies | |

The first page show the navigator template focused on the root node; the user selects the accounts keyref and then drills down on the "Acme" account. This navigates to the same navigator template, setting $current to point to the "Acme" account node. The user then selects the contats keyref and clicks on the contact record for "Sarah Smith"; this time, the navigator displays the detail template with $current set to the node representing the contact.

The browser's back button enables the user to navigate back from the detail template to the navigator template.

CRM Use Case Data Model Definitions

This section details all of the application components for a sample CRM application.

Data Model

As discussed above, FIG. 5 illustrates the Entity Relationship Diagram (ERD) for the CRM application.

The root and user nodes are system nodetypes. The root node represents the root of the virtual XML document representing the data that an individual user has access to. The user node represents an individual user of the system and is automatically generated by the system.

The root node contains account nodes and defines the accounts keyref. Each account node may contain contact, event, note, and task nodes, and defines corresponding keyrefs. Similarly, each contact node may contain event, note, and task nodes. The account node may also contain subaccounts and defines the subAccounts keyref.

Both the account and contact nodes contain an owner keyref, which references system users; similarly, task and event nodes define an assigned (user) keyref. All of these keyrefs have a cardinality of 1.

Schema and Keyref Definitions

The following sections detail the five application schemas; these are all defined in the/schemas/crm.xsd file.

```
<?xml version="1.0"?>
<xsd:schema targetNamespace="http://example.com/"
  elementFormDefault="qualified" attributeFormDefault="unqualified"
  xmlns:xsd="http://www.w3.org/2001/XMLSchema"
  xmlns:mas="urn:bea.com"
  xmlns="http://example.com/">
```

Account Type

The account nodetype is defined by the following schema.

```
<xsd:complexType name="accountType">
  <xsd:all>
    <xsd:element name="name" type="xsd:string"/>
    <xsd:element name="type" type="accountTypeEnum"/>
  </xsd:all>
  <xsd:attribute name="id" type="xsd:string" mas:type="pkey"/>
  <xsd:attribute name="timestamp" type="xsd:string"
  mas:type="seq"/>
  <xsd:attribute name="ownerId" type="xsd:string"/>
  <xsd:attribute name="parentAccountId" type="xsd:string"/>
</xsd:complexType>
<xsd:simpleType name="accountTypeEnum">
  <xsd:restriction base="xsd:string">
    <xsd:enumeration value="Direct"/>
    <xsd:enumeration value="Web"/>
    <xsd:enumeration value="Channel"/>
    <xsd:enumeration value="Partner"/>
  </xsd:restriction>
</xsd:simpleType>
```

Note, the account type defines a simple label declaration, which consists of the name element. Also, the type field has a set of constrained values defined by the accoutType simple type definition.

The following section shows the top of the/conduit/crm.jsx file, showing the first declared keyref. Note, the application is declared in the app namespace.

```
<?xml version="1.0"?>
<graphMETA xmlns="run:bea.com"
  xmlns:mas="run:bea.com"
  xmlns:app="http://example.com/">
<keyref name="account" sourceType="mas:root" targetType=
"app:account">
  . . .
</keyref>
. . .
</graphMETA>
```

The accounts keyref relates the user's root node to a set of account nodes. In the CRM application, this is the only keyref bound to the root node.

```
<keyref name="accounts"sourceType="mas:
    root"targetType="app:account"/>
```

The following keyref definitions relate to the account nodetype (i.e., all have app:account declared as the sourceType attribute). Accounts contain sub-accounts (subAccounts), and sets of nodes for contacts, notes, events, tasks, and quote requests.

```
<keyref name="subAccounts" sourceType="app:account"
targetType="app:account"/>
<keyref name="contacts" sourceType="app:account"
targetType="app:contact"/>
<keyref name="notes" sourceType="app:account" targetType="app:note"/>
<keyref name="events" sourceType="app:account"
targetType="app:event"/>
<keyref name="tasks" sourceType="app:account" targetType="app:task"/>
<keyref name="quotes" sourceType="app:account"
targetType="app:quoteRequest"/>
```

The account nodetype also contains a reference (lookup) to a single user node, which represents the current owner of the node. This is expressed by the following declaration, which specifies cardinality constraints (exactly 1).

```
<keyref name="owner" sourceType="app:account" targetType="mas:user"
  minOccurs="1" maxOccurs="1"/>
```

Contact Type

The contact nodetype is defined by the following schema.

```
<xsd:element name="contact" type="contactType">
  <xsd:annotation>
    <xsd:appinfo>
      <mas:nodeAnnotation>
        <mas:label>$node.first + " " + $node.last</mas:label>
      </mas:nodeAnnotation>
    </xsd:appinfo>
  </xsd:annotation>
</xsd:element>
<xsd:complexType name="contactType">
  <xsd:sequence>
    <xsd:element name="salutation" type="contactSalutationEnum"/>
    <xsd:element name="first" type="xsd:string"/>
    <xsd:element name="last" type="xsd:string"/>
    <xsd:element name="email" type="xsd:string"/>
  </xsd:sequence>
</xsd:complexType>
<xsd:simpleType name="contactSalutationEnum">
  <xsd:restriction base="xsd:string">
    <xsd:enumeration value="Mr"/>
    <xsd:enumeration value="Mrs"/>
    <xsd:enumeration value="Ms"/>
    <xsd:enumeration value="Dr"/>
  </xsd:restriction>
</xsd:simpleType>
```

Note, the account nodetype defines a label declaration, which consists of the first and last name elements. Also, the salutation field has a set of constrained values defined by the contactSalutationEnum simple type definition.

The following keyref definitions relate to the contact nodetype (i.e., all have app:contact declared as the sourceType attribute). Accounts contain sets of nodes for notes, events, and tasks.

```
<keyref name="notes" sourceType="app:contact" targetType="app:note"/>
<keyref name="events" sourceType="app:contact" targetType="app:
event"/>
<keyref name="tasks" sourceType="app:contact" targetType="app:task"/>
```

The contact nodetype also contains a reference (lookup) to a single user node, which represents the current owner of the node. This is expressed by the following declaration, which specifies cardinality constraints (exactly 1).

```
<keyref name="owner" sourceType="app:contact" targetType="mas:user"
    minOccurs="1" maxOccurs="1"/>
```

Note Type

The note nodetype is defined by the following schema.

```
<xsd:element name="note" type="noteType">
  <xsd:annotation>
    <xsd:appinfo>
      <mas:nodeAnnotation>
        <mas:label>$node.title</mas:label>
      </mas:nodeAnnotation>
    </xsd:appinfo>
  </xsd:annotation>
</xsd:element>
<xsd:complexType name="noteType">
  <xsd:sequence>
```

-continued

```
    <xsd:element name="title" type="xsd:string"/>
    <xsd:element name="body" type="xsd:string"/>
  </xsd:sequence>
</xsd:complexType>
```

Notes do not contain keyref definitions.

Event Type

The event nodetype is defined by the following schema.

```
<xsd:element name="event" type="eventType">
  <xsd:annotation>
    <xsd:appinfo>
      <mas:nodeAnnotation>
        <mas:label>$node.title</mas:label>
      </mas:nodeAnnotation>
    </xsd:appinfo>
  </xsd:annotation>
</xsd:element>
<xsd:complexType name="eventType">
  <xsd:sequence>
    <xsd:element name="title" type="xsd:string"/>
  </xsd:sequence>
</xsd:complexType>
```

The event nodetype also contains a reference (lookup) to a single user node, which represents the current assigned user of the event. This is expressed by the following declaration, which specifies cardinality constraints (exactly 1).

```
<keyref name="assigned" sourceType="app:event" targetType="mas:user"
    minOccurs="1" maxOccurs="1"/>
```

Task Type

The task nodetype is defined by the following schema.

```
<xsd:element name="task" type="taskType">
  <xsd:annotation>
    <xsd:appinfo>
      <mas:nodeAnnotation>
        <mas:label>$node.title</mas:label>
      </mas:nodeAnnotation>
    </xsd:appinfo>
  </xsd:annotation>
</xsd:element>
<xsd:complexType name="taskType">
  <xsd:sequence>
    <xsd:element name="title" type="xsd:string"/>
    <xsd:element name="status" type="taskStatusEnum"/>
  </xsd:sequence>
</xsd:complexType>
<xsd:simpleType name="taskStatusEnum">
  <xsd:restriction base="xsd:string">
    <xsd:enumeration value="Not started"/>
    <xsd:enumeration value="In progress"/>
    <xsd:enumeration value="Completed"/>
    <xsd:enumeration value="Deferred"/>
  </xsd:restriction>
</xsd:simpleType>
```

The task nodetype also contains a reference (lookup) to a single user node, which represents the current assigned user of the event. This is expressed by the following declaration, which specifies cardinality constraints (exactly 1).

```
<keyref name="assigned" sourceType="app:task" targetType="mas:user"
    minOccurs="1" maxOccurs="1"/>
```

QuoteRequest Type

The quoteRequest nodetype is defined by the following schema.

```
<?xml version="1.0"?>
<xsd:schema targetNamespace="http://example.com/"
    elementFormDefault="qualified" attributeFormDefault="unqualified"
    xmlns:xsd="http://www.w3.org/2001/XMLSchema"
    xmlns:mas="run:bea.com"
    xmlns="http://example.com/">
<xsd:element name="quoteRequest" type="quoteRequestType"/>
<xsd:complexType name="quoteRequestType">
    <xsd:sequence>
        <xsd:element name="prodId" type="xsd:string"/>
        <xsd:element name="qty" type="xsd:integer"/>
        <xsd:element name="response" minOccurs="0"
type="quoteRequestResponseType"/>
    </xsd:sequence>
</xsd:complexType>
<xsd:complexType name="quoteRequestResponseType">
    <xsd:sequence>
        <xsd:element name="price" type="xsd:double"/>
    </xsd:sequence>
</xsd:complexType>
</xsd:schema>
```

Sample Application Schema

The following section illustrates application data for the virtual data graph, which is accessed by the client programming model.

The framework generates the following XML Schema definition for the application data.

```
<?xml version="1.0"?>
<xsd:schema targetNamespace="http://example.com/"
    elementFormDefault="qualified" attributeFormDefault="unqualified"
    xmlns:xsd="http://www.w3.org/2001/XMLSchema"
    xmlns:mas="run:bea.com"
    xmlns="http://example.com/">
<xsd:element name="graph">
    <xsd:complexType>
        <xsd:sequence>
            <xsd:element ref="root" minOccurs="1" maxOccurs="1">
            <xsd:element ref="account" maxOccurs="unbounded">
            <xsd:element ref="contact" maxOccurs="unbounded">
            <xsd:element ref="note" maxOccurs="unbounded">
            <xsd:element ref="event" maxOccurs="unbounded">
            <xsd:element ref="task" maxOccurs="unbounded">
        </xsd:sequence>
    </xsd:complexType>
</xsd:element>
...
</xsd:schema>
```

The graph element represents the top level element of the application data model; this contains exactly one root node declaration, plus unlimited declarations for each node of each of the application schemas (account, contact, note, event, and task).

The following type definitions are generated from the application schema and keyref definitions.

```
<xsd:element name="account">
    <xsd:complexType>
        <xsd:sequence>
            <xsd:element name="name" type="xsd:string"/>
            <xsd:element name="type" type="accountType"/>
        </xsd:sequence>
    </xsd:complexType>
</xsd:element>
<xsd:element name="contact">
    <xsd:complexType>
        <xsd:sequence>
            <xsd:element name="salutation" type="contactSalutationEnum"/>
            <xsd:element name="first" type="xsd:string"/>
            <xsd:element name="last" type="addressType"/>
            <xsd:element name="email" type="xsd:string"/>
        </xsd:sequence>
    </xsd:complexType>
</xsd:element>
...
<xsd:element name="note">
    <xsd:complexType>
        <xsd:sequence>
            <xsd:element name="title" type="xsd:string"/>
            <xsd:element name="body" type="xsd:string"/>
        </xsd:sequence>
    </xsd:complexType>
</xsd:element>
<xsd:element name="event">
    <xsd:complexType>
        <xsd:sequence>
            <xsd:element name="title" type="xsd:string"/>
        </xsd:sequence>
    </xsd:complexType>
</xsd:element>
<xsd:element name="task">
    <xsd:complexType>
        <xsd:sequence>
            <xsd:element name="title" type="xsd:string"/>
            <xsd:element name="status" type="taskStatusEnurn"/>
        </xsd:sequence>
    </xsd:complexType>
</xsd:element>
...
```

Sample Application Data

The system has three users, "alex", "bob", and "carol" (these are system objects not shown in the virtual graph).

```
<graph>
<root accounts="a1 a2"/>
<account id="a1" owner="bob" contacts="c1 c2" notes="n1" events="e1" tasks="t1">
    <name>Acme</name>
    <type>Direct</type>
</account>
<account id="a2" owner="bob" contacts="c3">
    <name>Bancroft</name>
    <type>Web</type>
</account>
<contact id="c1" owner="bob" events="e2" tasks="t2">
    <salutation>Mr</salutation>
    <first>Roger</first>
    <last>Reed</last>
    <email>roger@acme.com</email>
</contact>
<contact id="c2" owner="bob" notes="n2">
    <salutation>Ms</salutation>
    <first>Sarah</first>
    <last>Smith</last>
    <email>sarah@acme.com</email>
</contact>
<contact id="c2" owner="bob" notes="n2">
    <salutation>Ms</salutation>
    <first>Sarah</first>
    <last>Smith</last>
    <email>sarah@acme.com</email>
</contact>
<note id="n1">
    <title>ROI information</title>
    <body>Attached document details ROI for product</body>
</note>
<note id="n2">
    <title>Customer requirements</title>
    <body>Attached document presents customer's current and anticipated needs</body>
</note>
```

-continued

```
<event id="e1" assigned="fred">
  <title>Sales meeting</title>
</event>
<event id="e2" assigned="fred">
  <title>Product demonstration</title>
</event>
<task id="t1" assigned="fred">
  <title>Prepare RFP for sales call</title>
  <status>Not started</status>
</task>
<task id="t2" assigned="fred">
  <title>Send white paper to customer</title>
  <status>Completed</status>
</task>
</graph>
```

Sample SPath Expressions

The following section illustrates some SPath expressions and the expected values based on the sample data above.

The following expression returns the nodeset (list of nodes) for the accounts keyref.

```
$root.@@accounts.*
```

```
<account id="a1" owner="bob" contacts="c1 c2" notes="n1" events="e1"
tasks="t1">
  <name>Acme</name>
  <type>Direct</type>
</account>
<account id="a2" owner="bob" contacts="c3">
  <name>Bancroft</name>
  <type>Web</type>
</account>
```

The following expression returns a set of name elements for all account nodes.

```
$root.@@accounts.*.name
Acme
Bancroft
```

The following expression returns all contacts for all accounts named Acme.

```
$root.@@accounts.*.where(name=="Acme")
    .@@contacts.*
```

```
<contact id="c1" owner="bob" events="e2" tasks="t2">
  <salutation>Mr</salutation>
  <first>Roger</first>
  <last>Reed</last>
  <email>roger@acme.com</email>
</contact>
<contact id="c2" owner="bob" notes="n2">
  <salutation>Ms</salutation>
  <first>Sarah</first>
  <last>Smith</last>
  <email>sarah@acme.com</email>
</contact>
```

The following expression returns all contacts (for all accounts) with the specified email address.

```
var $contactX=$root.@@accounts.*.@@contacts
    where(email=="sarah@acme.com")
```

```
<contact id="c2" owner="bob" events="e2" tasks="t2">
  <salutation>Ms</salutation>
  <first>Sarah</first>
  <last>Smith</last>
  <email>sarah@acme.com</email>
</contact>
```

The following expression sets the value for the <salutation> element within the $contactX node.

```
$contactX.salutation="Mrs"
```

```
<contact id="c2" owner="bob" events="e2" tasks="t2">
  <salutation>Mrs</salutation>
  <first>Sarah</first>
  <last>Smith</last>
  <email>sarah@acme.com</email>
</contact>
```

The following expression creates a new contact for the specified account. Note, it uses the system variable to set the owner attribute.

```
$accountX.@@contacts.create(
  <contact ownerId="$globalApp.user">
    <salutation>Dr</salutation>
    <first>David</first>
    <last>Daniels</last>
    <email>david@acme.com</email>
  </contact>
);
```

The following expression creates a new task for the specified contact; it then modifies the assigned keyref.

```
var $newTask = <task>
  <title>Perpare RFP</title>
  <status>Not started</status>
</task>
$contactX.@@tasks.create($newTask);
$newTask.@@assigned = $root.@@users.*.where(.username == "fred");
```

CRM Use Case Web service Definitions

This section shows parts of the WSDL (generated by Workshop) for the example CRM Web service.

```
<?xml version="1.0" encoding="utf-8"?>
<definitions xmlns="http://schemas.xmlsoap.org/wsdl/"
  xmlns:conv="http://www.openuri.org/2002/04/soap/conversation/"
  xmlns:cw="http://www.openuri.org/2002/04/wsdl/conversation/"
  xmlns:http="http://schemas.xmlsoap.org/wsdl/http/"
  xmlns:jms="http://www.openuri.org/2002/04/wsdl/jms/"
  xmlns:mime="http://schemas.xmlsoap.org/wsdl/mime/"
  xmlns:s="http://www.w3.org/2001/XMLSchema"
  xmlns:s0="http://www.openuri.org/"
  xmlns:soap="http://schemas.xmlsoap.org/wsdl/soap/"
  xmlns:soapenc="http://schemas.xmlsoap.org/soap/encoding/"
  targetNamespace="http://www.openuri.org/">
  . . .
```

Type Definitions

The WSDL contains two kinds of type definitions: input and output type definitions for message parameters; and, field type definitions (for individual complex types).

The <types> section contains schema definitions for operation input and output types, and for complex elements that are passed as operation parameters.

The following type definitions relate to input (getAccountsByUser) and output (getAccountsByUserResponse) message type for the getAccountsByUser Web service operation.

```
<types>
  <s:schema xmlns:s="http://www.w3.org/2001/XMLSchema"
    mlns:ope="http://www.openuri.org/" elementFormDefault="qualified"
    targetNamespace="http://www.openuri.org/">
  <s:element name="getAccountsByUser">
    <s:complexType>
      <s:sequence>
        <s:element name="userId" type="s:string" minOccurs="0"/>
      </s:sequence>
    </s:complexType>
  </s:element>
  <s:element name="getAccountsByUserResponse">
    <s:complexType>
      <s:sequence>
        <s:element name="getAccountsByUserResult" type=
        "ope:ArrayOfAccount"
          minOccurs="0"/>
      </s:sequence>
    </s:complexType>
  </s:element>
```

The following type definitions define complex types for parameters referenced in the input/output operation definitions above.

```
<s:complexType name="ArrayOfAccount">
  <s:sequence>
    <s:element name="Account" type="ope:Account" nillable="true"
      minOccurs="0" maxOccurs="unbounded"/>
  </s:sequence>
</s:complexType>
<s:element name="Account" nillable="true" type="ope:Account"/>
<s:complexType name="Account">
  <s:sequence>
    <s:element name="id" type="s:string"/>
    <s:element name="timestamp" type="s:string"/>
    <s:element name="name" type="s:string" minOccurs="0"/>
    <s:element name="type" type="s:string" minOccurs="0"/>
    <s:element name="ownerId" type="s:string" minOccurs="0"/>
  </s:sequence>
</s:complexType>
</s:schema>
```

The following type definitions all relate to the getContactsByAccount and addContactToAccount Web service operations.

```
  <s:element name="getContactsByAccount">
    <s:complexType>
      <s:sequence>
        <s:element name="accountId" type="s:string" minOccurs="0"/>
      </s:sequence>
    </s:complexType>
  </s:element>
  <s:element name="getContactsByAccountResponse">
    <s:complexType>
      <s:sequence>
        <s:element name="getContactsByAccountResult"
        type="ope:ArrayOfContact"
          minOccurs="0"/>
      </s:sequence>
    </s:complexType>
  </s:element>
  <s:element name="addContactToAccount">
    <s:complexType>
      <s:sequence>
        <s:element name="accountId" type="s:string" minOccurs="0"/>
        <s:element name="contact" type="ope:Contact" minOccurs="0"/>
      </s:sequence>
```

-continued

```
      </s:complexType>
    </s:element>
    <s:element name="addContactToAccountResponse">
      <s:complexType>
        <s:sequence>
          <s:element name="addContactToAccountResult" type="s:string"
            minOccurs="0"/>
        </s:sequence>
      </s:complexType>
    </s:element>
    <s:complexType name="ArrayOfContact">
      <s:sequence>
        <s:element name="Contact" type="ope:Contact" nillable="true"
          minOccurs="0" maxOccurs="unbounded"/>
      </s:sequence>
    </s:complexType>
    <s:element name="Contact" nillable="true" type="ope:Contact"/>
    <s:complexType name="Contact">
      <s:sequence>
        <s:element name="id" type="s:string"/>
        <s:element name="timestamp" type="s:string"/>
        <s:element name="first" type="s:string" minOccurs="0"/>
        <s:element name="last" type="s:string" minOccurs="0"/>
        <s:element name="email" type="s:string" minOccurs="0"/>
      </s:sequence>
    </s:complexType>
    </s:schema>
</types>
```

Message Definitions

Each Web service operation defines a pair of messages, which define the input and output types.

```
<message name="getAccountsByUserSoapIn">
  <part name="parameters" element="s0:getAccountsByUser"/>
</message>
<message name="getAccountsByUserSoapOut">
  <part name="parameters" element="s0:getAccountsByUserResponse"/>
</message>
```

PortType, Binding and Service Definitions

Conduits are structurally similar to portType definitions; portType operations are mapped onto conduit operations; input and output elements correspond to transformOut and transformIn XQuery declarations.

```
<portType name="CRMSoap">
  <operation name="getAccountsByUser">
    <input message="s0:getAccountsByUserSoapIn"/>
    <output message="s0:getAccountsByUserSoapOut"/>
  </operation>
  . . .
</portType>
<binding name="CRMSoap" type="s0:CRMSoap">
  <soap:binding transport="http://schemas.xmlsoap.org/soap/http"
   style="document"/>
  <operation name="getAccountsByUser">
    <soap:operation soapAction="http://www.openuri.org/
    getAccountsByUser"
      style="document"/>
    <input>
      <soap:body use="literal"/>
    </input>
    <output>
      <soap:body use="literal"/>
    </output>
  </operation>
  . . .
</binding>
<service name="CRM">
```

-continued

```
  <port name="CRMSoap" binding="s0:CRMSoap">
    <soap:address location="http://BISHAMON:7001/CRMWeb/
    CRM.jws"/>
  </port>
</service>
```

SalesForce Conduit Definitions

The following conduit file implements part of a conduit that connects with the SalesForce.com Web service.

```
/**
 * @mas:stateful shared="false"
 * @common:xmlns namespace="http://schemas.xmlsoap.org/soap/
  envelope/" prefix="soap"
 * @common:xmlns namespace="urn:partner.soap.sforce.com"
  prefix="sfdc"
 * @common:xmlns namespace="http://example.com/" prefix="app"
 */
/**
 * @common:control
 * @jc:location http-url="http://enterprise.soap.sforce.com/"
 */
ws = new WebServiceControl( );
// session object returned from web service
var sessionId = null;
// create and send login message and process results
function login( ) {
    var body =
        <login>
            <username>{$user.username}</username>
            <password>{$user.password}</password>
        </login>;
    var response = ws.invoke(body);
    // set session id
    sessionId = string(response.body.sfdc:result.sfdc:sessionId);
    // set URL for subsequent calls (from this conduit)
    ws.endPoint = string(response.body.sfdc:result.sfdc:serverUrl);
}
// create conversational header
function createHeader( ) {
    if (sessionId == null) {
        login( );
    }
    return
        <SessionHeader>
            <sessiondId>{sessionId}</sessiondId>
        </SessionHeader>;
}
/**
 * select contacts for an account: $account.@@contacts.*
 * @mas:operation type="select" keyref="app:contactAccountRef"
  inverse="true"
 * @mas:transform type="request" function="selectContacts_request"
 * @mas:transform type="response" function="selectContacts_response"
 */
function selectContacts($msg, $source) {
    $msg.header += createHeader( );
    return ws.invoke($msg);
}
/**
 * @mas:namespace target="sfdc"
 * @mas:field xpath="@id"
 * @language:body type="xquery"
 */
function selectContacts_request($source) {
    <query>
    <queryString>
        SELECT * FROM Contact
        WHERE AccountId = "{string($source/@id)}"
    </queryString>
    </query>
}
/**
 * @mas:namespace target="app"
 * @language:body type="xquery"
 */
```

-continued

```
function selectContacts_response($response) {
    for $i in $response/sfdc:queryResponse/sfdc:result/sfdc:records
    return
        <contact id="{string($i/sfdc:Id)}" accountId="{string($i/
        sfdc:AccountId)}">
            <modified>{string($i/sfdc:SystemModstamp)}</modified>
            <first>{string($i/sfdc:FirstName)}</first>
            <last>{string($i/sfdc:LastName)}</last>
            <email>{string($i/sfdc:Email)}</email>
        </contact>
}
/**
 * insert contact: $root.create(<contact>. . .</contact>);
 * @mas:operation type="insert" node="app:contact"
 * @mas:transform type="request" function="insertContact_request"
 * @mas:transform type="response" function="insertContact_response"
 */
function insertContact($msg, $node) {
    $msg.header += createHeader( );
    var response = ws.invoke($msg);
    var id = response.sfdc:createResponse.sfdc:result.sfdc:Id;
    // retrieve sequence number
    var $msg2 = createMessage(
        <query>
        <queryString>
            SELECT SystemModstamp FROM Contact
            WHERE Id = "{id}"
        </queryString>
        </query>
    );
    $msg2.header += createHeader( );
    var response2 = ws.invoke($msg2);
    // return both responses
    response.body += response2.body.sfdc:queryResponse;
    return response;
}
/**
 * @mas:namespace target="sfdc"
 * @language:body type="xquery"
 */
function insertContact_request($node) {
    <create>
        <sObjects xsi:type="Contact">
            <AccountId>{string($node/app:@accountId})</AccountId>
            <FirstName>{string($node/app:first})</FirstName>
            <LastName>{string($node/app:last})</LastName>
            <Email>{string($node/app:email})</Email>
        </sObjects>
    </create>
}
/**
 * @mas:namespace target="app"
 * @language:body type="xquery"
 */
function insertContact_response($response) {
    <contact id="{string($response/sfdc:createResponse/
    sfdc:result/sfdc:Id)}">
        <modified>
            {string($response/sfdc:queryResponse/sfdc:records/
            sfdc:SystemModstamp)}
        </modified>
    </contact>
}
```

In one embodiment, the occasionally-connected application server can interact with a server bus. In one embodiment, the service bust acts like a web server.

Service Bus can be a proxy that obtains information from multiple locations.

The service bus can:

Bridges the gap between the message the sender sends and the receiver expects in the area of envelope protocol, transport protocol, security scheme, payload contents, one-way and request/response paradigms, sync and async communication, and point to point and pub/sub.

Provides additional computing capability in the intermediary to do tasks like multi-destination publish, content based routing, authentication and authorization, and credential mapping.

Provides monitoring capability in the intermediary with metrics collection and display, alert displays, tracking event collection and use, message archiving and SLA management.

Service Bus can be an intermediary. Messages to Service Bus can come in through a transport, gets processed to determine where to route it to and transformed for message enrichment. It then goes out again through a transport. The response can follow the inverse path. A copy of the message may be published to a set of interested listeners as the message passes through. The message processing by the intermediary can be driven by METAdata specified through the console.

The service Bus can support clustering of the WebLogic managed servers. Configuration and METAdata is automatically propagated to the managed server for fast local retrieval. Monitoring metrics can be automatically collected from all the managed servers for aggregation and display on the console.

Both intermediaries (proxy services) and external services invoked by the intermediaries can be modeled as services.

A service can have:

a set of concrete interfaces called ports (also called an endpoint), each with a transport address and associated configuration. The set of ports constitutes load balancing and failover alternatives for the service and are identical in characteristics.

a single optional abstract interface (analogy is a JAVA interface) which is a definition of the structure of message parts in the interface possibly broken down by operations (analogy is methods of a JAVA interface with parameters), a single binding that defines the packaging of message parts in the abstract interface to a concrete message and the binding of that message to the transport.

Policies on WS Security (WSS) and WS reliable messaging (WS-RM), authorization policies, and actions needed to be performed transparently by the binding layer (like logging).

In the case of standard SOAP web services based on a HTTP(S) or JMS transport, a WSDL representation of the abstract interface, concrete interface and binding is possible. A WSDL resource or an exiting service could be used to jumpstart the definition of a new service's interface.

Service Bus can support JMS (for BEA and external JMS providers), HTTP(S), email, file, WS-RM and FTP as service transports. Service Bus can support both request/response and one-way paradigms for HTTP and JMS async transports. It optionally supports ordered delivery of messages if the underlying transport supports it. Service Bus can support XML, non XML (structure described with MFL), binary, MIME with attachments (email), and SOAP 1.1 and 1.2 (with or without attachments for both RPC style and document style) packaging.

A service can have multiple ports for the same binding. These ports can be used as load balancing and fail over alternatives. The service can define the load balancing policy to use for its ports. Supported policies are round robin and random (weighted or not weighted). The ports not only serve as load balancing destinations but also fail over alternatives on failure. The two concepts are coupled together for a HA load balancing scheme.

A service can also define the retry policies on failure and (for request/response) a timeout policy.

A service can define security policies that apply to messages in its interface. This can be specified at the service level (applies to all messages) or individual messages for the operations of the service.

Services can be categorized. Category schemes can be defined. Categories are essentially key names and category values are values for the key name. A service can have multiple values for multiple category names. Categories are very useful for discovery purposes. There are a number of standard ontologies (or category schemes) that defines the key name and allowed hierarchy of values. Service Bus only allows leaf values in the hierarchy to be used to categorize services.

A set of services can be provided by an organization or an application called a service provider. Defining a provider for a service is optional and you can have standalone services. These can either be internal sub organizations in an enterprise or external partner organizations or even individual applications (semantics is up to the user). Also a service provider can be categorized like services for searching. A service provider is associated with credentials and could be tied to a user so it can belong to roles for authorization. Service providers can send and receive messages.

Service consumers can be an organization or an application and can only send messages (or receive sync responses). Also a service provider can be categorized like services for searching. A service consumer is associated with credentials and is tied to a user so it can belong to roles for authorization.

The implementation of a proxy service can be specified by a pipeline definition. This consists of a request pipeline definition and a response pipeline definition. The pipelines specify what actions are performed on request messages to the proxy service before invoking an external (or another proxy) service and what processing is performed on responses from the service invoked by the proxy before the proxy returns a response.

Each pipeline can be a sequence of stages. Messages fed into the pipelines can be accompanied by a set of message context variables (that includes variables that contain the message contents) that can be accessed or modified by the pipeline stages.

The main stages in the pipelines are as follows.

A transformation stage allows if structures to be nested to select a transformation to be performed that affects the context. A web services callout or DB lookup can be an alternative to an Xquery or XSLT transformation to set the output context variable.

A routing stage (only allowed in request pipelines) allows if structures and case structures to be combined (and nested) to define a single endpoint and operation to route the message to. A set of transformations that affects context variables can be defined before the message is published to each endpoint. A web services callout or DB lookup can be an alternative to an Xquery or XSLT transformation to set the context variable.

A publish stage allows if structures and case structures to be combined (and nested) to define the set of endpoints and operations to publish the message to. A set of transformations that affects context variables can be defined before the message is published to each endpoint. A web services callout or DB lookup can be an alternative to an Xquery or XSLT transformation to set the context variable. The changes to the context are isolated to each published endpoint and do not affect subsequent processing by the pipeline.

WS-Security processing as well as authorization is transparently performed in the binding layer.

A tracking stage allows writing a tracking record with user defined information so the tracking system can be used to search by a user defined criteria.

An archiving stage writes the message to an archive for historical and record keeping purposes.

A logging stage allows logging of selected context to the system log for debugging purposes.

A validation stage validates a document against an XML of MFL schema.

A custom stage allows a user to define their own actions with an implementation of the stage using the stage SDK.

Each pipeline can consist of a sequence of stages. However a single service level request pipeline might optionally branch out into operational pipelines (at most one per operation and optionally a default operational pipeline). Since there is no standard way to determine an operation from the message contents, the determination of the operation is done through a user selected criteria. The response processing starts with the relevant operation pipeline which then joins into a single service level response pipeline.

The context can be shared across both the request pipeline and response pipeline, and its value is associated with individual request/response messages. The context can be a set of predefined XML variables. New variables can be added and deleted to the context dynamically. The predefined context variables have information about the message, the transport headers, security principals, the METAdata for the current proxy service and the METAdata for the primary routing and subscription services invoked by the proxy service. The context can be read and modified by Xquery/Xupdate expressions by the stages.

The core of the context can be the variables $header, $body and $attachments. These are wrapper variables that contain the SOAP headers, the SOAP body contents and the MIME attachments respectively. The context gives the impression that all messages are soap messages and non soap messages are mapped into this paradigm. In the case of binary or MFL data, the XML element that represents the document in $attachments or $body refers to the actual document with a unique identifier. In the case of SOAP RPC, the body content is itself a wrapper element that contains the typed RPC parameters.

Service Bus can have a built in type system that is available for use if desired at design time. When creating an Xquery expression in a condition or transformation at design time, the variable can be declared to be of one or more types in an editor to assist in easily creating the Xquery. The types are in XML schema, MFL or WSDL resources. This type declaration process is aware of the nature of the variable to be typed (is a wrapper for elements of the types or the types themselves). It also provides assistance to access SOAP RPC parameters or documents in $body easily.

Each stage can have a sequence of steps to execute if an error occurs in that stage. This sequence of steps constitutes an error pipeline for that stage. In addition an error pipeline can be defined for the whole pipeline or a whole proxy service. The lowest scoped error pipeline that exists is invoked on an error. This error pipeline allows the message to be published to an endpoint, formulate an error response message to be returned to the invoker of the proxy, log the message, continue after modifying the context, or raise an exception. Raising an exception transfers control to the next higher scoped error pipeline.

The processing of a request pipeline can consist of inbound transport processing, an inbound binding layer, the pipeline execution, outbound binding layer, and outbound transport processing steps. The binding layer automates some of the processing to be performed like mapping the message to/from context variables, packaging and unpackaging messages and doing WSS security and authorization. Both primary routing destinations and publish destinations follow this paradigm.

After the primary routing endpoint is invoked, the response pipeline processing follows a similar model.

A web services callout from a stage goes through a binding layer followed by the transport layer. The callout response follows the inverse path.

Users are security principals who can either be humans, organizations or applications. A user can either invoke UI interfaces (console user) or messaging interfaces (user modeled as a service consumer or provider).

Service Bus resources can be reusable common definitions or descriptions of entities and are typically METAdata for that entity. Resources can be used by multiple services and are standardized definitions or descriptions across an enterprise or department. Examples of resources are category schemes, MFL schemas, XSD schemas, Xquery maps, XSLT maps, WSDL interfaces, and WS-Policy files.

Category Schemes can define a single category name and a hierarchical set of values for the category name. Services, providers and consumers can be categorized using a registered scheme. They can be categorized with multiple leaf values for a category scheme or leaf values from multiple category schemes.

Schemas can describe types for primitive or structured data. MFL schemas describe types for non XML data. XML Schema describes types for XML. An XML schema type can import or include other schema files.

Transformation maps can describe the mapping between two types. XSLT maps describe mappings for XML data using the XSLT standard. Xquery maps describe the mappings for XML and non XML (MFL) data using the Xquery standard.

A WSDL interface can be a template for a service interface and describes the abstract interface of a service including the operations in that interface, and the types of message parts in the operation signature. It optionally also describes the binding of the message parts to the message (packaging) and the binding of the message to the transport. It also optionally describes the concrete interface of the service.

A WS-Policy can describe security and reliable messaging policy. It can describe what should be signed or encrypted in a message using what algorithms. It can describe what authentication mechanism should be used for the message when received.

In one embodiment, the Occasionally-connected application server platform provides a framework for developing, deploying and managing sophisticated mobile solutions, with a simple Web-like programming model that integrates with existing enterprise components.

Mobile applications may consist of a data model definition, user interface templates, a client side controller, which includes scripts that define actions, and, on the server side, a collection of conduits, which describe how to mediate between the data model and the enterprise. The occasionally-connected application server can assume that all data used by mobile applications is persistently stored and managed by external systems. The data model can be a META data description of the mobile application's anticipated usage of this data, and is optimized to enable the efficient traversal and synchronization of this data between occasionally connected devices and external systems.

The occasionally-connected data model can describe the structure (and other properties) of persistent application data.

The model itself can be synchronized with the mobile browser so that the client is able intelligently to traverse data and synchronize data with the server.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, a system and method for an occasionally-connected application server.

The invention claimed is:

1. An occasionally-connected application server comprising:

a synchronization unit that synchronizes a first set of data nodes stored on the occasionally-connected application server with a second set of data nodes stored on a mobile client for an application provided by the server, the application employing an occasionally-connected data model whereby the mobile client is enabled to utilize data in the second set of data nodes to run while disconnected from the occasionally-connected application server;

a conduit manager that translates between data from external systems and the first set of data nodes defined by the occasionally-connected data model stored on the server;

wherein the conduit manager employs a set of conduits that define transforms between first set of data nodes defined by the occasionally-connected data model and requests and responses for a specific external web service;

wherein the occasionally-connected application server interacts with the specific external web service to produce and update the first set of data nodes for the mobile client;

wherein the first set of data nodes have associated synchronization states, wherein the synchronization states are passed between the server and the mobile client as a background process to synchronize the first set of data nodes on the server with the second set of data nodes on the mobile client, such that update operations performed on the first set of data nodes during periods where the mobile client is disconnected from the server are reflected on the server when the connection is reestablished by employing the synchronization states associated with the first set of data nodes.

2. The occasionally-connected application server of claim 1, wherein the occasionally-connected application server is configured to cache data nodes as indicated by metadata in the occasionally-connected data model.

3. The occasionally-connected application server of claim 1, further comprising an adaptive user interface server adapted to provide HTML pages constructed using the data nodes and the occasionally-connected data model to the mobile client.

4. The occasionally-connected application server of claim 1, wherein synchronization requests that pass the synchronization states run asynchronously with respect to the browser on the mobile client.

5. The occasionally-connected application server of claim 1, wherein when the server receives a synchronization request from the mobile client, if the server has cached the data related to the request, the server responds immediately, otherwise if the data cached on the server is stale, the conduit manager invokes one or more of said conduits to deliver updated data.

6. The occasionally-connected application server of claim 1, wherein the synchronization states passed between the server and the mobile client is comprised of the following indications:

an indication whether the data node was locally created or modified;

an indication whether the data node was locally created or modified and ready for synchronization with server;

an indication whether the data node has a server synchronization pending; an indication whether the data node was synchronized with the servers;

an indication whether synchronization was rejected by the server; and an indication whether there was a conflict between a local modification and a server update.

7. The occasionally-connected application server of claim 1, wherein the occasionally-connected data model indicates anticipated usage of said data node by said mobile client before said data nodes are requested by said mobile client.

8. The occasionally-connected application server of claim 1, further comprising:

a primary in-core cache stored in memory on said occasionally-connected application server, wherein the in-core cache stores the set of data nodes, wherein each data node is associated with a synchronization state;

a secondary persistence cache stored on persistent memory on said occasionally-connected application server, wherein when at least some of the set of data nodes are stored on the persistent cache.

9. The occasionally-connected application server of claim 1, further comprising:

a cache manager that provides an interface of create, read, update and delete (CRUD) operations to the set of data nodes of the occasionally connected data model; and at least one cache which stores the set of data nodes for access by the cache manager, wherein each data node is associated with a synchronization state.

10. The occasionally-connected application server of claim 1, wherein:

the data nodes have an expire Time To Live (TTL) after which the data node is not returned from the occasionally-connected application server; and the data nodes have a refresh Time To Live (TTL) after which the data node is returned with an indication that the data node may be stale.

11. A method for operating an occasionally-connected application server comprising:

synchronizing a first set of data nodes stored on the occasionally-connected application server with a second set of data nodes stored on a mobile client for an application provided by the occasionally-connected application server, the application employing an occasionally-connected data model whereby the mobile client is enabled to utilize data in the second set of data nodes to run while disconnected from the occasionally-connected application server;

translating between data from external systems and the first set of data nodes stored on the occasionally-connected application server;

employing conduits which define transforms between requests and responses for a specific external web service and the first set of data nodes stored on the occasionally-connected application server;

interacting with the specific external web service to produce and update the first set of data nodes stored on the occasionally-connected application server;

maintaining synchronization states associated with the first set of data nodes stored on the occasionally-connected application server; and passing the synchronization states associated with the first set of data nodes between the occasionally-connected application server and the mobile client as a background process to synchronize the first set of data nodes on the occasionally-connected application server with the second set of data nodes on the mobile client, such that update operations performed on the first set of data nodes during periods where the mobile client is disconnected from the occasionally-connected application server are reflected on the mobile client when the connection is reestablished.

12. The method of claim 11, further comprising:

caching data nodes as indicated by metadata in the occasionally-connected data model.

13. The method of claim 11 further comprising:

providing an adaptive user interface server adapted to provide HTML pages constructed using the data nodes and the occasionally-connected data model to the mobile client.

14. The method of claim 11, further comprising running synchronization requests that pass synchronization states asynchronously with respect to a browser on the mobile client.

15. The method of claim 11, wherein when the server receives a synchronization request from the mobile client, if the server has cached the data related to the request, the server responds immediately, otherwise if the data cached on the server is stale, the conduit manager invokes one or more of said conduits to deliver updated data.

16. The method of claim 11, wherein the synchronization states passed between the server and the mobile client are comprised of the following indications:

an indication whether the data node was locally created or modified;

an indication whether the data node was locally created or modified and ready for synchronization with server;

an indication whether the data node has a server synchronization pending; an indication whether the data node was synchronized with the servers;

an indication whether synchronization was rejected by the server; and an indication whether there was a conflict between a local modification and a server update.

17. The method of claim 11, wherein the occasionally-connected data model indicates anticipated usage of said data node by said mobile client before said data nodes are requested by said mobile client.

18. The method of claim 11, further comprising:

providing a primary in-core cache stored in memory on said occasionally-connected application server, wherein the in-core cache stores the set of data nodes, wherein each data node is associated with a synchronization state; and providing a secondary persistence cache stored on persistent memory on said occasionally-connected application server, wherein when at least some of the set of data nodes are stored on the persistent cache.

19. The method of claim 11, further comprising:

providing via a cache manager an interface of create, read, update and delete (CRUD) operations to the set of data nodes of the occasionally connected data model; and providing at least one cache which stores the set of data nodes for access by the cache manager, wherein each data node is associated with a synchronization state.

20. A non-transitory computer-readable storage medium storing a set of instructions for operating an occasionally-connected application server, said instructions, when executed by one or more processors, causing the one or more processors to perform steps comprising:

synchronizing a first set of data nodes stored on the occasionally-connected application server with a second set of data nodes stored on a mobile client for an application provided by the occasionally-connected application server, the application employing an occasionally-connected data model whereby the mobile client is enabled to utilize data in the second set of data nodes to run while disconnected from the occasionally-connected application server;

translating between data from external systems and the first set of data nodes stored on the occasionally-connected application server;

employing conduits which define transforms between requests and responses for a specific external web service and the first set of data nodes stored on the occasionally-connected application server;

interacting with the specific external web service to produce and update the first set of data nodes stored on the occasionally-connected application server;

maintaining synchronization states associated with the first set of data nodes stored on the occasionally-connected application server; and passing the synchronization states associated with the first set of data nodes between the occasionally-connected application server and the mobile client as a background process to synchronize the first set of data nodes on the occasionally-connected application server with the second set of data nodes on the mobile client, such that update operations performed on the first set of data nodes during periods where the mobile client is disconnected from the occasionally-connected application server are reflected on the mobile client when the connection is reestablished.

* * * * *